"SEQUENCE"

"SELECT"
"SELECT AND COLLATE"

"SEPARATE"

Jan. 16, 1962     A. A. AUERBACH ET AL     3,017,610
ELECTRONIC DATA FILE PROCESSOR
Filed March 15, 1957                   36 Sheets-Sheet 4

GATE 922

BUFFER 946

DELAY LINE 971

CATHODE FOLLOWER 1150

INVENTORS
ALBERT A. AUERBACH
EVELYN BEREZIN
SAMUEL LUBKIN
ROBERT F. SHAW

BY Charles L. Allyn
ATTORNEY

AMPLIFIER 1000

RESHAPER 1050

FLIP FLOP 1100

END OF TAPE & INFORMATION CONTROLS 762

CYCLE CONTROLS 764

COMPARATORS 768

COMPARISON
TIME SELECTOR 770

ALTERNATE PULSE GENERATOR 772

SPROCKET SYNCHRONIZER 714

INPUT SERIALIZER 716

DIGIT INPUT COUNTER 720

GROUP INPUT COUNTER 722

LEAST SIGNIFICANT BIT COUNTER 724

MOST SIGNIFICANT BIT COUNTER 726

CHECK DIGIT CONVERTER 728

CHECK DIGIT COMPARATOR 730

Jan. 16, 1962   A. A. AUERBACH ET AL   3,017,610
ELECTRONIC DATA FILE PROCESSOR
Filed March 15, 1957   36 Sheets-Sheet 22

OUTPUT BUFFER STORAGES

INVENTORS.
ALBERT A. AUERBACH
EVELYN BEREZIN
SAMUEL LUBKIN
ROBERT F. SHAW
BY
Charles C. Allyn
ATTORNEY

DIGIT OUTPUT COUNTER
736

FIG. 31 GROUP OUTPUT COUNTER 738

OUTPUT SPROCKET GENERATOR 740

READ OUT CONTROL

INVENTORS.
ALBERT A. AUERBACH
EVELYN BEREZIN
SAMUEL LUBKIN
ROBERT F. SHAW
BY
Charles L. Allyn
ATTORNEY

OUTPUT SYNCHRONIZER CONTROL 748

OUTPUT PARALLELIZER 742

OUTPUT DECIMAL POINT & CARRIAGE RETURN DETECTORS 744

Jan. 16, 1962 A. A. AUERBACH ET AL 3,017,610
ELECTRONIC DATA FILE PROCESSOR
Filed March 15, 1957 36 Sheets-Sheet 29

ELECTRO-MECHANICAL TYPEWRITER 750

INVENTORS.
ALBERT A. AUERBACH
EVELYN BEREZIN
SAMUEL LUBKIN
ROBERT F. SHAW
BY
ATTORNEY

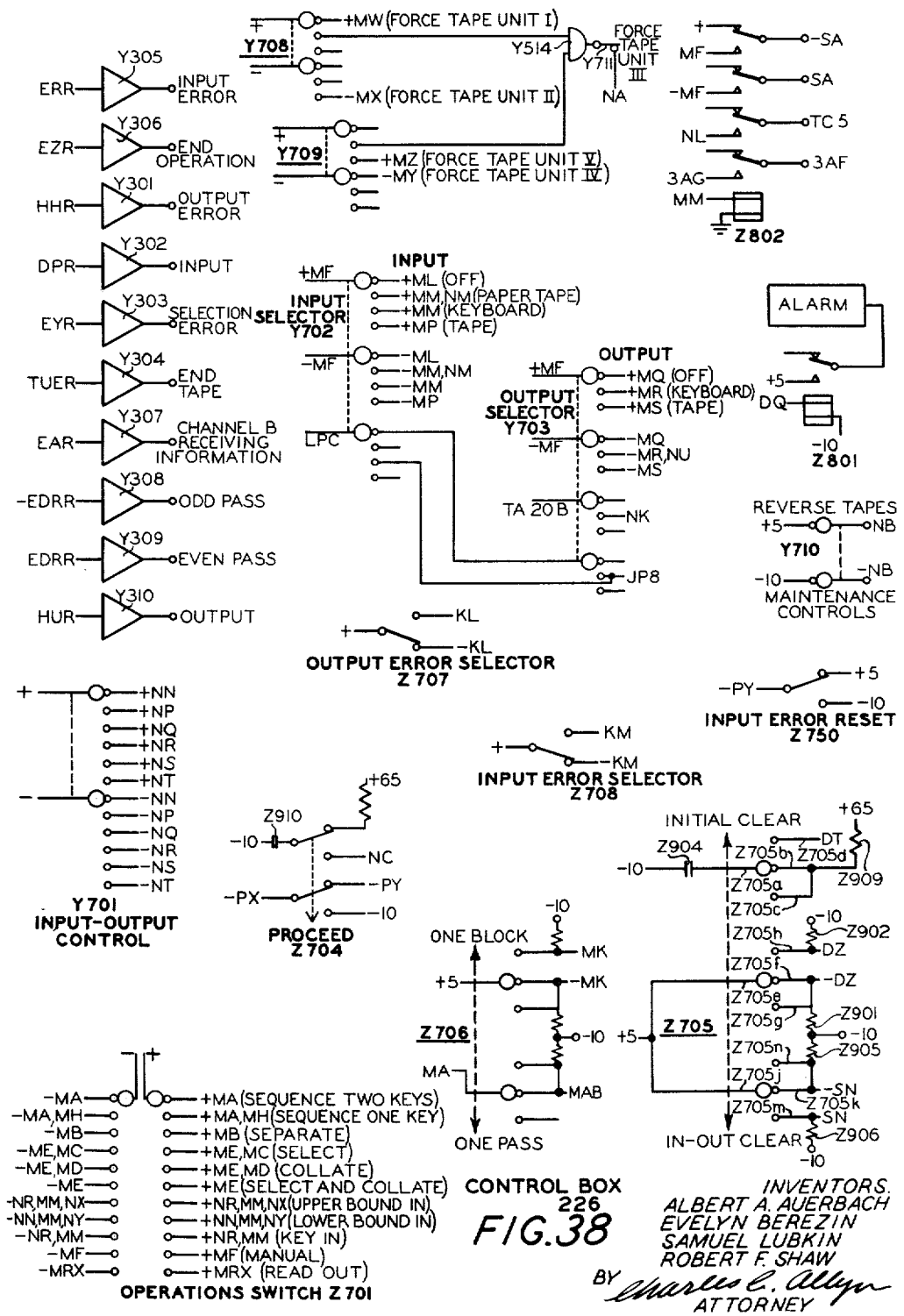

SIGNALS FROM TIMER 228

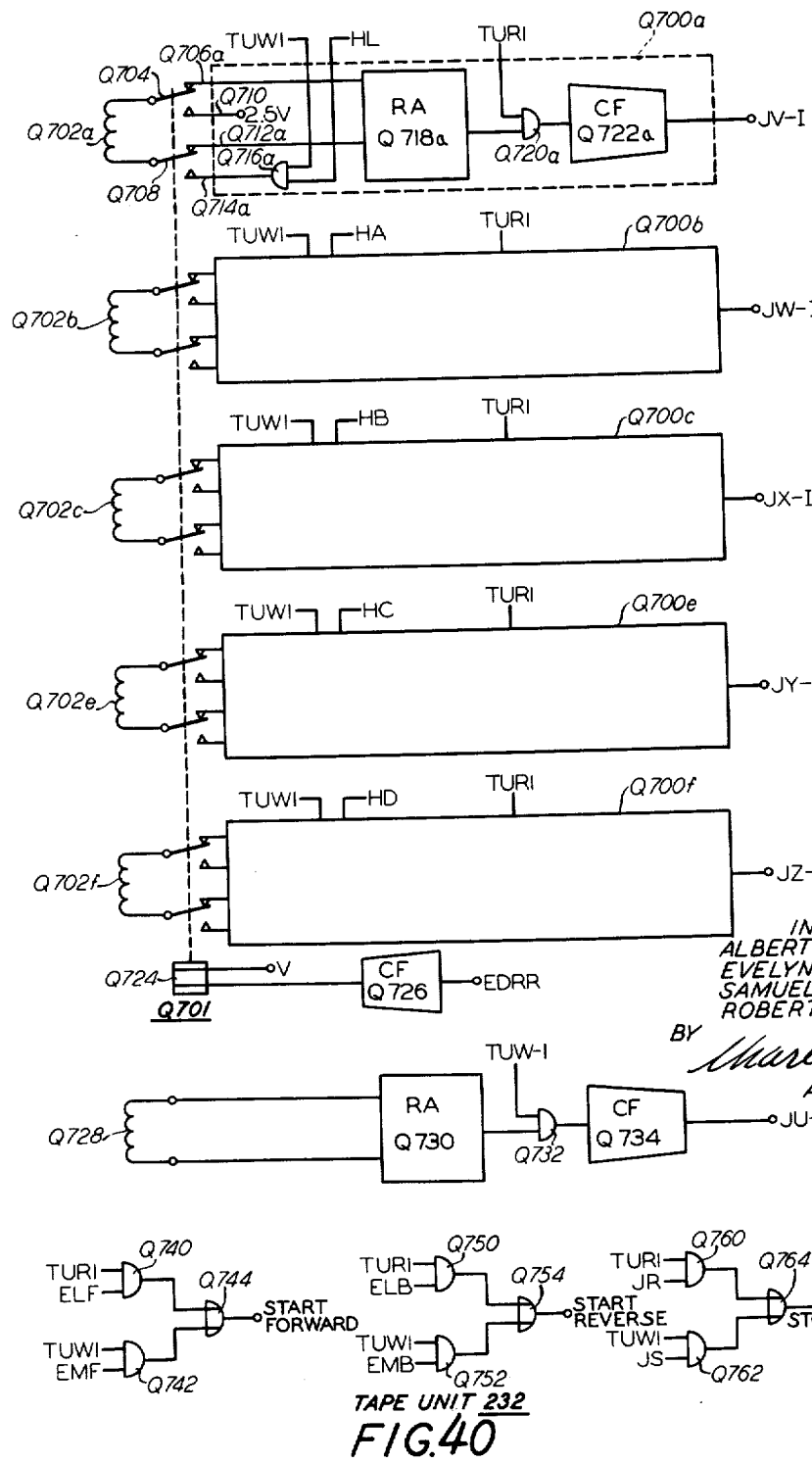

TAPE ERROR AND PROCEED CIRCUITRY 756

TAPE SELECTOR 760

United States Patent Office 3,017,610
Patented Jan. 16, 1962

---

3,017,610
ELECTRONIC DATA FILE PROCESSOR
Albert A. Auerbach, Hollis, Evelyn Berezin, New York, Samuel Lubkin, Bayside, and Robert F. Shaw, New York, N.Y., assignors, by mesne assignments, to Curtiss-Wright Corporation, Carlstadt, N.J., a corporation of Delaware
Filed Mar. 15, 1957, Ser. No. 646,492
15 Claims. (Cl. 340—172.5)

1. Introduction

This invention relates to business machines and more particularly to electronic data handling apparatus for processing files of items represented by signals recorded on magnetic tapes or similar media. Files composed of information items recorded in this fashion must be arranged, rearranged, supplemented and revised from time to time if they are to be of practical use for business purposes. Such processing of the data or items in a file is the purpose of the electronic equipment of this invention.

From the time the first electronic digital computer was developed, it was recognized that similar equipment would eventually have important applications in accounting and other business applications. With the exception of the electronic multiplying punches used with punched card equipment, which for some time have been in general use, electronic digital computers are only now beginning to find their way into accounting applications on a reasonably large scale.

In order to explain this slow acceptance of computers in the commercial field, it is necessary to understand the difference between scientific and business computation.

Most scientific computation involves a great many arithmetic operations—additions, subtractions, multiplications, and divisions—on a comparatively small amount of initial data, and the final result of this mass of computation is, in many cases, only a handful of numerical results. The high internal speed of electronic computers is ideal for such problems, and not too much attention has to be given to input and output equipment.

ELECTRONIC DATA FILE PROCESSOR

Table of contents

| SUBJECT | Column |
|---|---|
| 1. Introduction | 1 |
| 1a. Definitions—File Processing Operations (General) | 3 |
| 1b. File Processing Operations | 4 |
| 1c. Sequence | 4 |
| 1d. Collate | 5 |
| 1e. Select | 5 |
| 1f. Separate | 5 |
| 1g. Brief Description of Invention | 5 |
| 2. Brief Description of Drawings | 11 |
| 3. Coding and Related Definitions | 13 |
| 4. Signals of the File Processor | 15 |
| 5. Brief Description of Units of the File Processor System (Fig. 1) | 20 |
| 6. Sequence (Fig. 1) | 21 |
| 7. Select (Fig. 2) | 29 |
| 8. Collate (Fig. 1) | 33 |
| 9. Select and Collate (Fig. 2) | 33 |
| 10. Separate (Fig. 3) | 34 |
| 11. Gate (Figs. 4a and 4b) | 36 |
| 12. Buffer (Figs. 5a and 5b) | 37 |
| 13. Delay Line (Figs. 6a and 6b) | 38 |
| 14. Amplifier (Figs. 8a and 8b) | 39 |
| 15. Reshaper and Pulse Extender (Figs. 9a and 9b) | 40 |
| 16. Flip Flop (Figs. 10a and 10b) | 41 |
| 17. Miscellaneous Amplifiers (Fig. 7) | 42 |
| 18. The Memory (Fig. 11) | 42 |
| 19. The Control Unit (Figs. 12 and 13) | 45 |

| SUBJECT | Column |
|---|---|
| 20. End of Tape and Information Controls (Fig. 12) | 45 |
| 21. Cycle Controls (Fig. 13) | 48 |
| 22. The Comparison Circuits (Figs. 14, 15, 16) | 51 |
| 23. The Comparators (Fig. 14) | 51 |
| 24. Comparison Time Selector (Fig. 15) | 53 |
| 25. The Alternate Pulse Generators (Fig. 16) | 54 |
| 26. The Input Synchronizer (Fig. 17) | 55 |
| 27. Input Buffer Storage Registers of the Input Synchronizer (Fig. 18) | 56 |
| 28. The Sprocket Synchronizer (Fig. 19) | 58 |
| 29. Input Serializer 716 (Fig. 20) | 59 |
| 30. Input Decimal Point and Carriage Return Detector (Fig. 21) | 60 |
| 31. The Digit Input Counter (Fig. 22) | 62 |
| 32. Group Input Counter (Fig. 23) | 63 |
| 33. Tape Input Error Check Circuitry (Figs. 24, 25, 26, 27) | 66 |
| 34. The Output Synchronizer (Fig. 28) | 69 |
| 35. The Output Buffer Storages (Fig. 29) | 70 |
| 36. The Digit Output Counter (Fig. 30) | 71 |
| 37. The Group Output Counter (Fig. 31) | 73 |
| 38. The Output Synchronizer Control (Fig. 33) | 76 |
| 39. Output Sprocket Generator 740 (Fig. 32) | 79 |
| 40. Output Parallelizer 742 (Fig. 34) | 80 |
| 41. Output Decimal Point and Carriage Return Detectors (Fig. 35) | 83 |
| 42. The Input Output Unit (Figs. 36 and 37) | 86 |
| 43. The Electromechanical Typewriter (Fig. 36) | 87 |
| 44. The Electromechanical Typewriter Controls (Fig. 37) | 88 |
| 45. The Control Box (Figs. 38 and 38a) | 92 |
| 46. Signals from Timer 228 (Fig. 39) | 95 |
| 47. Tape Unit I 232 (Fig. 40) | 96 |
| 48. The Tape Controls 242 (Figs. 41, 42, 43) | 97 |
| 49. Tape Selector (Fig. 41) | 97 |
| 50. Tape Error and Proceed Circuitry (Fig. 42) | 99 |
| 51. Tape Selection and Motion Control (Fig. 43) | 102 |
| 52. Conclusion | 104 |

In most commercial applications a quite different situation prevails. Actual computation is usually very simple, involving chiefly addition and subtraction and occasionally multiplication, but the total amount of data to be handled is very large. As an example, consider the maintenance of an inventory file. Such a file may contain entries for thousands of items, and a considerable amount of information may be recorded for each item. A day's shipments, however, might involve only a handful of items, and the only operation necessary may be the correction of the stock balance for each of these few items. The problem therefore is to select from this voluminous file only a few items, and in each of these items to change only one figure. From this example, typical of the great majority of commercial data processing applications, it is apparent that in order for a computer to be of value in such a case it must be part of a complete system which also includes a special purpose device which is called a file processor.

Furthermore, the system must provide for economical storage of a large volume of data and must include provisions for giving the computer access to any part of the data by means as rapid and as automatic as possible.

For some years punched cards have been widely used as a storage medium for data. A variety of mechanical and electromechanical devices were developed for punching, interpreting, sorting, tabulating, and performing various other operations on these cards. Punched cards, however, suffer from several serious deficiencies which severely limit the proper utilization of the vast potentialities of electronics in a data processing system.

In the first place, cards are a relatively inefficient storage medium in terms of weight and bulk for the amount of information they can hold. This leads to problems both in storing and in handling them. Their inherent efficiency in these respects is further reduced by the fact that it is seldom possible to utilize fully the potential storage capacity—for example, it is usually necessary to use a full 80-column card for an item of information even though only 50 columns are actually required.

Another disadvantage of punched cards lies in the amount of handling required. With existing equipment, human intervention is usually required after each machine operation. Sorting is an outstanding example of this. To perform a numerical sort on 8 columns, the operator must gather the cards and load them into the sorter 8 times, and if an alphabetic sort is required, the situation is considerably worse.

Another limitation which is inherent in punched cards as a storage medium is the fact that data once punched cannot be altered.

Finally, the rate at which cards can be read or punched is considerably below the speed capabilities of electronic equipment.

The foregoing considerations indicate that a more efficient primary storage medium is required in electronic data processing systems, although it is still true, and probably will be for some time to come, that cards have a place in the over-all picture. It is highly desirable to store the data on a more suitable storage medium. This medium, in practically every modern electronic data processing system, is magnetic tape.

When recording data on tape, each numerical digit or letter of the alphabet is first converted to a unique and recognizable combination of electrical signals. These signals are then passed through very small electromagnets called "recording heads," over which the tape is moved, and they magnetize small areas on the surface of the tape. When the tape is again moved over the "heads," the latter act as reading devices and reproduce the electrical signals representing the letters and numerals. The small magnetized spots on the tape correspond to the holes in a punched card or a piece of Teletype tape. The advantage of magnetic tape over punched paper tape lies in the fact that data can be recorded magnetically at a much faster rate than paper tape can be punched, and in the further and very significant fact that information on magnetic tape can be erased and new data recorded in its place.

Magnetic tape is a very efficient storage medium. One reel 8 inches in diameter, holding 1200 feet of tape half an inch wide, can hold as much information as 12,000 punched cards. Information can be read from or recorded on this tape at a rate corresponding to 3000 cards per minute. This should be compared to 100 cards per minute for a standard card punch, or 240 cards per minute for a standard card reader. (The fastest card sorter runs at a little over 1000 cards per minute, but ordinarily reads only one column at a time.) Thus, it is highly desirable to utilize magnetic tapes as the record media in a filing system.

1a. *Definitions—file processing operations (general)*

The following definitions are helpful in describing file processing operations: An Item (sometimes called a file item or line item) is a group of information referring to a single account, transaction, inventory unit, or similar classification. It is identified and distinguished from other items of a similar type by the designator or key, which is usually the account number, stock number, or similar identifying information. In some cases the designator may be a person's name; electronic equipment, unlike punched card equipment, can operate on alphabetic data as easily as on numeric.

Items of fixed length (i.e., a fixed number of characters) were the rule until recently, but modern electronic data processing equipment can now accept items of varying lengths. Since the disposition of an item during most operations is determined by its designator, the latter always occupies a fixed position with respect to the beginning of an item. For example, the designator may be the first 12 characters, or possibly the 7th to 16th characters inclusive, or may be split, occupying for example, the 3rd to the 7th and the 11th to the 19th characters. Whatever its location, however, it must always be in the same position in every item in a given group, in order that the automatic comparing circuits of the equipment may always know which characters to examine and which are to be ignored in deciding upon the proper disposition for the item.

Certain other parts of an item must also occupy standard positions (see description of the separation below). Remaining data sometimes called satellite or trailer information, may also occupy standardized locations for convenience in certain computer operations, but their exact location often is not significant.

Some distinctive character or combination of characters, the item end marker, must be provided, however, to indicate the end of an item, and it may also be convenient to indicate the beginning of each item by a separate indicator.

A File is an assembly of similar items. There is a further implication in the term "file"—namely that the items are arranged within the file (i.e., on the magnetic tape in the situation herein concerned) in a sequence determined by their designators. A File may consist of one or several reels of tape.

One complete movement of a tape past the reading or writing head is known as a Pass. In most cases the tape must be rewound after a pass, although in certain cases (see the discussion of sequencing, for example) information may be read or recorded with the tape running backward. In describing such operations it may be necessary to specify the direction of tape motion by referring to a forward or a reverse pass.

1b. *File processing operations*

The operations which a data processing system is called upon to perform fall into two well-defined classes. In the first of these classes are operations which affect the individual parts of an item. These may be called Computing or Arithmetic operations, and include such processes as addition, subtraction, etc. This type of work can be handled quickly and efficiently by practically any modern electronic digital computer.

The second general class of data processing operations, and the one with which the present embodiment of the invention is concerned, may be called the class of File Processing operations. These are operations in which each item is handled as a complete unit—i.e., if a decision is made to move an item from one tape to another, the entire item is moved, and never only a part of it. Actually, File Processing operations are essentially item arranging operations, but it should be noted that this implies arranging items with respect to other items, and not arranging parts of an item with respect to each other.

In punched card operations, sorting and collating are the most familiar examples of file processing operations. A card collator can also be used to select cards from a file deck under control of a selection deck, and either a card sorter or card collator can be used to separate from a file deck all cards which have some characteristic in common. All these operations have their counterparts in electronic file processing. These operations are hereinafter called Sequence, Collate, Select and Separate.

1c. *Sequence*

Sequence is the process of arranging a group of items in a systematic arrangement according to their designators. Thus, for example, if the designator is a name, sequence would mean arranging the items in alphabetical order; if the designator is an account number, sequence would mean arranging items in account number order.

1d. Collate

Collate may be considered a special case of sequence, in which each of the two input files contains completely sequenced items. In Collate, data from these two sequenced files are merged to give a single sequenced file.

Collate is used in cases where data recorded on several reels are to be sequenced. In such cases each reel is sequenced, and the resulting reels are collated in pairs until the entire file is in sequence on successive reels.

1e. Select

Select is a process by which the file processor separates out of the main file those items requiring action.

In this process a tape is used which is known as the selector tape. It contains the list of items desired, arranged in the same sequence as the main file.

Items on the selector tape must carry the designators of the items desired from the file, and these designators must occupy the same relative position within an item as the designators in the file items. Aside from the designators, the data contained in the selector items has no bearing on the selection process. In practice, the selector tape usually contains a list of transaction items which affect items in a file. For example, a list of items received and shipped might make up the selector tape used in processing an inventory file. As far as the selection process is concerned, the important part of each selector item would be the designator, which in this case would be the stock number. Other information in each selector item, such as the quantity, order number, whether the item refers to a receipt or a shipment, etc., would be carried along for later use, but would not affect the selection operation.

1f. Separate

It is often necessary to extract from a file all items which satisfy certain conditions—for example, all accounts receivable over 90 days old, or all customers living in a certain state or group of states. Such an operation is called Separate (and is sometimes known as "class selection").

1g. Brief description of invention

In sequence or sorting operations during which a file is arranged in a uniform sequence as determined by the magnitude of each item, the various items to be sequenced are compared with one another and distributed onto one of two magnetic tapes according to the results of comparisons. Three items at a time are compared, two items from the incoming magnetic tape or tapes and the last item that was recorded on an outgoing magnetic tape. After the file has been operated on once there are two partially sequenced subfiles, each on an output magnetic tape. The usual procedure is to rewind these two output magnetic tapes and start the sequence operation for a second pass using these rewound magnetic tapes as input tapes. Since in the course of sequencing a randomly distributed file there may be a great many passes required, the total rewind time (one for each pass) becomes considerable. Although the rewind can occur at higher tape speeds, these speeds cause increased abrasive wear on the magnetic coating of the tapes as the tapes move over the transducing heads.

It is therefore an object of the invention to provide an improved means for the sequencing of items stored on a magnetic tape.

It is another object of the invention to provide means whereby a sequencing operation may be performed in a minimum time without causing undue abrasive wear of the magnetic tapes.

It is a further object of the invention to provide apparatus which eliminates the necessity of rewinding the magnetic tapes between the reading and recording of information.

In accordance with the invention apparatus is provided for reading information from a first magnetic tape in a first order of significance i.e. most significant digit first and recording the information on a second magnetic tape in a second order of significance i.e. least significant digit first while both magnetic tapes are moving in a first direction and at a later time while both magnetic tapes are moving in a direction opposite the first direction information is read from the second magnetic tape in the first order of significance and recorded on the first magnetic tape in the second order of significance.

One of the more important routines in file processing is the removal of items from a file, the processing of these items, and the reinsertions of these items after the processing. For example, a file is first run through a file processor and selected items are removed, the selected items are then arithmetically operated upon, in a separate arithmetic unit. After the arithmetic operation, the up-dated items are collated with the unselected items to again form a complete file.

At a later time different items may be selected for a different type of arithmetic operation and then returned to the file.

In the present art the selecting and collating operations are performed during separate passes of the file. For example, during one pass the main file is compared against a selector file and all the items of the main file that correspond to items of the selector file are extracted. After the selected items are arithmetically operated upon, there is another pass during which the unselected items and the selected items which have been arithmetically changed are collated or merged. Thus at least two passes are required to remove and reinsert items from a main file. If several different arithmetic operations such as up-dating, billing and posting are to be performed a selecting and collating pass brackets each arithmetic operation. Each pass of the main file is time consuming since there are many items contained in the file and time is expended during the two passes which bracket an arithmetic operation.

It is therefore an object of the invention to provide improved apparatus for removing and restoring items from a file.

It is another object of the invention to provide improved removal and reinsertion means which consumes less time in performing these two functions.

It is a further object of the invention to provide selection and collating means which effectively halves the operating time required to perform these operations.

In accordance with the invention, apparatus is provided for performing combined selection and collating of items in a file. The apparatus includes a first and a second storage means for storing the two portions of the main file to be collated. A comparison means compares items from the first and second storage means to determine the order in which items are extracted from the first and second storage means. A third storage means is incorporated for storing a file of selector items. The comparison means also compares the extracted items with the selector items. If an equality exists between a selector item and an extracted item, the extracted item is transferred to a fourth (selected) storage means and if an inequality exists the extracted item is transferred to a fifth (unselected) storage means.

Thus the collating is performed by choosing from between two files the item which is next to be compared with a selector item.

Two comparisons are performed. The first comparison is between items from the first and second storage units which contain the subfiles being collated or merged to determine which of two such items is to be compared during a second comparison with a selector item. The second comparison determines which output storage unit, the fourth or the fifth receives the item being compared with a selector item. Hence, during the first portion of a comparison period comparisons are performed which control collating operations and during the second portion of a comparison period comparisons are performed which control selection operations.

It is therefore only necessary to pass the files through the processor once to collate two files which are simultaneously scanned for the selection of items to create two new files one of which contains the selected items as determined by a selector file and the other containing the unselected items in collated form.

In the processing of a file, one very common application is to separate out all those items which fall within a range of a condition. For example, in an inventory file it is necessary to know when to re-order items. Thus periodically the file is surveyed and each item which indicates that the on-hand quantity of the part is below a predetermined minimum is extracted so that re-orders can be initiated. In another instance, it may be desirable to extract all items indicating the parts associated with a particular machine.

In general when serial type comparisons are performed it is possible during each pass of a file to separate out all those items which satisfy one particular criterion. If, however, it is desired to separate out all items which satisfy either one or both of two criteria it is necessary to run the file through the processor once for each criterion. As the alternative criteria increase the number of runs or passes also increase.

Since the files are lengthy the time for each pass is relatively long and a doubling or tripling of the time to search a file is very time consuming and may even overshadow the advantages accrued from magnetic tape operations. Even if time were not an element to consider the extra handling of the magnetic tapes is an undesired feature because of the wear associated with a tape moving over a transducing head.

It is therefore an object of the invention to provide an improved means of separating from a file of items those items which satisfy any one of several alternative conditions.

It is another object of the invention to provide apparatus which permits the separating from a file those items which satisfy any one of several alternative conditions in a minimum length of time.

It is a further object of the invention to provide alternative criteria separation apparatus for removing items from a file wherein only one scan of the file is required.

In accordance with the invention apparatus is provided for separating from a file of items those items which satisfy at least one of several alternative criteria. The apparatus includes means for storing the criteria and means for entering each item serially into a comparison unit. As each item enters the comparison unit it is compared with the criteria. Whenever the item satisfies at least one of the criteria a control means is activated. The items after comparison are stored in one of two output means. The choice of the output means is determined by the state of the control means.

For example, assume the items are to be separated if they satisfy either a condition A or a condition B. The condition A may be that a particular field of the item has a value between a given upper and a given lower bound. The condition B may be that another field of the items be equal to a given value. In an insurance file the conditions may be to separate all policy holders either in the 30 to 35 age bracket or that live in Connecticut. The coded representation of the criteria is stored in one storage location and each item of the file is serially fed to a comparison means. As each item is fed to the comparison means the stored criteria is also fed to the comparison means. A test is first made to determine whether the item satisfies the state criteria and then a test is made to determine whether the age criteria is satisfied. If either condition is satisfied the item stored is in a first location and if not the item is stored in a second location.

It should be noted that by performing the comparisons serially the amount of testing means is considerably lessened. Only one comparison means is required and the criteria are tested on a time sharing basis.

One of the prime functions of a file processor is to select from a file particular items for up-dating. In a billing file there is a time, say, at the end of a day's transactions, when all accounts relating to the transactions are removed from the file and up-dated.

In file processors of the punched card type, the usual procedure is to choose the field in the items for which the selection is to be performed. The apparatus in one form or another stores a representation which indicates the position of the field in the items. The selector items are compared against the file items in the pre-chosen field and whenever an equality exists the file item is pulled. Thus in a sense three storage devices are required one to store the file item during comparison, one to store the selector item during comparison and one to store the field locator.

Since storage devices or their equivalent are expensive, any means for reducing the number of such devices is highly desirable.

It is therefore an object of the invention to provide improved means for selecting desired items from a file.

It is another object of the invention to provide improved item selection means which requires less apparatus than conventional devices and is therefore less expensive.

It is a further object of the invention to provide item selection means which reduces the number of storage locations required to perform the selection.

In accordance with the invention, apparatus is provided which permits the selection of items from a file. The apparatus includes means for storing the main file of items and means for storing the selection file of items. The items in the selection file contain selection criteria in the appropriate position and in those positions not required for the selection criteria a coding character, different from all selection criteria, is inserted. Both the items from the main file and the selection file are fed to a comparison means. The comparison is blocked as long as the first coding characters are sensed and is only activated by characters other than these. Following the selection criteria, an end of comparison character may be included to lock the comparison means in its final state. Control means are provided which are responsive to the comparison means to activate means which places the file item in either one of two output locations. Thus only two storage devices are required, one for the selector items and one for the file items. The coding in the selector items performs the same function as a field selector register in conventional punched card equipment.

In many information processors the size of each unit of information is usually fixed. This unit sometimes known as a word or even a block has a maximum upper limit in size determined by the capacity of the storage registers associated with the information processor. In digital computers which handle purely numerical computations this imposes hardly any limitation since word lengths up to twenty digits suffice for most numerical problems.

However, in processors which handle more than computational information such as inventory files, insurance policy files or magazine subscription files a serious problem is imposed. Each separate item of information may contain hundreds of digits. Some of the digits are computational such as quantities of merchandise, premium payments or subscription payment installments, while others are not, such as part numbers, policy holder names and addresses and subscription holder names, occupations, etc. One solution of the problem is to design a processor having registers large enough to handle the largest size item, but such a solution is expensive and inefficient since many items are smaller than the capacity of the registers. A second solution is to limit the size of the items to the capacity of the registers but then much useful information must be omitted.

It is therefore an object of the invention to provide an improved method of handling variable length items.

It is another object of the invention to provide a method of handling variable length items wherein each item is divided into separate portions that are handled sequentially.

It is a further object of the invention to provide a method of handling variable length items in which each item is divided into sequential parts while being processed and reformed into a continuous item after processing.

In accordance with the invention means are provided in a file processor for dividing an item into sub-groups, called blocks. To each block is appended an end of block marker. The size of the block plus the end of block marker is no greater than the capacity of the registers of the processor. One of the blocks, either the first or the last, has a first kind of end of block marker which indicates either the beginning or the end of the item. The remaining blocks of the item have a second kind of end of block marker. Sensing apparatus is included which tests for end of block markers to effect transfer operations by activating various transfer paths in the file processor. Whenever a first kind of block marker is detected the transfer paths may or may not be altered, but whenever the second kind of end of block marker is detected the transfer path remains unaltered and the block associated with this end of block marker traverses the same path as the preceding block.

For example, assume an item is divided into three blocks. At the end of the first block is a first marker which is interpreted to mean this block is the lead or designator block of the item, while at the end of each of the two remaining blocks is a second marker which is interpreted to mean that these blocks are satellite or trailer blocks. At the end of the entrance of the first block into the processing circuits, the first marker is detected which activates a particular transfer path through the file processor dependent upon the information contained in the first block. The end of block marker activates apparatus which causes the entry of the second block of the item. When the second end of block marker is detected the second block proceeds to traverse the same transfer path as the first block and the third block enters. The third block also traverses the same transfer path. This transfer path is locked in and remains locked in until an end of block marker of the first kind is again detected.

In some of the operations of the file processor such as select and collate there may be a plurality of input reels of magnetic tape. After a first reel is processed a new reel is then inserted and processed. In this manner a multi-reel file is processed. Since the file for such processing operations must be in a completely sequenced order each of the reels contains a portion of the file in a completely sequenced order and each reel must be entered into the processing operation in its correct order of sequence. If the reels are fed into the file processor in an out-of-sequence order the processing cannot proceed in a correct manner and the resultant file is not only out of sequence but also may contain misinformation. Since the reels are fed to the file processor by human means there is the possibility of an intermixing in the order of reel entry.

Therefore, an object of the invention is to provide means for insuring the proper sequenced entry of reels in a multi-reel file to the file processor.

Another object of the invention is to provide means whereby whenever an out of sequence reel enters the file processor the file processor is halted and an indication given.

In accordance with the invention, apparatus is provided to detect the entry of an out-of-sequence item whenever an operation is in progress which requires that the items being processed occur in a sequence of predetermined order. The apparatus includes a storage means to store both the last processed item and the item being entered for processing. Both items are compared and if the newly entered item does not conform to the predetermined order of sequence the file processor is halted and an alarm signal initiated.

With most addressable recirculating memories it is customary to have an address generator. The address generator is synchronized with the recirculating memory such that as each storage location becomes available a number indicative of the location is generated by the address generator. Thus when storage location one is available for either transmitting or receiving information a representation of the number one is generated by the address generator, similar for the storage location two, etc.

When a specific storage location is to be filled or emptied the number representing the storage location is stored in a separate register and continuously compared by a comparator with the sequential numbers generated by the address generator. When an equality of numbers is indicated the desired storage location has been found and an information transfer is performed. After the transfer the number in the supplementary register is changed and a new address location is begun.

However, in many instances serial memory locations are called for as during the loading and unloading of a complete memory channel. In this case, after each storage location is used, the number in the supplementary register is increased by one and a new comparison is performed. Usually the rate at which information can be fed to the memory or used by circuits external to the memory is much slower than the rate of occurrence of successive memory locations so that at least one cycle of the memory occurs between information transfers and, therefore, a continuous transfer cannot be performed. Hence there is the need for continuously locating storage locations even though the locations desired are sequentially located.

In any case, with the use of a conventional address generator, the required supplemental storage and comparison circuits usually entail a great deal of equipment, and such equipment considerably adds to the expense of the overall system.

It is, therefore, an object of the invention to provide an improved means of locating sequential storage locations in a cyclic or recirculating type memory.

It is another object of the invention to provide successive address locating means which requires a minimum of equipment.

It is a further object of the invention to provide an address locating means for a cyclic memory which requires neither a supplementary storage nor a comparison means.

In accordance with the invention there is apparatus provided for locating storage locations in a cyclic type memory where the succeeding locations to be used bear a fixed relationship to each other. For example, one may follow the other or one may precede the other. The apparatus includes one recycling counting means having a maximum count equal to the number of storage locations in the cyclic memory and a means for changing the count by a unit in the recycling counting means as each storage location is available for use. At the start of a transfer of information to a group of storage locations, synchronizing means synchronizes the cyclic memory and the recycling counting means so that a predetermined count in the recycling counting means occurs when the first of the storage locations is available. Transfer means, responsive to the predetermined count, cause a transfer of the first unit of information. Count modifying means responsive to the transfer means modifies the count in the recycling counter by a predetermined amount so that when the counter again reaches the same predetermined number a new storage location is available to cooperate in a transfer.

For example, assume a recirculating memory having thirty-seven storage locations. A counter is provided which counts to thirty-seven and cycles back to zero and starts counting again. If the first unit of information is to be stored in location one, the second in location two, the third in location three, etc. the count is synchronized so that address location one is available when the counter is counting one and a transfer will always occur at a count of one.

When the counter has a count of one the first unit is transferred and the entry of one into the counter is suppressed. The next time the counter indicates a count of one (thirty-eight storage locations later) storage location two is available. If a unit count is suppressed again, the count of one occurs when the third storage location is available. It should be noted that by causing an extra unit addition whenever a transfer occurs it is possible to have the storage locations available in the reverse order. It should also be noted that by changing the count by two during a transfer every other storage location becomes available.

In the process of recording information upon magnetic tapes the information is usually recorded in basic units or blocks of digits. The basic unit is usually equal to the capacity of an internal storage register. In some digital computers the basic unit is a word comprising a fixed number of digits. When information is to be recorded on a magnetic tape the complete basic unit is transferred to a synchronizing means for recording. There arises, however, the possibility that there is not enough magnetic tape, particularly at the end of a reel, to record the complete unit. In such a case only a portion of the unit is recorded and the magnetic tape does not contain all the information that was assumed to be recorded.

It is therefore an object of the invention to provide a more reliable means for recording information on magnetic tape.

It is another object of the invention to provide a means for insuring the complete recording of a unit of information.

It is a further object of the invention to provide means for insuring that enough magnetic tape is available to finish recording a basic unit of information before the recording has begun.

In accordance with the invention a supplementary track or channel is provided on a magnetic tape parallel to the information tracks. Upon this supplementary track, indicia are recorded as long as there is sufficient tape remaining to insure that a complete unit of information may be recorded. Means are provided to sense the indicia and as long as the indicia are detected the recording means for recording information is permitted to operate. If however the indicia are not detected any information to be recorded is retained in its customary storage register unit until such indicia are detected.

2. Brief description of drawings

Figure 36:
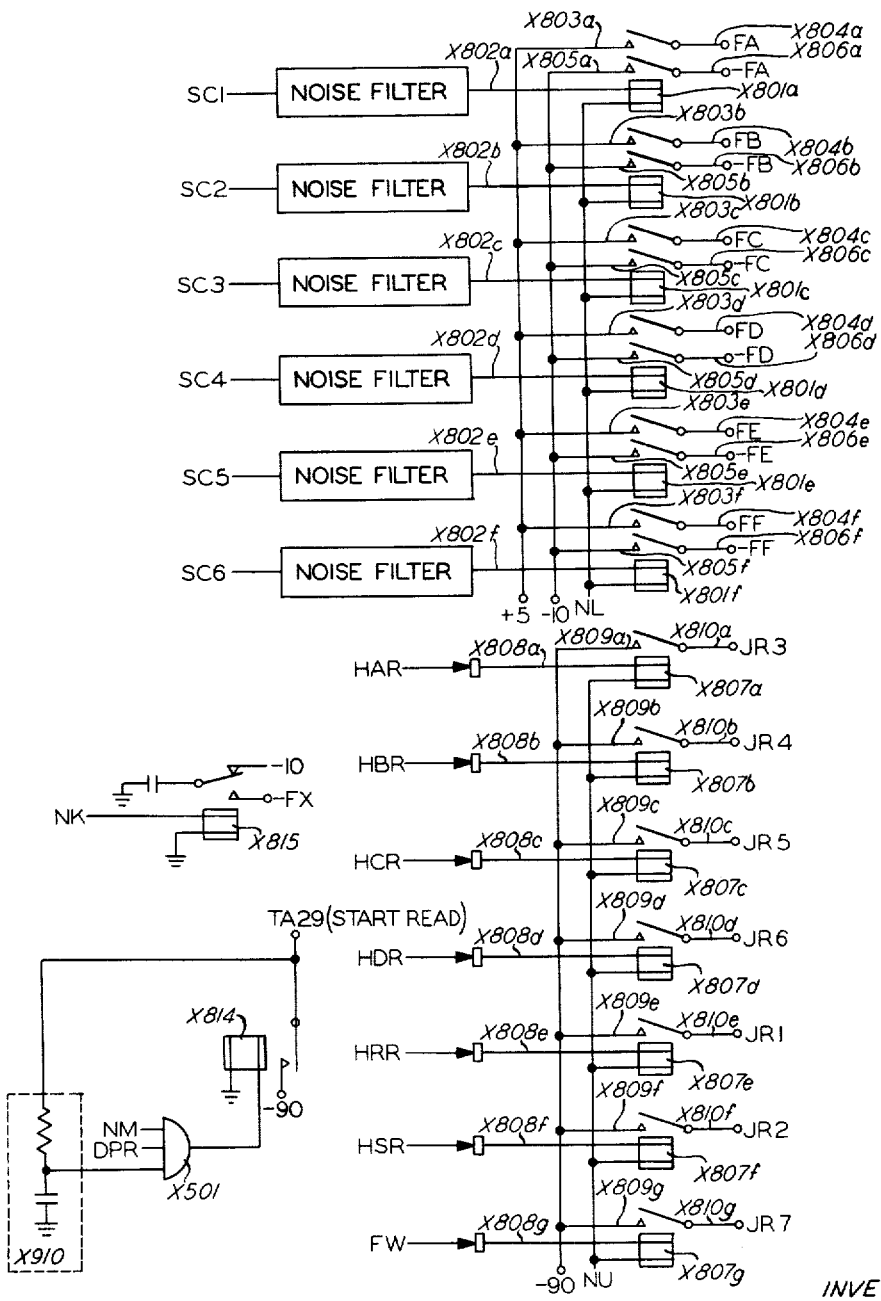

FIGURE 36 comprises the circuits interconnecting the File Processor and the Electromechanical Typewriter.

Figure 37:
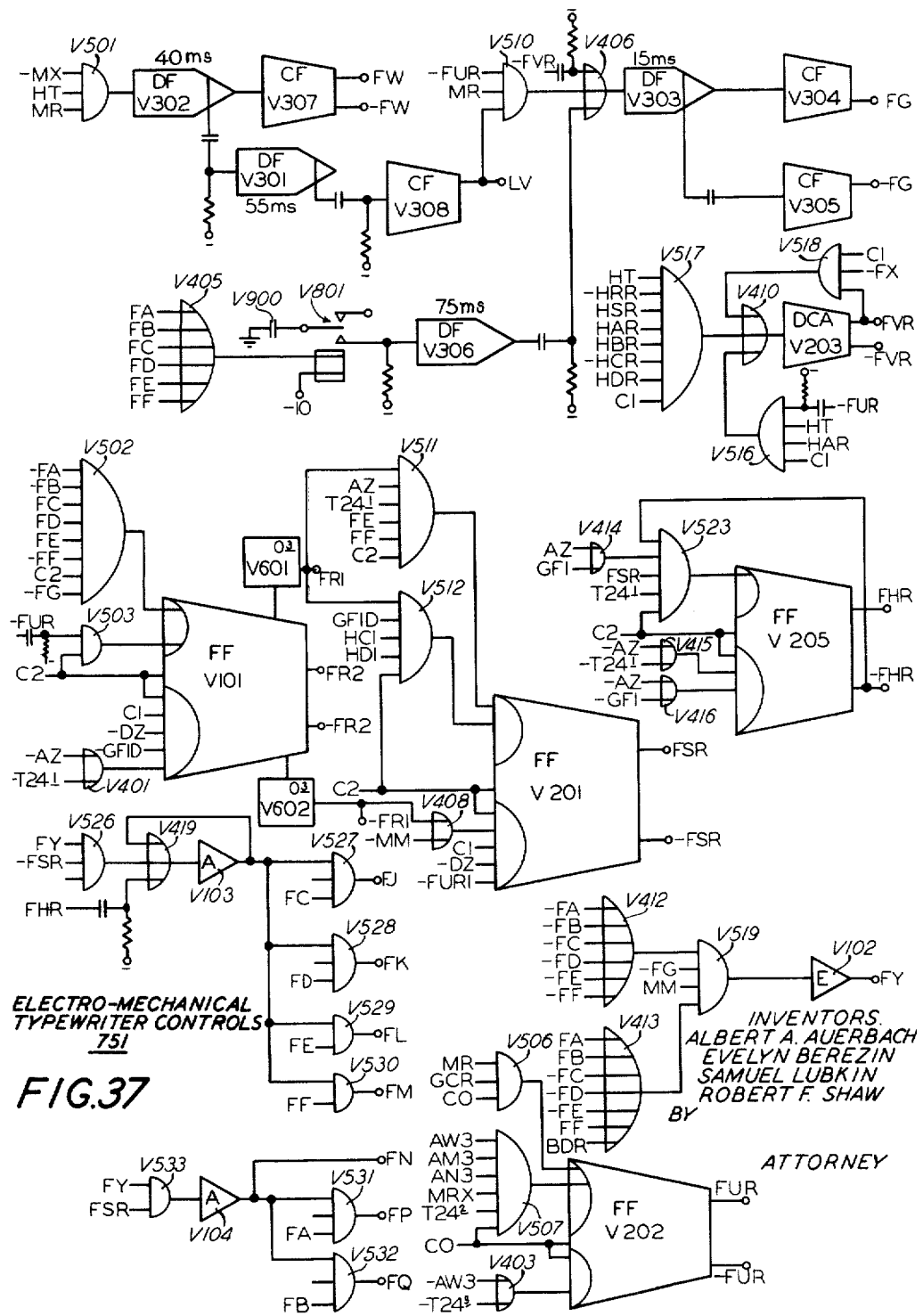

FIGURE 37 comprises the Electromechanical Typewriter Controls.

FIGURE 38 shows the switching circuits and operation indicators of the Control Box of the File Processor.

Figure 38A:
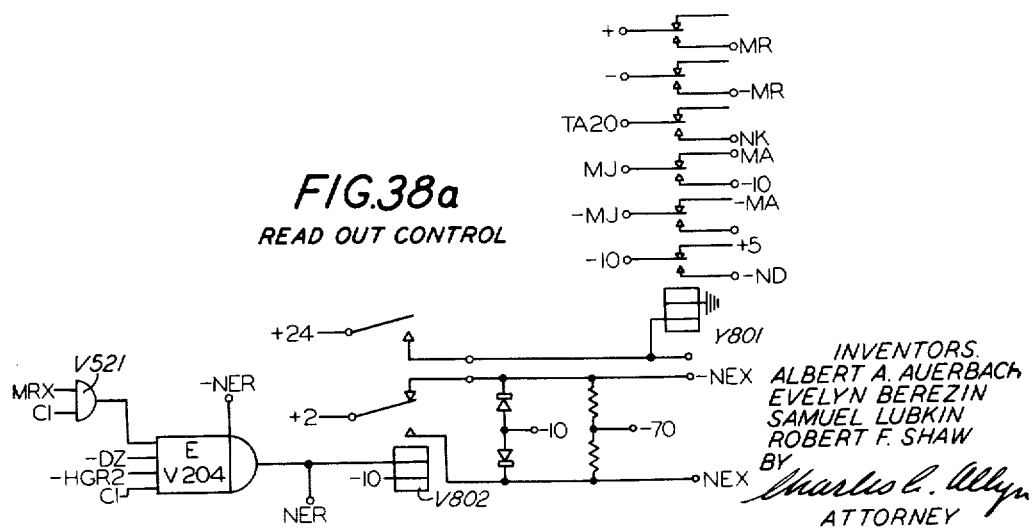

FIGURE 38a shows the switching circuits for Control of Read Out.

Figure 39:
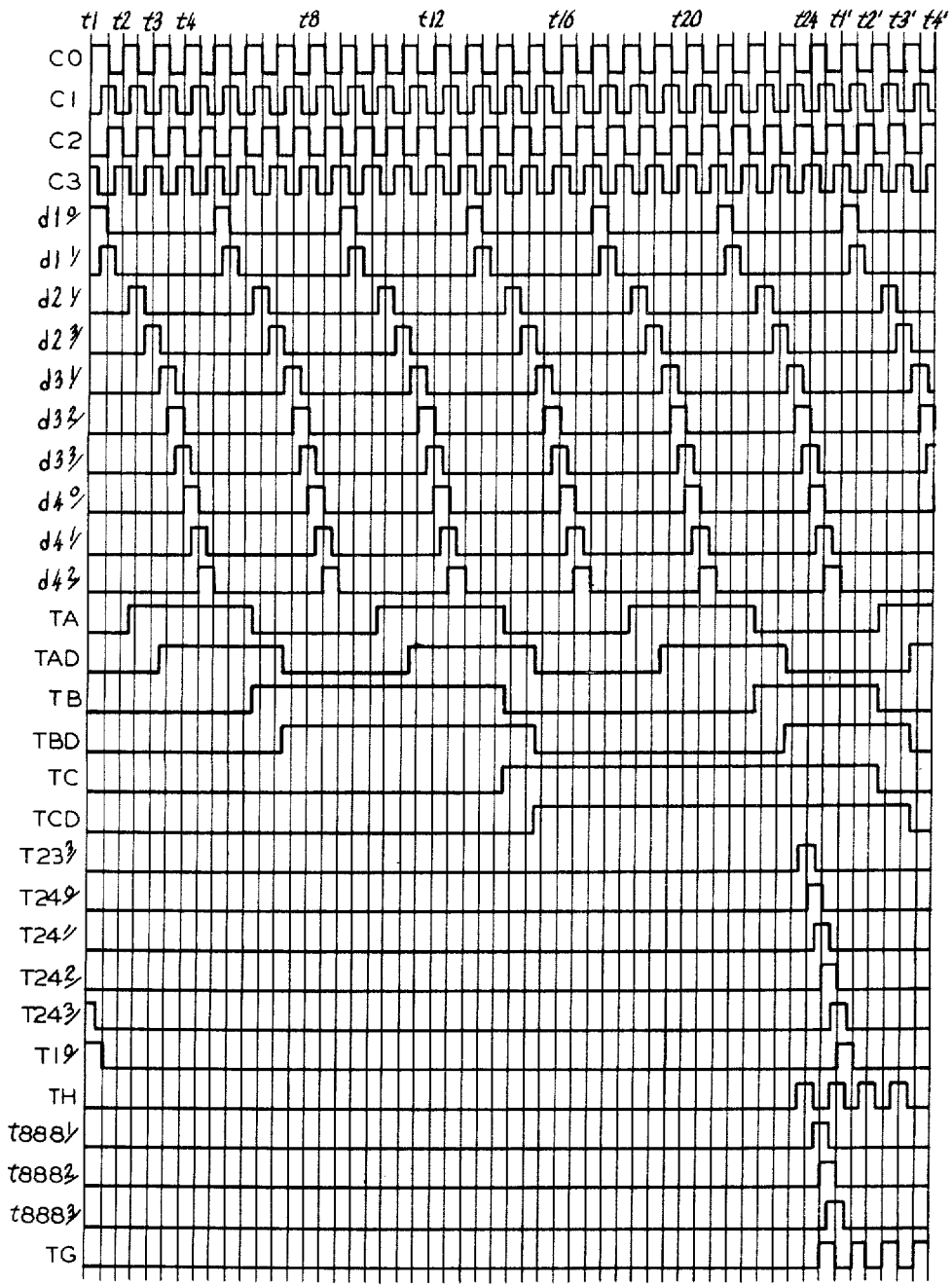

FIGURE 39 shows the timing signals used in the File Processor.

FIGURE 40 is a block diagram with one channel schematically shown of a Tape Unit.

Figure 41:
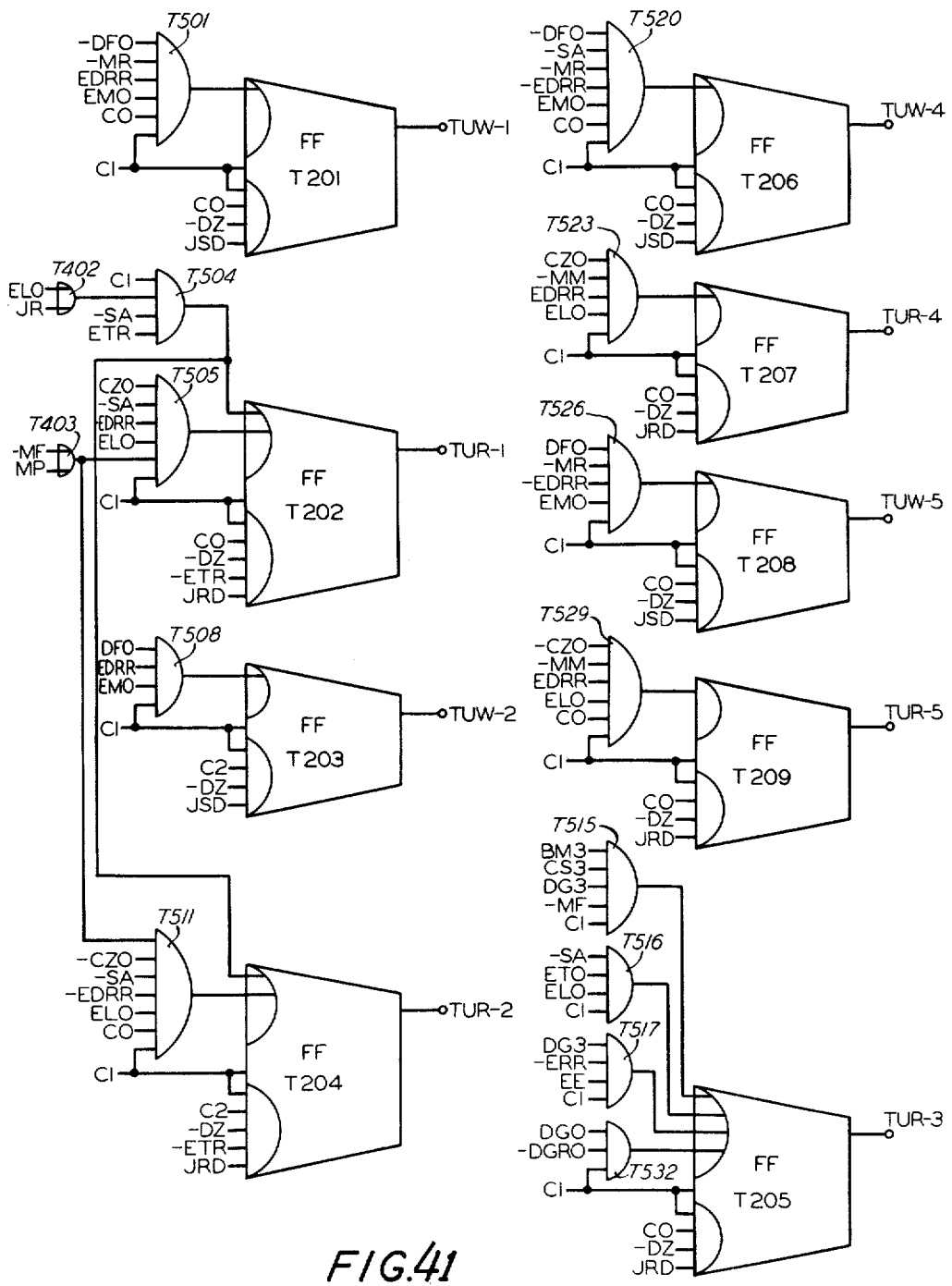

FIGURE 41 is a schematic showing of the Tape Unit Selector Circuits.

Figure 42:
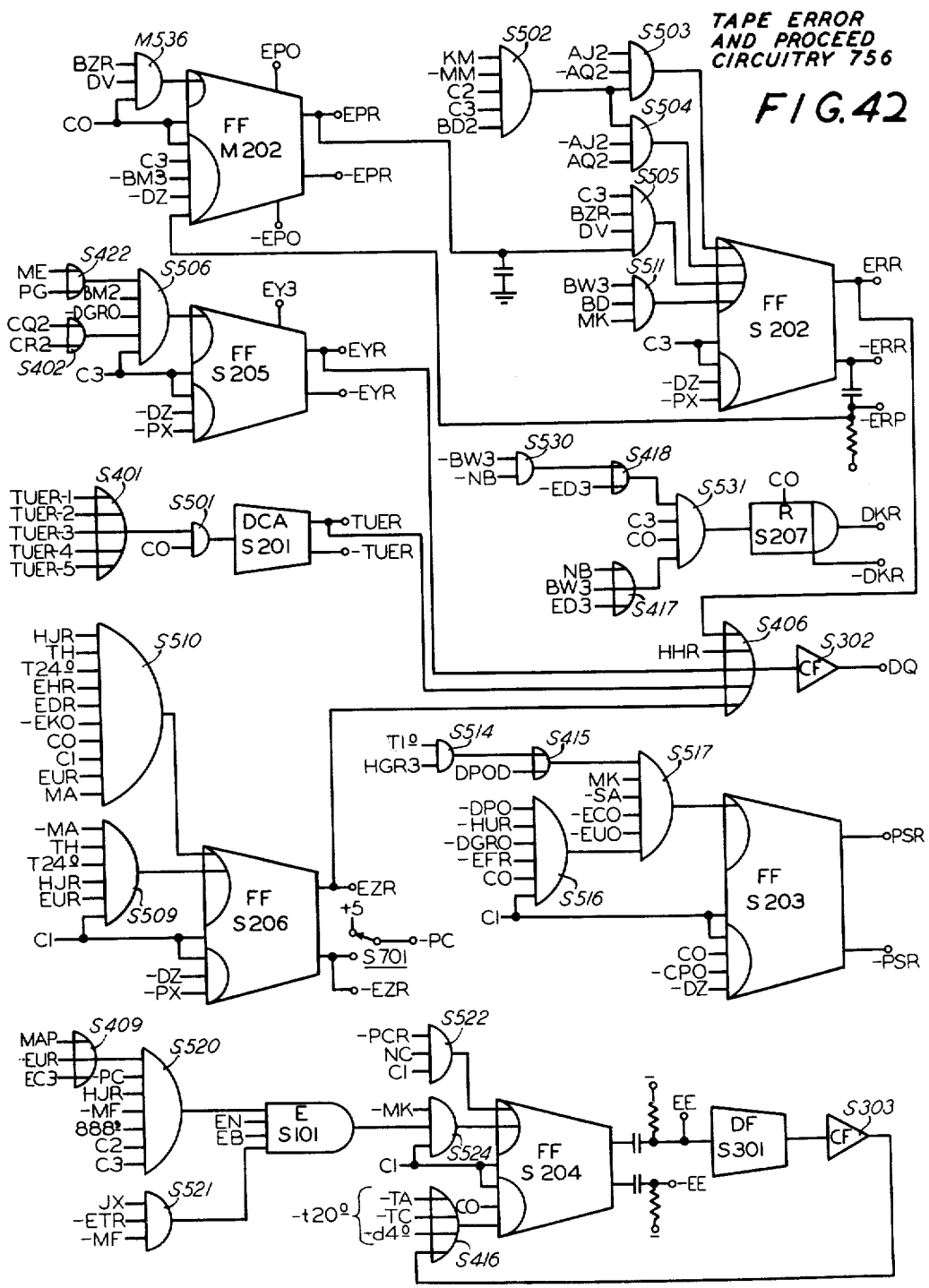

FIGURE 42 is a schematic diagram of the Tape Error and Proceed Circuitry, and

Figure 43:
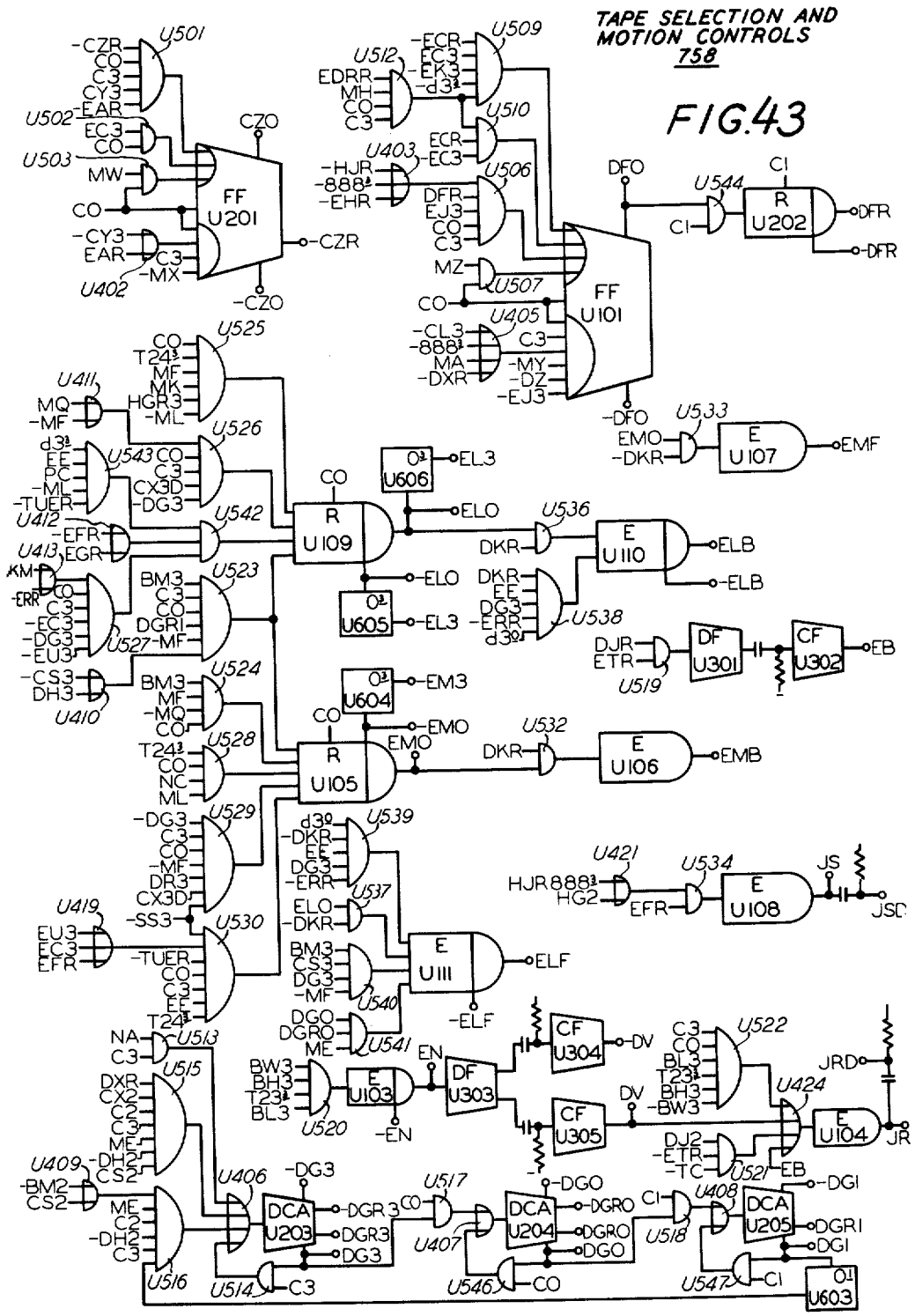

FIGURE 43 is a schematic showing of the circuitry of the Tape Selection and Motion Controls.

3. Coding and related definitions

*Bits.*—A bit is either the binary digit zero (0) or one (1). The binary digits are extremely suitable for electronic file processors for they are easily represented by electrical quantities. For example, the presence of a voltage indicates a one and the absence of the voltage indicates a zero or the presence of a pulse indicates a one and the absence of a pulse indicates a zero or the presence of a magnetized spot on a magnetic tape indicates a one and the absence of a magnetized spot on a magnetic tape indicates a zero.

*Decimal digits.*—The decimal digits zero through nine are represented by coded combinations of binary digits. The coding used in the file processor is the excess three code which represents the decimal digits as follows:

| Decimal digit: | Excess three code combination |
|---|---|
| 0 | 0011 |
| 1 | 0100 |
| 2 | 0101 |
| 3 | 0110 |
| 4 | 0111 |
| 5 | 1000 |
| 6 | 1001 |
| 7 | 1010 |
| 8 | 1011 |
| 9 | 1100 |

All numbers are combinations of these representations, for example the number

756=1010 1000 1001=101010001001

ALPHANUMERIC CHARACTERS

Alphabetic characters are represented by two decimal digits. The most significant digit of the pair is the alphanumeric "zone" digit and can have one of the four decimal values 1, 2, 3, or 4. The other digit of the pair is the "sector" digit. The letter A, for example, is represented by 0101 0100 (21), B, by 0101 0101 (22), etc. Each alphanumeric file processor word consists of five characters and is preceded by a special sign called the "alphanumeric indicator" (see below). When numerals are mixed with alphabetic characters in the same word they must also be represented by two decimal digits each. In these cases the alphanumeric zone digit is always 0100 (1). Digits and letters and their alphanumeric equivalents are shown below:

| Digit | Numeric equivalent | Pulse code | | Letter | Numeric equivalent | Pulse code | |
|---|---|---|---|---|---|---|---|
| | | Zone | Sector | | | Zone | Sector |
| 0 | 10 | 0100 | 0011 | | | | |
| 1 | 11 | 0100 | 0100 | A | 21 | 0101 | 0100 |
| 2 | 12 | 0100 | 0101 | B | 22 | 0101 | 0101 |
| 3 | 13 | 0100 | 0110 | C | 23 | 0101 | 0110 |
| 4 | 14 | 0100 | 0111 | D | 24 | 0101 | 0111 |
| 5 | 15 | 0100 | 1000 | E | 25 | 0101 | 1000 |
| 6 | 16 | 0100 | 1001 | F | 26 | 0101 | 1001 |
| 7 | 17 | 0100 | 1010 | G | 27 | 0101 | 1010 |
| 8 | 18 | 0100 | 1011 | H | 28 | 0101 | 1011 |
| 9 | 19 | 0100 | 1100 | I | 29 | 0101 | 1100 |

| Letter | Numeric equivalent | Pulse code | | Letter | Numeric equivalent | Pulse code | |
|---|---|---|---|---|---|---|---|
| | | Zone | Sector | | | Zone | Sector |
| J | 31 | 0110 | 0100 | | | | |
| K | 32 | 0110 | 0101 | S | 42 | 0111 | 0101 |
| L | 33 | 0110 | 0110 | T | 43 | 0111 | 0110 |
| M | 34 | 0110 | 0111 | U | 44 | 0111 | 0111 |
| N | 35 | 0110 | 1000 | V | 45 | 0111 | 1000 |
| O | 36 | 0110 | 1001 | W | 46 | 0111 | 1001 |
| P | 37 | 0110 | 1010 | X | 47 | 0111 | 1010 |
| Q | 38 | 0110 | 1011 | Y | 48 | 0111 | 1011 |
| R | 39 | 0110 | 1100 | Z | 49 | 0111 | 1100 |

*Word.*—A word in the file processor is composed of forty-four bits. The four most significant bits are assigned to the sign position. The character in the sign position may be:

| Symbol: | Pulse code |
|---|---|
| Blank | 0001 |
| Space | 0010 |
| Comma (,) | 0011 |
| Minus (—) | 0100 |
| Decimal point (.) | 0101 |
| Carriage return | 0110 |

The space character is used to indicate a positive sign. The comma is used as an alphanumeric indicator. When the comma is in the sign position of a word the remaining forty bits of the word comprise five alphanumeric characters. For example, the code combination 0011 0101 0101 0100 0101 1001 0100 0110 0101 0110 0111 0110 indicates the word AF3CT. The comma (0011) in the sign position, the alphanumber indicator, indicates the remaining bits are to be interpreted in pairs of four bit groups.

Any other character in the sign position indicates the bits are to be treated in single four bit groups. Consider the same representation as given above with a minus sign (0100): 0100 0101 0100 0101 1001 0100 0110 0101 0110 0111 0110 indicates the word −2126132343. The absence of the alphanumeric indicator implies that the word is pure numeric and each four bit group is a decimal digit.

Electrically the file processor word consists of a time sequence of forty-four pulse positions, any one of which may contain a pulse. It will be convenient to identify these positions by numbering them $p1$ to $p43$ inclusive in the order of occurrence in the time sequence, with the last pulse of a word designated by $p0$.

MINOR CYCLE

A minor cycle is considered to last twenty-four pulse times. The minor cycle for the file processor is the time occupied by a group of six decimal digits which can be also called a group period.

BLOCK

It has been found convenient for tape handling purposes to transfer information to and from the magnetic tapes in fixed units of words. These fixed units comprising twenty words (880 bits) are known as blocks. The time occupied by a block is known as a major cycle, and since two check digits of four binary bits each are included at the end of a block, a block may contain a maximum of 888 bits. Since an item of the file may be as small as one word or as long as several blocks it is necessary to distinguish between blocks in an item.

If an item exceeds one block, the first block is known as a "designator block." All the information by which a file may be sequenced, collated, selected or separated must be in the designator block. In other words, the part number of an inventory file would be in the designator block while the information concerning the supplier would be in the remaining blocks. The remaining blocks are called either "trailer" or "satellite blocks."

During bi-directional sequencing the designator must be repeated in the last block of an item. In such cases the designator blocks are separately identified as the "front designator blocks" and the "back designator block."

To identify the start of a block two decimal points (1101 1101) are recorded on the magnetic tape in the two positions preceding the sign digit position of the first word of the block.

The next to last two numeric digits of the last word of a block are reserved for the "block end marker." The designations of the block end markers are as follows:

(a) Single block items, to be sequenced in forward direction only-decimal point (1101) carriage return (1110) or ".CR" (1101—1110) are used.

(b) Single block items, to be sequenced in both directions ". ." two decimal points (1101 1101) are used.
(c) Multiblock items, to be sequenced in forward direction only use ".CR" (1101 1110) for designator block and "CR CR" (1110 1110) for trailer blocks.
(d) Multiblock items, to be sequenced in both directions ".CR" (1101 1110) is used for front designator block, "CR CR" (1110 1110) for trailer blocks and "CR." for back designator blocks.

4. Signals of the file processor

The signals of the file processor normally have potential limits of plus five and minus ten volts. Positive D.C. signals when present assume a positive potential of five volts and remain at a negative potential of ten volts when absent. Negative D.C. signals assume a negative ten volt potential when present and when absent they are at a positive five volt potential. Positive pulse signals rise from a negative ten volt base line to a positive five volt peak, while negative pulse signals drive down from a quiescent value of plus five volts to a negative peak excursion of minus ten volts.

The list of signals below shows only the parent signals. Each of the parent signals may generate several subsidiary signals. The subsidiary signals are the signals employed throughout the file processor. For example, the AP signal may include an APR, AP0, AP1, AP2 and AP3 or the negative counterparts −APR, −AP0, −AP1, −AP2 and −AP3.

The letter R (meaning rectified) following a parent signal indicates the signal is a D.C. signal. The number following a parent signal indicates that the subsidiary signal is a pulse signal in phase with the clock pulse corresponding to the number. These two types of designations cover most signals in the file processor. In rare cases other designations are used and as these cases arise they will be discussed.

In discussing the operations of the file processor only the parent signals will be cited, but it should be remembered that this implies the subsidiary signals are present. When the basic units of the file processor are explained the subsidiary signals will be set out in detail.

| Signal | Source | Figure | Comments |
|---|---|---|---|
| AA | A204a | 20 | Signal derived from most significant bit of a digit from magnetic tape or input units. |
| AB | A204b | 20 | Signal derived from second most significant bit of a digit from magnetic tape or input units. |
| AC | A204c | 20 | Signal derived from third most significant bit of a digit from magnetic tape or input units. |
| AD | A204d | 20 | Signal derived from least significant bit of a digit from magnetic tape or input units. |
| AF | A102 | 20 | Twenty four bit synchronized sprocket signal derived from magnetic tapes or input units. |
| AG | A103 | 20 | Four bit signal derived from a sprocket to identify time a digit is inserted into input buffer storages. |
| AH | A104 | 20 | Last bit of AG signal to indicate when to switch loading of an input buffer storage after loading of sixth digit. |
| AJ | A105 | 20 | Serialized digit output signal to buffer storages after a digit has been read in parallel from magnetic tape or input units. |
| AK | B101 | 18 | Serialized output of input buffer storage I. |
| AL | B102 | 18 | Serialized output of input buffer storage II. |
| AM | C623 | 23 | Signal from group input counter used in sensing a count of eleven on a type out operation. |
| AN | C623 | 23 | Do. |
| AP | C201 | 22 | Determines which of input buffer storages receives information. |
| AQ | E108 | 27 | Signal indicating the number of bits received by input synchronizer. Used in error detection. |
| AR | C610 | 22 | Signal from digit input counter used in determining a count of six. |
| AS | C108 | 22 | Do. |
| AT | C112 | 22 | A four bit gating signal to determine position at which a digit is inserted into input buffer storages. AT precesses in time as digits are entered. |
| AU | C623 | 23 | Signal from group input counter used in determining a count of thirty-seven. |
| AV | C623 | 23 | Do. |
| AW | C101 | 23 | Unit add in group input counter. |
| AX | C104 | 23 | Signal indicating input buffer storage I is loaded. |
| AY | C105 | 23 | Signal indicating input buffer storage II is loaded. |
| AZ | A107 | 20 | Signal primarily clearing digit input flip flops. (Resets AA, AB, AC, AD signal generators.) |
| BA | A202 | 21 | Indicates presence of a decimal point or carriage return in information from magnetic tapes or input units. |
| BB | A106 | 21 | Decimal point or carriage return memory. |
| BC | A209 | 21 | Indicates a second decimal point or carriage return has been sensed on magnetic tapes or from input units. |
| BD | A208 | 21 | Denotes input period of most significant check digit. |
| BE | A203 | 21 | Denotes input period of least significant check digit. |
| BF | B103 | 18 | Information signal from the input buffer storages. |
| BH | C111 | 23 | Controls termination of input of a block of information. |
| BL | C202 | 23 | Indicates entry position in memory of a group of information. Clears group input counter. |
| BM | M110 | 13 | Termination signal of an input cycle. |
| BN | C113 | 23 | Gating signal that permits transfer of information from input buffer storages to the memory. |
| BQ | A210 | 21 | Signal which permits transfer from magnetic tape units of a block of information. |
| BR | E601 | 25 | Carry digit from LSD check counter to MSD check counter. |
| BS | E102 | 25 | Do. |
| BU | E606 | 25 | Signal representing LSD of check digits. |
| BV | E606 | 25 | Do. |
| BW | E104 | 27 | Indicates input error from magnetic tapes. |
| BX | E609 | 25 | Signal representing MSD of check digits. |
| BY | E609 | 25 | Do. |
| BZ | E202 | 27 | Controls a reverse pass of a reread in event of an error on input from magnetic tapes. |
| CA | P103a | 11 | Main signal representing contents of memory channel A. |
| CB | P103b | 11 | Main signal representing contents of memory channel B. |
| CC | P103c | 11 | Main signal representing contents of memory channel C. |
| CD | P103d | 11 | Main signal representing contents of memory channel D. |
| CE | P104a | 11 | Auxiliary signal representing contents of memory channel A. |
| CF | P104b | 11 | Auxiliary signal representing contents of memory channel B. |
| CG | P104c | 11 | Auxiliary signal representing contents of memory channel C. |
| CH | P104d | 11 | Auxiliary signal representing contents of memory channel D. |
| CJ | P114 | 15 | Control of comparison times within a block. Function of the contents of memory channel D. |
| CL | M101 | 13 | Synchronizing interval before start of a transfer cycle which causes transfer to start at time t1. |
| CM | M102 | 13 | Pulse signal at start of transfer cycle. |
| CP | M104 | 13 | One major cycle signal at start of transfer cycle. |
| CQ | R101 | 14 | Signal indicating contents of memory channel C greater than contents of memory channel A. |
| CR | R102 | 14 | Signal indicating contents of memory channel C greater than contents of memory channel B. |
| CS | R103 | 14 | Signal indicating contents of memory channel A greater than contents of memory channel B or that contents of memory channel C are greater than contents of memory channel D. |
| CT | R105 | 14 | Signal indicating that contents of memory channel A are not equal to contents of memory channel C. |
| CU | R106 | 14 | Signal indicating that contents of memory channel B are not equal to contents of memory channel C. |
| CV | R107 | 14 | Signal indicating that contents of memory channel A are not equal to contents of memory channel B or that the contents of memory channel C are not equal to the contents of memory channel D. |

| Signal | Source | Figure | Comments |
| --- | --- | --- | --- |
| CW | M103 | 13 | Indicates input transfer cycle which includes an alternation of input tapes. |
| CX | M106 | 13 | Pulse indicating end of transfer cycle. |
| CY | R110 | 16 | Pulse signal associated with the alternation of input tapes. |
| CZ | U201 | 43 | Control signal which causes alternation of input tapes. |
| DA | A211 | 20 | Indicates good tape for recording. |
| DF | U101 | 43 | Output magnetic tape selector; determines which of magnetic tapes is to be used to receive a block of information. |
| DG | U204 | 43 | Selector tape control. |
| DH | L102 | 12 | Signal indicating end of selector tape. |
| DJ | L204 | 12 | Indicates end of information by reading three decimal points. |
| DK | S207 | 42 | Reverses direction of any magnetic tape units that are running. |
| DP | M203 | 13 | Indicates an input cycle proceeding. |
| DQ | S302 | 42 | Actuates an alarm at end of a pass. |
| DR | M108 | 13 | Prevent an output operation until information can be delivered to output magnetic tapes. |
| DT | Z705 | 38 | Differentiated initial clear signal. |
| DV | U305 | 43 | Delayed stop signal on error to permit tapes to coast. |
| DW | L203 | 12 | Memory for two decimal points during the detection of three decimal points to indicate end of information. |
| DX | M204 | 13 | Indicates the reading of a valid block of information (a block with a designator). |
| DZ | Z705 | 38 | Initial clear signal. |
| EA | L205 | 12 | Signal indicating only one input magnetic tape being used. |
| EB | U302 | 43 | Signal which provides sufficient overrun of input tape at end of first pass of sequence. |
| EC | L207 | 12 | Signal characteristic of start of a new pass. |
| ED | L208 | 12 | Signal indicating that tapes 1 and 2 are output tapes. |
| EE | S204 | 42 | Signal providing adequate delay while tapes are changing direction. |
| EF | L201 | 12 | Signal indicating physical end of output tapes (leader marks). |
| EG | L202 | 12 | Signal indicating physical end of input tapes (leader marks). |
| EH | L209 | 12 | Binary counter which counts number of tapes reaching their end. |
| EJ | R109 | 16 | Pulse signal indicating output tapes are to be alternated. |
| EK | L106 | 12 | Test for last pass of sequence operation as indicated by no alternation if output tapes. |
| EL | U109 | 43 | Starting of input tapes. |
| ELB | U110 | 43 | Starting of input tapes in reverse. |
| ELF | U111 | 43 | Starting of input tapes forward. |
| EM | U105 | 43 | Starting of output tapes. |
| EMB | U106 | 43 | Starting of output tapes in reverse. |
| EMF | U107 | 43 | Starting of output tapes forward. |
| EN | U103 | 43 | Stop on tape input error. |
| EP | M202 | 42 | Signal counting rereads on an error. |
| ER | S202 | 42 | Error indicator on input. |
| ES | P610 | 15 | Signifies carriage return symbol in a digit position of channel D. |
| ET | M201 | 13 | Signal characteristic of first pass of sequence. |
| EU | L206 | 12 | Control signal at the end of any pass. |
| EY | S205 | 42 | Selection error signal. |
| EW | P104e | 11 | Information output of channel E. |
| EX | R108 | 15 | Clear signal for resetting the flip flops of comparison circuits. |
| EZ | S206 | 42 | End of operation signal. |
| FA | Typewriter | 36 | Most significant zone bit from electromechanical typewriter. |
| FB | do | 36 | Least significant zone bit from electromechanical typewriter. |
| FC | do | 36 | Most significant sector bit from electromechanical typewriter. |
| FD | do | 36 | Second most significant sector bit from electromechanical typewriter. |
| FE | do | 36 | Third most significant sector bit from electromechanical typewriter. |
| FF | do | 36 | Least significant sector bit from electromechanical typewriter. |
| FG | V304 | 37 | Fifteen millisecond signal permitting bounce of bit relays in electromechanical typewriter to pass. |
| FH | V205 | 37 | Binary counter signal which indicates second sprocket signal for probing sector during reading of an alpha numeric character by electromechanical typewriter. |
| FJ | V527 | 37 | An FC signal probed by a sprocket. |
| FK | V528 | 37 | An FD signal probed by a sprocket. |
| FL | V529 | 37 | An FE signal probed by a sprocket. |
| FM | V530 | 37 | An FG signal probed by a sprocket. |
| FN | V104 | 37 | Sprocket signal for probing zone bits. |
| FP | V531 | 37 | An FA signal probed by a sprocket. |
| FQ | V532 | 37 | An FB signal probed by a sprocket. |
| FR | V692 | 37 | Signal at beginning of each word to alert alpha numeric detection apparatus. |
| FS | V201 | 37 | Signal indicating an alpha numeric indicator has been sensed. |
| FU | V202 | 37 | Signal providing for automatic spacing between words printed out. |
| FV | V203 | 37 | Used during a carriage return action in electromechanical typewriter as a stall. |
| FW | V307 | 37 | Sprocket pulse to electromechanical typewriter. |
| FX | K401 | 34 | Signifies end of carriage return action. |
| FY | V102 | 37 | Sprocket associated with reading out of electromechanical typewriter. |
| GA | J101 | 33 | Defines interval during which first digit of a block is located for output. |
| GB | J202 | 35 | Defines interval when information is being read out. |
| GC | H201 | 35 | Defines synchronizing interval at start of an output cycle. |
| GD | G532 | 30 | Pulse signal indicating the end of a block has been located. |
| GE | H103 | 35 | Synchronizing interval at end of output cycle. |
| GF | J102 | 32 | Output sprocket signal. |
| GG | G111 | 30 | Signal indicating six digits have been loaded into an output buffer storage. |
| GH | H601 | 35 | Senses decimal points and carriage returns on output cycle. |
| GJ | H603 | 35 | Remembers a decimal point or carriage return on output cycle. |
| GK | H202 | 35 | Indicates a serial combination of decimal points or carriage returns on output cycle. |
| GL | G203 | 31 | Signal indicating the position in memory from which a group is to be extracted. |
| GM | F101 | 29 | Output of buffer storage III. |
| GN | F102 | 29 | Output of buffer storage IV. |
| GP | G204 | 31 | Binary counter to determine whether buffer storage III or IV is to supply output digits. |
| GQ | J203 | 32 | Counter that generates timing between output sprockets. |
| GR | G607 | 30 | Six sensing tap on digit output counter. |
| GS | G607 | 30 | Do. |
| GT | G110 | 30 | Processing four bit signal used in extracting digits from buffer storages III and IV during output. |
| GU | G609 | 31 | Thirty-seven sensing tap on group output counter. |
| GV | G609 | 31 | Thirty-seven sensing tap on group output counter. |
| GW | J302 | 33 | 10 ms. inhibition to permit output tapes to come up to speed. |
| GX | G201 | 31 | Signal permitting the loading of buffer storage III. |
| GY | G202 | 31 | Signal permitting the loading of buffer storage IV. |
| GZ | J201 | 33 | Signal under control of GW which stalls output until tapes are up to speed. |
| HA | K201a | 34 | Most significant bit of information write flip flop. |
| HB | K201b | 34 | 2nd m.s.b. of information write flip flop. |
| HC | K201c | 34 | 3rd m.s.b. of information write flip flop. |
| HD | K201d | 34 | Least significant bit of information write flip flop. |
| HE | J204 | 33 | Forces recording of decimal points. |
| HG | J206 | 33 | Pulse signal indicating end of output cycle. |
| HH | J207 | 33 | Indicates output error. |
| HJ | J205 | 33 | Pulse signal indicating recording of third decimal point. |
| HL | K205 | 34 | Recording sprocket. |
| HM | K302 | 34 | Signal determining width of recording sprocket. |
| HR | K206a | 34 | 2nd l.s.b. of zone digit. |
| HS | K206b | 34 | l.s.b. of zone digit. |
| HT | K102 | 34 | Pulse signal at start of recording sprocket. |
| HU | M205 | 13 | Indicates output cycle in progress. |
| JR(1-7) | X807a-g | 36 | Operates code magnets of electromechanical typewriter for printing. |
| JR | U104 | 43 | Stop input magnetic tape units. |
| JS | U108 | 43 | Stop output magnetic tape units. |
| JU(I-V) | Tape unit | 40 | Constant frequency signal recorded on sixth channel of tape. |
| JV(I-V) | do | 40 | Reproduced sprocket signal from a tape unit I to V. |
| JW(I-V) | do | 40 | Reproduced most significant bit from a tape unit I to V. |
| JX(I-V) | do | 40 | Reproduced second most significant bit from a tape unit I to V. |

| Signal | Source | Figure | Comments |
| --- | --- | --- | --- |
| JY(I-V) | Tape unit | 40 | Reproduced third most significant bit from a tape unit I to V. |
| JZ(I-V) | ----do---- | 40 | Reproduced least significant bit from a tape unit I to V. |
| KL | Z707 | 38 | Output error delete. |
| KM | Z708 | 38 | Input error delete. |
| KU | P103e | 11 | Contents of memory channel E. |
| KW | P603b | 11 | Contents of memory channel B. |
| KX | P603c | 11 | Contents of memory channel C. |
| KY | P603d | 11 | Contents of memory channel D. |
| KZ | P603e | 11 | Contents of memory channel E. |
| LA | P111 | 15 | Indicates digit being sampled in memory channel D is not a carriage return (1110). |
| LB | P113 | 15 | Indicates digit being sampled in memory channel D is not a blank (0001). |
| LPC | | | Control signal from electromechanical typewriter latch punch clutch. |
| LU | P112 | 15 | Prevents comparisons on separate and sequence after a carriage return is detected in memory channel D. |
| LY | K101 | 34 | Reset signal to output flip flops. |
| MA | Z701 | 38 | Control signal characteristic of sequence. |
| MAB | Z706 | 38 | Same as MA except on single pass operations. |
| MB | Z701 | 38 | Signal characteristic of separate operation. |
| MC | Z701 | 38 | Signal characteristic of separate and select operations. |
| MD | Z701 | 38 | Signal characteristic of separate and collate operations. |
| ME | Z701 | 38 | Signal characteristic of separate and combined select and collate operations. |
| MF | Z701 | 38 | Signal characteristic of manual operations. |
| MH | Z701 | 38 | Signal characteristic of unidirectional sequence. |
| MJ | Y801 | 38a | Same as MA except on read out operation. |
| MK | Z706 | 38 | One block test operation. |
| ML | Z702 | 38 | Input controls off. |
| MM | Z701, Z702 | 38 | Signal characteristic of keyboard input operation. |
| MP | Z702 | 38 | Signal characteristic of magnetic tape input operation. |
| MQ | Z703 | 38 | Output controls off. |
| MR | Z703, Y801 | 38 | Signal characteristic of keyboard output operation. |
| MRX | Z701 | 38 | Signal characteristic of Read Out (Test) operation. |
| MS | Z703 | 38 | Signal characteristic of magnetic tape output operation. |
| MW | Y708 | 38 | Force tape unit I. |
| MX | Y708 | 38 | Force tape unit II. |
| MY | Y709 | 38 | Force tape unit IV. |
| MZ | Y709 | 38 | Force tape unit V. |
| NA | Y711 | 38 | Force tape unit III. |
| NB | Y710 | 38 | Force reversal of direction of tape units. |
| NC | Z704 | 38 | Proceed. |
| ND | Y801 | 38a | Signal to force a read out operation. |
| NE | V204 | 38a | Read out flip flop signal. |
| NK | Z703 | 38 | Signal associated with keyboard output of electromechanical typewriter. |
| NL | Z802 | 38 | Ground return for input relays to the electromechanical typewriter. |
| NM | Z702 | 38 | Start a reading of paper tape by the electromechanical typewriter. |
| NN | Y701 | 38 | Force memory channel A to accept information. |
| NP | Y701 | 38 | Force memory channel B to accept information. |
| NQ | Y701 | 38 | Force memory channel C to accept information. |
| NR | Y701 | 38 | Force memory channel D to accept information. |
| NS | Y701 | 38 | Force memory channel E to accep information |
| NT | Y701 | 38 | No memory channels being forced. |
| NU | Z703 | 38 | Signal characteristic of keyboard output by electromechanical typewriter. |
| PB | A302 | 19 | Pulse at start of input cycle after tape units have come up to speed. |
| PC | S701 | 42 | Manual test signal to stop tape units immediately after sequencing. |
| PE | A301 | 19 | An inhibition at end of input cycle to prevent spurious readings. |
| PSR | S203 | 42 | Remembers where operation stopped during test operations. |
| PX | Z704 | 38 | Reset of error flip flops. |
| PY | Z750 | 38 | Manual reset of input error flip flops. |
| SA | Z802 | 38 | Simulates manual conditions on insert positions of operation switch when on key insert or upper and lower bound inserts. |
| SC(1-6) | | 36 | Bit output signals from electromechanical typewriter. |
| SN | Z705 | 38 | Clear signal for input and output synchronizers. |
| TUER | S201 | 42 | End of reel signal |

| Signal | Source | Figure | Comments |
| --- | --- | --- | --- |
| TUR1 | T202 | 41 | Selects tape unit I for reproducing |
| TUR2 | T204 | 41 | Selects tape unit II for reproducing |
| TUR3 | T205 | 41 | Selects tape unit III for reproducing. |
| TUR4 | T207 | 41 | Selects tape unit IV for reproducing. |
| TUR5 | T209 | 41 | Selects tape unit V for reproducing |
| TUW1 | T201 | 41 | Selects tape unit I for recording. |
| TUW2 | T203 | 41 | Selects tape unit II for recording |
| TUW4 | T206 | 41 | Selects tape unit IV for recording |
| TUW5 | T208 | 41 | Selects tape unit V for recording |

Figure 1:
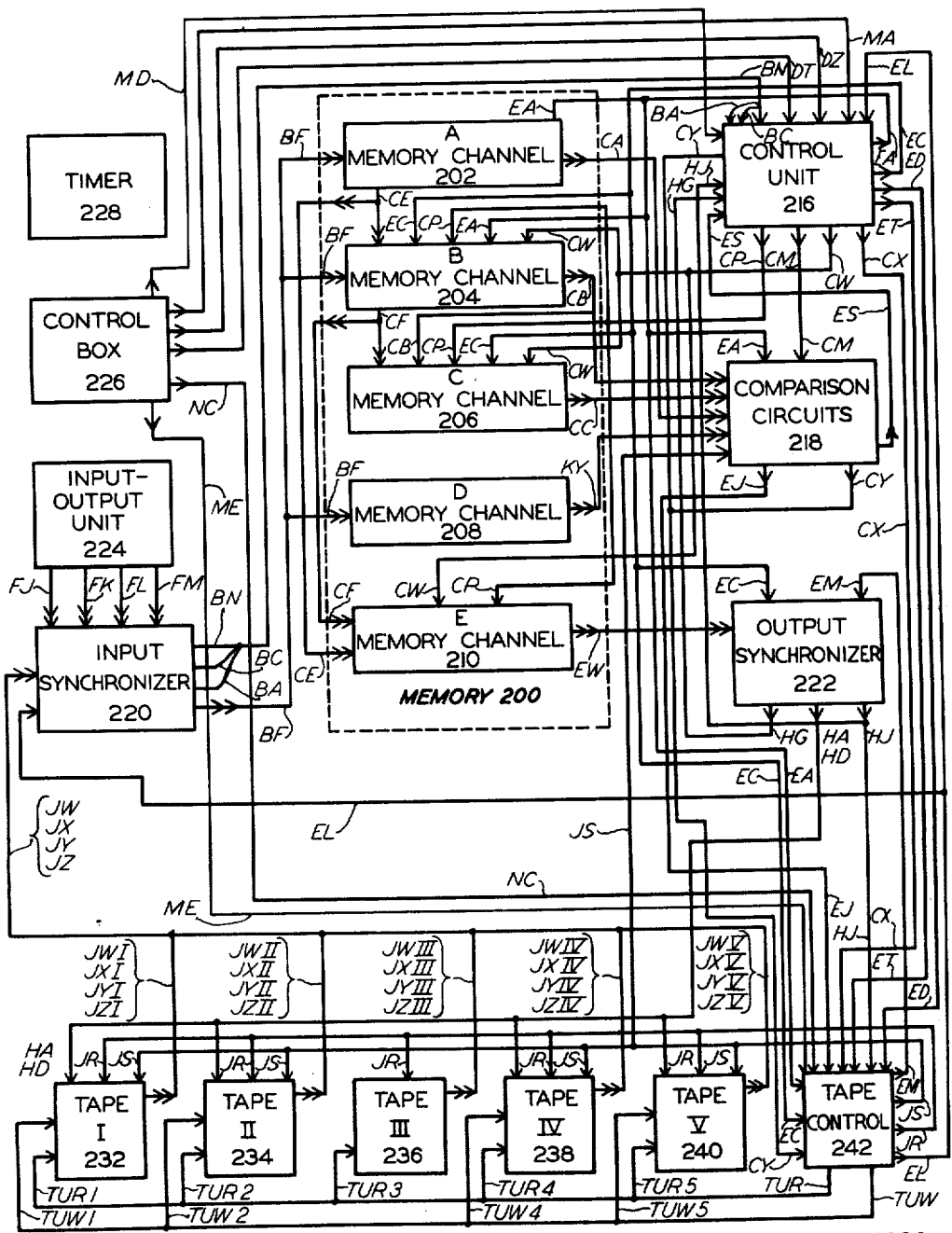
FIGURE 1 is a block diagram of the elements involved, together with the signal and information, of a "Sequence" operation.

5. Brief description of units of the file processor system (FIG. 1)

To facilitate the description, the file processor has been divided into a plurality of operating units. Each unit may generally be defined as performing one of the following functions: memory, external communication, control, comparison, synchronization and magnetic tape storage.

The memory comprises five memory channels A202–E210. Each one of these memory channels is an acoustic delay line capable of storing one block of information The external communication is performed by the input output unit 224 which includes an electromechanical typewriter with paper tape facilities, and a control box 226 comprising a plurality of manual switches.

The control unit 216 and the timer 228 are used to sequence and control the file processor through its several operations.

The comparison circuits 218, a plurality of comparators, is chiefly concerned with determining the relative magnitudes of blocks of information stored in the various memory channels.

The tape storage unit comprises five tape units I232–V240, and the tape control 242. The tape units I to V are standard tape drives and multi-channel magnetic tapes upon which the information of the file is stored The tape control unit 242 is primarily a plurality of circuits which are used to control the activation of particular tape drives during recording and reproducing operations.

The input synchronizer 220 functions chiefly as an intermediate storage between the tape units and the memory 200. Since the rate at which information is available from the tape units is much slower than the rate at which information may be accepted by the memory 200 the input synchronizer 220 is used as a buffering link between these two units during a transfer from the magnetic tapes to the memory.

During an output operation, that is, the transfer of information from the memory to the magnetic tapes the output synchronizer 222 performs a similar buffering operation. In a recording operation it is necessary to slow down the rate at which information is available at the memory to the rate at which information may be recorded on the magnetic tapes.

The block illustrations are usually arranged so that input lines enter at the left and top sides of each unit and output lines leave at the bottom and right sides of each unit. The lines that connect the blocks denoting the basic units represent cables which may contain a plurality of wires through which electrical signals are transmitted. The flow of information signals is indicated by double arrowheads on the lines which represent the cables. The flow of control signals, when shown, is along lines designated by single arrowheads.

The lines representing the information and control signals have letter designations that are identical with the letter designations of the parent signal. For example, the EP signal line carries the EP signal. In the sections following, the terminology will be used interchangeably If a signal is fed via the EP signal line it is the EP signal. Or if a unit receives the EP signal it receives the EP signal via the EP signal line. For the sake of simplicity only positive signals will be mentioned but it should be understood that the signal may be either positive or negative and the distinction will be made during the detailed description of each of the blocks. When a "number" is mentioned, what is usually meant is: "the signal representing the "number".

6. *Sequence* (FIG. 1)

Sequencing is defined as the process of arranging a plurality of items of a file in a uniform order as determined by the magnitude of the same particular group of digits in the individual items. Prior to the sequencing operation the particular group of digits is chosen and the sequence is carried out in relation to that particular group of digits. At a later time, the same file may be sequenced with respect to a different group of digits in which case the relative positions of the individual items in a file is changed, for example; the following items are sequenced with respect to the first two digits of each item:

```
01   QR   203
03   CD   109
04   CA   519
10   ZY   317
99   MN   001
``` if the sequencing is dependent on the second two characters the sequence becomes,

```
04   CA   519
03   CD   109
99   MN   001
01   QR   203
10   ZY   317
``` while if the last group of three characters determines the sequence then the processed file becomes,

```
99   MN   001
03   CD   109
01   QR   203
10   ZY   317
04   CA   519
```

It should be noted that although the relative positions of the items is different for each example, each of the items is in its proper order as determined by the group of digits chosen to control the sequencing.

Once it has been decided which group of digits in an item is to determine the sequencing, all the remaining digits of the item become inconsequential as far as the sequencing is concerned. For this reason in the following description of the method of sequencing the items will be considered to be composed only of the key digits, the group of digits in each item which have been selected for sequencing by a key item.

The sequencing operation is basically a reading of items from either one of two input tapes, a comparison of items and the writing of the items on either one of two output tapes. Usually the first pass consists in the reading in of items from one input tape. The operation is bidirectional, that is, on what is called a forward pass items are read in from, say, tapes 1 and 2 and recorded on tapes 4 and 5, then without a rewind operation a reverse pass is performed in which items are read from tapes 4 and 5 and recorded on tapes 1 and 2.

The basic motivation that controls the entire sequence operation is that during each pass larger and larger strings of sequenced items (the strings may be in ascending or descending order) are formed until finally one string of sequenced items is formed which comprises the entire file. This is accomplished by building a sequence string on one output tape until an item is encountered which can no longer maintain the sequence. This out of sequence item is recorded on the second output tape and the formation of a string sequenced in the same order is attempted on the second output tape which continues until another out of sequence item is read in. The output tapes are again switched and a new string is attempted on the first output tape.

The first operating rule is thus: whenever an input item does not fit into the sequence being formed on one tape start forming on an alternate output tape, a new sequence of the same type, starting with this out of order item.

Since in general there are two input tapes (the first pass has one input tape), it is necessary to determine from which of the two tapes the next item is to be read. The rule is: select the item which most nearly conforms to the sequence being formed; if an item from a first tape conforms to the sequence and the item on the other tape does not, read in the item from the first tape; if both items conform, read in the item which is closer in magnitude to the previously read out item, i.e. if ascending order strings are being formed choose the item of smaller magnitude; and if neither conforms then it is a function of the type of sequences being formed, when ascending sequences are being formed choose the item smaller in magnitude whereas when descending sequences are being formed choose the item of greater magnitude. If, however, there is one one input tape such as during the first pass, then there will be no choice of an input tape.

Finally, when forward passes are performed, sequences in ascending orders of significance are formed and when reverse passes are performed, sequences in descending orders of significance are formed.

The following is an example of a bidirectional sequencing operation. The initial file contains the items:

Tape 3 (04; 22; 06; 02; 15; 05; 03; 10; 08)

Initially there is one input tape called tape 3, and two output tapes called tapes 4 and 5. The first forward pass starts with the reading in of the item on the far left (04) which is recorded on tape 4. The choice of tape 4 is arbitrary but once chosen the relationship of tapes 4 and 5 must be maintained. The second item read (22) is also recorded on tape 4 (it is greater than (04) and ascending strings are being formed). The third item (06) is read in and, since it is less than (22) the sequence, cannot be maintained so it is recorded on tape 5. The fourth item (02) which is less than (06) is read in and, since it cannot maintain the sequence started on tape 5, it is recorded on tape 4.

By the end of the first forward pass the tapes 4 and 5 contain:

Tape 4 (04; 22; 02; 15; 03; 10)
Tape 5 (06; 05; 08            )

It should be noted that the item (10) was the last item written on tape 4 and the item (08) the last item written on tape 5. Since the next pass, a reverse pass, has no initial rewind of the tapes, these are the first items compared in the process of forming descending sequences. Tapes 4 and 5 become the input tapes and tapes 1 and 2 the output tapes, tape 3 which contains the original information is no longer used so that the original file is not erased or altered.

The larger of these two items (10) is chosen and written on tape 2 and the second item (03) of tape 4 replaces it in the comparison. The (03) and the (08) are then compared with the record (10).

Since they both satisfy the criteria of being smaller than the previously recorded item, and since the (08) is closer in magnitude to the (10), the (08) is then written on tape 2 and (05) of tape 5 is used in the next comparison. The (05) of tape 5 is compared with the (03) of tape 4 and the recorded (08) resulting in the writing of the (05) on tape 2. The (06) of tape 5 is now compared with the (03) of tape 4 and the recorded (05). Since only the (03) can maintain the sequence it is written and the (15) of tape 4 replaces it for the next comparison. The next comparison is between (15) on tape 4, (06) of tape 5 and the recorded (03). Since both input items are greater than the previously recorded item, the greater of the two, the (15), is recorded on tape 1, etc. At the end of the first reverse pass the contents of tape 1 and tape 2 are as follows:

Tape 1 (15; 06; 02         )
Tape 2 (10; 08; 05; 03; 22; 04)

where the (04) was the last item written of tape 2 and (02) the last item written on tape 1.

The second forward pass starts with the comparison of these two items to form ascending sequences (there is no rewind). The (02) being the smaller is written on tape 4. The result of a comparison of the (06) which replaced the (02) on tape 1, the (04) of tape 2 and the recorded (02) is the recording of the (04). These comparisons continue until Tape 4 (02; 04; 06; 15; 22)
Tape 5 (03; 05; 08; 10      )

where (22) is the last item recorded on tape 4 and (10) the last item recorded on tape 5.

The next reverse pass starts with the comparison of (22) and (10) and ends with tape 2 containing the completed sequence (22; 15; 10; 08; 06; 05; 04; 03; 02)

and tape 1 blank.

If the sequencing ended on a forward pass with the file recorded in descending order on tape 4 a "copying" reverse pass is performed resulting in the file being recorded on tape 2 in ascending order.

The generalized scheme for carrying out the comparisons will now be considered. Each item that is handled is first extracted from a magnetic tape and stored in a memory channel where it is compared with items stored in other memory channels. Five memory channels are used. These channels each capable of storing a block of information are known as channel A to channel E.

Memory channel A always receives the input item when there are two input tapes, that is, the item being read from one of the two input tapes.

Memory channel B contains the stored item, that is, the item not chosen for output as the result of a comparison. This channel also receives the input item when there is only one input tape.

Memory channel C contains the output item, the item that as the result of a comparison was selected for recording on an output tape. It is stored here for the next comparison.

Memory channel D contains the key block, a block of control information which determines which digits in an item the sequence is dependent upon.

Memory channel E also contains the output item preparatory to recording.

The channels A, B and C contain the items that are involved in each comparison. As each new item is read from an input tape into channel A, it is compared with the item stored in channel B and the item that has just been recorded in channel C. The memory channel E contains the same item as the memory channel C. This comparison determines whether the item in channel A or in channel B is placed in channel E for recording and in memory channel C to participate in the next comparison, and which of the output tapes it is to be recorded on, and also which of the input tapes is to feed a new item into channel A.

For forward passes where ascending sequences are being formed channel B is transferred to channel C for recording, the contents of channel A are transferred to channel B and there is an alternation of input tapes when one of the three following conditions is satisfied:

"A" is greater than "B" is greater than or equal to "C"
"B" is greater than or equal to "C" is greater than "A"
"C" is greater than "A" is greater than "B"

while for the conditions:

"A" is greater than "C" is greater than "B"
"B" is greater than "A" is greater than "C"
"C" is greater than "B" is greater than "A"

the contents of channel A are transferred to channel C, the contents of channel A transferred to channel B, and the source input tape is not alternated.

The conditions of C is greater than B and also C is greater than A alone determine that the output tape for recording the contents of channel C is switched to the one that did not receive the last item (the output tapes are alternated).

Similarly for reverse passes where descending order sequences are being formed the contents of channel B are transferred to channel C, the contents of channel A are transferred to channel B and the input tapes alternated when:

"C" is greater than or equal to "B" is greater than "A"
"A" is greater than "C" is greater than or equal to "B"
"B" is greater than "A" is greater than "C"

Similarly, the contents of channel A are transferred to channel C, and the input tapes unalternated when:

"C" is greater than "A" is greater than "B"
"A" is greater than "B" is greater than "C"
"B" is greater than "C" is greater than "A"

The output tapes are alternated only when both A is greater than C and B is greater than C and for no other conditions.

It should be noted that this discussion has been for single block items. When multiblock items are sequenced only the designator blocks are involved in the comparison and after the switching has been set up both the designator blocks and the trailer blocks are transferred in an appropriate manner.

Prior to the actual sequencing operation, the key that determines upon which digits or characters each item is to be sequenced is inserted into memory channel D 208. The key is basically twenty ten digit words. In every digit position a blank (BL) is inserted except those digit positions for which the sequencing is to be performed. In these positions, comparisons are performed provided neither a blank or carriage return (CR) is present. During the actual comparison steps the comparators will be active only during those times when non blank or non carriage return characters are sensed in the memory channel D 208.

The file to be sequenced is initially stored on the tape unit III 236. The tape units I, II, IV and V are in a rewound state. During the first pass known as a forward pass, as each item is read in from tape unit III 236 comparisons are performed and the item is recorded on either tape unit IV 238 or tape unit V 240. Whenever tape unit III 236 moves, tape units I 232 and I 234 follow the motion but do not participate in any transfer of information to insure that sufficient tape is unwound so that on the second and all succeeding reverse passes there is sufficient tape for recording all the items being processed.

The processing starts with the recording of three decimal points on the magnetic tape of both the tape unit IV 238 and the tape unit V 240. On the reverse pass these are end of information indicators. The first item of information is read in from the tape unit III 236 during an input cycle via the input synchronizer 220 into the memory channel B 204. On this first pass, a one input tape pass, and on all other one input tape passes, items are read into memory channel B 204. Prior to this the memory channels A 202, C 206 and E 210 are cleared to blanks (0001) in all digit positions. During a one input tape pass, it is only necessary to determine for a forward pass whether the contents of the memory channel B 204, for convenience noted as "B," are greater or not greater than the contents of the memory channel C 206, noted as "C." As the memory channel B 204 is loaded the comparison circuits 218 are operating under the control of the key memory channel D 208. When the loading is complete the input cycle is terminated and a transfer cycle occurs. The comparison circuits 218 are tested as the transfer cycle begins and the contents of the memory channel B 204 are transferred to both the memory channel C 206 and the memory channel E 210. And a parallel input output cycle is performed. During the output portion the contents of the memory channel E 210 are recorded on the tape unit IV 238 via the output synchronizer 222 while during the input portion the second item is inserted into the memory channel B 204 via the input synchronizer 220. As the new item enters, the comparison circuits 218 under the control of the key stored in the memory channel D 208 compare "B" with the item just recorded on the tape unit IV 238 which is also at this time stored in memory channel C 206.

When both the input and the output cycles are complete the comparison circuits are tested and a transfer cycle begins. "B" is transferred to the memory channel C 206 to be used in the next comparison and to the memory channel E 210 for recording during the next input output cycle. If "B" were greater than or equal to "C" then the recording will be on the tape unit IV 238. However, if "B" is less than "C" then a flip flop in the tape control 242 acting as a binary counter during sequence operations is flipped so that the recording will be on tape unit V 240 and the recordings will continue on tape unit V 240 until the same inequality occurs as the result of the comparison of later read in items. Thus, as long as sequences of increasing order of magnitude occur items are recorded on the same tape unit. As soon as the sequence can no longer be continued the binary counter is flipped and the alternate tape unit receives the information to be recorded.

This operation of reading in an item from tape unit III 236 via the input synchronizer 220 to the memory channel B 204, comparing it with the previous item, stored in memory channel C 206, transferring "B" to memory channel C 206 and E 210 and recording "E" on either tape unit IV 238 or tape unit V 240 continues until three decimal points are read in from the tape unit III 236 indicating the end of information on this tape unit.

The tape unit III 236 and the tape units I 232 and II 234 which follow the motion of the tape unit III 236 are permitted to run three more seconds before stopping to insure that enough tape is payed out in the tape units I 232 and II 234 to receive information during the next (reverse) pass. After the three second free run all these units are stopped and the tape units IV 238 and V 240 are momentarily started and stopped to provide acceleration time during the next (reverse) pass.

After these two tape units have finished their movement a reverse pass is initiated by changing the state of a binary counter in the control unit 216 which indicates, for a reverse pass, the tape units I 232 and II 234 are output tapes (receive information) and the tape units IV 238 and V 240 are input tapes (transmit information). The tape unit III 236 is no longer used. During a reverse pass the comparison rules change since there are now two input tapes and the comparison rules must include both of the input tapes and both of the output tapes.

Using the previously stated notation, for reverse passes during which descending subsequences are formed, output tapes are alternated; if both "C" is greater than "A" and "C" is greater than "B." This implies that when descending order subsequences can no longer be formed on a tape unit a new subsequence is started on a second tape unit. The rules for selecting the input tape unit are if "C" is greater than or equal to "B" is greater than "A" "A" is greater than "C" is greater than or equal to "B" "B" is greater than "A" is greater than "C" the next input item is from the tape unit which was inactive when the previous item was entered.

For all but the first pass and single input tape portions of the remaining passes, items are fed from the input synchronizer 220 to the memory channel A 202.

The transfer cycle associated with two tape input involves two routes. If the input tapes are not altered then there is a transfer of "A" to both memory channel C 206 for use in next comparison and to memory channel E 210 for recording on the output cycle. If the input tapes are alternated then there is a transfer of "A" to memory channel B 204 while "B" is being transferred to memory channels C and E.

The reverse pass starts with the recording of three decimal points on the magnetic tapes of both the tape unit I 232 and the tape unit II 234. The first item is read in from the tape unit IV 238 via the input synchronizer 220 to the memory channel A 202 on an input cycle and compared with "B" and "C" which have both been cleared to blanks (0001). Since "A" is greater than "B"="C," there is a transfer of "A" to memory channel B 204, "B" to memory channel C 206, the input tapes alternated, and no output cycle. The second item, the first from tape unit V 240, is read into memory channel A 202 in the same manner. At the end of the input cycle the comparisons are tested. The results of the comparison determine the transfer path and which tape unit supplies the next input item. At the end of the transfer there is a "read in" item in memory channel B 204 and in memory channels C 206 and E 210.

The first input-output cycle now occurs as the third item is read in the usual manner from the selected tape unit and the item in channel E 210 is recorded via the output synchronizer 222 on the tape unit II 234.

At the end of the combined input-output cycle the comparisons are tested that determine which of the tape units IV 238 or V 240 supply the next item, the transfer path between the memory channels, and which of the tape units I 232 or II 234 receive the item to be recorded.

The input-output cycles and transfer cycles occur until three decimal points are read in from one of the input tape units indicating that the end of information has been reached on its associated tape. From this point on, the pass is a one input tape pass and all items are entered into the memory channel B 204 and the comparisons only determine an alternation of output tape units.

When three decimal points are detected on this lone input tape, the pass is terminated by causing a movement of the two output tape units to provide acceleration distance for the next pass. The pass control binary counter in the control unit 216 changes state and a forward pass begun, during which the tape units I 232 and II 234 carry the input tapes and the tape units IV 238 and V 240 the output tapes.

Three decimal points are recorded on the tape units IV 238 and V 240 followed by the reading into channel A 202 of the first item from the tape unit I 232.

During this pass, a forward pass, ascending subsequences are formed, starting on tape unit IV 238. An alternation of output tape units is subject to the conditions that both "C" is greater than "A" and "C" is greater than "B" and an alternation of input tapes coupled with an "A" to memory channel B 204 transfer and a "B" to memory channels C 206 and E 210 transfer when "A" is greater than "B" is greater than or equal to "C", or "B" is greater than or equal to "C" is greater than "A", or "C" is greater than or equal to "A" is greater than "B". Except for the comparison conditions and the direction of tape motion, this pass is the same as the previously described pass and terminates in the same manner.

During each reverse pass, a flip flop in the control Unit 216 tests to see whether an alternation of output tape units occurs during the pass. If no alternation occurs, the file is in sequence and at the end of the pass instead of reversing the roles of the tape units the two output units, the tape units I 232 and II 234, are started up and run until a leader mark at the start of the reel is detected to terminate the operation. Since all reverse passes start with the recording of the first item on tape unit II 234 and no alternation has occurred, the sequenced file is one tape unit II 234 with "smallest" item available first. It should be noted that the file may have been in sequence after the previous forward pass but with the "largest" item first, hence in this case the last reverse pass is actually a copying pass.

Referring to FIG. 1, the flow of information and the more important control signals are shown. Only one polarity of signal and only one phase of signal is shown although in general both polarities and all phases participate in the operation as will be more fully set out in the later detailed descriptions of the individual units. It will be assumed that terms of the key block have been inserted serially via the input-output unit 224 which generates the parallel FJ, FK, FL, FM signals for each term and applies them to the input synchronizer 220 wherein they are converted into serial form and sent to the memory channel D 208 as the BF signals.

A multiposition switch is set to the sequence position in the control box 226 to cause the generation of the MA signals characteristic of sequencing. The initial clear switch of the control box 226 is pushed causing the generation of the DZ and DT signals and the proceed switch of the control box 226 is then actuated giving an NC signal.

These signals are primarily fed to the control unit 216 where they cause the generation of ET signals which are characteristic of the first pass of a sequence, the EA signals which are characteristic of one input tape operations and the EC signals which are characteristic of the start of every pass to control the recording of three decimal points on each of the output tapes. After one hun-hundred milliseconds a signal (EE) is generated in the tape control 242 which initiates the next operation.

The EA signal is fed to the memory channel A 202 and blocks the entry of information into this channel while the EA signal is fed to memory channel B 204 and will permit the insertion of information into this channel. The memory channel B 204 is used when information is entered from input synchronizer 220. The EE and EC signals cooperate in the tape control 242 to generate the EM signals and the EM signal causes the generation of the TUW4 signal in the tape control 242 which signal is fed to tape unit IV 238 to start the tape movement.

Signal EM is also fed to the output synchronizer 222 to start the output synchronizer 222 on an output cycle, during which signals (HU) are generated which will remain present until the end of the output cycle. At the end of the output cycle, the output synchronizer 222 writing circuits record three decimal points (a combination of HA—HD signals) on the magnetic tape of tape unit IV 238. After the third decimal point is recorded an HJ signal is fed from the output synchronizer 222 to the tape control 242 to cause generation of a JS signal which is fed to the tape unit IV 238 and causes it to stop.

The JS signal is also fed to the comparison circuits 218 to cause generation of an EJ signal, indicating that the output tapes should be alternated. The EJ signal is fed back to the tape control 242 to set a flip flop acting as a binary counter during sequencing to cause the alternation of the output tapes and causes generation of a TUW5 signal that selects tape unit V 240 for recording. At the same time, a signal (EH) is generated in the control unit 216 to indicate that one tape unit has three decimal points recorded. In addition, the HJ signal causes the generation of another EE signal from tape control 242 after a delay of a hundred milliseconds. The EE signal then causes the generation of another set of EM, HU and HE signals as described above and three decimal points are recorded on the magnetic tape of tape unit V 240. This recording is followed by the generation of another HJ signal which causes generation of another JS signal to halt tape unit V 240 and reset the EC flip flop in the control unit 216. The file processor is now ready to perform the first sequencing pass.

An EL signal generated at the end of the EC signal in tape control 242, initiates the generation of the TUR1, TUR2, and TUR3 signals which are fed respectively to the tape units I 232, II 234 and III 234 to start their magnetic tapes moving in a forward direction. The EL signal is also fed to the control unit 216 to start the DP signals indicating an input cycle and to the input synchronizer 220 to start the input cycle.

The first item is fed as the JW–III to JZ–III signals to the input synchronizer 220 wherein they are assembled and fed via the BF signal line to the memory channel B 204. At the same time the item enters the memory channel B 204, it is also fed via the CB signal line to the comparison circuits 218 for comparison with the contents of memory channel C 206 (the CC signal) under the control of the key in memory channel D 208 (the KY signal).

When the end of block characters are detected, a BN signal is generated by the input synchronizer 220. The BN signal is fed to the control unit 216 to terminate the DP signals and end the input cycle. The termination of this input cycle causes a transfer cycle during which the comparison circuits 218 are tested and the contents of the memory channel B 204 are transferred to the memory channels C 206 and E 210. The CM signal generated in the control unit 216 characterizes the start of the transfer cycle and is fed to the comparison circuits 218 to test the comparators. The CP signal generated in control unit 216 is present for the entire transfer cycle and opens the intermemory channel paths, while the CX signal also from the control unit indicates the end of the transfer cycle.

The CX signal fed to the tape control 242 starts the next input cycle and an output cycle by generating the EL and EM signals in the tape control. The input cycle proceeds in same manner as above and the second item is read in. The EM signal is fed to the output synchronizer 222 and after a time delay to permit the output tape unit (tape unit IV 238) to accelerate the synchronizer is activated for recording and the item in memory channel E 210 is recorded least significant digit first in time. During all operations but sequencing the recording is most significant digit first. When both the input cycle and the output cycle are complete as indicated by presence of both a BM signal generated by a BN signal from the input synchronizer 220 and an HG signal from the output synchronizer 222, another transfer cycle with comparisons is performed.

If an alternation of output tapes is to occur the comparison circuits 218 generate an EJ pulse signal which is fed to the tape control 242 causing the setting of a flip flop which acts as a binary counter during sequencing. The flip flop remains in this state until another EJ signal is received. The pass proceeds until the three decimal points indicating the end of information on the tape unit III 236 are read by the input synchronizer 220. A BC signal and a BA signal indicating the occurrence of the three decimal points are fed to the control unit 216 to cause the generation of the DJ and EU signals. The DJ signal together with the ET signal present at the tape control 242, after three seconds, cause the control to generate a JR signal which is fed to the tape units I 232, II 234 and III 236 to halt these units. In addition, sequential short TUW4 and TUW5 signals are generated that cause a slight movement of the tape units IV 238 and V 240 to provide acceleration distance for the reverse pass which is to follow.

After both tapes are moved the acceleration distance, the EC and ED signals are generated by the control unit 216. The ED signals are fed to the tape control 242 and are from a binary counter which changes state at the end of each pass. When the ED signals are present the tape units IV 238 and V 240 supply the input tapes and tape units I and II are the output tapes.

A new pass starts with generation of the EC signal which causes the writing of three decimal points on both the tape units I 232 and II 234 by activating the circuitry prementioned in output synchronizer 222 and by causing the generation of the TUW1 and TUW2 signals in the tape control 242. These tape units will supply the output tapes for the new pass. The setting of the ED binary counter controls their being chosen as output tapes and also the choice of the tape units IV 238 and V 240 as the input tapes. (The TUR4 and TUR5 signals generated in tape control 242 activate these units for reading.) It should be noted that the EA signal from control unit 216 which controlled one input tape operations was terminated at the end of the previous (the first) pass.

After the two sets of three decimal points are recorded in the manner described above, the first item is read in to memory channel A 202 via the BF signal line from the input synchronizer 220 which received the first block from the tape unit IV 238 as the JWI V–JZI V signals. A binary counter in the tape control 242, when set, selects this tape unit IV 238 during reverse passes and when reset selects the tape unit V 240.

The contents of the memory channel A 202 are compared with the cleared to blank contents of the memory channels B 204 and C 206 and an alternate transfer cycle characterized by the generation of a CW signal generated by the control unit 216 is performed ("A" is greater than "B"="C"). Whenever there is an alternate transfer cycle there will also be an alternation of input tapes and a CY signal from comparison circuits 218 indicating this type of comparison is fed to the control unit 216 to cause the generation of the CW signal and to the tape control 242 to cause the resetting of the binary counter in the tape control 242 to select tape unit V 240 as the source for the next input item.

The pass continues with input-output cycles and transfer cycles with alternations of input and output tapes as called for until three decimal points are read in from one of the input tapes.

The reading in of the three decimal points causes the setting of the EA signal in the control unit 216 and the remainder of the pass is a one input tape operation as first described. When the three decimal points are read in from the second input tape, the pass is terminated by generation of the DJ and EU signals which operate in their usual manner to slightly move tape units I 232 and II 234 to provide acceleration distance for next pass.

The ED flip flop in control unit 216 is reset by the EU signal and the role of the tape units is again reversed. The EC signal is generated in control unit 216 and three decimal points are recorded on tape units IV 238 and V 240 as previously described. A new forward pass using both tape units I 232 and II 234 as inputs is performed.

During each reverse pass a flip flop tests to see whether there is an alternation of output tapes. If there is, the resulting EJ signal is fed to the control unit 216 and sets a flip flop which is reset at end of each pass. If said flip flop is not set, the control unit 216 prevents the starting of a new pass. Instead the two output tapes I 232 and II 234 are restarted in the same direction and permitted to run to the end of the reel where a mechanical contact terminates operation by transmitting a signal back to the tape control 242.

7. *Select (FIG. 2)*

Select is the operation of extracting from a file a list of specified items. As it is performed in the file processor, select uses, in conjunction with a file tape, a selector tape containing a list of the desired items, arranged in the same sequence as the file. File items whose designators correspond to those of the items on the selector tape are copied on one output tape, called the selected file tape, and all other file items are copied on a second output tape, called the residual file tape. The items on the file tape must be in sequence.

In operation the main file from which items are to be selected is on the tape unit I 232. The selector tape is on the tape unit III 236. The tape unit IV 238 receives the residual file and tape unit V 240 the selected file.

The items of the selector file are read into the memory channel D 208 from the tape unit III 236 via the input synchronizer 220. These items will contain blank characters in all digit positions starting from the most significant to the digit positions for which the selection is to be performed. A carriage return symbol follows the last digit participating in the selection and prevents further comparison. From this position on, any characters may be in the selector items.

The items from the file tape enter the memory channel B 204 via the input synchronizer 220 from the tape unit I 232 just as in any one input tape operation. During transfer cycles "B" is transferred to the memory channels C 206 and E 210.

Comparisons are performed between "C" and "D" in which three conditions may arise.

(1) If "C"="D," "C" is a selected item and "E" is recorded on tape unit V 240. The next item, from tape unit I 232, is entered into memory channel B 204.

(2) If "C" is greater than "D," a new selector item is necessary and the next item from III 236 is entered into the memory channel D 208.

(3) If "C" is less than "D," "C" is not a selected item and "E" is recorded on the tape unit IV 238 and the next item from tape unit I 232 is entered into memory channel B 204.

The operation may be implemented by the following rules:

(1) If "C"="D," an output cycle is started to record "E" on tape unit IV 238 and an input cycle is started to bring the next item in from tape unit I 232 to the memory channel B 204.

(2) If "C" is greater than "D" at the end of a transfer cycle (characterized by a CX signal), the next item is read from tape unit III 236 into memory channel D 208.

(*a*) There will be no output cycle associated with the input cycle which causes reading in from tape unit III 236.

(*b*) There is no transfer cycle after reading in from tape unit III 236.

The reading in from tape unit III 236 will continue until "C" is equal to or less than "D."

(3) If "C" is less than "D" at the end of a transfer cycle, the next item is read in fom tape unit I 232 into memory channel B 204 and "E" is recorded on tape unit V 240.

As an example of a select operation assume the main file on tape unit I 232 consists of

04; 06; 15; 16; 24; 53; . . .

and the selector file on tape unit III 236 contains

06; 17; 24; . . .

| Cycle | Channels | | | Comment |
|---|---|---|---|---|
| | B | C and E | D | |
| Input | 04 | Blank | Blank | Read in of first item from tape unit I 232. |
| Transfer | | 04 | Blank | Transfer "B" to memory channels "C" and "E" and since "C" is greater than "D" prepare to read in first item of tape unit III 236. |
| Input | | 04 | 06 | The reading in of the first item from tape unit III 236. No transfer cycle will follow, but rather an input and an output cycle is started. |

| Cycle | Channels | | | Comment |
|---|---|---|---|---|
| | B | C and E | D | |
| Input-output.. | 06 | 04 | 06 | Records "E" on tape unit IV 238 since "C" is less than "D" and enters the next item of tape unit I 232 into memory channel "B." Prepares for a transfer cycle. |
| Transfer...... | -------- | 06 | 06 | Transfers "B" to memory channels "C" and "E." |
| Input-output.. | 15 | 06 | 06 | Since "C"="D", records "E" on tape unit V 240 and brings next item of tape unit I 232 into channel "B." |
| Transfer...... | -------- | 15 | 06 | Transfers "B" to memory channels "C" and "E." |
| Input........ | -------- | 15 | 17 | Reads next item of tape unit III 236 into memory channel "D" since "C" is greater than "D." There will be no transfer cycle. |
| Input-output.. | 16 | 15 | 17 | Since "C" is less than "D" records "E" on tape unit IV 238 and reads in next item from tape unit I 232. |
| Transfer...... | -------- | 16 | 17 | Transfer "B" to memory channels "C" and "E." |
| Input-output.. | 24 | 16 | 17 | Reads in next item from tape unit I 232 while "E" is recorded on tape unit IV 238 since "C" is less than "D." |
| Transfer...... | -------- | 24 | 17 | Transfer "B" to memory channels "C" and "E." |
| Input........ | -------- | 24 | 24 | The next item of tape unit III 236 is read into memory channel "D." There is neither an output cycle nor a transfer cycle as an item is being read in from tape unit III 236. |
| Input-output.. | 53 | 24 | 24 | Next item of tape unit I 232 is read into memory channel "B" while "E" is recorded on tape unit V 240, since "C"="D." |
| Transfer...... | -------- | 53 | 24 | Transfer "B" to memory channels "C" and "E." |
| Input........ | -------- | 53 | -------- | Next item is read into memory channel "D" from tape unit III 236 since "C" is greater than "D." This item is three decimal points indicating the end of selector items. |
| Input-output.. | -------- | 53 | -------- | Read in of next item from tape unit I 232 while "E" is recorded on tape unit IV 238. Once the end of the selector items is reached all items from tape unit I 232 are entered into memory "B" and transferred to memory channels "C" and "E" and recorded on tape unit IV 238. This continues until three decimal points are read in from tape unit I 232 to terminate the operation. |

The comparison circuits are tested at the end of each transfer cycle which normally follows the input and output cycles. This test is performed by a CX signal which occurs at the end of a transfer cycle. However, since there is no transfer cycle after the reading in of an item from tape unit III 236 during the input cycle of a selector item, a sampling is also performed at the end of these particular input cycles in addition to the end of transfer cycle sampling.

Figure 2:
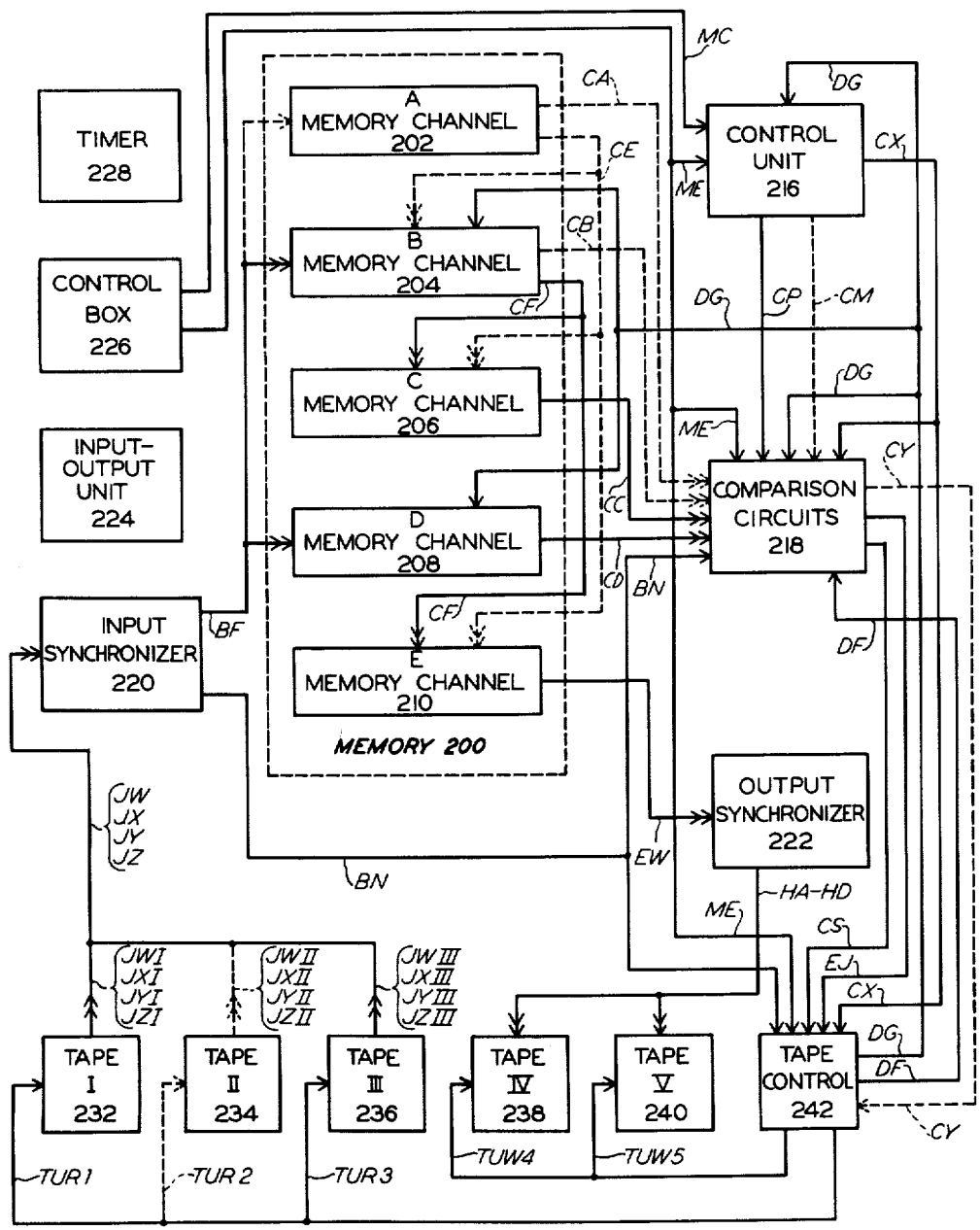
FIGURE 2 is a block diagram similar to FIGURE 1 for the "Select" and "Select and Collate" operations.

The basic information flow is shown in FIG. 2 with the control signals that are more important to this particular operation. The dotted lines of signal flow are for a combined select and collate operation hereinafter described.

The information flow is via either the JWI—JZI signal lines from the tape unit I 232 or the JWIII—JZIII signal lines from the tape unit III 236 to the input synchronizer 220 for assembly. The choice between tape unit I 232 and tape unit III 236 is determined by the presence of the TURI or TUR3 signal from the tape control 242. The assembled item is fed to either the memory channel B 204 or the memory channel D 208 as the BF signal. Control signals such as the DG signal determine which memory channel receives the information. Selector items are stored in the memory channel D 208 and file items enter the memory channel B 204 during an input cycle and are transferred to the memory channels C 206 and E 210 via the CF signal line during a transfer cycle. The contents of the memory channel C 206 as the CC signal are compared with the contents of the memory channel D 208 as the CD signal in the comparison circuits 218.

The contents of the memory channel E 210 during an output cycle are fed by the EW signal line to the output synchronizer 222 and thence via the HA—HD signal line to either the tape unit IV 238 or V 240 for recording, as determined by the presence of a TUW4 or a TUW5 signal from tape control 242, under control of a CS signal generated in comparison circuits 218.

Since most of the control signals perform similar functions, as in the previously described operations, only the differences will be stated.

The ME and MC signals, characteristic of select, are generated by a switch in the control box 226. The ME signals are fed to the control unit 216 to permit deletion of transfer cycles after an input cycle, which involves tape unit III 236, to the comparison circuits to permit comparisons between "C" and "D" and to the tape control 242 to alert the DG flip flop which generates the key control signal for select. The MC signal is also fed to the control unit 216 to set the EA flip flop which controls all main file one input tape operations as previously described in the Sequence section.

The rules associated with select will now be re-stated and an indication of the function of the control signals will be given.

*Rule 1.*—If "C"="D," switch output tape units from tape unit IV 238 to tape unit V 240. The state of the comparators in the comparison circuits 218 is tested at the end of a transfer cycle by a CX signal from the control unit 216 or by a BN signal from the input synchronizer 220 under the control of a DG characteristic of reading from tape unit III 236. The DG signal is generated in the tape control 242 during an input cycle in which the input item is from tape unit III 236. If a switch from tape unit IV 238 to tape unit V 240 is to occur as indicated by the generation of an EJ signal, by the comparison circuits 218, the DF flip flop is set in the tape control 242 and a —DF signal is fed back to the comparison circuits 218 to prevent any further generation of EJ signals until the next item is compared.

*Rule 2.*—Read in next item from tape unit III 236 if "C" is greater than "D." The sampling occurs at end of a transfer cycle by a CX signal from the control unit 216. When "C" is greater than "D" at the sampling time, a CS signal is fed from the comparison circuits 218 to the tape control 242 to set the DG flip flop which in turn causes the generation of a TUR3 signal that permits reading from the tape unit III 236.

*Rule 3.*—If at end of reading in a new selector item "C" is still greater than "D," the next selector item is read in from tape unit III 236. The DG flip flop remains set until a —BN signal, generated by the input synchronizer 220, is fed to the tape control 242 at the end of the input cycle to reset the flip flop. If, however, "C" is still greater than "D," then a CS signal is again fed to the tape control 242 which effectively negates the —BN signal and the DG flip flop remains set. Another item is read in from the tape unit III 236.

*Rule 4.*—There is no output cycle when an input cycle from tape unit III 236 is occurring. A —DG signal in the tape control 242 prevents the generation of an EM signal which starts an output cycle.

*Rule 5.*—There is no transfer cycle following an input cycle associated with an item from tape unit III 236. The DG signals associated with such an input cycle are fed to the control unit 216 to prevent the start of the transfer cycle. Since the next input and output cycles are started by the termination of a transfer cycle a new starting means is required. The BN and DG signals fed to the tape control 242 act as this starting means.

8. Collate (FIG. 1)

The collate operation is the merging of two sequenced files into one sequenced file. In a sense, it is equivalent to the last pass of a sequencing operation. It is used primarily as a means of restoring items to a file that were previously selected in a sequential manner.

Since the operation is very similar to sequencing only the main points will be indicated. One of the two sequence files is placed in the tape unit I 232 and the other sequence file is placed in the tape unit II 234. The key is initially inserted in the memory channel D 208. The items from the tape units I 232 and II 234 are handled in the same way and the items from these units during a forward pass of a sequence operation. Comparisons are performed in the usual manner but there will only be a controlling of the alternation of input tape units since only one output tape unit (the tape unit IV 238) will receive the information. For this reason the circuitry in the comparison circuits 218 which generates the alternate output pulses is not activated and the DF flip flop in the tape control 242 is never set. When the operation terminates it is necessary to write three decimal points on the magnetic tape of the tape unit IV 238. Therefore at the start of the operation an MD signal characteristic of collate is fed from the control box 226 to the control unit 216 to cause the setting of the EH flip flop. The EH flip flop is used at the end of an operation to count the recording of the three decimal points on each of two output tapes. The initial setting of the flip flop by the MD signal substitutes for the recording of the information on one of the output tapes, so when the three decimal points are recorded on the tape unit IV 238 the control unit 216 interprets this first recording of three decimal points as a second recording of three decimal points and the usual operation termination procedure is carried out.

9. Select and collate (FIG. 2)

The select and collate operation is the simultaneous performance of the select and the collate operations. The operation permits the collating of two input tapes while a third input tape determines which items are to be selected from the two merging tapes.

In this operation the tape unit I 232 and the tape unit II 234 contain sequenced files which are to be merged and selected from. The tape unit III 236 contains the selector items. The tape unit IV 238 receives the residual items and the tape unit V 240 the selected items.

Basically, collating is performed during input cycles just as in the predescribed collate operation. Either an item is read into memory channel A 202 from the tape unit I 232 or the tape unit II 234 via the input synchronizer 220. At the start of the transfer cycle, a CM signal is fed from the control unit 216 to the comparison circuits 218 to perform the usual tests associated with collate operations. The result of the tests determines which tape unit (I 232 or II 234) supplies the next item. The same type of transfer cycles are performed as in collate operations with "A" or "B" being transferred to the memory channels C 206 and E 210. At the end of the transfer cycle the select portion takes over. There is now the test between "C" and "D" just as in the select operation to determine whether "E" is recorded on the tape unit IV 238 or V 240. Or whether there will be the insertion of a new selector item into the memory channel D 208 from the tape unit III 236.

FIG. 2 which is associated with the select operation shows the signal flow. The dotted lines are the additional signals used in the select and collate operation. However the MC signal which causes the generation of an EA signal that controlled one input tape operations is not generated. In all two input tape operations all file information is fed from the input synchronizer 220 to the memory channel A 202, whereas, for one input tape operations, all file information is fed to the memory channel B 204. With two input tape operations it is necessary to select between input tape units. This is accomplished at the start of a transfer cycle and if there is to be an alternation of input tapes the comparison circuits generate a CY signal that is fed to the tape control 242. As a result of an occurrence of a CY signal the tape control 242 alternates the tape unit I 232 and the tape unit II 234 controls the source of the next file item.

These two distinct operations may be combined since two comparisons are performed during a transfer cycle. One comparison is at the start of a transfer cycle to determine conditions required for collating and the other comparison is at the end of a transfer cycle to determine conditions required for selecting.

Figure 3:
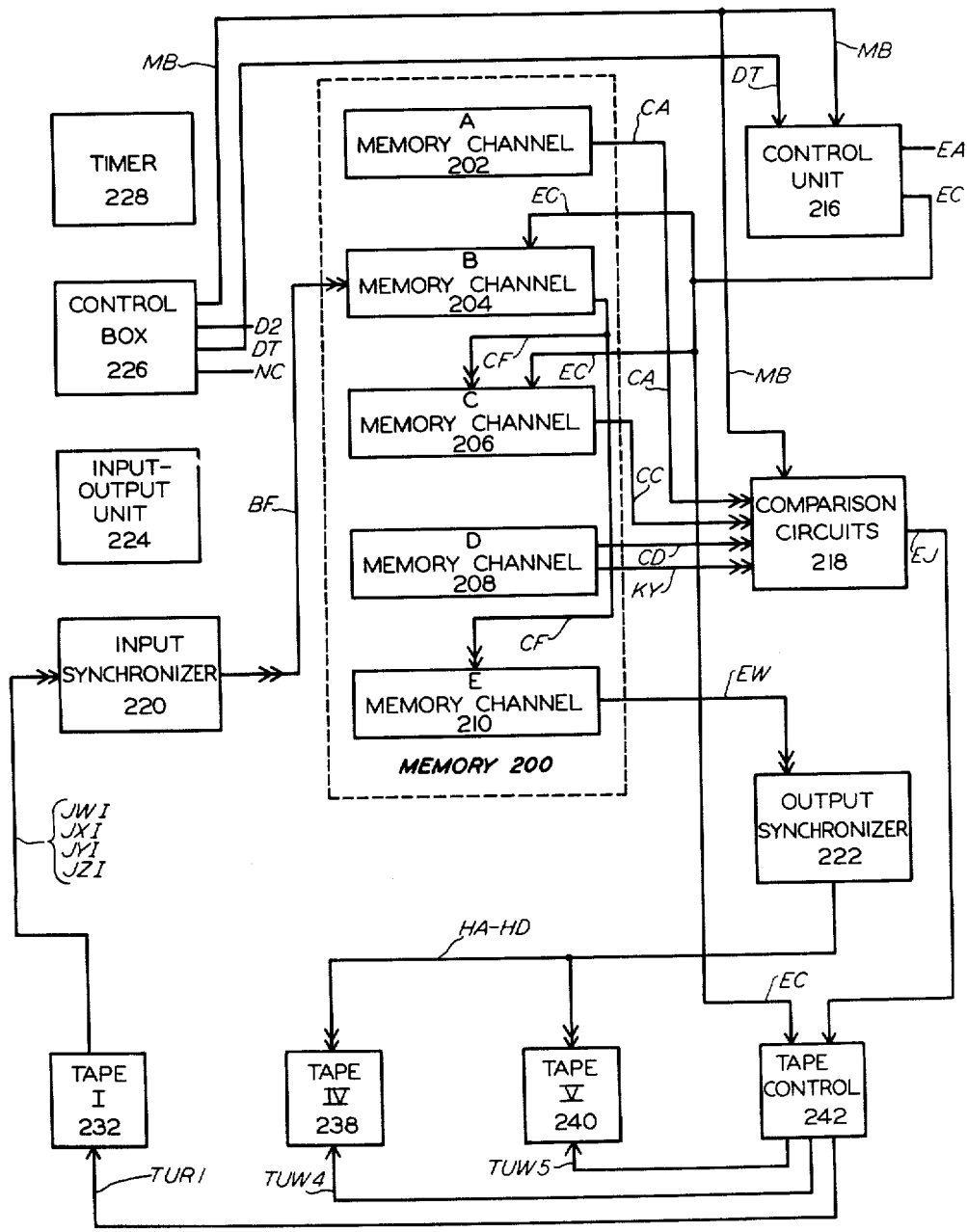
FIGURE 3 is a block diagram similar to FIGURES 1 and 2 for the 'Separate" operation.

10. Separate (FIG. 3)

The basic separate operation is to choose from a main file those items which fall between prescribed limits or bounds. This operation, sometimes called class selection, is used when it is necessary to copy from a file all items which fall into certain categories. An example is the copying out, from an accounts receivable file, all accounts receivable over ninety days old. Another example would be copying from an inventory file all items relating to parts valued between $10.00 and $20.00.

It is possible to separate from a file those items which satisfy any one or more of several alternative conditions; that is, items which satisfy condition A or condition B or condition C, for example. There is no limit to the number of alternative separation conditions, aside from the fact that all fields concerned must be within the designator block and must be separated from each other by one or more digits.

Another type of multiple separation criteria is possible; this is the requirement that separation shall occur only if all of several conditions are met, that is, only items which satisfy condition A and condition B and condition C, for example, will be separated. This makes possible such operations as separating from a magazine subscriber file all those subscribers who live in Connecticut and have been subscribers for more than five years.

This type of separation is subject to the restriction that only the last of two or more interdependent fields may have different upper or lower bounds specified; the upper bound must equal the lower bound for every field except the last. Finally, it is possible to combine alternative and interdependent criteria in the same separation pass. For example, it may be wished to separate items which satisfy condition A or condition B or conditions C and D.

This type of separation is subject to the restriction that an alternative condition cannot lie between two interdependent conditions, for example, the alternative condition A cannot lie between the interdependent conditions C and D.

To illustrate some of the principles described a specific example will be given. Assume on a particular day it is desired to have from an insurance policy file:

(a) All policies whose premium due dates lie between March 1st and March 15th,
(b) All policies for which the insured lives in Arkansas,
(c) All policies for insured married males in the 26–30 age bracket.

Assume that the state code is the third word, digits five and six; marital status code fourth word digit 2; sex code, fourth word digit 5; insuring age, fifth word, digits one and two; premium due date seventh word, digits seven, eight, nine and ten. It is also to be assumed that the code for Arkansas is 02, that for a married person is 2 and that for a male is 1. Then the upper and lower bound patterns are:

| Upper Bound | Lower Bound |
| --- | --- |
| bbbbbbbbbbb | bbbbbbbbbbb |
| bbbbbbbbbbb | bbbbbbbbbbb |
| bbbbb02cbbb | bbbbb02cbbb |
| bb2bb1bbbbb | bb2bb1bbbbb |
| b30cbbbbbbb | b26cbbbbbbb |
| bbbbbbbbbbb | bbbbbbbbbbb |
| bbbbbbb0315 | bbbbbbb0301 |
| bcbb, etc. | bcbb, etc. | where "b" represents in this particular pattern a blank symbol (0001) and "c" a carriage return symbol (1110) and the most significant digit of each word is a sign digit and not an information digit.

It should be noted that each "or" (alternative) condition is followed by a carriage return symbol and that all and interdependent conditions are continuous and only the last of the interdependent conditions is followed by a carriage return. Blanks are in all positions of irrelevant data.

In the file processor, the upper bound is initially inserted into the memory channel D 208 and the lower bound in the memory channel A 202. The file to be separated is stored on the tape unit I 232. The selected items are recorded on the tape unit IV 238 and the unselected items recorded on the tape unit V 240.

The basic information flow as well as the more important control signals are shown in FIG. 3. The upper bound is stored in the memory channel D 208 and the lower bound is stored in the memory channel A 202.

An item is read from the tape unit I 232 via the JW1—JZ1 signals lines, the input synchronizer 220 and the BF signal line to the memory channel B 204 during an input cycle. During a transfer cycle the item is transferred to the memory channel C 206 and the memory channel E 210 via the CF signal line while the comparisons are performed between this item entering the memory channel C 206 (the CC signal) and the upper bound stored in the memory channel D 208 (the CD signal) and the lower bound stored in the memory channel A 202 (the CA signal). The criteria used in the comparison are "D" is equal to or greater than "C" is equal to or greater than A. If the criteria are satisfied an EJ signal is fed to the tape control 242, if not, this signal is not transmitted.

In either case, the block in memory channel E 210 is transferred via the EW signal line, the output synchronizer 222 and the HA—HD signal lines to either the tape unit IV 238 or the tape unit V 240 as determined by the presence or absence of the EJ signal.

After the upper bound has been inserted in the memory channel D 208 and the lower bound inserted in the memory channel A 202 the operation switch in the control box 226 is turned to the "Separate" position causing the generation of the MB signals. The initial clear and proceed switches are then depressed and the usual DZ, DT and NC signals are generated. The MB signal is fed to the control unit 216 to cause the generation of the EA signals which are characteristic of one input tape operations. The EA signal remains set for the entire operation.

At the same time the DT signal causes the generation of the EC signal which for this operation lasts one minor cycle and is used primarily to clear the memory channels "B" and "C" to blanks (0001). The EC signal is also fed to the tape control 242 to cause the generation of a signal (CZ) which causes the tape unit I to be selected for the input tape by means of a TUR1 signal fed to the tape unit I 232.

The first item from the tape unit I is fed via the JW1—JZ1 signal lines to the input synchronizer 220 where after being assembled it is transferred in the usual manner via the BF signal line to the memory channel B 204. During a transfer cycle, following this input cycle, the item is transferred via the CF signal line to the memory channel C 206 and the memory channel E 210. While the item is being transferred the comparisons occur. The information from the lower bound is fed from the memory channel A 202 via the CA signal line and the information from the upper bound is fed from the memory channel D 208 via the CD signal line. As the item enters the memory channel C it is also fed via the CC signal line to the comparison circuits. Whenever any character but a blank or carriage return is sensed in the upper bound by the comparison circuits 218 the state of the comparators is tested. After each test the comparators are reset by a signal (—EX) in the comparison circuits 218. Thus within an entire block of information it is possible to perform several comparisons since after each comparison is tested the comparators are returned to their initial state. If when the comparators are tested the condition is found that "D" is equal to or greater than "C" is equal to or greater than "A" the item is fed to the memory channel C 206 and the memory channel E 210 to be separated. When this condition is satisfied an EJ signal is generated by the comparison circuits 218 and fed to the tape control 242.

Initially the tape control 242 and, in particular, a flip flop therein is in a reset condition such that any information received by the output synchronizer 222 is recorded on the tape unit IV 238. If the item is to be separated as indicated by the generation of an EJ signal, the tape control 242 generates a TUW5 signal which activates the tape unit V 240 to receive the block of information. After the block has been recorded on the tape unit V 240 the flip flop is again reset and any further blocks will be recorded on the tape unit IV 238 until another EJ signal, resulting from a later comparison, changes the state of the flip flop during the recording of that block.

In either case, after the comparisons have been performed, the block of information, temporarily stored, in the memory channel E 210, is transferred via the EW signal line to the output synchronizer 222 for recording on the selected tape unit via HA—HD signal lines.

The next item is then fed into the input synchronizer 220 and the same operation proceeds with the eventual recording of the block on either the tape unit IV 238 or the tape unit V 240. Finally, three decimal points are detected at the end of the input information on the tape unit I 232 and the termination routine begins. The detection of the three decimal points causes the generation of the EU signals in the control unit 216 as described in the "Sequence" operation. The EU signals then cause the generation of the HE signals in the output synchronizer 222 and three decimal points are recorded on the tape unit IV 238 and the tape unit V 240 in the usual manner. After the decimal points have been recorded the operation terminates.

Figure 4A:
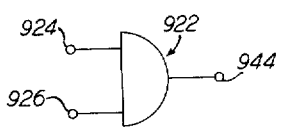
FIGURE 4a and FIGURE 4b are respectively the symbol for and the schematic diagram of a gate.
Figure 4B:
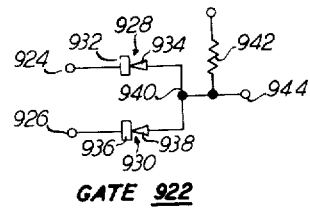

11. *Gate* (FIGS. 4a and 4b)

The gates used in the file processor are of the "coincidence" type, each comprising a crystal diode network which functions to receive input signals via a plurality of input terminals and to pass the most negative signal.

The symbol for a representative gate 922, having two input terminals 924 and 926, is shown in FIG. 4a. Since the signal potential levels are plus five volts (positive signals) and minus ten volts (negative signals), the potentials of the signals which may exist at the input terminals 924 and 926 are thereby limited.

If a potential of minus ten volts is present at one or both of the input terminals 924 and 926, a potential of minus ten volts exists at the output terminal 944. Therefore, if one of the input signals to the input terminals 924 and 926 is positive and the other signal is negative, the negative signal is passed and the positive signal is "blocked."

When there is a coincidence of positive signals at the two input terminals 924 and 926, a positive signal is transmitted from the output terminal 944. In such case, it may be stated that a positive signal is "gated" or "passed" by the gate 922.

The schematic details of the gate 922 are shown in FIG. 4b. Gate 922 includes the crystal diodes 928 and 930. Each of the input terminals 924 and 926 is coupled to one of the crystal diodes 928 and 930. Crystal diode 928 comprises the cathode 932 and the anode 934. Crystal diode 930 comprises the anode 938 and the cathode 936. More particularly, the input terminals 924 and 926 are respectively coupled to the cathode 932 and the cathode 936 of the crystal diode 930. The anode 934 of the crystal diode 928 and the anode 938 of the crystal diode 930 are interconnected at the junction 940. The anodes 934 and 938 are coupled via the resistor 942 to the positive potential of sixty-five volts.

If negative potentials are simultaneously present at the input terminals 924 and 926, both of the crystal diodes 928 and 930 conduct, since the positive potential tends to make the anodes 934 and 938 more positive. The voltage at the junction 940 will then be minus ten volts since, while conducting, the anodes 934 and 938 of the crystal diodes 928 and 930 assume the potential of the associated cathodes 932 and 936.

When a positive signal is fed only to the input terminal 924, the cathode 932 is raised to a positive five volts potential and is made more positive than the anode 934, so that crystal diode 928 stops conducting. As a result, the potential at the junction 940 remains at the negative ten volts level. In a similar manner, when a positive signal is only present at the input terminal 926, the voltage at the junction 940 will not be changed.

When the signals present at both input terminals 924 and 926 are positive, the anodes 934 and 938 are raised to approximately the same potential as their associated cathodes 932 and 936 and the potential at the junction 940 rises to a positive potential of five volts.

The potential which exists at the junction 940 is transmitted from the gate 922 via the connected output terminal 944.

In the above described manner, the gate 922 is frequently used as a switch to govern the passage of one signal by the presence of one or more signals which controls its operation.

It should be understood that the potentials of plus five volts and minus ten volts used for purpose of illustration are approximate, and the exact potentials will be affected in two ways. First, they will be affected by the value of the resistance 942 and its relation to the impedances of the input circuits connected to the input terminals 924 and 926. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in apparatus.

A clamping diode may be connected to the output terminal 944 to prevent the terminal from becoming more negative than a predetermined voltage level to protect the diodes 928 and 930 against excessive back voltages and to provide the proper voltage levels for succeeding circuits.

12. *Buffer (FIGS. 5a and 5b)*

The buffers used in the file processor are also known as "or" gates. Each buffer comprises a crystal diode network which functions to receive input signals via a plurality of input terminals and to pass the most positive signal.

Figure 5A:
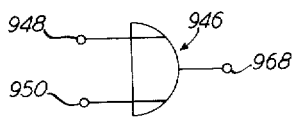
FIGURE 5a and FIGURE 5b are respectively the symbol for and the schematic diagram of a buffer.

The symbol for a representative buffer 946, having two input terminals 948 and 950, is shown in FIG. 5a. Since the signal potential levels in the system are minus ten volts and plus five volts, either one of these potentials may exist at the input terminals 948 and 950.

If a positive potential of five volts exists at one or both of the input terminals 948 or 950, a positive potential of five volts exists at the output terminal 968. If a negative potential of ten volts is present at both of the input terminals 948 and 950, a negative potential of ten volts will be present at the output terminal 968.

Figure 5B:
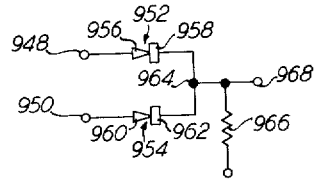

The schematic details of the buffer 946 are shown in FIG. 5b. The buffer 946 includes the two crystal diodes 952 and 954. The crystal diode 952 comprises the anode 956 and the cathode 958. Crystal diode 954 comprises the anode 960 and the cathode 962. The anode 956 of the crystal diode 952 is coupled to the input terminal 948. The anode 960 of the crystal diode 954 is coupled to the input terminal 950. The cathodes 958 and 962 of the crystal diodes 952 and 954, respectively, are joined at the junction 964 which is coupled to the output terminal 968, and via the resistor 966 to the negative potential of seventy volts. The negative supply bus 970 tends to make the cathodes 958 and 962 more negative than the anodes 956 and 960, respectively, causing both crystal diodes 952 and 954 to conduct.

When negative ten volt signals are simultaneously present at input terminals 948 and 950, the crystal diodes 952 and 954 are conductive, and the potential at the cathodes 958 and 962 approaches the magnitude of the potential at the anodes 956 and 960. As a result, a negative potential of ten volts appears at the output terminal 968.

If the potential at one of the input terminals 948 or 950 increases to plus five volts, the potential at the junction 964 approaches the positive five volts level as this voltage is passed through the conducting crystal diode 952 or 954 to which the voltage is applied. The other crystal diode 952 or 954 stops conducting since its anode 956 or 960 becomes more negative than the junction 964. As a result, a positive potential of five volts appears at the output terminal 968.

If positive five volt signals are fed simultaneously to both input terminals 948 and 950, a positive potential of five volts appears at the output terminal 968, since both crystal diodes 952 and 954 will remain conducting. This the buffer 946 functions to pass the most positive signal received via the input terminals 948 and 950.

13. *Delay line (FIGS. 6a and 6b)*

Figure 6A:
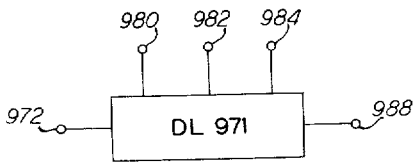
FIGURE 6a and FIGURE 6b are respectively the symbol for and the schematic diagram for a delay line.

The symbol for a representative electrical delay line 971 which is a lumped parameter type delay line and which functions to delay received pulses for discrete periods of time, is shown in FIG. 6a.

The delay line 971 comprises the input terminal 972, the output terminal 988, and a plurality of taps 980, 982 and 984. A pulse which is fed via the input terminal 972 to the delay line 971 will be delayed for an increasing number of pulse times before successively appearing at the taps 980, 982 and 984. When the pulse reaches the output terminal 988, the total delay provided by the delay line 971 has been applied. In the text, the specific number of pulse-times delay which is encountered before a pulse travels from the input terminal of a tap of the delay line will be stated.

Figure 6B:
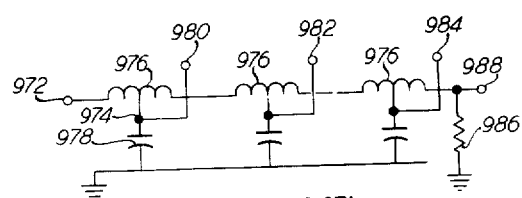

The delay line 971 shown in FIG. 6b comprises a plurality of inductors 976 connected in series, with the associated capacitors 978 which couple a point 974 on each inductor 976 to ground. A signal is fed into the delay line 971 at the input terminal 972 and the maximum delay occurs at the output terminal 988. The taps 980, 982 and 984 are each connected to one of the points 974 and provide varied delays. The delay line 971 is terminated by a resistor 986 in order to prevent reflections. Although in the delay line of FIG. 6b a tap is shown connected to each of the points 974, it should be understood that in actual practice there are ordinarily several untapped points 974 between successive taps.

In many instances, distributed constant delay lines are used. Such delay lines are commercially available from several manufacturers. The short delay lines are of this type while the longer delay lines are of the lumped parameter type.

14. Amplifier (FIGS. 8a and 8b)

Figure 8A:
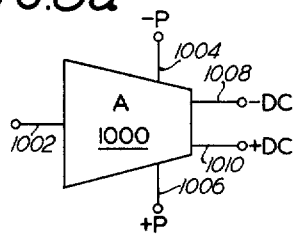
FIGURE 8a and FIGURE 8b are respectively the symbol for and the schematic diagram of an amplifier.
Figure 8B:
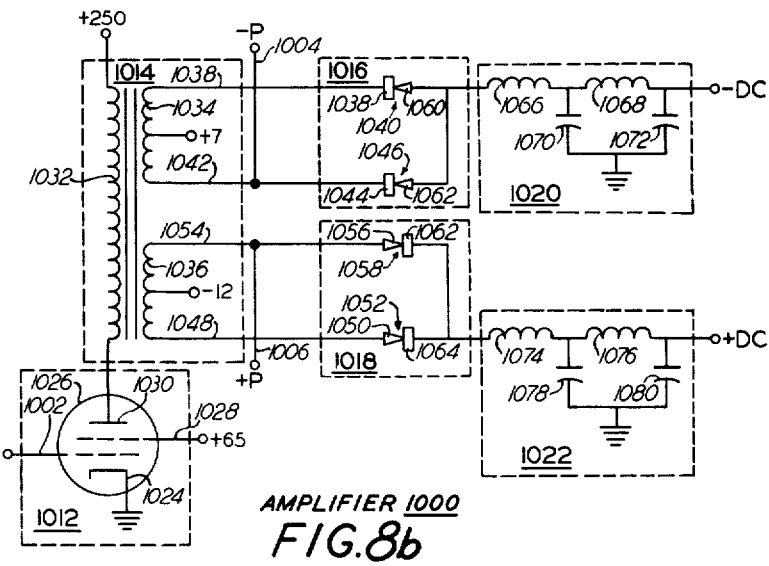

FIG. 8a shows a typical amplifier 1000 having an input terminal 1002, a negative pulse output terminal 1004, a positive pulse output terminal 1006, a negative D.C. output terminal 1008 and a positive D.C. output terminal 1010.

When the amplifier 1000 receives a train of pulses at its input terminal 1002 it transmits a train of amplified negative-going pulses from the negative pulse output terminal 1004 and a train of amplified positive-going pulses from its positive output terminal 1006. At the same time, the amplifier 1000 transmits a negative D.C. voltage from its negative D.C. output terminal 1008 and a positive D.C. voltage from its positive output terminal 1010. These D.C. output voltages are delayed one pulse time with respect to the entrance of the input pulses to the input terminal 1002.

Several variations of the amplifier 1000 are employed throughout the system. These variations are concerned with the type of output signals generated in response to the input pulses fed to the amplifier. In some cases only pulse signals will be generated. In other cases only D.C. signals will be generated, while in still other cases combinations of positive and negative pulse and D.C. signals will be generated. In order to determine which signals are generated it is only necessary to note which of the output terminals are present with each of the amplifiers. For example, since the four output terminals 1004 to 1010 are all present in the amplifier 1000, the four above mentioned types of signals will be generated. Whenever one of the output terminals is missing it will be assumed that the type of signal associated with the missing terminal is not generated.

FIG. 8b shows the schematic diagram of the amplifier 1000. The amplifier 1000 comprises the vacuum tube 1012, the transformer 1014, the negative rectifier network 1016, the positive rectifier network 1018, the negative filter 1020 and the positive filter 1022.

The vacuum tube 1012 has a grounded cathode 1024, a control grid 1026 coupled to the input terminal 1002, a screen grid 1028 coupled to a positive sixty-five volt potential, a plate 1030 coupled to one end of the primary winding 1032 of the transformer 1014. The other end of the primary winding 1032 is coupled to a positive two hundred and fifty volt potential.

The transformer 1014 has a negative secondary 1034 which is center tapped, the center tap being returned to a positive seven volt potential. The outer arm 1038 of the negative secondary 1034 is coupled to the cathode 1039 of a diode 1040 in the negative rectifier 1016.

The inner arm 1042 of the negative primary 1034 is coupled to the cathode 1044 of the diode 1046 in the negative rectifier 1016. This arm is also coupled to the negative pulse output terminal 1004.

The transformer 1014 also has a positive secondary which is center tapped and returned to a negative twelve volt potential. The outer arm 1048 of the positive secondary 1036 is coupled to the anode 1050 of the diode 1052 in the positive rectifier 1018. The inner arm 1054 of the positive secondary 1036 is coupled to the anode 1056 of the diode 1058 in the positive rectifier 1018. This arm is also coupled to the positive pulse output terminal 1006.

The anode 1060 of the diode 1040 and the anode 1062 of the diode 1046 are linked together and fed to the input terminal of the negative filter 1020. The cathode 1062 of the diode 1058 and the cathode 1064 of the diode 1052 are linked together and connected to the input terminal of the positive filter 1022.

The negative filter 1020 comprises the inductors 1066 and 1068 and the capacitors 1070 and 1072 joined together in a pair of series-connected conventional L-C filter networks. Similarly the positive filter 1022 comprises the inductors 1074 and 1076 and the capacitors 1078 and 1080 joined together to form a pair of serially connected conventional L-C filter networks.

When a train of positive pulse signals is fed to the input terminal 1002 of the amplifier 1000, a series of amplified negative pulses is fed via the negative secondary 1034 to both the negative rectifier 1016, as a series of negative pulses, and to the negative pulse output terminal 1004 and also a series of amplified positive pulses is fed via the positive secondary 1036 to both the positive rectifier 1018 and to the positive pulse output terminal 1006.

The negative rectifier 1016 acting as a full wave rectifier feeds the rectified negative pulses to the negative filter 1020 where the ripple frequencies are smoothed out and a constant negative D.C. voltage is fed from the output terminal 1008. The positive pulses from the positive secondary 1036 are fed to the positive rectifier 1018 where they are full wave rectified and fed to the positive filter 1022. The positive filter 1022 smooths out the ripple frequencies and permits a constant positive D.C. potential to be transmitted from the output terminal 1010.

It should be noted, that at the same time the positive pulses are fed to the rectifier 1018, positive pulses are also transmitted from the positive output terminal 1006. Likewise, when the negative pulses are fed to the negative rectifier 1016, the negative pulses are fed to the output terminal 1004. Thus the amplifier operates four distinct waveforms.

In some embodiments of the amplifier 1000 where D.C. output signals are not required the output terminals 1008 and 1010 will be deleted. Schematically this implies that when the output terminal 1008 is deleted the negative rectifier 1016 and the negative filter 1020 are also deleted. Similarly when it is not required for the amplifier 1000 to supply positive D.C. signals the output terminal 1010 will be deleted as schematically the positive rectifier 1018 and the positive filter 1022 will not be included in the amplifier.

15. Reshaper and pulse extender (FIGS. 9a and 9b)

Figure 9A:
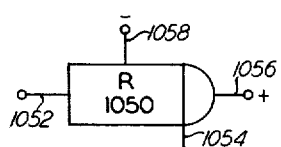
FIGURE 9a and FIGURE 9b are respectively the symbol for and the schematic diagram of a reshaper.

FIG. 9a shows the logical symbol for a typical reshaper 1050. The reshaper 1050 has an input terminal 1052, a clock pulse terminal 1054, a positive output terminal 1056 and a negative output terminal 1058. The reshaper 1050 is basically a pulse amplifier which generates rigidly timed pulses that have sharp leading and trailing edges. When a poorly shaped pulse is fed to the input terminal 1052 a well timed and well shaped positive pulse is transmitted from the positive output terminal 1056 and a similar pulse of the opposite polarity is transmitted from the negative output terminal 1058. A continuous source of clock pulse signals are fed to the clock pulse terminal 1054 and essentially one of these clock pulses is substituted for the mis-shaped pulse fed to the input terminal 1052.

Figure 9B:
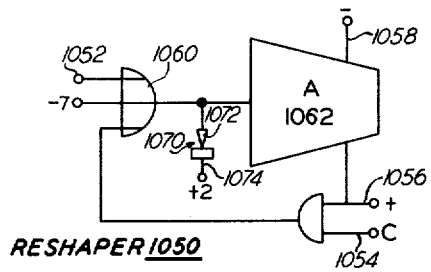

FIG. 9b shows the reshaper 1050 in more detail, using some of the above described logical symbols. The reshaper 1050 is shown comprising the buffer 1060, the amplifier 1062 and the gate 1064. The output terminal of the buffer 1060 is coupled to the input terminal of the amplifier 1062 and to the anode 1072 of the diode 1070, whose cathode is returned to a positive two volt potential. The positive output terminal of the amplifier 1062 is coupled to an input terminal 1056 of the gate 1064 and the output terminal of the gate 1064 is coupled to a first input terminal of the buffer 1060 thus forming a closed loop. When a low amplitude pulse is fed to the input terminal 1052, which is also the second input terminal of the buffer 1060, the pulse passes through the buffer 1060 to the input terminal of the amplifier 1062 and begins to be clipped and amplified. The buffer 1060 has a third input terminal coupled to a seven volt negative potential to provide baseline clipping. The amplified leading edge of the positive-going output pulse from the positive output terminal 1056 alerts the gate 1064. When a clock pulse appears at the clock pulse terminal 1054 the clock pulse passes through the gate 1064 and is fed back through the buffer 1060 to the amplifier 1062 providing positive feedback. The positive feedback continues for the duration of the clock pulse signal at which time the recirculation is terminated and the output immediately diminishes. This assures the transmission of a full amplitude well shaped pulse from the reshaper 1050.

When the reshaper is labeled with an E instead of an R, the reshaper becomes a pulse extender which is identical to the reshaper in all respects except that the clock pulse terminal 1054 is replaced by a reset terminal which receives a negative pulse signal. Thus, when the pulse extender receives a pulse, the feedback action continues until the negative signal breaks the feedback path. In this manner a pulse having several times the width of a standard clock pulse is generated. In a sense the extender functions like a monostable multivibrator.

16. *Flip flop (FIGS. 10a and 10b)*

Figure 10A:
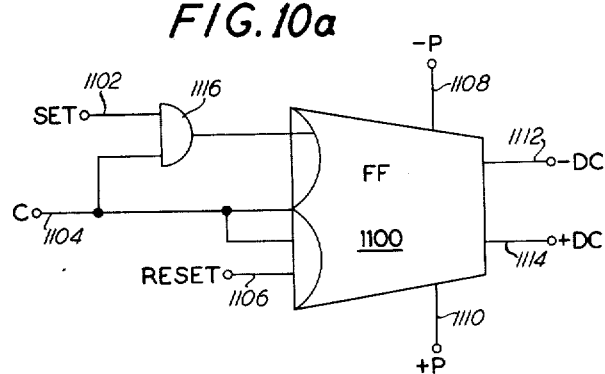
FIGURE 10a and FIGURE 10b are respectively the symbol for and the schematic diagram of a flip flop.

FIG. 10a shows the logical symbol for the flip flop 1100. The flip flop 1100 (a typical flip flop) has a set terminal 1102, a clock pulse terminal 1104, a reset terminal 1106, a negative pulse output terminal 1108, positive pulse output terminal 1110, a negative D.C. output terminal 1112 and a positive D.C. output terminal 1114. When a positive pulse is fed via the set terminal 1102 to the gate 1116 the flip flop is turned on and the following signals are generated: a train of negative pulses from the negative pulse output terminal 1108, a train of positive pulses from the positive pulse output terminal 1110, a negative D.C. signal from the negative D.C. output terminal 1112 and a positive D.C. signal from the positive output terminal 1114.

These signals are transmitted until a negative pulse is fed via the reset terminal 1106 to the flip flop 1100 and the flip flop 1100 returns to a reset condition. In the reset state the negative pulse output terminal 1108 is at a constant positive potential, the positive pulse output terminal 1110 is at a constant negative potential, the negative D.C. output terminal 1112 is at a constant positive potential and the positive D.C. output terminal 1114 is at a constant negative potential. It should be noted that there may be a plurality of set input terminals to the flip flop 1100. Generally each of the set input terminals will be associated with a gate similar to the gate 1116. It should also be noted that more than one reset terminal may be associated with the flip flop 1100.

Figure 10B:
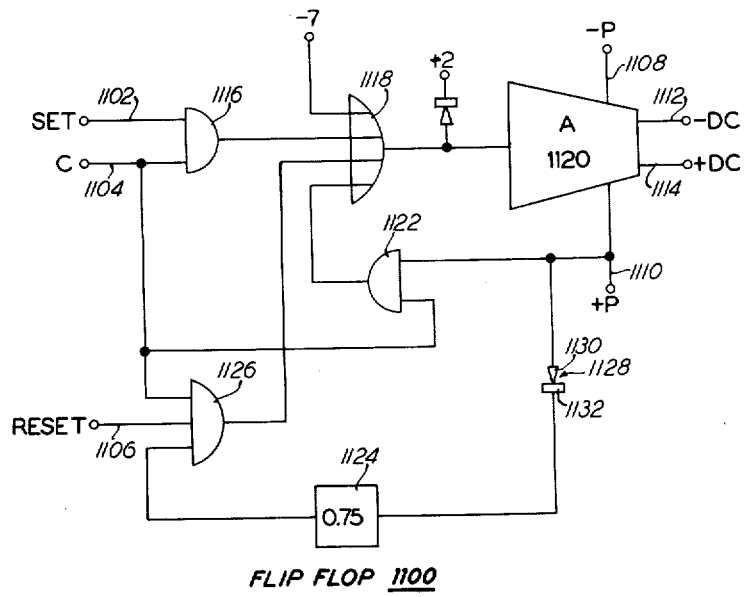

FIG. 10b shows a more detailed configuration for the flip flop 1100 using the previously described logical symbols. The flip flop 1100 is shown comprising: a set gate 1116 having a set input terminal 1102 and a clock pulse input terminal 1104; the buffer 1118 having one input terminal coupled to the output terminal of the gate 1116; a second input terminal returned to a negative seven volt potential, third and fourth input terminals and an output terminal; a diode having its anode coupled to the output terminal of the buffer 1118 and its cathode, returned to a positive two volt potential; an amplifier 1120 having its input terminal coupled to the output terminal of the buffer 1118, a negative pulse output terminal 1108, a positive pulse output terminal 1110, a negative D.C. output terminal 1112 and a positive D.C. output terminal 1114; a recirculation gate 1122 having one input terminal coupled to the positive pulse output terminal 1110 and a second input terminal coupled to the clock pulse terminal 1104, and its output terminal coupled to the third input terminal of the buffer 1118; an isolation diode 1128 having its anode 1130 connected to the positive pulse output terminal 1110 and its cathode 1132 coupled to the input terminal of a delay line 1124. The delay line 1124 provides for a three-quarter pulse time delay. The output terminal of the delay line 1124 is coupled to a first input terminal of the reset gate 1126. The second input terminal of the reset gate 1126 is coupled to the clock pulse terminal 1104 and the third input terminal of the reset gate 1126 is coupled to the reset terminal 1106.

The flip flop 1100 operates as follows: Upon receipt at the set terminal 1102 of a pulse, which is in phase with the clock pulses being fed to the clock pulse terminal 1104, a pulse is passed through the set gate 1116 to the buffer 1118. The pulses are clipped in both positive and negative directions so that the maximum of excursions of the pulse will be from a potential of minus seven to a potential of plus two. This clipped pulse is then fed to the amplifier 1120 and the above described output signals are initiated. The positive pulse signal so generated is fed back through the recirculation gate 1122 to produce the above mentioned reshaping effect and is also fed through the diode 1128, the delay line 1124 and the reset gate 1126 back to the buffer 1118. This feedback pulse enters the pulse amplifier 1120 one pulse time after the initial setting pulse and the process is repeated. This regeneration and recirculation of the pulses continues until a reset signal is fed to the reset terminal 1106. With the presence of a negative potential at the reset terminal 1106 recirculation is blocked and no more delayed pulses are fed back to the buffer 1118 and the flip flop 1100 returns to its reset condition.

17. *Miscellaneous amplifiers (FIG. 7)*

Figure 7:
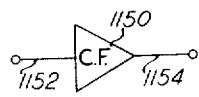
FIGURE 7 is a symbol for a conventional cathode follower amplifier.

FIG. 7 shows the generalized symbol for miscellaneous amplifiers. The letter designation within the symbol will determine the type of amplifier required. The miscellaneous amplifiers used in the file processor and their letter designation follow:

C.F. designates a cathode follower amplifier. Cathode follower amplifiers are well known in the art and the type of amplifier required is left to the circuit designer.

D.F. designates a conventional monostable multivibrator which is also well known in the art. The delay times required for the monostable multivibrator will be noted in the text. These monostable multivibrators having the required time constants are readily available.

The symbol N within the amplifier indicates a neon tube driver which is essentially a standard triode amplifier that includes a neon tube in the plate circuit.

18. *The memory (FIG. 11)*

Figure 11:
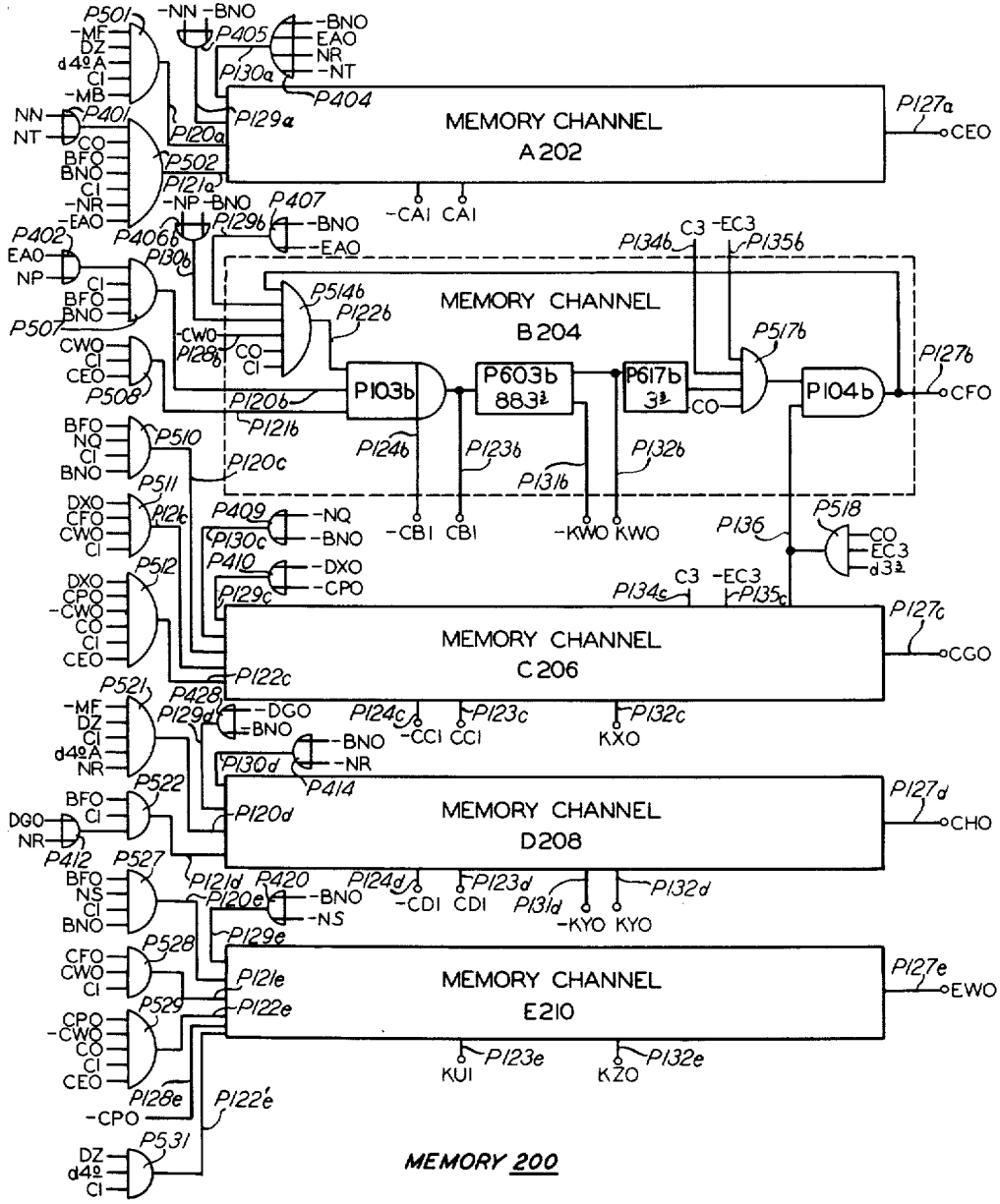
FIGURE 11 is a block diagram, partly schematic, of the Memory Channels.

The memory 200 as shown in FIG. 11 comprises five memory channels of the recirculating type each of which is capable of storing a maximum of eight hundred and eighty-eight bits of information.

All the memory channels may receive information from the input synchronizer 220. During operations having only one input magnetic tape, information is usually fed into memory channel B204. During two input magnetic tape operations, information is fed into memory channel A202. After comparisons are performed the memory channel C206 and the memory channel E210 receive information from either the memory channel A202 or the memory channel B204. In one transfer condition the content of memory channel A202 is transferred to both memory channel C206 and memory channel E210 while information is retained by the memory channel B204. In another transfer condition information is transferred from memory channel B204 to both the memory channel C206 and the memory channel E210. The alternate CP0 and CW0 signals set up the transfer parts to determine whether the information input to memory channels C206 and E210 shall be from memory channel A202 or memory channel B204.

The memory channel D208 usually contains the "key" block during sequence type operations and the upper bound criteria during a separate operation. All information to be recorded on a magnetic tape or other output device is transferred to the output synchronizer 222 from the memory channel E210.

Since all the memory channels are similar in structure only a detailed diagram for a typical channel will be shown. The remainder of the channels are shown diagrammatically with a plurality of input and output connections.

The memory channel B204 comprises a reshaper P103b having input terminals P120b, P121b and P122b. These three input terminals are considered to be the input terminals to the memory channel B204. The positive output terminal of the reshaper P103b is coupled to the input terminal of an eight hundred and eighty-three and three quarter pulse time acoustic delay line P603b. The positive output terminal of the reshaper P103b is also coupled via the line P123b to the CB1 signal line and the negative output terminal of the reshaper P103b is coupled via the P124b line to the —CB1 signal line. These two lines are considered to be the positive and negative output terminals of the memory channel B.

The acoustic delay line P603b is a commercially available device and has its positive output terminal coupled to the delay line P617b having a delay time of three and three quarter pulse times. The positive output terminal is also coupled via the line P132b to the KW0 signal terminal and the negative output terminal is coupled via the line P131b to the —KW0 signal terminal. The output terminal of the delay line P617b is coupled to an input terminal of the gate P517b. A second input terminal of the gate P517b is coupled to a C0 signal line, a third input terminal of the gate P517b is coupled via the line P134b to the C3 signal line and the fourth input terminal of the gate P517b is coupled via the line P135b to the —EC3 signal line. The line P135b is used for inhibition purposes and when line P135 is not shown in another memory channel, it is not present.

The output terminal of the gate P517b is coupled to an input terminal of the reshaper P104b. The second input terminal of the reshaper P104b is coupled to the P136 signal line. This line, if not shown in any of the memory channels, is assumed to be absent.

The output terminal of the reshaper P104b si coupled via the line P127b to the CF0 signal line and is considered to be a delayed output of the memory channel B.

The output terminal of the reshaper P104b is also coupled to an input terminal of a recirculation gate P514b. Second and third input terminals to this gate are coupled to clock pulse signal lines. A fourth input terminal to the recirculation gate P514b is coupled to the P128b signal line, a fifth input terminal is coupled to a P129b signal line and a sixth input terminal is coupled to a P130b signal line. The signal lines P128b to P130b are considered as clearing inputs to the memory channel B.

The output terminal of the recirculation gate P514b is connected to an input terminal of the reshaper P130b to complete a recirculation path.

Thus any information that is received by one of the input terminals, for example, P121b enters the memory channel B and first appears as information at an output terminal P123b a quarter of a pulse time later, then after a delay of 883¾ pulse times, the information appears at an output terminal P132b and after another four pulse time delay appears at the output terminal P127b, and is fed back to the memory channel input provided no inhibitions are present on the inhibitory signal lines P128b to P130b.

The memory channel A202 has the first input terminal connected to the gate P501 by means of the line P120a. This input lead is primarily included for circuit considerations so that the acoustic delay line is never completely cleared (the type of acoustic line incorporated in the present memory channels, uses an amplitude modulated carrier and includes AGC circuitry). The second input terminal is coupled by the line P121a to the gate P502. This gate is the normal input to the memory channel A. Information from the input synchronizer 220 is fed into memory channel A via the BF0 signal line under the control of the BN0 gating signal. During operations in which only one magnetic tape unit is feeding information to the input synchronizer 220 the —EA0 signal is present at an input terminal of the gate P502 and information is prevented from passing through this gate. As will be described hereinafter, the information at this time is fed to the memory channel B.

The positive output of the memory channel A appears at the CA1 terminal while the information in inverted signal form appears at the —CA1 terminal. The P127a signal line couples the delayed output of the memory channel A to the CE0 terminal. A clearing input of the memory channel A is coupled via the P129a signal line to the buffer P405 so that any information in the memory channel A may be cleared during test operations. A second clearing input is coupled via the P130a signal line to the buffer P404 to clear out old information as new information is being inserted during normal operations.

The first input terminal of the memory channel B is coupled via the P120b signal line to the gate P507 and is used during one input magnetic tape operation to accept information via the BF0 signal line from the input synchronizer 220. Note that the EA0 signal line feeding the buffer P402 is characteristic of one input tape operation. The second input terminal of the memory channel B is connected via the P121b signal line to the gate P508. During the transfer cycles, when conditions in the comparison circuits 218 dictate the alternation of input tapes, a CW0 signal is present which permits the information from the memory channel A to be transferred via the CE0 signal line to the memory channel B. The positive and negative outputs of the memory channel B are respectively coupled via the lines P123b and P124b to the CB1 and the —CB1 signal lines. The lines P132b and P131b, respectively, couple the inputs of the acoustic delay line P603b to the KW0 and —KW0 signal lines. The lines P134b and P135b connect the C3 and —EC3 signal lines to an initial clearing input of the memory channel B. The line P136 connects a forced insertion terminal to the output of the gate P518.

At the start of a sequence pass, the memory channel B is initially cleared to a series of blank characters which are represented by (0001). The presence of the —EC3 signal on the line P135b prevents recirculation in the memory channel B while the presence of a +EC3 signal at an input terminal of the gate P518 permits the entry of the d3-¾ signals into the memory channel B.

The delayed output terminal of the memory channel B is connected via the P127b signal line to the CF0 terminal. The presence of a —CW0 signal on the P128b signal line into gate P514b prevents recirculation of the contents of the memory channel B when there is a transfer of information from memory channel A to memory channel B. The P129b signal line connects a second inhibiting terminal of gate P514b to the buffer P407 to clear out old information as new information is being inserted during a single input magnetic tape operation. The P130b signal line connects a third inhibiting terminal of the gate to the buffer P406b which is used in the clearing of memory channel B during test operations.

The following table will summarize the connections of the memory channel C.

| Signal line | Connected to— | Comments |
| --- | --- | --- |
| P120c | Gate P510 | Input during test operations. |
| P121c | Gate P511 | Permits a transfer of the contents of memory channel "B" via the CF0 signal line under the control of a CW0 signal. |
| P122c | Gate P512 | Permits the transfer of the contents of memory channel "A" via the CE0 signal line during the presence of a CP0 signal and the absence of a —CW0 signal. |
| P123c | CC1 terminal | |
| P124c | —CC1 terminal | |
| P134c | C3 signal | |
| P135c | —EC3 signal line | To clear channel "C" during the insertion of blanks (0001). |
| P136 | Gate P518 | To insert blanks (0001). |
| P127c | CG0 terminal | |
| P129c | Buffer P410 | To clear memory channel "C" when new information is being inserted. |
| P130c | Buffer P409 | For clearing during test operations. |

The following is a table for the connections to the memory channel D:

| Signal line | Connected to— | Comments |
| --- | --- | --- |
| P120d | Gate P521 | To permit the forced insertion of blanks (0001) so that the memory channel is not cleared to zero at the start of an operation. |
| P121d | Gate P522 | To permit the insertion of the "key" block during sequencing or the upper bound block during separation. |
| P123d | CD1 terminal | |
| P124d | —CD1 terminal | |
| P127d | CH0 terminal | |
| P129d | Buffer P428 | To clear the memory channel "D" while a new "key" or upper bound is being inserted. |
| P130d | Buffer P414 | To clear the memory channel "D" during test operations. |

The following is a table for the connections to the memory channel E:

| Signal line | Connected to— | Comments |
| --- | --- | --- |
| P120e | Gate P527 | Used on the forced insertion of information during a test operation. |
| P121e | Gate P528 | To receive information from the memory channel "B" via the CF0 signal line under the control of the CW0 signal. |
| P122e | Gate P529 | Used to receive information from the memory channel "A" during the presence of the CP0 signal and the absence of the —CW0 signal. |
| P122'e | Gate P531 | Permits insertion of blanks (0001). |
| P123e | KU1 terminal | |
| P127e | EW0 terminal | |
| P128e | —CP0 signal line | To clear out old information when new information is being received. |
| P129e | P420 | To clear the memory channel "E" during test operations. |

19. *The control unit (FIGS. 12 and 13)*

The control unit 216 is a unit for controlling the operation of the file processor at the beginning and the end of an information pass and at the end of a reel of magnetic tape. These control functions are handled by the end of tape and information controls 762. A second function of the control unit 216, is to step the file processor through its operating cycles of input, output and transfer. The cycle controls 764 perform this function.

20. *End of tape and information controls (FIG. 12)*

Figure 12:
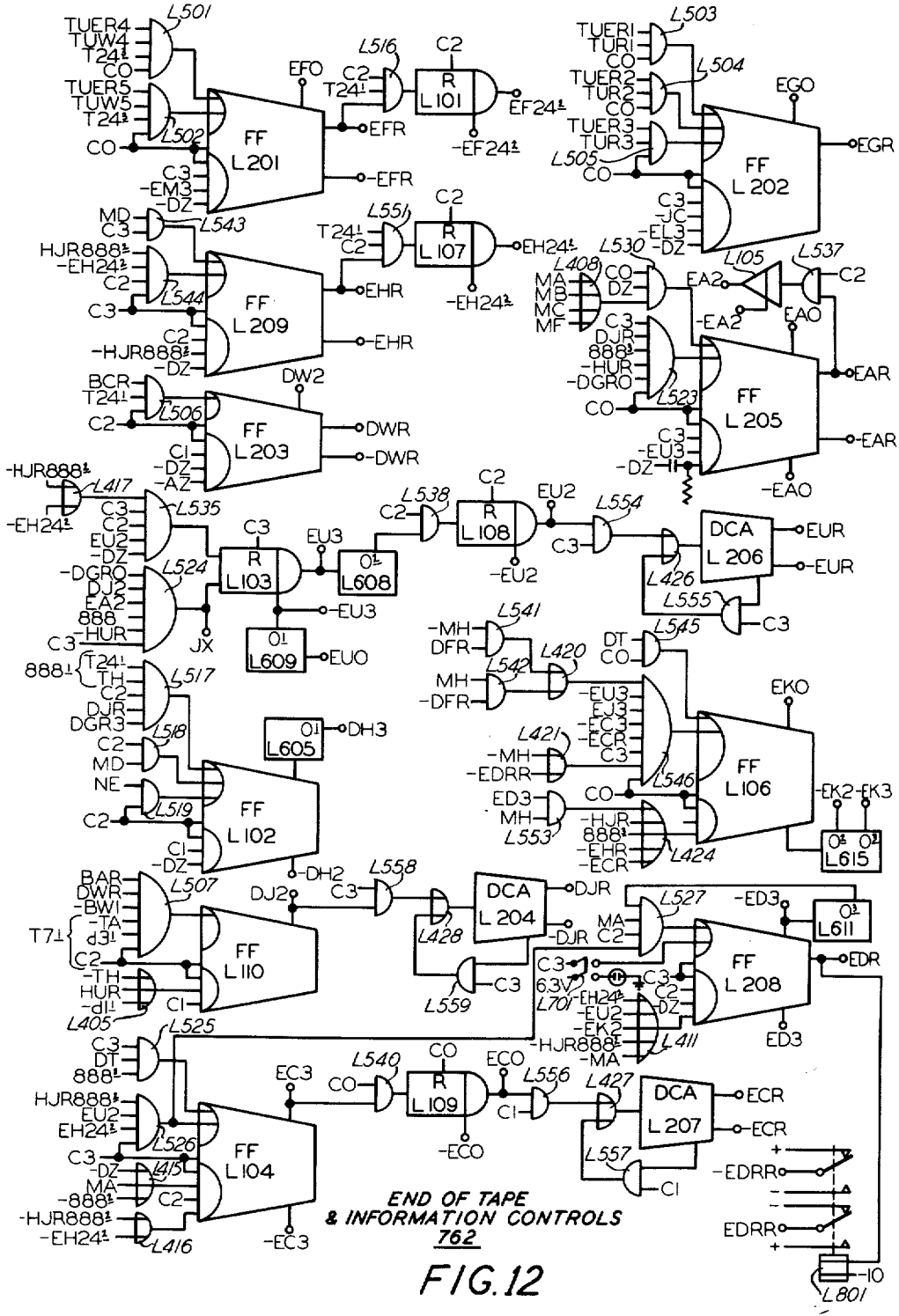
FIGURE 12 is the schematic diagram of the End of Tape and Information Controls.

The end of tape and information controls 762, as shown in FIG. 12, have for their prime function, the generation of control signals at the beginning and end of a pass and the generation of control signals whenever the end of a reel of magnetic tape is detected. The end of tape information controls 762 comprise: the flip flop L201 having the set gates L501 and L502; the flip flop L202 having the set gates L503, L504 and L505; the flip flop L203 having the set gate L506; the flip flop L110 having the set gate L507 and the reset buffer L405; the flip flop L205 having the set gate L523 and the set gate L530 which is fed by the buffer L408; the flip flop L208 having the set gate L527 and the reset buffer L411; the flip flop L209 having the set gates L543 and L544 and having its positive output terminal feeding the reshaper L107; the flip flop L102 having the set gates L517, L518 and L519; the flip flop L106 having the set gate L545 and the set gate L546 which is fed by the buffers L421 and L420. Buffer L420 receives signals from the gates L541 and L542 and the reset buffer L424 which receives signals from the gate L553. The controls 762 further include the flip flop L104 having the set gates L525 and L526 and the reset buffers L415 and L416 and feeding the serially connected gate L540, reshaper L109 and the D.C. amplifier L207; the reshaper L103 having the input gates L524 and L535 which is fed by the buffer L417 and whose positive output terminal feeds the serially connected delay line L608, the gate L538, the reshaper L108 and the D.C. amplifier L206.

The flip flop L201, when set, causes the generation of the EF signals to indicate that the end of a reel has been reached in the process of recording information. In particular, the set gate L501 triggers the flip flop L201 whenever the end of a reel signal is detected while information is being recorded on the tape unit IV. The TUER4 signal is a signal characteristic of the end of a reel on tape unit IV while the TUW4 signal is a signal characteristic of the operation of recording information on the tape unit IV. Similarly, the set gate L502 passes a pulse whenever the end of the reel associated with tape unit V is detected during the operation of recording information on the tape unit V.

The flip flop L202, when set, generates the EG signals indicating that the end of a reproducing tape has been detected. In particular, the set gate L503 passes a pulse whenever the end of the reel associated with the tape unit I is reached (the TUER1 signal) during the reading of information from the tape unit I (TUR1 signal). Similarly, the set gate L504 passes a triggering pulse during the reading of information from the tape unit II whenever the end of reel signal associated with this unit is detected. Likewise, the set gate L505 passes a pulse signal whenever such a condition is encountered during the reading of information from the tape unit III.

The flip flops L203 and L204 are used in the detection of the three decimal points which are characteristic of the end of the information recorded on a magnetic tape. These three decimal points indicate that all the information associated with a pass has been read in from a tape unit. The first two decimal points are detected by the decimal point and carriage return detectors 718 in the input synchronizer 220 as will be described at a later point and cause the generation of a BCR signal which is fed to the set gate L506 to set the flip flop L203 causing the generation of the DW signals. This flip flop serves as a memory to indicate that at least two decimal points have been detected. If a third decimal point immediately follows the two just detected a BAR signal from the decimal point and carriage return detectors 718 cooperates with a DWR signal to cause the setting of the flip flop L204 via the gate L507. The setting of this flip flop causes the generation of the DJ signals which indicate that three decimal points have been detected and during nonsequence operations set up the control circuitry to terminate the operation.

The flip flop L102 which generates the DH signals is used primarily to indicate the end of the information on the tape unit III which contains the selector tape during operations concerned with selection. The primary set gate is the gate L517 which passes a set pulse after the three decimal points are detected as indicated by the DJR signal during the movement of the tape on the tape unit III as characterized by the DGR3 signal.

During sequence operations, the end of pass controls operate in a different manner. Normally, on sequencing, there are two input tape units which reach the end of the information, characterized by three decimal points, at different times. When the first three decimal points are detected from one of the tape units the DJR signal passes a pulse through the set gate L523 to cause the setting of the flip flop L205 and the generation of the EA signals. The EA signals indicate that the remainder of the sequence pass will be performed with one input tape. The sequence operation then proceeds with the remaining input tape. When the DJ signal associated with the reading of the three decimal points from the remaining input tape is detected, a DJ2 signal cooperates with an EA2 signal to trigger reshaper L103 to cause the generation of a family of EU signals indicating that the end of a pass has been reached. To determine whether, at the end of a pass, the sequence operation is complete, the flip flop L106 is employed. The flip flop L106 primarily remembers whether there has been an alternation of input tapes during the pass. If there has been no alternation of input tapes then the information read in during the pass must have been in sequence. If there has been an alternation of input tapes, then the information was not in sequence. The set gate L546 tests for the alternation. If an alternation has occurred during the pass, an EJ signal would be fed from the comparison circuits 218 and the flip flop L106 would be set. If no alternation had occurred, there would be no EJ3 signal and the flip flop L106 would remain reset. The circuitry which controls the termination of the operation looks for the presence or absence of the EK signal generated by flip flop L106 when set. If the EK signals are present, a new pass is begun and the flip flop L106 is reset via the buffer L424 primarily by a —ECR signal which is characteristic of the start of a sequence pass.

At the start of any sequence pass it is necessary to record three decimal points on each of the output tapes because, on the reverse pass, these will contain the read-in information for the next pass. The control of the writing of the three decimal points on each of the output tapes is from the flip flop L104. On the first pass of sequence, a DT pulse is fed through the set gate L525 to cause the generation of the EC signals which remain present until three decimal points are written on both of the output tapes. The EC signals are fed to the output synchronizer 220 to activate the usual decimal point writing circuits as will be described. After the decimal points have been written on one of the output tapes, an HJR 888¾ signal is generated and fed via the set gate L544 to set the flip flop L209 which generates the EH signals. The EH signals serve as a memory to indicate that three decimal points have been written on the first output tape and start the recording of the three decimal points on the second output tape. After the three decimal points have been recorded on the second output tape the sequence operation proceeds.

The termination of a sequence pass is as follows: When three decimal points are detected on the first completed input tape, the DJ signal is generated by flip flop L110 and fed via the set gate L523 to set the flip flop L205 and cause the generation of the EA signals characteristic of one input tape operation. When the three decimal points are detected on the lone input tape, a DJ2 and an EA2 cooperate at the gate L524 to cause the generation of the EU signals by reshaper L103.

The EU signals set up the three decimal point writing circuits which cause movements of both output tapes but no actual writing is performed. Only the tapes are moved and all associated signals are generated. As the first HJ signal is generated, the flip flop L209 is set and the EH signals generated which cause the movement of the alternate tape unit. When the second HJ signal is generated, the HJ, the EU and the EH signals, set the flip flop L104 causing the generation of the EC signals and change the state of the flip flop L208 acting as a binary counter. Also a —HJ signal and a —EH signal through buffer L417 terminate the EU signals from reshaper L103 (the pass is considered ended and a new pass may be started).

The EC signal from flip flop L104 causes the writing of three decimal points on the one of the new output tapes determined by the ED signals generated by the flip flop L208. The writing of the decimal points on the first output tape as above described yields an EH signal from flip flop L109. After the —HJ signal associated with the writing of the second group of three decimal points cooperates with a —EH signal at the reset buffer L416 to terminate the EC signals, the new pass proceeds.

21. Cycle controls (FIG. 13)

Figure 13:
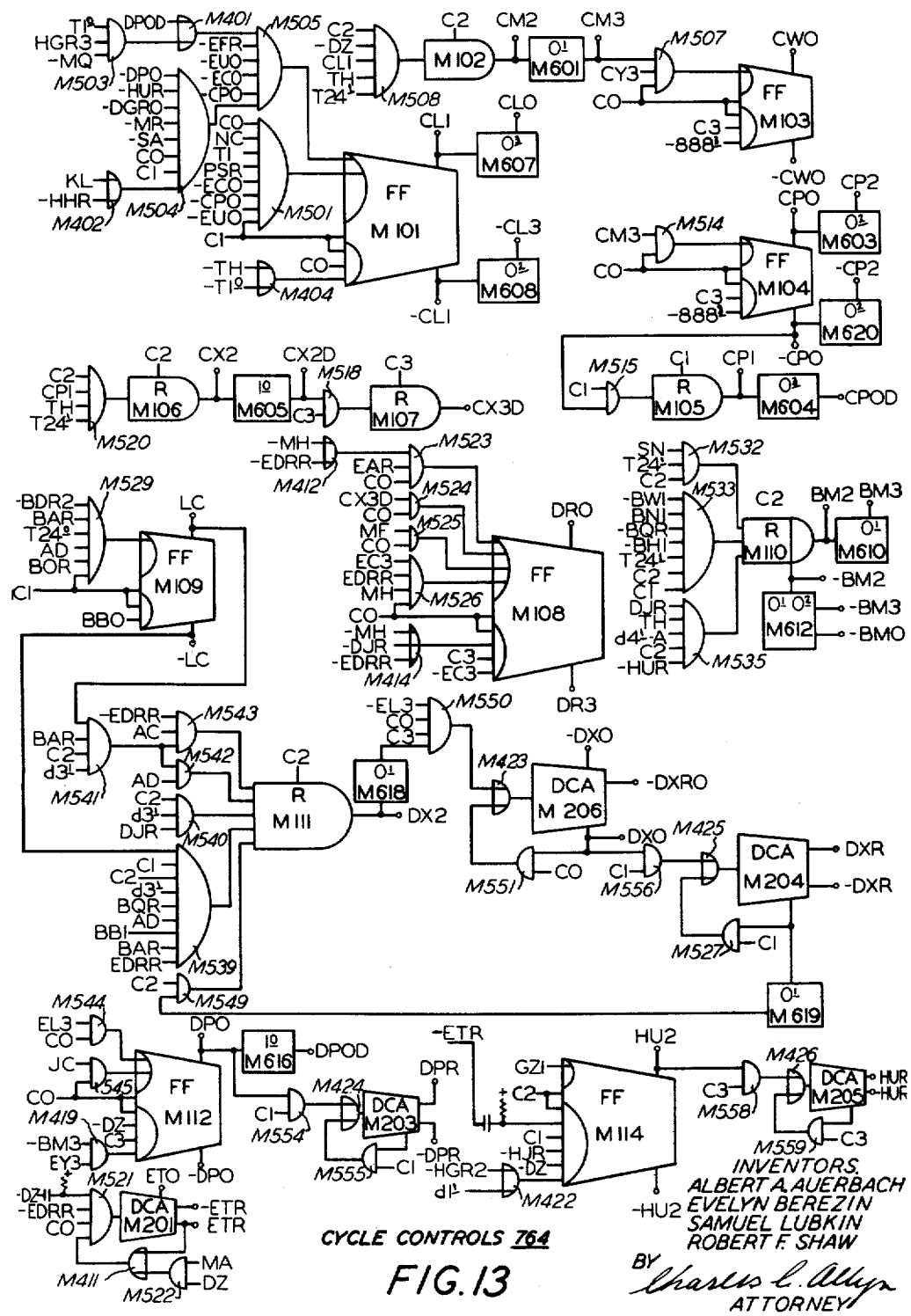
FIGURE 13 is the schematic diagram of the Cycle Controls.

The cycle controls 764 as shown in FIG. 13 are primarily a group of circuits which define the operating cycles of the file processor. There are three main operating cycles. The first main operating cycle constitutes an input cycle. During an input cycle, information from a tape unit is transmitted via the input synchronizer 220 into a memory channel. The second main operating cycle is an output cycle. During such a cycle, information is extracted from a memory channel and fed via the output synchronizer 222 to a tape unit for recording. It should be noted here that an input cycle and an output cycle usually occur simultaneously.

The third main operating cycle of the file processor is known as a transfer cycle. This cycle, having a duration of one major cycle, starts after both of the input and the output cycles are terminated. During a transfer cycle, blocks of information are switched from specific memory channels to other memory channels. Two types of transfer operations are possible, depending upon the state of the comparison circuits 218. One of these transfers is the transfer of the contents of the memory channel A to the memory channel C and E and the other type of transfer is an alternate input transfer in which the contents of the memory channel A are transferred to the memory channel B while the contents of the memory channel B are being transferred to the memory channels C and E.

Several miscellaneous control circuits are also included in the cycle controls. For example, there is a circuit which is only activated during the first pass of sequence operations. There is another circuit which becomes activated only after there is information in the memory channel E for transfer to the output synchronizer 222. This permits the recording of the information in memory channel E on an output magnetic tape. There is also a circuit which indicates when comparisons are to be performed since the file processor may handle multiblock items. When handling multiblock items, all comparisons are performed on the first designator block of an item and the remaining blocks of the item follow the same transfer paths as the designator block. Therefore, circuitry is provided which distinguishes the designator block from the remaining trailer blocks of the item.

The flip flop M112 and the reshaper M110 together with their associated gates and buffers are concerned with defining an input cycle. The flip flop M112 having the set gates M544 and M545, when set, generates a family of DP signals indicating that an input cycle is in progress. The flip flop M112 is set by an EL signal fed to the set gate M544 and remains set until a —BM signal is present at the reset buffer M419. The BM signal is generated by the reshaper M110. The reshaper M110 has three input gates: the gate M532 which transmits a T24¼ pulse during test and maintenance operations; the gate M533 which transmits a T24¼ pulse after the second check digit has been read in to the input synchronizer 220 indicating that the last digit of a block has been reproduced from an input tape; and the gate M535 which transmits a d4¼ pulse under control of a DJR signal after the reading of the third decimal point indicating the end of information on a tape, whenever the end of information occurs before an input buffer storage is completely filled.

The flip flop M114, the D.C. amplifier M205 and the associated circuitry is used in the determination of the output cycle. The flip flop M114 when set generates a family of HU signals. The setting of the flip flop M114 is determined by the occurrence of the GZ signal from the output synchronizer 222 which indicates that the output tapes are coming up to speed. The flip flop M114 remains set and generating the HU signals until the end of the output cycle when a —HG signal from the output synchronizer 222 is fed via the reset buffer M422 to indicate that an entire block has been recorded on an output magnetic tape. The —HJ signal feeding a reset terminal of the flip flop M114 will also cause the resetting of the flop flop when three decimal points have been recorded at the beginning or end of a magnetic tape.

The flip flop M101, the pulse amplifier M102, and the serial flip flop M103, the flip flop M104 and the serially connected reshaper M105, and the serially connected reshapers M106 and M107 are concerned wth the transfer cycle. The transfer cycle starts at the beginning of the first major cycle after both the input and output cycles are terminated. Since these terminations may occur anywhere during a major cycle it is necessary to provide a synchronizing circuit which detects the termination of both the input and the output cycles and remembers their termination until the start of the next major cycle. This synchronizing circuit is the flip flop M101 and its associated gates and buffers. Under normal operating conditions when an input cycle is complete as characterized by the disappearance of the —DP0 signal and an output cycle is complete as characterized by the disappearance of the —HUR signal, a pulse passes through the gate M504 and the set gate M505 to set the flip flop M101 and cause the generation of the CL signals. The CL signals are present until the start of the next major cycle when at that time a CL1 signal cooperating with a TH and a T24¼ signal, both occurring near the start of a major cycle, pass a pulse through the gate M508 into pulse amplifier M102, to give a CM pulse signal which indicates the start of a transfer cycle.

The CM pulse signal fed through the set gate M514 sets the flip flop M104 causing the generation of the CP signals which are characteristic of the transfer cycle. One major cycle later a —888¾ timing signal resets the flip flop M104. Just before the termination of the CP signals a CP1 signal cooperating with a TH and a T24¼ pass a pulse through the gate M520 to cause the generation of the CX pulse signal by binary reshaper M106. The CX signal is a pulse which indicates the end of the transfer cycle.

If the particular transfer cycle is an alternate transfer cycle which includes an alternation of input tape units, a CY3 signal from the comparison circuits 218 will be present at the gate M507 where it cooperates with the CM3 signal generated at the start of a transfer cycle, to set the flip flop M103 causing the generation of the CW signals. The CW signals have a duration of one major cycle and occur in parallel with the CP signals to indicate that the transfer cycle includes the alternation of input tapes and a change in the routing of the information through the memory channels.

Included in the cycle controls 764 is the D.C. amplifier M201 and its associated circuitry which acts as a flip flop. This circuitry, when set, generates the ET signals that are characteristic of only the first pass of a sequence when there is one input tape unit and this input tape unit contains the main file. It is only used during the first pass of sequence and never used again during the entire sequence operation.

In the course of handling information in the file processor the items being handled may comprise several blocks. If the items being handled are greater than one block length, only the first block called a designator block is handled by the comparators. It is, therefore, necessary to have an indication of the designator block. The end of block characters for single block items are two decimal points. For multiblock items, the designator block is ended by the combination of a decimal point and a carriage return, while the end of block markers in the subsidiary block or trailer blocks are two carriage returns.

Only when the end of designator block characters are detected are the comparision circuits tested to determine the flow of information. If the end of designator block characters are not detected the comparison circuits are not tested and the information flows in a path previously determined by a comparison concerned with designator blocks. The testing of the end of block characters is performed by the flip flop M109 and the serially connected reshaper M111, D.C. amplifier M204 and D.C. amplifier M206, together with their associated circuitry. Whenever a decimal point or carriage return is detected by the input decimal point and carriage return detectors 718, a BAR signal is fed to the set gate M529 for flip flop M109. If the character was a decimal point, a pulse will be present in the least significant bit position of the character and an AD signal will be fed from the input serializer 716 to gate 529. The simultaneous occurrence of the BAR and the AD signals will set the flip flop M109. Thus the set gate M529 only detects a decimal point. If the flip flop M109 is set and the next character is either a decimal point or a carriage return, a BAR pulse is fed through the gate M541 to the gates M542 and M543. If the second character is a decimal point, an AD signal will also be present at the gate M542 to cause the passage of a pulse into the reshaper M111 causing the generation of the DX signals which indicate that a designator block has been read in. In this particular case, the sensing of two consecutive decimal points indicates that single block items are being processed.

For multiblock items it is not only necessary to detect both a decimal point and a carriage return but the relative occurrence of each. During forward passes the occurrence in time will be decimal point followed by carriage return. In this case, the decimal point will cause the setting of the flip flop M109 via the set gate M529 in the above described manner. As the second character is detected a BAR signal permits the gating of the pulse through the gate M541 to the gate M543. If a forward pass is being performed the —EDRR signal is absent and the gate becomes dependent upon the A.C. signal. If the second character is a carriage return the A.C. signal indicative of the second least significant bit, is fed from the input serializer 716 and a pulse passes to the reshaper M111 causing the generation of the DX signals. The occurrence of the DX signals indicates that the designator block during a forward pass has just been read in from a tape unit.

During reverse passes the order of occurrence of the end of designator block characters is a carriage return followed by a decimal point. In this case, the occurrence of the carriage return does not cause the setting of the flip flop M109 and the negative output of flip flop M109 does not inhibit the sampling gate M539. During a reverse pass, the EDRR signal is present and the sampling gate M539 is activated. If the first character is either a decimal point or a carriage return and the second character is either a decimal point or a carriage return, a BB1 signal is fed from the decimal point and carriage return detector 718. However, if the second character is a decimal point an AD signal (the least significant bit) is also fed from the input serializer 716 and a pulse will pass through the sampling gate M539 to yield the DX signal indicating the reading in of a designator block during a reverse pass.

It should be noted that in this last cited case the BB1 signal will be present even if the first character were a decimal point but if the first character were a decimal point then the flip flop M109 would be set and the sampling gate M539 would be inhibited. Therefore the sampling gate M539 only passes a pulse when the first character is a carriage return and the second character read is a decimal point.

Since all trailer blocks in an item comprise a pair of carriage returns, this combination of characters cannot generate the DX signals and the comparators are not sampled for trailer block items so the route of information flow remains the same until another designator block is detected. The trailer blocks thus follow the same paths set up as a result of the comparisons of their designator blocks and in effect multiblock items are treated as oversized single block items.

The flip flop M108 which generates the OR signals is used to permit output cycles only if there is information available in memory channel E for recording. The set gate M523 is used during one input tape operations to permit output cycles after the first input cycle. The set gate M524 is used during two input tape operations to cause the setting of the flip flop after two transfer cycles since it is not until this time that valid information is in the memory channel E. The set gate M525 is used in test operations to permit the immediate reading out of whatever is contained in the memory channel E. The set gate M526 is used during sequencing when there is only one input tape to permit output cycles after the first input cycle.

*22. The comparison circuits (FIGS. 14, 15, 16)*

The comparison circuits 218 receive information represented by the blocks circulating in the memory channels and perform magnitude comparisons between the same characters of selected circulating blocks. When the comparisons are completed, the comparison circuits generate control pulse signals which determine the transfer of the blocks of information between the memory channels. These same signals are used to determine which tape unit will supply the next block of information for the comparisons and also which tape unit will receive the block to be recorded as a result of the comparisons.

To perform this function the comparison circuits 218 comprise the comparators 768 which actually perform the comparisons, the comparison time selector 770 to determine which characters in the blocks are to be compared, and the alternate pulse generators 772 to indicate the results of the comparisons.

*23. The comparators (FIG. 14)*

Figure 14:
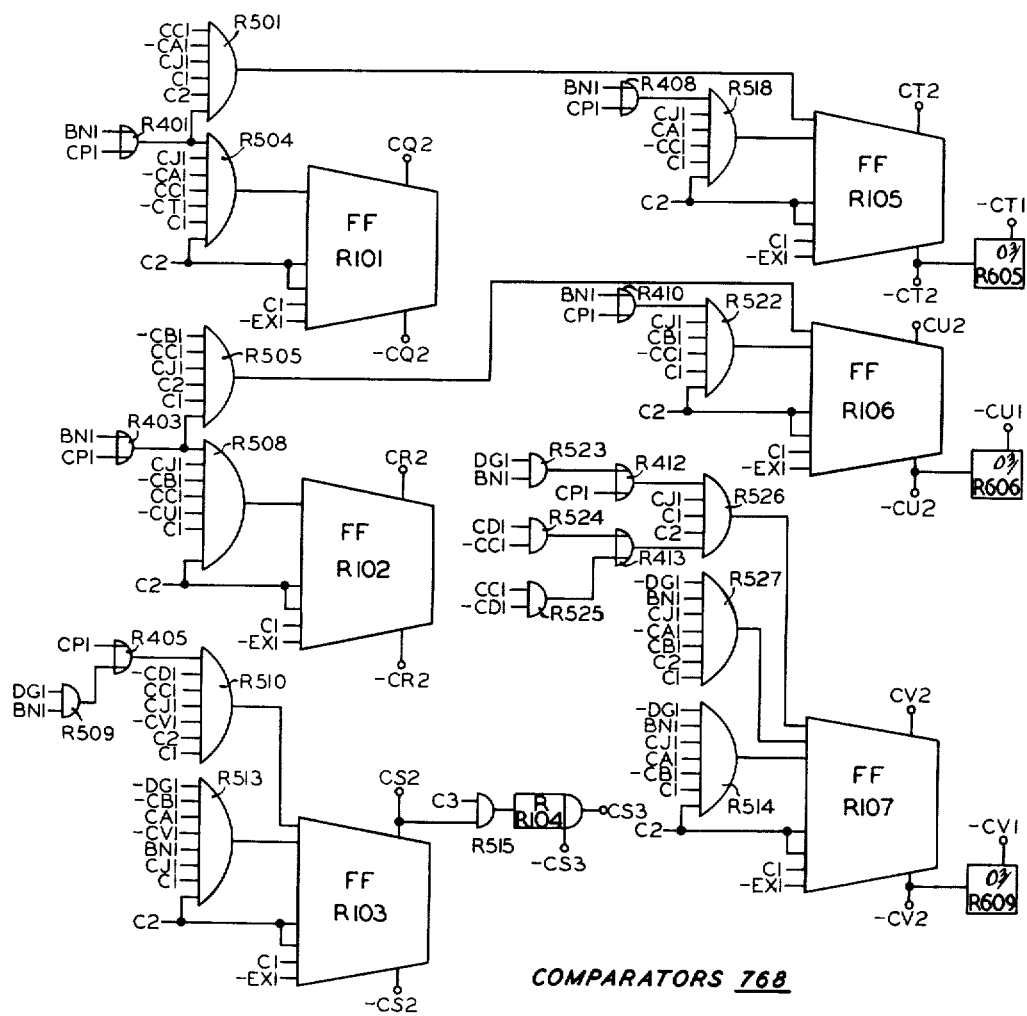
FIGURE 14 is the schematic diagram of the Comparators.

The comparators 768 as shown in FIG. 14 are a plurality of flip flops which are used to determine the magnitudes of the contents of particular memory channels. Since in general only particular digits in each block are compared, a control signal is present on each one of the set gates to permit the comparisons to occur for preselected digits in a block of information. As a result of the comparisons, certain of the flip flops are set and cause the generation of signals which control the transfer of information between the memory channels and to select the tape units to be used to transmit or receive the next blocks of information.

The comparators 768 comprise the flip flop R101 having a set gate R504 which is fed by a buffer R401; the flip flop R102 having a set gate R508 which is fed by the buffer R403; the flip flop R103 having the set gate R513 and the set gate R510 which is fed by the buffer R495 which in turn receives signals from the gate R509; and the second set gate R501 being fed by the buffer R401; the flip flop R106 having the set gate R522 which is fed by the buffer R410, and the second set gate R505 which is fed by the buffer R403; the flip flop R107 having the set gate R514, the set gate R527 and the set gate R526 which receives signals from the buffers R412 and R413 which in turn receives signals from the gates R524 and R525.

The flip flop R101, when set, generates the CQ signals which indicate that the contents of the memory channel C are greater than the contents of the memory channel A. It should be noted that the set gate R504 serially compares, by the standard technique using inhibitions, the contents of the memory channel C as represented by the CC1 signal with the contents of the memory channel A as represented by the —CA1 signal. These comparisons occur during the presence of the CJ1 signal which is a gating signal to permit the comparison to occur during the time specific digits of the block are present.

The flip flop R105 (an equality detector) when in a reset condition does not generate the CT signals. The absence of the CT signals indicates that the contents of the memory channel A are equal to the contents of the memory channel C. It should be noted that if the contents of the memory channel A are greater than the contents of the memory channel C the flip flop will be set via the gate R518 and if the contents of the memory channel C are greater than the contents of the memory channel A the flip flop will be fed via the set gate R501.

The flip flop R102, when set, causes the generation of the CR signals indicating that the contents of the memory channel C are greater than the contents of the memory channel B. The set gate R508 compares the contents of the memory channel C (the CC1 signal), and the contents of the memory channel B (the —CB1 signal). If during a selected comparison time, indicated by the presence of a CJ1 signal, the contents of the memory channel C are greater than the contents of the memory channel B a set pulse passes through the gate R508 to set the flip flop R102.

The flip flop R106 is used to test for the equality of the contents of the memory channel C and the contents of the memory channel B. If the flip flop R106 is in a reset condition, the CU signals are not generated and an equality exists. If, however, the contents of the memory channel C are greater than the contents of the memory channel B, a set pulse is fed through the set gate R505 to set the flip flop R106. Likewise, a set pulse will be transmitted from the set gate R522 when the contents of the memory channel B are greater than the contents of the memory channel C.

The flip flop R103, when set, generates the CS signals which indicate one of two conditions depending on the type of operation being performed. If a select operation is being performed, the setting of the flip flop R103 indicates that the contents of the memory channel C are greater than the contents of the memory channel D while during any operation but select, the setting of the flip flop indicates that the contents of the memory channel A are greater than the contents of the memory channel B. During select operations, the set gate R510 is activated by means of the DG1 signal acting through the gate R509 and the buffer R405, and a comparison is performed between the contents of the memory channel C (the CC1 signal) and the contents of the memory channel D (the —CD1 signal). During operations other than select the —DG1 signal does not block the set gate R513 and the contents of the memory channel A (the CA1 signal) are compared with the contents of the memory channel B (the —CB1 signal).

The flip flop R107, when in a reset condition, does not generate the CV signals. The absence of the CV signals indicates, during a select operation, the equality of the contents of the memory channel C and the memory channel D. During nonselect operations, the setting of the flip flop R107 indicates that an inequality exists between the contents of the memory channel A and the memory channel B. For select operations, the set gate R526 is activated by the DG1 signal acting through the gate R523 and the buffer R412. At this time, if the contents of the memory channel D are greater than the contents of the memory channel C, a set pulse is fed through the gate R524, the buffer R413 and the gate R526 to set the flip flop R107. Similarly, if the contents of the memory channel C are greater than the contents of the memory channel D, a set pulse passes through the gate R525, the buffer R413 and the set gate R526 to set the flip flop R107.

During nonselect operations, the —DG1 signals are absent from the set gates R514 and R527, to permit a comparison between the contents of the memory channel B and the contents of the memory channel A. If the contents of the memory channel B are greater than the contents of the memory channel A, the flip flop is set via the set gate R527 and if the contents of the memory channel A are greater than the contents of the memory channel B, the flip flop is set via the set gate R514.

It should be noted that a —EX1 signal is fed to a reset terminal of each of the above described flip flops and is used to reset the flip flops after an interpretation of the comparisons is performed.

24. *Comparison time selector (FIG. 15)*

Figure 15:
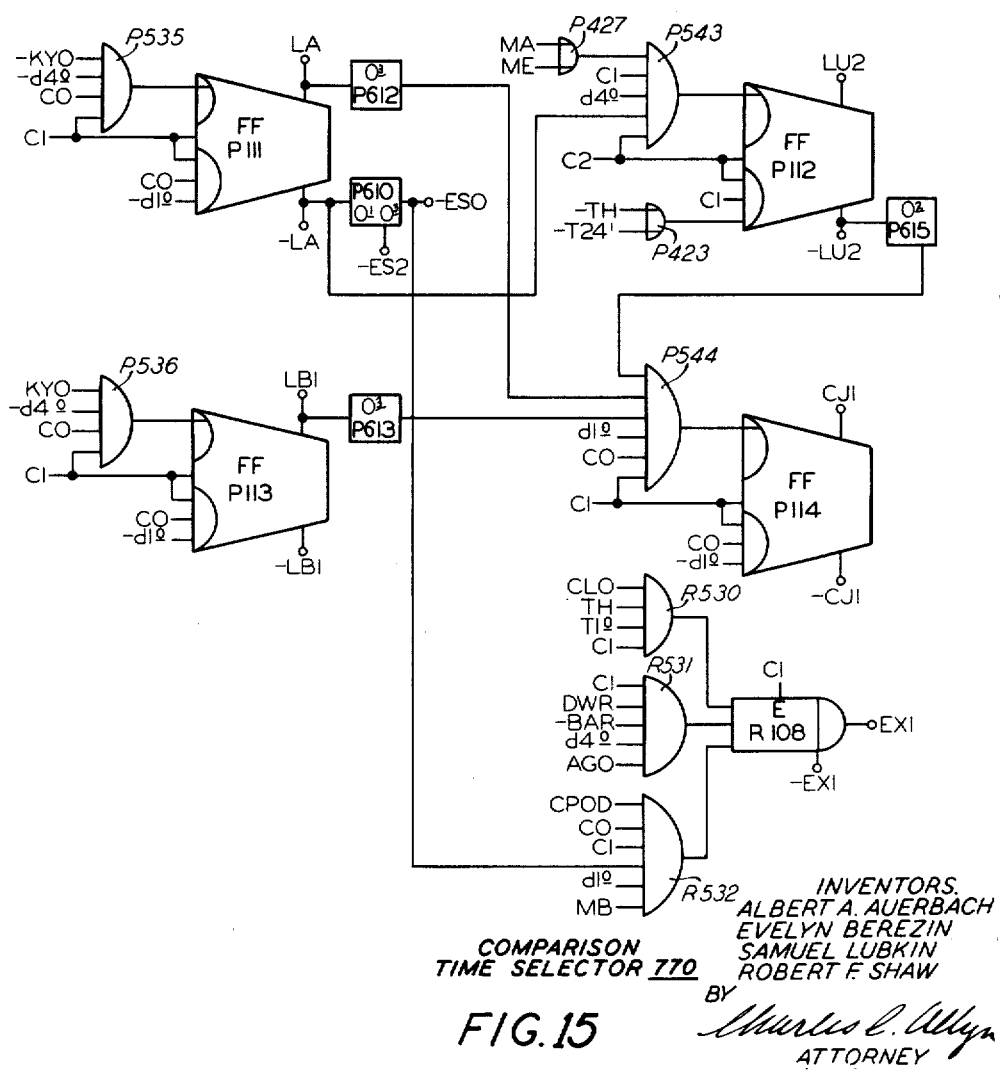
FIGURE 15 is a diagram of the Comparison Time Selector Circuits.

The comparison time selector 770 as shown in FIG. 15 is used primarily to indicate for which characters of the block being operated upon, a comparison is to occur. During separate operations, the memory channel D contains the key block which indicates which digital positions in the blocks being processed are to be compared. Whenever any digit in the key block is a blank or a carriage return, the corresponding digits in the blocks being processed (those blocks being stored in the memory channels A, B and C) are not compared.

To perform these operations the comparison time selector 770 comprises the flip flop P111 having the set gate P535, the flip flop P113 having the set gate P536, the flip flop P112 having the set gate P543 fed by the buffer P427 and a reset buffer P423 and the flip flop P114 having the set gate P544.

During separate operations, the flip flop P111 will set, via the set gate P535, whenever anything but a carriage return (1110) is sensed in a digit position of the memory channel D (—KY0 signal). Similarly, the flip flop P113 will be set to generate the LB signals, via the set gate P536, whenever a digit position of the memory channel D contains anything but a blank character (0001). When a digit position contains anything but a blank or a carriage return character, both the LA and LB signals will be present to permit a set pulse to pass through the set gate P544, setting flip flop P114 to cause the generation of the CJ signals. The CJ signals are essentially four pulse time gating signals which when fed to the comparator 768 permit the comparison of corresponding digits stored in the memory channels. The flip flop P112 generating the LU signals when set inhibits a comparison on separate and sequence operations after a carriage return is detected in memory channel D.

In some operations it is desired to terminate comparisons before the end of a block. During these operations, the occurrence of a carriage return character in the memory channel D is used as an indication that the comparisons for that particular block are finished. Thus, whenever a carriage return is detected and the LA signals are not being generated by the flip flop P111, the set gate P543, under the control of the MA or ME signal from the control box 226, permits a set pulse to trigger the flip flop P112 causing the generation of the LU signals. A —LU2 signal is fed via the delay line P615 to an inhibitory input of the set gate P544 preventing any further setting of the flip flop P114 and no signals which permit comparison will be generated for the remainder of the block.

Included in the comparison time selector 770 is the flip flop R108 which functions to clear the flip flops of the comparator 768 before the comparisons occur. The flip flop R108 has the input gates R530, R531 and R532. The input gate R530 passes a pulse at the start of each transfer cycle just before the comparisons are to occur. The input gate R531 passes a pulse at the beginning of each pass. The set gate R532 passes a pulse during separate operations whenever the comparison is terminated before the end of a block.

25. *The alternate pulse generators (FIG. 16)*

Figure 16:
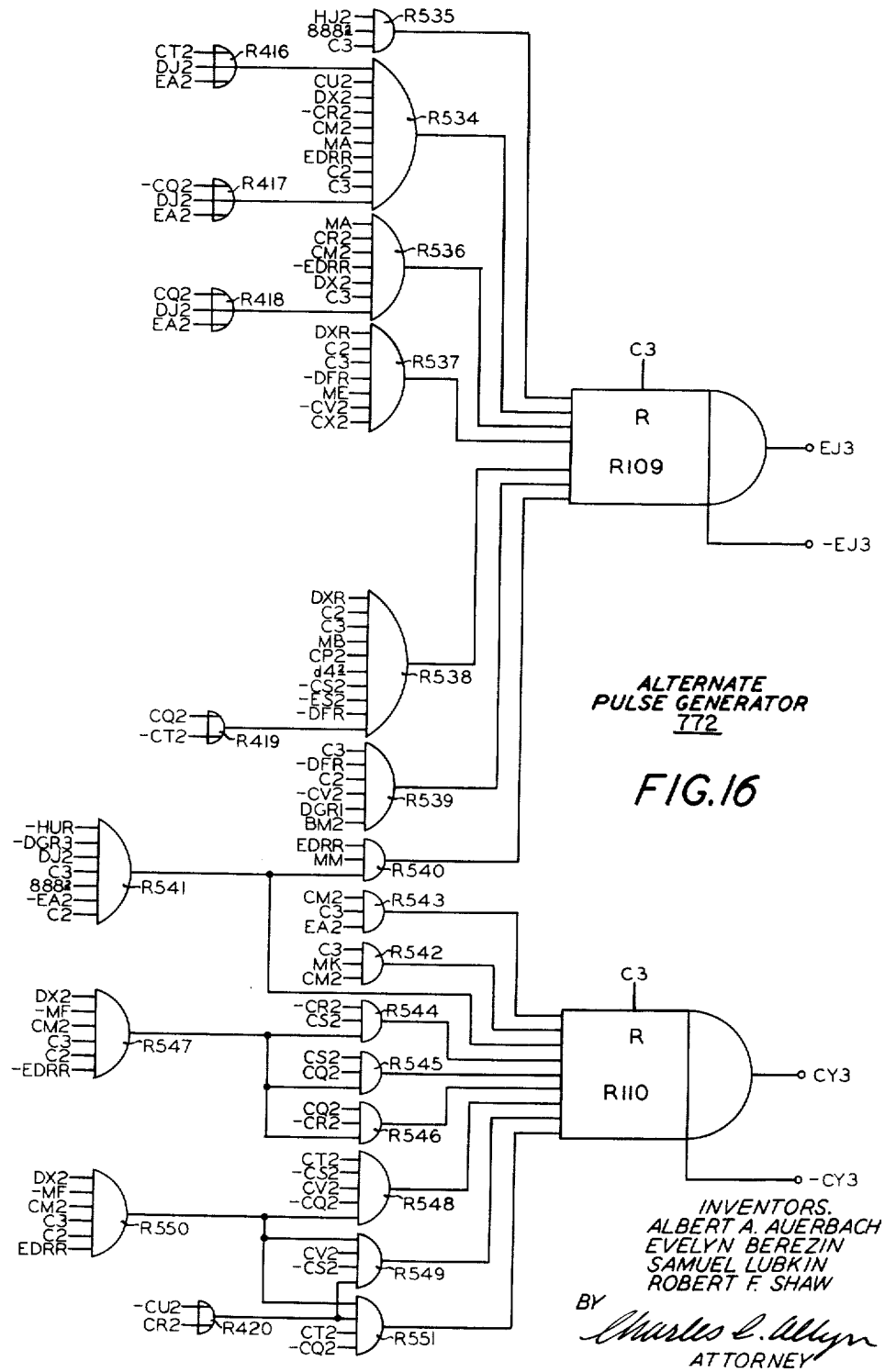
FIGURE 16 shows the circuits for the Alternate Pulse Generator.

The alternate pulse generators 772 shown in FIG. 16 primarily sample the states of the comparators 768 and generate signals which determine whether the information is to be recorded on the same tape unit as the previous block or on another tape unit. At the same time, a determination is made as to whether the new block of information is to be read in from the same input tape unit as the previous block of information or whether it is to be read in from another tape unit.

In conjunction with the input tape unit, alternation of a control operation is performed, which determines whether the information stored in memory channel A is to be transferred to memory channel C and E or whether the information stored in memory channel B is to be transferred to memory channel C and E and the information stored in memory channel A is to be transferred to memory channel B.

The alternate pulse generators 772 are the two reshapers R109 and R110 which each have a plurality of input gates.

Whenever the reshaper R110 transmits a CY pulse signal, the input tapes are alternated and a transfer cycle is performed in which the contents of the memory channel A are transferred to memory channel B and the contents of the memory channel B are transferred to the memory channels C and E. The following table summarizes the role of the input gates and the generation of an alternate input pulse by the reshaper R110:

| Gate | Comment |
|---|---|
| R543 | During any operation when there is only one input tape to give an alternate transfer between channels but not alternate the input tapes. |
| R541 | To alternate the input tapes after one input tape is completely read. |
| R544 | During a forward pass when the contents of the memory channel A are greater than the contents of the memory channel "B" and when the contents of memory channel "B" are equal to or greater than the memory channel "C." |
| R545 | During a forward pass when the contents of the memory channel "C" are greater than the contents of the memory channel "A" and the contents of the memory channel "A" are greater than the contents of the memory channel "B." |
| R546 | The contents of the memory channel "B" is equal to or greater then the contents of the memory channel "C" and the contents of the memory channel "C" are greater than the contents of the memory channel "A." |
| R548 | The contents of the memory channel "B" are greater than the contents of the memory channel "A" and the contents of the memory channel "A" are greater than the contents of the memory channel "C." |
| R549 | During a reverse pass when the contents of the memory channel "C" are greater than or equal to the contents of the memory channel "B" and the contents of the memory channel "B" are greater than the contents of the memory channel "A." |
| R551 | During a reverse pass when the contents of the memory channel "A" are greater than the contents of the memory channel "C" and the contents of the memory channel "C" are equal to or greater than the contents of the memory channel "B." |

The reshaper R109 when pulsed transmits the EJ signals which are primarily fed to the tape control 242 to cause an alternation of the output tape units. The following table summarizes the input gates to the reshaper R109 and their function in causing the generation of the EJ pulse signals:

| Gate | Comment |
|---|---|
| R535 | Causes an alternation of the output tapes at the beginning and end of a pass to facilitate the writing of three decimal points or to provide for spare tape at the end of a pass. |
| R534 | During a reverse pass of sequence when there are two input tapes, when the contents of the memory channel "B" are greater than the contents of the memory channel "C" and the contents of the memory channel "A" are greater than the contents of the memory channel "C" or during a one input tape sequence operation, when the contents of the memory channel "B" are greater than the contents of the memory channel "C." |
| R536 | During a forward pass of a two input tape sequence, when the contents of the memory channel "B" and the contents of the memory channel "C" are both greater than the contents of the memory channel "A" or during a one input tape sequence when the contents of the memory channel "C" are greater than the contents of the memory channel "B." |
| R537 | During a select operation when the contents of the memory channel "C" are equal to contents of the memory channel "D." |
| R538 | During a separate operation when the contents of the memory channel "D" are equal to or greater than the contents of the memory channel "C" which is equal to or greater than the contents of the memory channel "A." |
| R539 | During a select operation when the contents of the memory channel "C" are equal to the contents of the memory channel "D." |
| R541 | Together with the gate R540, at the end of one input tape during a reverse pass of sequence. |

It should be noted that the DX signals are fed to all the sampling gates and actually determine the sampling time for the states of the comparators. Although the comparisons are performed no control functions are set up until the DX signal is generated. As will hereinafter be described the DX signal is only generated at the end of designator blocks and not at the end of trailer blocks in multiblock items. This permits the trailer blocks to follow the same paths as the associated designator blocks.

26. *The input synchronizer (FIG. 17)*

Figure 17:
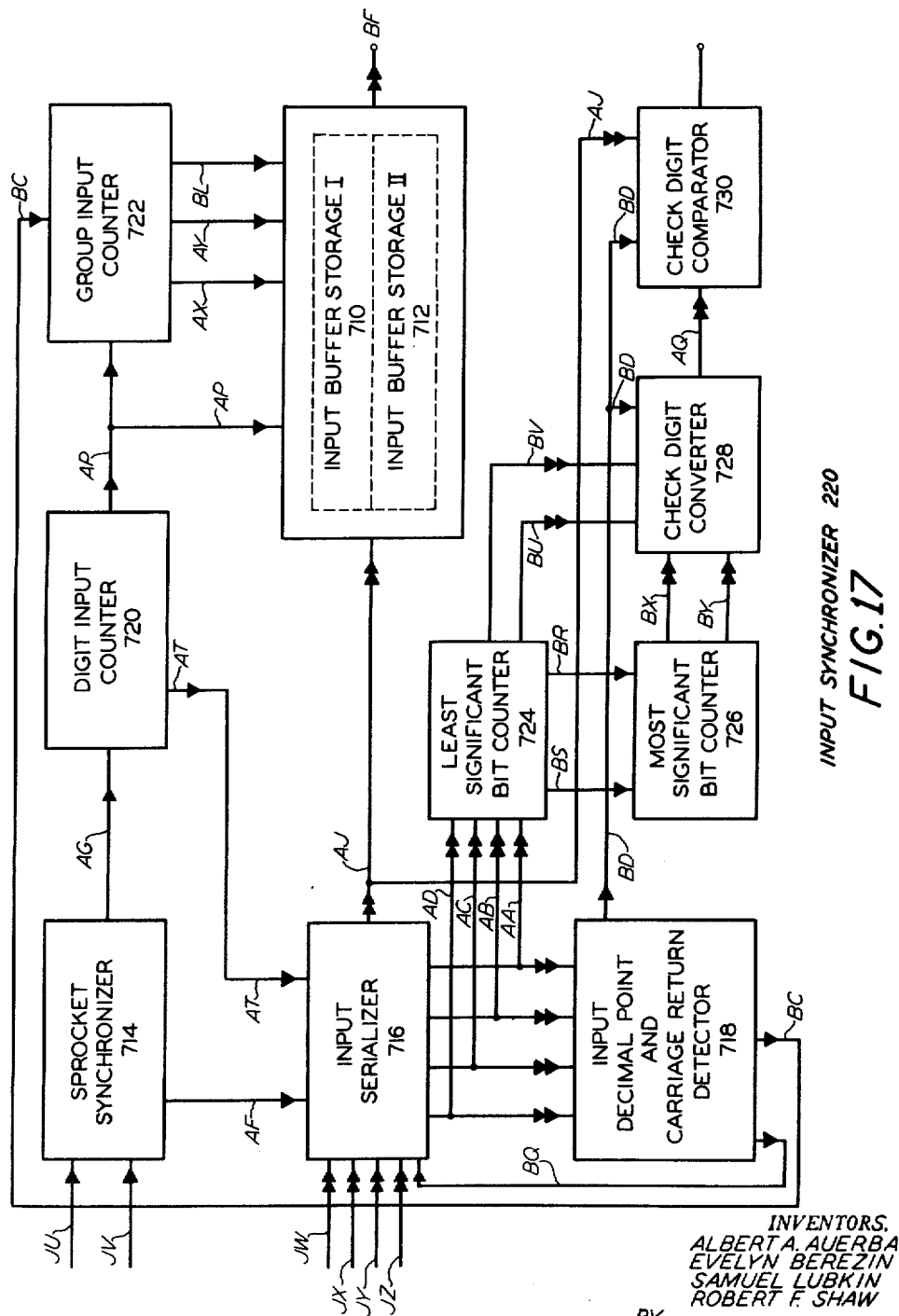
FIGURE 17 is a block diagram of the components of the Input Synchronizer.

The input synchronizer, designated generally as 220 and diagrammatically shown in FIG. 17, is used primarily to accept information, a block at a time, from the magnetic tapes. The information is received from the magnetic tapes in an asynchronous manner. The information is synchronized and transmitted to the memory of the file processor synchronously.

The magnetic tapes are effectively six channel tapes. Four of the channels are used for recording in parallel the four bits of a decimal digit. The fifth channel is used for recording a sprocket pulse in parallel with the recording of a digit. The sixth channel carries a permanently recorded sine wave which signifies that there is adequate space to record an entire block of information before the end of the tape is reached.

The input synchronizer includes means for detecting the sine wave recording to control future recording of information, means for detecting the sprocket signals and for synchronizing these signals to the rhythm of the file processor, and means for detecting the information signals from information channels in parallel and converting them to synchronized pulse signals for serial transmission.

Since a block of information is preceded by a start of block marker represented by two decimal points, and the end of a block is designated by a marker comprising a two character combination of decimal points and/or carriage returns and two check digits, circuitry is included to detect the start and end of block marker symbols.

To detect any errors in transfer of information between the magnetic tapes and the file processor, an error checking input system is included. As was stated above, the two last characters recorded in a block of information are two check digits. These check digits are related to the count of the number of bits recorded in a block of information. As the information is read in, the bits of information are counted and two check digits associated with this count are formed. The two derived check digits are compared to the two recorded check digits and if an equality exists no error has occurred, if an inequality exists, apparatus is set up to permit a reread of the block of information.

The input synchronizer 220 comprises: the sprocket synchronizer 714 which receives sprocket signals from a sprocket channel on the magnetic tapes and generates synchronized sprocket signals which are used to synchronize the sampling of the digits of a block of information; an input serializer 716 which receives asynchronously the bits of a digit in parallel from parallel channels of a magnetic tape and converts them to a synchronized serial representation with the aid of synchronized sprocket signals from the sprocket synchronizer 714; an input buffer storage 1710 and an input buffer storage II712, each of which temporarily stores six synchronized serial digits until they may be transferred to the file processor memory; the decimal point and carriage return detectors 718 which function to detect these characters to set up the start and termination of the transfer of a block of information; the digit input counter 720 which controls the proper positioning of each digit in an input buffer storage; the group input counter 722 which controls the proper positioning of each group of six digits from a buffer storage in a memory channel; the least significant bit counter 724 and the most significant bit counter 726 which count the number of bits transferred from a magnetic tape; the check digit converter 728 which converts the representation of the counts in the two check counters to a form similar to the check digits recorded on the magnetic tape; and the check digit comparator 730 which compares the two above noted representations for equality and activates error circuitry if an inequality is found.

27. *Input buffer storage registers of the input synchronizer (FIG 18)*

Figure 18:
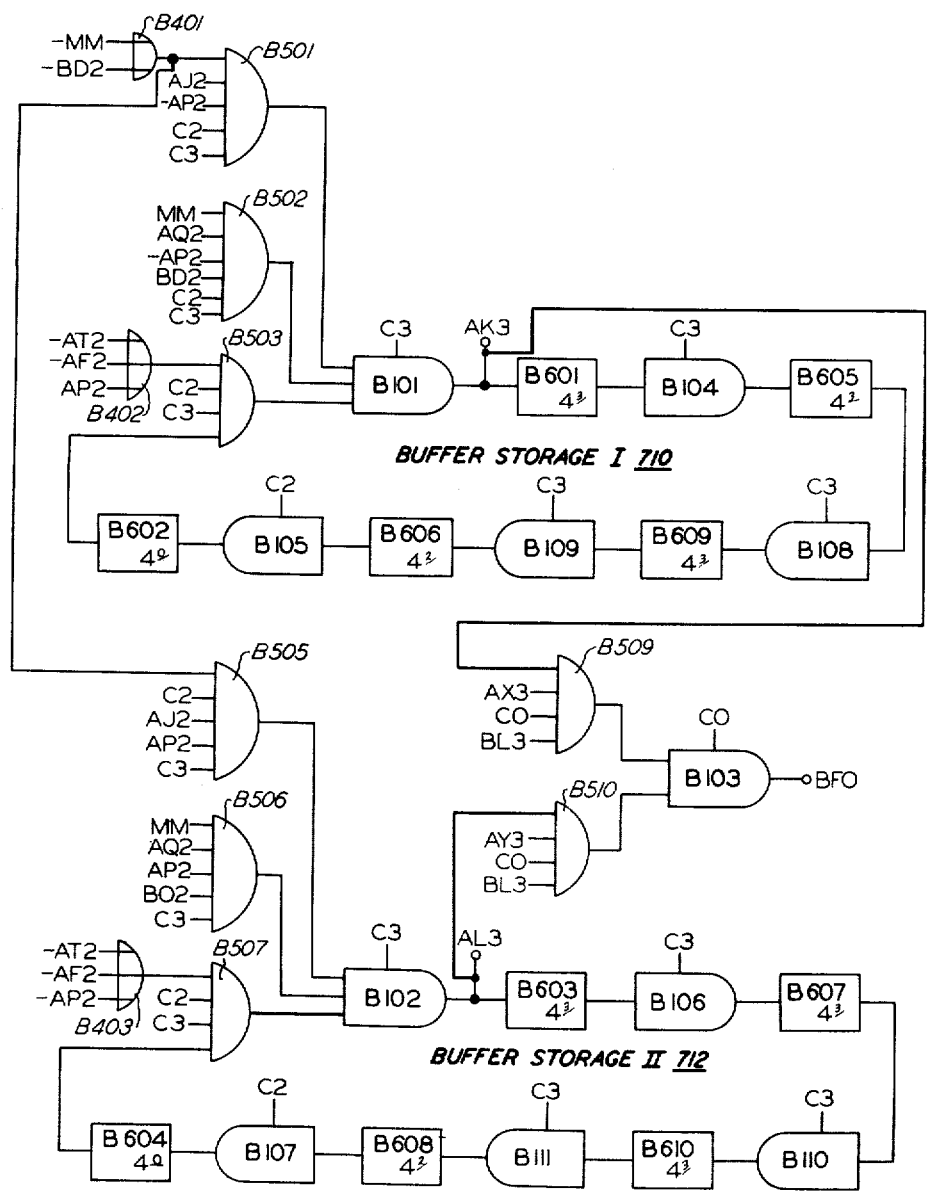
FIGURE 18 is a schematic diagram of the Buffer Storages.

The input synchronizer 220 contains two buffer storage registers 710 and 712, FIG. 18. Each buffer storage register is of the recirculating delay line type capable of storing six digits or twenty-four bits.

The buffer storage 1710 comprises the reshaper B101, the 4¾ pulse delay line B601, the reshaper B104, the 4¾ pulse delay line B605, the reshaper B108, the 4¾ pulse delay line B609, the reshaper B109, the 4¾ pulse delay line B606, the reshaper B105 and the four pulse delay line B602. These elements are serially connected with the output terminal of the four pulse delay line B602 coupled to an input gate B503 feeding the reshaper B101.

The remaining input gates to the reshaper B101 are the gates B501 and B502. The gate B501 received the serialized information from the tape drives via the AJ signal line from the input serializer 716. The gate B502 receives the coded combinations of the particular count number as the AQ signal during operations which are related to entering information into the file processor by means of the electromechanical typewriter input. The buffer B401 controls the type of information to be entered into the buffer storage 1710. The MM signal fed to the gates B501 and B502 determines the type of input. When the MM signal (active during electromechanical typewriter input) is present indicating the external insertion of information, the gate B501 is blocked and the gate B502 is activated. When the MM signal is absent implying that the insertion of information is from one of the magnetic tapes in the file processor, the gate B501 is activated and the gate B502 is blocked.

In either case, as each digit of the information is inserted, the —AT signal and the —AF signal feeding the buffer B402 blocks the gate B503 for four pulse times, thus effectively clearing a whole digit position in the register so that a new digit may be inserted via the gate B501 or the gate B502.

Since the AT, and AJ signals occur in a precessing manner each succeeding digit is loaded in a digit position one order lower in significance. The information continues to recirculate until it is transferred from the register via the AK signal line which is coupled to the positive output terminal of the reshaper B101.

The buffer storage II 712 is very similar to the buffer storage I 710. The buffer storage II 712 comprises the reshaper B102, the 4¾ delay line B603, the reshaper B106, the 4¾ delay line B607, the reshaper B110, the 4¾ pulse delay line B610, the reshaper V111, the 4⅔ pulse delay line B608, the reshaper B107 and the four pulse delay line B604 serially connected to form a closed loop. Three input gates to the buffer storage II 712 are connected to the input terminals of the reshaper B102. The first input gate B505 performs the same function as the input gate B501 of the buffer storage I 710. The second input gate B506 functions in a similar manner as the gate B502 of the buffer storage I 710 and the third input gate B507 (the recirculation gate) functions in a similar manner as the gate B503 of the buffer storage I 710. The output terminal of the buffer storage II 712 is the AL signal line which is connected to the positive output terminal of the reshaper B102. The buffer storage II 712 operates in exactly the same manner as the buffer storage I 710.

To determine which of the buffer storages is receiving the information at any one time a signal (the AP signal) is fed to both buffer storages. A —AP signal is fed to the gates B501 and B502 of the buffer storage I 710 and an AP signal is fed to the gates B505 and B506 of the buffer storage II 712. When the AP signal is present, the gates B501 and B502 are blocked and the gates B505 and B506 are alerted. Thus any information, whether from the magnetic tapes or from the input-output unit (the electromechanical typewriter) can only enter the buffer storage II 712. Conversely, when the AP signal is absent and therefore the —AP signal is positive, the gates B501 and B502 are capable of passing information and the gates B505 and B506 cannot pass information. Therefore any available information enters the buffer storage I 710.

Since it most often happens that one of the buffer storages contains information while the other buffer storage is being loaded it is necessary to maintain the recirculation in the buffer storage not being loaded. The maintenance of circulation is accomplished by the AP signal fed to the buffer B402 of the buffer storage II 710 and the —AP signal fed to the buffer B403 of the buffer storage II 712. When the AP signal is present, the buffer storage II 712 is being loaded and the AP signal overrides the effect of the —AT and the —AF signals feeding the buffer B402 and no information is prevented from circulating in the buffer storage I 710. Conversely, when the AP signal is absent (more particularly when the —AP signal is at a positive voltage) the positive potential fed to buffer B403 overrides the effect of the —AT and the —AF signals. Therefore, any information circulating in the buffer storage II 712 continues to recirculate while the buffer storage I 710 is being loaded.

The reshaper B103 is used as the common output of both the buffer storages. The reshaper B103 has the input gates B509 and B510. The input gate B509 receives the output of the buffer storage I 710 via the AK signal line and the gate B510 receives the output of the buffer storage II 712 via the AL signal line. The AX signal when present at an input of the gate B509 permits the contents of the buffer storage I 710 to pass through the reshaper B1-03 and leave the input synchronizer 220 as the BF signal under the synchronized control of the BL signal.

Similarly, when the AY signal is present at an input terminal of the gate B510, the contents of the buffer storage II 712, as the AL signal, passes through the reshaper B103 under the control of the BL signal, and is transmitted from the input synchronizer as the BF signal. It should be noted that at any one time either the AX or the AY signals are generated but never both.

28. *The sprocket synchronizer (FIG. 19)*

The function of the sprocket synchronizer 714 is to convert asynchronous sprocket signals from either the magnetic tapes or the input-output units to signals which are synchronous with the internal elements of the file processor.

Figure 19:
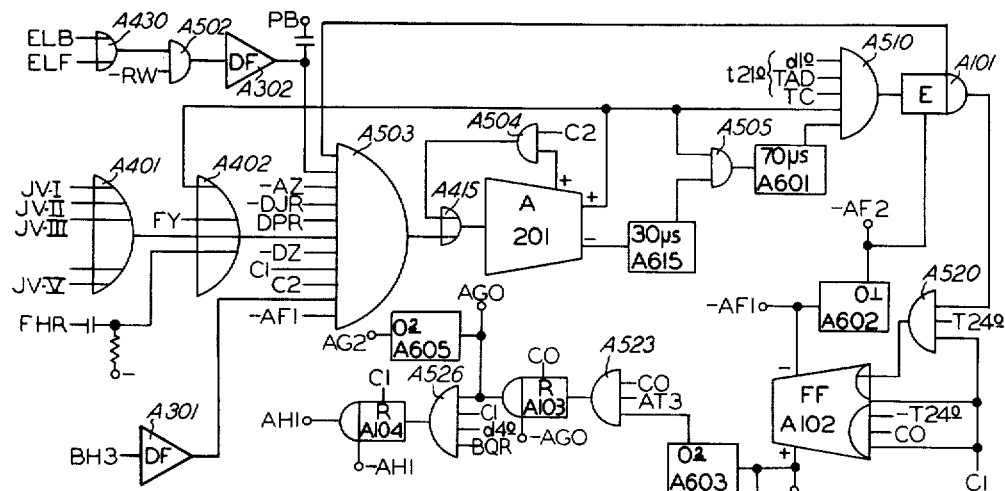
FIGURE 19 is a schematic diagram of the circuits of the Sprocket Synchronizer.

The sprocket synchronizer 714 as shown in FIG. 19 comprises the serially connected buffer A401, the buffer A402, the gate A503, the D.C. amplifier A201, the gate A505, the seventy microsecond delay line A601, the gate A510, the pulse extender A101, the gate A520, the flip flop A102, the delay line A603, the reshaper A103 and the reshaper A104. Several other logical elements are coupled to this serial chain and will be introduced as they occur in the discussion of the operation of the unit.

The buffer A402, having four input terminals, receives the above mentioned asynchronous signals. A first input terminal of the buffer A402 is coupled to the output terminal of the buffer A401 which receives via the JV signal lines, sprocket pulses from the magnetic tape being read. Second and third input terminals are coupled to the FY and FHR signal lines of the electromechanical typewriter for receiving sprocket signals during typewriter input. The fourth input terminal is a feedback terminal from the D.C. amplifier A201.

The output terminal of the buffer A402 is coupled to an input terminal of the gate A503. The remaining input terminals of the gate A503 serve as inhibitions on the passage of sprocket signals to the D.C. amplifier A201. The —AZ signal feeding an input terminal to the gate A503 prevents an early setting of the D.C. amplifier A201 while a previous digit is being cleared. The —AF1 signal feeding another input of the gate A503 prevents a second setting of the D.C. amplifier A201 as a result of a wide sprocket signal. The —DJR signal prevents the passage of a spurious sprocket signal at the end of an information pass. The DPR signal connected to an input terminal of the gate A503 permits the gate to operate only during an input operation. The —DZ signal which is fed to the input terminal of the gate A503 prevents the passage of sprocket signals when a tape is reversed preparatory to a rerun as a result of an input error. The —PE signal fed to an input terminal of the gate A503 operates as a jam, preventing the reading of spurious sprockets while the magnetic tape coasts to a stop at the end of the reading of a block of information. And the last input terminal of the gate A503 is coupled to the output terminal of the four millisecond delay flop A302 which prevents the reading of sprockets as the tapes come up to speed at the start of the entry of an item of information into the file processor.

With none of the inhibitions present, a sprocket pulse that is fed through the buffer A402 passes through the gate A503 and sets the D.C. amplifier A201 which will remain set until it is internally turned off as will be hereinafter described. The positive output terminal of the D.C. amplifier A201 is fed to an input terminal of the gate A510 and this gate is alerted. At the same time, a positive signal passes through the gate A505 to the seventy microsecond delay line A601. The negative terminal of the D.C. amplifier A201 passes a negative signal through the thirty microsecond delay line A615 so that a thirty microsecond pulse is formed by the gate A505. Seventy microseconds after the start of transmission of this thirty microsecond pulse, the input terminal of the gate A510, coupled to the output terminal of the delay line A601, goes positive awaiting the occurrence of a *t*21 pulse formed by the three timing signals fed to the three remaining input terminals of the gate A510. Since the *t*21 pulse occurs once every twenty-four microseconds at least one *t*21 pulse is fed to the pulse extender A101 which generates a pulse having a duration of approximately four microseconds. The negative pulse transmitted from the negative output terminal of the pulse extender A101 is fed back to the gate A503 to shut off the D.C. amplifier A201 by interrupting its feedback path. The pulse from the positive output terminal of the extender A101 is fed to an input terminal of the gate A520 where after three microseconds a t24 pulse sets the flip flop A102 causing the generation of the AF signals.

The —AF1 signal is fed through the delay line A602 and after a one-quarter of a pulse time delay turns off the pulse extender A101. The next —T24 signal fed to a reset terminal of the flip flop A102 turns off the flip flop and terminates the generation of the AF signals. Thus the AF signals are variously phased groups of twenty-four pulse signals which include a complete minor cycle. In this manner it has been shown that by starting with asynchronous sprocket signals of varying width it has been possible to generate a family of synchronous signals having a duration of one minor cycle.

The AF1 signal is also fed through the delay line A603 and alerts the gate A523. Upon the occurrence of the AT3 signal (a precessing group of four pulses generated by the digit input counter 720), the reshaper A103 generates these four pulses as the AG signals.

The AG0 signal is fed to an input terminal of the gate A526 where under the control of the BQ signal (indicating that a block is being read in), the last of the four pulses is selected by means of the d4 signal and is fed to the reshaper A104 to cause the generation of the AH signal. In summary, it may be said that the AG signals are four successive pulses encompassing a digit of the twenty-four AF signals encompassing a minor cycle and that the AH signal is the last of the four pulses of the AG signal.

Included in the sprocket synchronizer 714 is the four millisecond delay flop A301 and the good tape indicator comprising the buffer A429, the gate A545 and the D.C. amplifier A211. The gate A545 is fed by the buffer A429 which receives the good tape signals (JU) from the selected tape unit. As long as good tape signals are present recordings can proceed as is hereinafter described.

At the end of reading in a block of information, the BH3 signal is generated which sets delay flop A301 and causes the generation of a —PE signal for four milliseconds to prevent the possible reading of spurious sprocket signals while the magnetic tape coasts to a stop.

To insure an adequate amount of tape to write an entire block of information, signals have been recorded on a channel of each of the magnetic tapes. These signals, the JV signals from the various tape units, when present at an input terminal of the buffer A429, causes the generation of the —DA signal by the D.C. amplifier 211 which permits an output cycle to occur.

29. *Input serializer 716 (FIG. 20)*

The primary function of input serializer 716 is to receive the four bits of a digit asynchronously in a parallel manner and to transmit the bits of a digit in a serial manner synchronously with the basic timing of the file processor.

Figure 20:
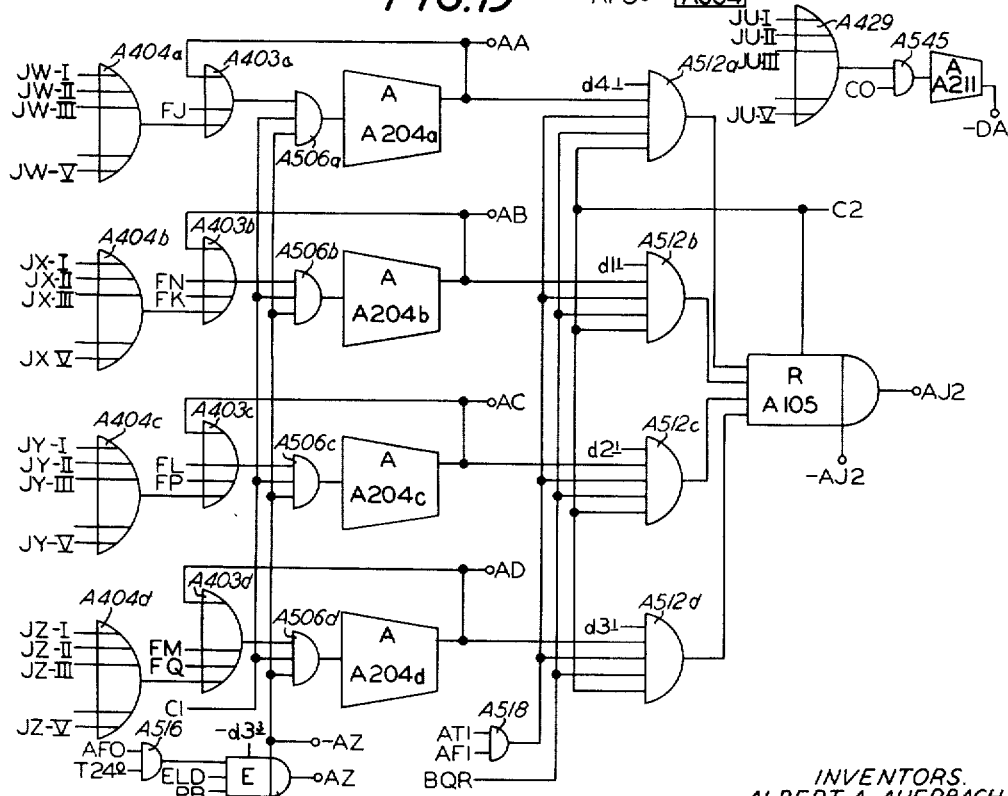
FIGURE 20 is a schematic diagram of the circuits of the Input Serializer.

The input serializer 716, FIG. 20, comprises the magnetic tape bit buffers (A404 (a–d), the general bit buffers A403 (a–d), the bit clearing gates A506 (a–d), the bit D.C. amplifiers A204 (a–d) generating respectively the AA, AB, AC and AD signals, the bit sampling gates A512 (a–d), the serialized output reshaper A105 (the AJ2 signal), the probing pulse gate A518, and the bit clearing pulse extender A107 (the AZ signal) having the gate A516 feeding one of its input terminals.

All elements having the same suffixed unit are associated with the same bit of a digit. For example, the elements A404a, A403a, A506a, A204a and A512a are related to the most significant bit of a digit while in a parallel manner the elements A404d, A403d, A506d, A204d and A512d are associated with the least significant bit of a digit.

As a digit is read from the magnetic tapes, the four bits of the digit enter the input serializer 716. The JW signal from the most significant bit of the selected magnetic tape enters the magnetic tape bit buffer A404a, the JX signals representing the second most significant bit track of the selected magnetic tape enter the magnetic tape bit buffer A404b, etc. These signals pass through the appropriate general bit buffers A403 (a–d) and the related bit clearing gates A506 (a–d) to set the bit D.C. amplifiers A204 (a–d).

During external input operations, the remaining input terminals to the general bit buffers 403 (a–d) are employed. The FJ, FK, FL, and FM signals feeding the general bit buffers A403 (a–d), respectively, are the bits associated with the numeric digit of a character from the electromechanical typewriter. The FN, FP and FQ signals feeding the general bit buffers A403 (b–d) are the bits associated with the zone digit of a character from the electromechanical typewriter.

Regardless of the type of input, the appropriate bit D.C. amplifiers A204 (a–d) are turned on and their output terminals prime the bit sampling gates A512 (a–d), each of which has been alerted by the BQR signal during information input. These gates await the occurrence of the synchronized AF1 and AT1 signals generated by the sprocket synchronizer 714 and the digit input counter 720, and four serial pulses are passed by the probing pulse gate A518. These probing pulses permit the passage of the d4¼, d1¼, d2¼ and d3¼ signals through the appropriate bit sampling gates A512 (a–d) which serially enter the serialized output reshaper A105. The four signals from reshaper A105 represent the bits of the digit in serialized form.

Finally the coincidence of the AF0 signal and a T24 signal at gate A516 triggers the bit clearing extender A107 causing the generation of the AZ signal. The —AZ signal blocks each one of the bit clearing gates A506 (a–d) and all the bit D.C. amplifiers A204 (a–d) are reset.

The EL0 signal feeding an input terminal of the bit clearing pulse extender A107 is used as an initial clear at the start of an input cycle. Similarly, the PB signal is used to generate a clear before the magnetic tapes start moving.

30. *Input decimal point and carriage return detector (FIG. 21)*

The first two characters of any block of information read from the magnetic tapes into the file processor are two decimal points. The end of the block is characterized by a combination of decimal points or carriage returns followed by two check digits. It is necessary to detect these characters to start and to terminate the entry of a block of information. The decimal point and carriage return detector 718, FIG. 21, performs this function.

The decimal point and carriage return detector 718 comprises the character detector flip flop A202 having a set gate A527, the character memory flip flop A106 having a set gate A530, the flip flop A209 having a set gate A539, the flip flop A210 having a set gate A542, the first check digit flip flop A208 having a set gate A534 and the second check digit flip flop A203 having a set gate A536.

The set gate A527 has eight input terminals. Three of the input terminals receive the AF1, the AT1 and the d1¼ signals respectively to determine the sampling time for the detection of the carriage return or the decimal point. Three other input terminals receive respectively the output terminal of the buffer A419, the output terminal of the buffer A420 and the AB signal line. It should be noted that the buffer A420 receives the AA signal (the DWR signal at a second input terminal of the buffer A420 is used for electromechanical typewriter operations and will be considered as inactive at this time) and the buffer A419 receives the AC and the AD signals. Thus at the proper sampling time if the AA, the AB and either the AC or the AD signals are present, a pulse passes through the gate A527 to set the character detection flip flop A202. The combination AA, AB and AC signals represent the binary coded character 1110 (a carriage return) and the combination AA, AB and AD signals represent the binary coded character 1101 (a decimal point).

When the character detector flip flop A202 is set, the BA signals are generated. The BAR signal is fed to the set gate A530 and causes a T24 to set the character memory flip flop A106 which generates the BB signals. The first —T24¼ that occurs after the generation of the BA signal, resets the character detection flip flop A202 which returns to a state of readiness to sample the next entered character. As the next character enters the input synchronizer, the AG signal (synchronized sprocket) is generated in the usual manner by the sprocket synchronizer 714. A —AG0 signal fed to the buffer A427, will, with the cooperation of a —d4 signal, attempt to reset the character memory flip flop A106 unless the new character is either a decimal point or a carriage return. In this case the BA signals are again generated and a BAR signal fed to the third input terminal of the buffer A427 overrides the effect of the —AG0 signal, and both the BA and BB signals are generated.

The BA2D and BB2D signals are both fed to input terminals of the set gate A539 of the flip flop A209 causing the generation of the BC signals starting at time T24¾. The —BCR signal fed to a reset terminal of the character memory flip flop A106 causes the termination of the BB signal while the BA signal from flip flop A202 is terminated by a —T24¼ signal. At the same time a BCR signal is fed to an input terminal of the gate A542 where approximately one minor cycle later it gates a T24¼ pulse to set the flip flop A210 and a quarter pulse time later a —T24¾ resets the flip flop A209 terminating the BC signals.

The setting of the flip flop A210 causes the generation of the BQ signals which are characteristic of information entry into the input buffer storages 710 and 712. Note that the BQR signal is fed to the bit sampling gates A512 (a–d) in the input serializer 716 of FIG. 20.

At the end of the insertion of a block of information, a two character combination of decimal points and carriage returns is again detected and the BA and BB signals are generated in the manner described above. The presence of both signals does not now set the flip flop A209 for a —BQ2 signal blocks the set gate A539. Instead, a BQR signal present at an input terminal of the set gate A534 cooperates with the BAR and BB1D signal to pass a T24¼ pulse to a set terminal of the first check digit flip flop A208 causing the generation of the BD signals. The BDR signal is fed to the set gate A536 of the second check digit flip flop A203.

As the first check digit is read, the AG signal from sprocket synchronizer 714 causes the generation of the AH signal in the synchronizer which cooperates with the BD signal in gate A536 causing the flip flop A203 to generate the BE signal. The BE and BD signals are both present while the second check digit is read in. The AH signal associated with the second check digit first cooperates with a —BER at buffer A424 causing the reset of the first check digit flip flop A208 to terminate the BD signal, secondly it cooperates with a —BER at buffer A428 causing the reset of the flip flop A210 to terminate the BQ signal and thirdly it is applied to the reset terminal of flip flop A203 to reset the second check digit flip flop A203 and terminate the BE signals. All the information of the block plus the check digits have been inserted and all the flip flops of the unit are now in the reset condition awaiting the entry of a new block of information.

Figure 22:
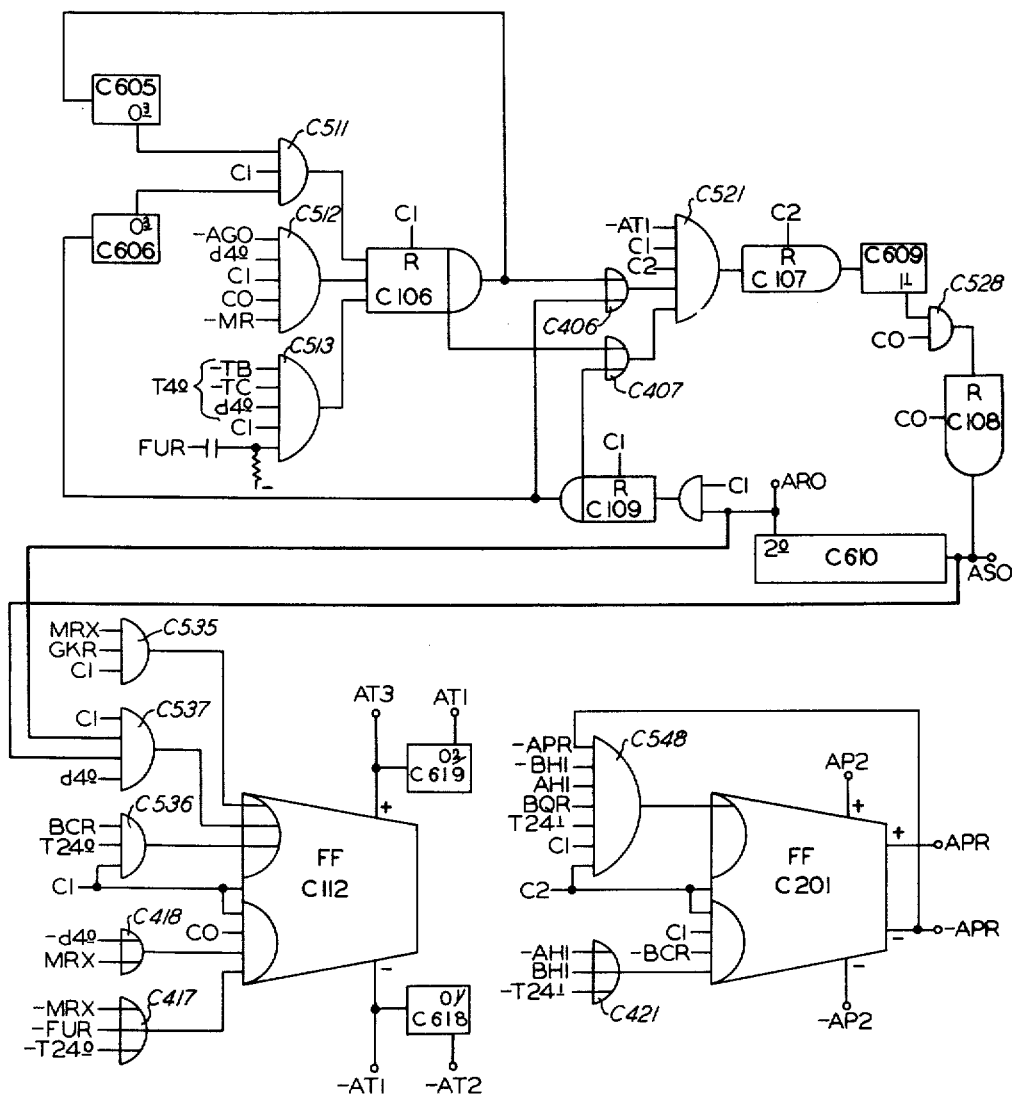
FIGURE 22 is the schematic showing of the Digit Input Counter.

31. *The digit input counter* (FIG. 22)

The digit input counter 720 of the input synchronizer 220 is used primarily to place each digit in its proper location in a buffer storage. The first digit is placed in the most significant digit position of a buffer storage, the second digit is placed in the next most significant digit position, etc. Since the buffer storages are recirculating registers capable of storing six decimal digits it is necessary to synchronize the entry of the first and succeeding digits relative to each other as well as to the rhythm of the input synchronizer as a whole. It is also necessary to know when a buffer storage is completely loaded so that another buffer storage may be loaded by switching the loading source to the other buffer storage. The digit input counter 720 performs these functions by generating a four pulse time gating pulse nearly every minor cycle. The four pulse time gating pulse is originally synchronized to start at the beginning of a minor cycle. This four pulse time gating signal is used to gate the first information digit into an input buffer storage. After the first digit enters a buffer storage, the gating signal is precessed to occur twenty-eight pulse times later for one cycle and then return to its original minor cycle repetition rate. Thus the next information digit enters an input buffer storage in the second most significant digit position. As each digit is inserted the four pulse time precession occurs and each digit enters one digit position lower in significance. When the first buffer storage is loaded, a switch system is activated which permits the next six digits to be loaded into the second buffer storage.

The digit input counter 720, FIG. 22, is a counter which includes a conventional unit adder and a storage register, and counts d4 pulses (pulses occurring every four pulse times). When the sixth such pulse is being counted, a four pulse time gating signal (AT) is generated which clears the counter and the counter starts counting again.

Whenever an AT signal occurs with a sprocket signal (AF), a digit is gated through and serialized by the input serializer 716, FIG. 20. And at the same time the AG signals are generated by the sprocket serializer 714, FIG. 19. The AG signal prevents one of the unit additions and the AT signal is precessed four pulse times later.

The digit input counter 720 which counts in straight binary notation comprises: a storage register composed of the serially connected reshaper C107, the one and one quarter pulse time delay line C609, the reshaper C108 (yielding the AS0 signal) and the two pulse time delay line C610 (yielding the AR0 signal); and the binary unit adder composed of the sum gate C521, the cross connected buffers C406 and C407, the augend reshaper C109, the three quarter pulse time carry delay lines C605 and C606, and the add one reshaper C106 being fed by the carry gate C511, the magnetic tape add one gate C512 and the electromechanical typewriter add one gate C513. The flip flops C112 and C201 are also included in the digit input counter 720. The flip flop C112 for generating the AT signals has three set gates C535, C536, C537 and two reset buffers C417 and C418. The flip flop C201 for generating the AP signals is a binary counter having a set gate C548 and a reset buffer C421.

The apparatus operates as follows: When the file processor is turned on, the d4 pulses pass through the magnetic tape add one gate C512 but not through the electromechanical typewriter add one gate C513 (the —MR and the FUR signals characteristic of typewriter input operations are absent) and a count of these d4 pulses is accumulated. After the count reaches five, the AR0 and AS0 signals fed to the set gate C537 of the flip flop C112, go positive as the count is to become six by virtue of another d4 pulse. The AR0 and AS0 permit this d4 pulse to set the flip-flop C112 which is reset four times later by the —d4 pulse fed through the reset buffer C418. The AT signals composed of four pulse signals are thus generated by flip flop C112 and a —AT1 signal blocks the sum gate C521. The counter 720 is cleared to zero and new count begins. This counting up and clearing process continues until a block of information preceded by its usual two decimal points enters the input synchronizer 220. As the second decimal point is detected, the BCR signal generated in the decimal point carriage return selector 718, FIG. 21, gates a T24 pulse through the set gate C536 and the AT signals are now forced to occure from T24—T3 (pulse positions related to the most significant digit in an input buffer storage).

The $d4$ pulses are still counted and cleared. When the first information digit enters the input synchronizer, the coincidence of the AT signal and an AF signal from sprocket synchronizer 714, gate the digit into a buffer storage and cause the generation of the AG signals in the synchronizer. The —AG0 signal is fed to the add one gate C512 and inhibits the gate long enough to prevent one $d4$ pulse addition. Thus it effectively takes one extra $d4$ pulse addition to reach the count of five in the counter and therefore this one cycle takes seven digit times. The AT signals will now occur four pulse times later from T4 to T7. They keep occurring at this time until another decimal digit enters the input synchronizer 220 at which time the —AG0 generated causes another precession to occur. These precessions occur for each digit entry until the AT signals occur during the interval T20 to T23. This is accomplished by six precessions of the AT and six entries of digits into an input buffer storage which, since its capacity is six digits, is now full.

With a buffer storage full it is necessary to shift the loading operating to the other buffer storage. It is noted in the section on the input buffer storages that the AP signals fed to the input buffer storage I 710 and the input buffer storage II 712 determine which of the buffer storages receives the information.

The flip flop C201 acting as a binary counter generates the AP signals. When the flip flop C201 is set, the input buffer storage I 710 accepts available information and when the flip flop C201 is reset, the input buffer storage II 712 accepts available information.

Initially the —BCR fed to a reset terminal of the flip flop C201 places the flip flop in a reset condition and the first six information digits enter input buffer storage I.

The specific AH1 which occurs immediately after the sixth digit has entered is in coincidence with a T24¼ set gate C548 and since AP is reset (—APR is therefore positive) and an information input is in progress (BQR is therefore positive), the flip flop C201 is set causing the generation of the AP signals. The next six digits enter the input buffer storage II 712. After six digits are therein entered the AH1 signal is again in coincidence to the T24¼ signal. At this time, since —APR is present and therefore negative) no set pulse is fed through the set gate C548. Instead the —AH1 and —T24¼ feed a reset pulse through the rest buffer C421 and the flip flop C201 is reset. In this manner, the flip flop C201 binary counts. It is set by the first AH1, T24¼ coincidence, reset by the second, set by the third, etc. Since the coincidences only occur after each sixth digit is loaded, the loading operation is switched every sixth digit.

The —BH1 signal into gate C548 and the plus BH1 signal into buffer C421 are used to freeze the state of the flip flop C201 when the check digits at the end of a block are inserted and will be discussed in connection with those digits.

32. *Group input counter (FIG. 23)*

Figure 23:
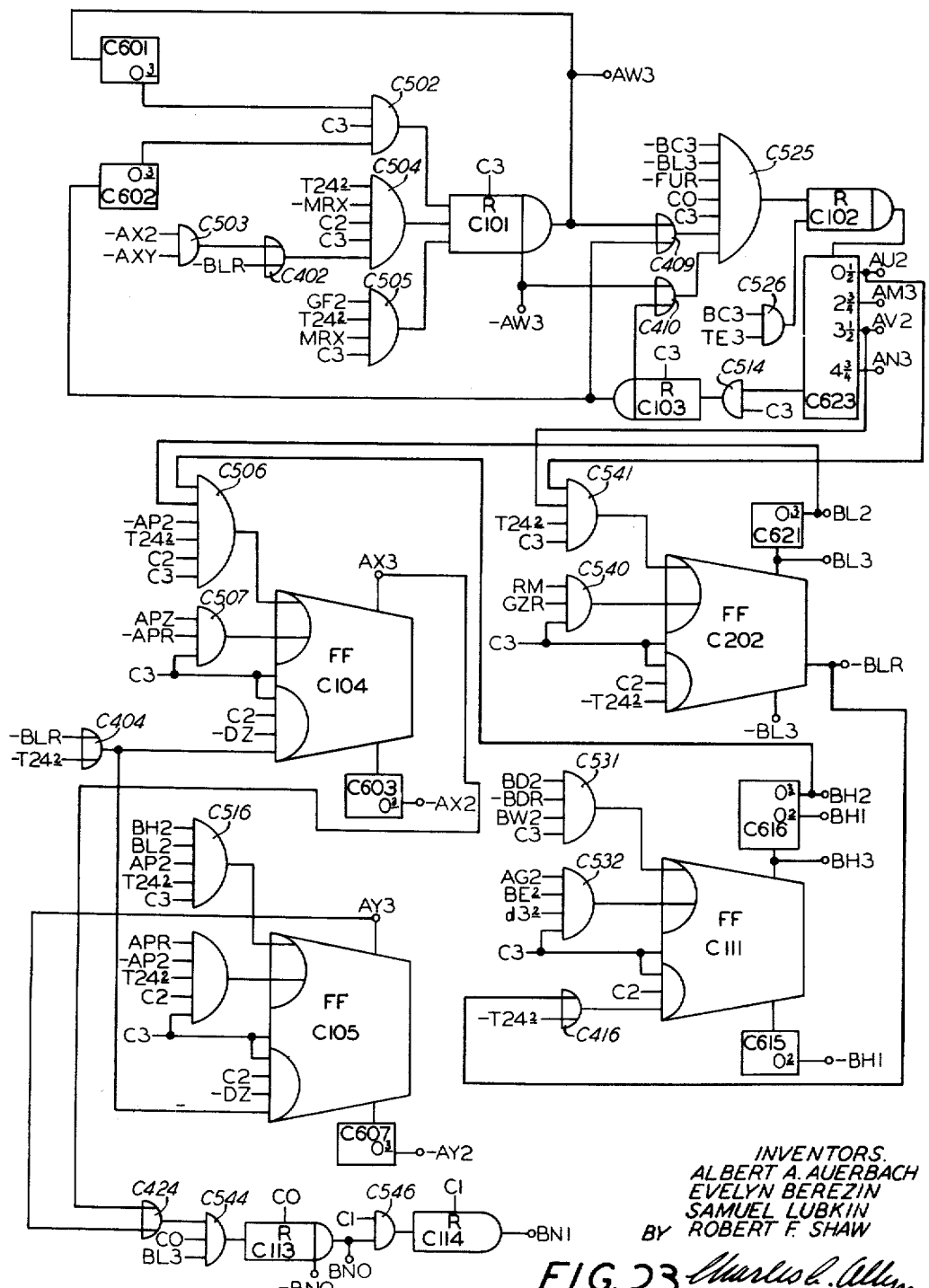
FIGURE 23 is the schematic representation of the Group Input Counter.
Figure 24:
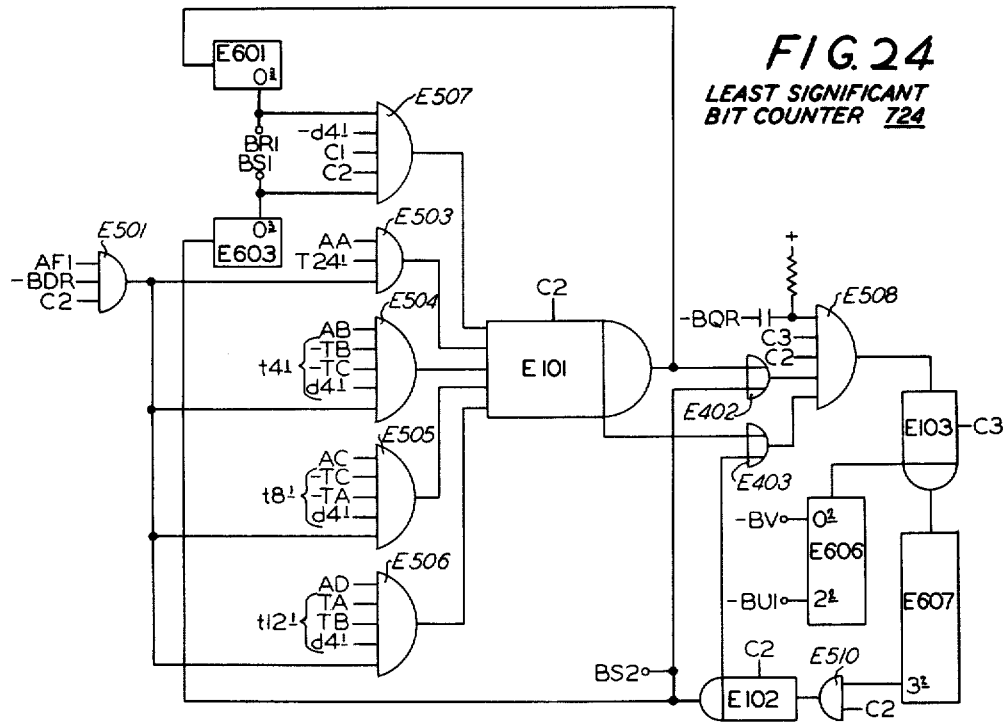
FIGURE 24 is the schematic representation of the Least Significant Bit Counter.
Figure 25:
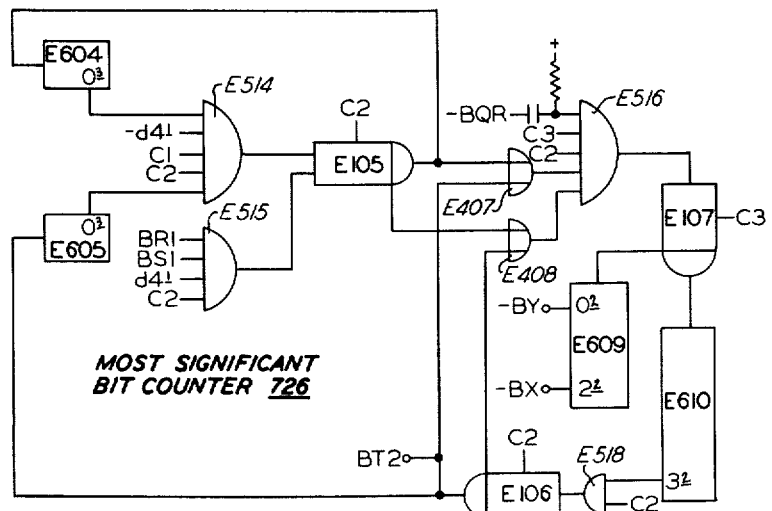
FIGURE 25 is the schematic representation of the Most Significant Bit Counter.

The group input counter 722 shown in FIG. 23 functions primarily by counting minor cycles to synchronize the placement of each group of six digits received from an input buffer storage into a specific location of one of the memory channels. The synchronization is such that the first group is placed in the six most significant digit positions of a chosen memory channel, the next group into the next six cost significant positions, etc. The initial synchronization for the placement of the first group is accomplished by forcing the count in the group input counter 722 to coincide with the count in the minor cycle counter of the timer 228 to be later described.

Once the primary synchronization has been accomplished, it is only necessary to generate precessing gating pulses to assure that each successive six digit group occupies its appropriate memory location.

The group input counter 722 counts minor cycles and as the count changes from thirty-six to thirty-seven indicating the completion of a major cycle, the counter is cleared and a new count begun. If initially the group input counter 722 is synchronized with the minor cycle counter of the timer 228, the clearing operation occurs just prior to the start of a new major cycle. If a group transfer occurs at that time, the group will enter the most significant group position (six most significant digit positions) of a memory channel. If also when the transfer occurs, the count of one minor cycle is suppressed, then the next and all succeeding thirty-seven counts occur one minor cycle later. The next time a group transfer from input buffer storage to memory channel occurs, the group will enter the next most significant group position of the memory channel. The suppression of a minor cycle count during a transfer permits the precession of a gating signal to one group time lower in significance.

Since there are two input buffer storages associated with the input synchronizer and these storages are alternately loaded, it is necessary to provide switching apparatus which first unloads the first of the input buffer storages and waits until the second is filled and then unloads it, then waits for the first to be refilled and empties it, etc. Apparatus is provided which permits switching the output line from the input serializer 716 between the two input buffer storages.

Because a block may vary in length, there is no fixed number of digits being transferred and therefore no counting operation can determine the end of the block transfer. To accommodate for a varying block length the usual end of block characters, when read, activate circuitry which permits a comparison between the representation of a count kept by the input synchronizer of the bits transferred and a count recorded as two check digit representations at the end of the block of information on the magnetic tape preparatory to terminating the input cycle.

The group input counter 722 has a unit adder and storage register similar to the digit input counter 720. The group input counter 722 counts minor cycles as represented by T24⅔ pulses and when the count in the group input counter reaches a count of thirty-seven the counter is cleared to zero and the count starts over. Since the information received from the magnetic tapes is not necessarily in synchronism with the circulating registers of the memory channels, it is necessary at the start of an input cycle to synchronize the group input counter with the minor cycle counter of the timer 228. This is accomplished during the detection of the second decimal point at the start of a block of information. At this time the group input counter 722 is cleared of whatever count number it has and the count contained in a minor cycle counter of the timer 228 is inserted into the counter. The groups to be transferred are now in synchronism with the memory and in particular the first group to be transferred will occupy the first six most significant digit positions of the memory. From then on, as each group is loaded in the memory it will occupy the next six most significant digit positions. As each group is transferred, one unit addition is suppressed and the thirty-seven count is delayed by one minor cycle. In this manner the precessions occur.

The group input counter 722 comprises: a counter having a storage register shown ideally as composed of the serially connected reshaper C102 having one input terminal connected to the force gate C526, the 5½ pulse delay line C623 having the AU2 signal tap ½ pulse time down the line, the AM3 signal tap 2¾ pulse times down the line, the AV2 signal tap 3½ pulse times down the line and the AN3 signal tap 4¾ pulse times from the start of the line, and the clockingg at C514; and a conventional unit adder composed of the sum gate C525 feeding a second input terminal of the reshaper C102, the cross connected buffers C409 and C410, the addend reshaper C103 being fed by the clocking gate C514, the carry pulse delay lines C601 and C602, and the add one reshaper C101 having the add one gates C504 and C505. Included in the group input counter 722 are: the thirty-seven indicating flip flop C202 having the set gates C540 and C541; the unload I flip flop C104 having the set gates C506 and C507 and the reset buffer C404; the unload II flip flop C105 having the set gates C516 and C517, the completion of transfer flip flop C111 having the set gates C531 and C532 and the reset buffer C416 and the buffer C424, the gate C544, and the memory gating reshapers C113 and C114 connected in a serial manner.

The overall operation of the group input counter 722 will now be described with reference to FIG. 23. As the second decimal point is detected at the start of a block of information the —BC signals are generated by the decimal point and carriage return detectors 718, FIG. 21. The +BC3 signal fed to the force gate C526 permits the initial entry of the pulse train representing the minor cycle count from the minor cycle counter of the timer 228 as the TE3 signal. The —BC3 signal fed to the sum gate C525 clears whatever count is circulating in the counter.

Each minor cycle a T24¾ signal is fed through the add one gate C504 (the —MRX signal feeding this gate is used during electromechanical typewriter operations at which time the add one gate C504 is blocked and the add one gate C505 is activated). These unit additions of a T24¾ pulse each minor cycle continue until a count of thirty-six is reached in the counter. All this time the AU2 and the AV2 signals (from taps on the delay line C623) are fed to the set gate C541 of the flip flop C202. As the thirty-seventh T24¾ signal is being added via the gate C504 it is also passed through the set gate C541 for the AU2 and AV2 signals are positive at this time. The thirty-seven indicating flip flop C202 is then set causing the generation of the BL signals which last for one minor cycle since the next —T24¾ pulse resets the flip flop. The —BL3 signal is fed to the sum gate C525 and blocks circulation for one minor cycle causing the counter to clear to zero. A new thirty-seven count then begins.

This counting and clearing operation continues until the buffer storage I contains six digits. At this time it will be recalled the flip flop C201, FIG. 22, of the digit input counter 720 is set. The setting of the flip flop C201 causes the generation of the AP signals. The AP2 signal and the —APR signal are fed to the set gate C507 of the unload I flip flop C104 to generate a positive transient causing the flip flop C104 to set and generate the AX signals.

The AX signals so generated wait for the occurrence of the next BL signal. At this time the AX3 signal, acting through the buffer C424, cooperates with the BL3 signal at the gate C544 to cause the generation of the BN signals. The BN signals fed to the memory 200, open up the entry gates for digits to be transmitted from the input buffer storages. At the same time, the AX3 and BL3 signals are fed to the input buffer storages where they alert an exit gate B509 of the buffer storage I 710 permitting the six digits in the buffer storage I 710 to be transferred to the memory 200. The —AX2 signal fed through the gate C503 cooperates with the —BLR signal at the buffer C402 to prevent one unit addition of a T24¾ pulse through the gate C504 and the generation of the next thirty-seven count will take thirty-eight minor cycles and the occurrence of the BL signal is precessed one group time.

At the end of the BL signal a —BLR and a —T24¾ cooperate through the reset buffer 404 and reset the unload I flip flop C104 terminating the AX signals. When the buffer storage II is completely loaded the flip flop C201 of the digit input counter 720 (FIG. 22) is reset causing the termination of the AP signals. The APR and the —AP2 signals fed to the set gate C517, FIG. 23, of the unload II flip flop C105 generate a positive transient causing the setting of the flip flop C105 and the generation of the AY signals. When the next thirty-seven count occurs the AY3 signal fed through the buffer C424 cooperates with the BL3 signal at the gate C544 causing the generation of the BN signals which permits transfer of information from the input buffer storages to the memory.

At the same time, a BL signal and an AY signal fed the input buffer storage II 712 (FIG. 18) activate an exit gate B510 causing the contents of the buffer storage II to be fed to the memory 200. The unit addition that would occur during the coincidence of the AY and the BL signals in Group Input Counter 722 (FIG. 23) is prevented by the action of the —AY2 signal at the gate C503 in cooperation with the —BLR signal at the buffer C402 which blocks the add one gate C504 for one minor cycle. In this manner each of the input buffer storages I and II is alternately unloaded.

It is possible to arrive at the end of the insertion of input digits before one of the buffer storages is completely loaded and therefore no AP signals are generated. The flip flop C111 handles the situation when the usual mechanism for unloading the buffer storage is not activated. The BE2 signal which is generated when the last check digit (the absolute last digit to be read in from a block) enters the buffer storage is used to pass a $d3¾$ pulse through the set gate C532 to set the flip flop C111 causing the generation of the BH signals. The BH2 signal is fed to the set gate C506 of the unload flip flop I C104 and to the set gate C516 of the unload flip flop II C105 where they await the occurrence of the next BL signal.

If the AP signals are absent indicating that the last unloading was from the buffer storage II, then a T24¾ pulse passes through the set gate C506 causing the generation of the AX signals and the buffer storage I is unloaded. If, however, the AP signals are present indicating that the buffer storage I was last unloaded, then a T24¾ pulse passes through the set gate C516 during the occurrence of the BL signal. The unload II flip flop C105 is set and the AY signals cause the unloading of the buffer storage II.

33. *Tape input error check circuitry*
*(FIGS. 24, 25, 26, 27)*

The last two digits recorded on a block of information are the check digits. The check digits are actually the eight least significant bits of a binary count of the total number of bits of information in a block. To prevent the possibility of self-correcting errors due to the loss of an information bit concurrent with the loss of a check digit bit the eight bits are modified. The bits are inverted (all the binary ones are changed to zeros and all the binary zeros to ones) and are considered in two four bit pairs. The significance of the bits within each pair is changed, the most significant bit becomes the least, the second most the second least, etc. This will be called a rotation. These inverted and rotated four bit pairs are known as the recorded check digits. This feature is more fully disclosed in the copending application Serial No. 542,051 filed Oct. 21, 1955, by one of the co-inventors herein and titled Error Detection System.

When a block of information is read in from the tapes the information bits are binarily counted and two secondary check digits are formed from the eight least significant bits of this count. These secondary check digits are inverted, rotated and compared with the check digits read from the magnetic tape at the end of the block. The two pairs of check digits are compared for equality. If an equality exists the operation is complete. If an inequality exists, the input magnetic tape is reversed and returns to the start of the block and proceeds to read the block in a second time. Since most errors are transient in nature a second reading usually suffices. When further rereads are still called for, the file processor is halted and an alarm is given. The reread and alarm mechanism will be discussed in greater detail in a subsequent section.

The tape input error check circuitry as shown in FIGS. 24, 25, 26 and 27 comprises the least significant bit counter 724, the most significant bit counter 726, the check digit converter 728, and the check digit comparator 730.

The least significant four bit counter 724 is a conventional counter having a binary unit adder and a storage register. The storage register is composed of the reshaper E103 and the 3¾ pulse time delay line E607. The binary unit adder is composed of the sum gate E508, the cross connected buffers E402 and E403, the three quarter pulse time carry delay lines E601 and E603, the augend reshaper E102 and the add one reshaper E101 being fed by the add one gates E503—E507. Also included in the unit adder is the priming gate E501 and the 2¾ pulse delay line E606 having a —BV tap two quarters of a pulse time down the line and a —BU tap at the end of the line.

Figure 21:
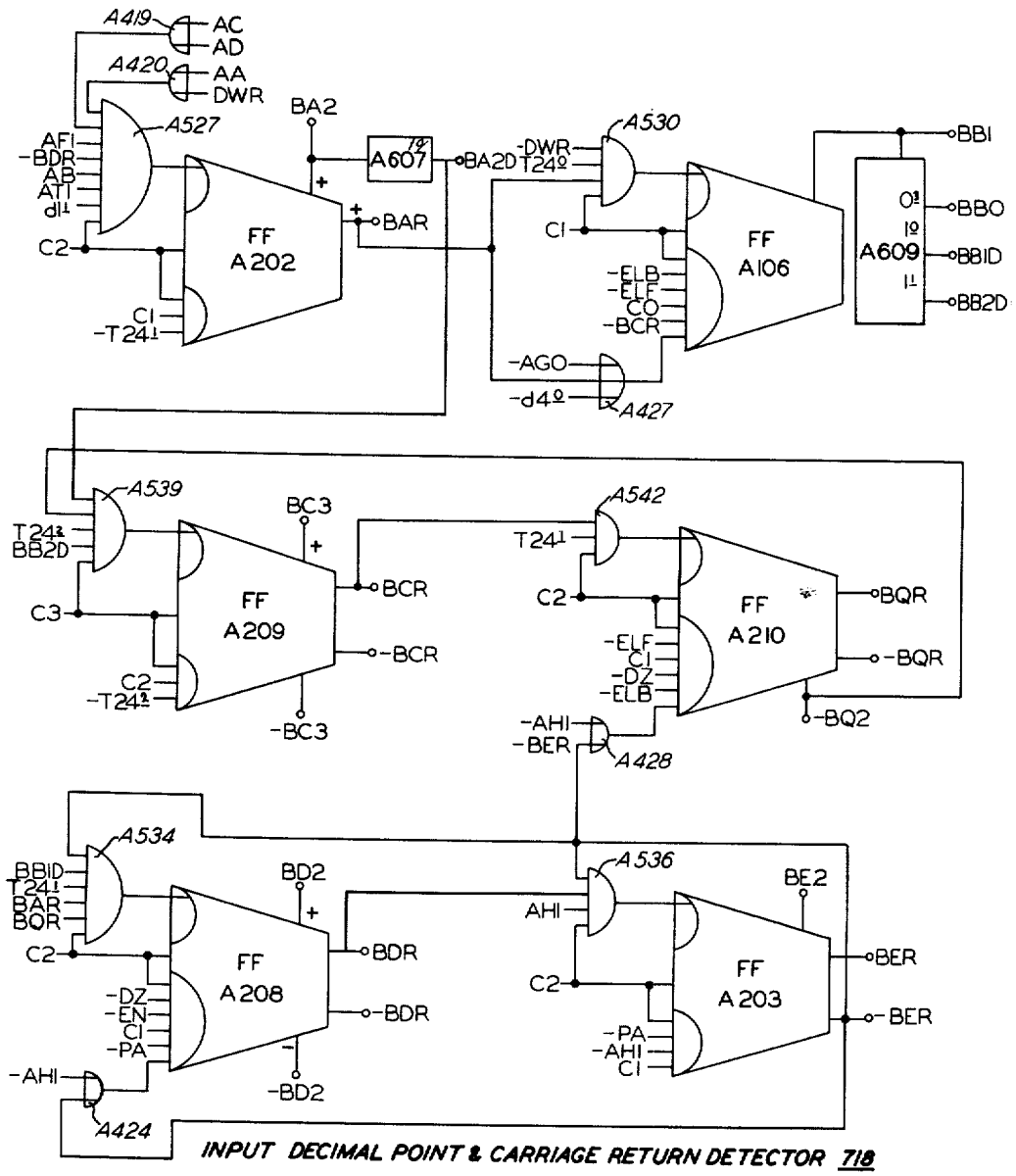
FIGURE 21 is the Input Decimal Point and Carriage Return Detector Circuitry.

After the second decimal point at the start of a block of information is detected, the BQ signal is generated in the decimal point and carriage return detector 718, FIG. 21, and a —BQR is differentiated and fed to an input terminal of the sum gate E508 to clear whatever is circulating in the register. As the first information digit enters the input synchronizer 220 some combination of the AA, AB, AC and AD signals are generated. When the synchronized sprocket signal (AF) which is associated with these signals is generated, an AF1 is transmitted through the gate E501 to alert the gates E503 to E506. These gates are then serially sampled at four pulse time intervals by timing pulses and whenever a signal representing a bit is present at one of these gates, an add one pulse is fed to the add one reshaper E101 and the count is increased by one.

The gate E507, a carry gate, having two input terminals connected to the three quarter pulse carry delay lines E601 and E603, generates carries whenever they are called for as a result of the additions. The —d4¼ pulse being fed to a third input terminal of the gate E507 prevents an end around carry from being generated. These additions occur for all the information digits in a block of information. Just before the check digits are read in from the magnetic tapes the BD signals are generated by the decimal point and carriage return detectors 718, FIG. 21, and a —BDR fed to the gate E501 prevents the counting of the bits associated with the check digits.

The most significant bit counter 726 is similar to the above described least significant bit counter 724. It comprises a storage register composed of the reshaper E107 and the 3¾ pulse time delay line E610; of the binary unit adder composed of the sum gate E516, the cross connected buffers E407 and E408, the three-quarter pulse time carry delay lines E604 and E605, the augend reshaper E106, and the add one reshaper E105 having an add one gate E515. The 2¾ pulse time delay line E609 having its input terminal connected to the negative output terminal of the reshaper E107 and having a —BY tap two quarter pulse times down the line and a —BX tap at the end of the line is also included in the most significant bit counter 726.

The —BQR signal fed to an input terminal of the sum gate E516 functions as an initial clear for the counter. The BR1, BS1 and d4¼ signals fed to input terminals of the add one gate E515 permit unit additions to occur only when there is a possible end around carry in the least significant bit counter 724. Although it is possible to use one counter to count the bits, it was found more convenient to use the two above described counters to perform the operation.

Figure 26:
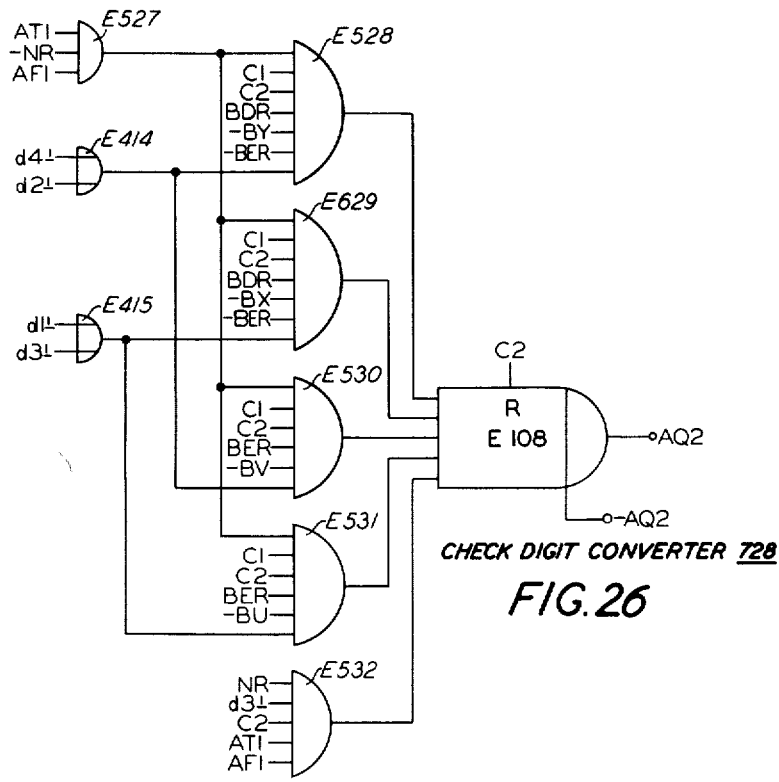
FIGURE 26 is the schematic diagram of the Check Digit Converter Circuits.

The check digit converter 728, FIG. 26, comprising the reshaper E108, the gates E528 to E532, and the buffers E414 and E415 is used to convert the count of the bits stored in both check counters to a configuration similar to the recorded check digits on the magnetic tape. The BDR signal feeding both the gates E528 and E529 alerts these gates during the reading in of the most significant check digit from the magnetic tapes. When this digit is read in, the AT and AF signals are generated and pass through the gate E527 to prime the gates E528 to E531. The —BY signal feeding an input terminal of the gate E528 and the —BX signal feeding the gate E529 represent in an inverted manner the count contained by the most significant bit check counter 726. The timing signals feeding the buffer E414 whose output is connected to an input of the gates E528 and E530 and the timing signals feeding the buffer E415 whose output is connected to an input terminal of the gates E529 and E531 are used to probe these gates so that the information being transmitted from the most significant bit counter 726 is rotated.

After the first check digit is read in from the magnetic tape, the BE signals are generated by the input decimal point and carriage return detector 718, FIG. 21, and the —BER signal fed to input terminals of the gates E528 and E529 block these gates. The BER signals fed to the gates E530 and E531 alert these gates to cause a similar inversion and rotation of the contents of the least significant bit counter 724 during the reading in of the least significant check digit from the magnetic tapes. The —BV signal feeding the gate E530 and the —BU signal feeding the gate E531 are the inverted contents of the least significant bit counter 724.

Figure 27:
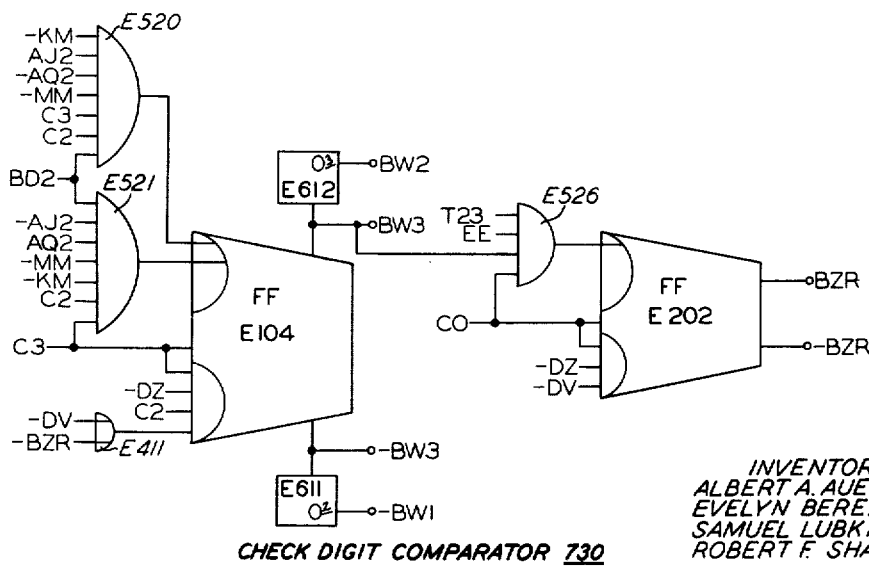
FIGURE 27 is the schematic diagram of the Check Digit Comparator.

As these bits from both check counters are converted they are transmitted from the reshaper E108 in a serialized manner as the AQ signal and are fed to the check digit comparator 730, FIG. 27.

The check digit comparator 730 is a standard flip flop type comparator comprising the flip flop E104 having the set gates E520 and E521 and the reset buffer E411. Also included in the check digit comparator 730 is the flip flop E202 having the set gate E526. The —DZ signal fed to a reset input terminal of the flip flop E104, initially resets the flip flop at the start of an operation. The flip flop E104 will remain in this condition until it is set by a signal passed through either of the set gates E520 or E521. Both of the set gates are alerted by a BD2 signal which is present while the check digits are being read in from the magnetic tape. The —KM signal feeding both gates is used during maintenance test operations when an error delete switch is thrown. The —MM signal feeding both gates is present during electromechanical typewriter operations when the input synchronizer is used in a slightly different manner.

The AJ and AQ signals feeding both gates are the actual signals to be compared. The AQ signals are the converted serialized bits of the bit counters via the check digit converter 728. The AJ signals at this time are the serialized representation of the check digits recorded on the magnetic tape from the input serializer 716. Since an AJ2 signal and a —AQ2 signal are fed to the set gate E520, a set pulse will only pass through this gate when a one is present in one of the bit positions of a check digit from the magnetic tape and a zero is present in the same bit position from the bit check counters. This indicates that an inequality in the counter will set flip flop E104. Similarly the AQ2 signal and the —AJ2 signal feeding the input terminals of the gate E521 will cause the passage of a set pulse through this gate only when a one is present in one of the bit positions from the bit counters and a zero is present in the same bit position of the check digits from the magnetic tapes. It should be noted that when the bits from both sources are identical neither gate passes a pulse and the flip flop E104 is not set.

As long as the flip flop remains in a reset condition no error has occurred. Whenever the flip flop is in a set condition, an error is indicated. If an error is indicated, the flip flop E104 is set and the BW signals are generated and in particular a BW3 signal is fed to the set gate E526 causing the setting of the flip flop E202 which generates the BZ signals. The BZ signals are then fed to control circuits in the remainder of the file processor to cause an input tape to reverse one block and start a reread. Just before the reread occurs a —DV signal is generated as will be later described and the —DV signal cooperating with a —BZR signal at the buffer E411 resets the flip flop E104 and the —DV signal fed to a reset terminal of the flip flop E202 also resets the flip flop E202. A reread then occurs.

Figure 28:
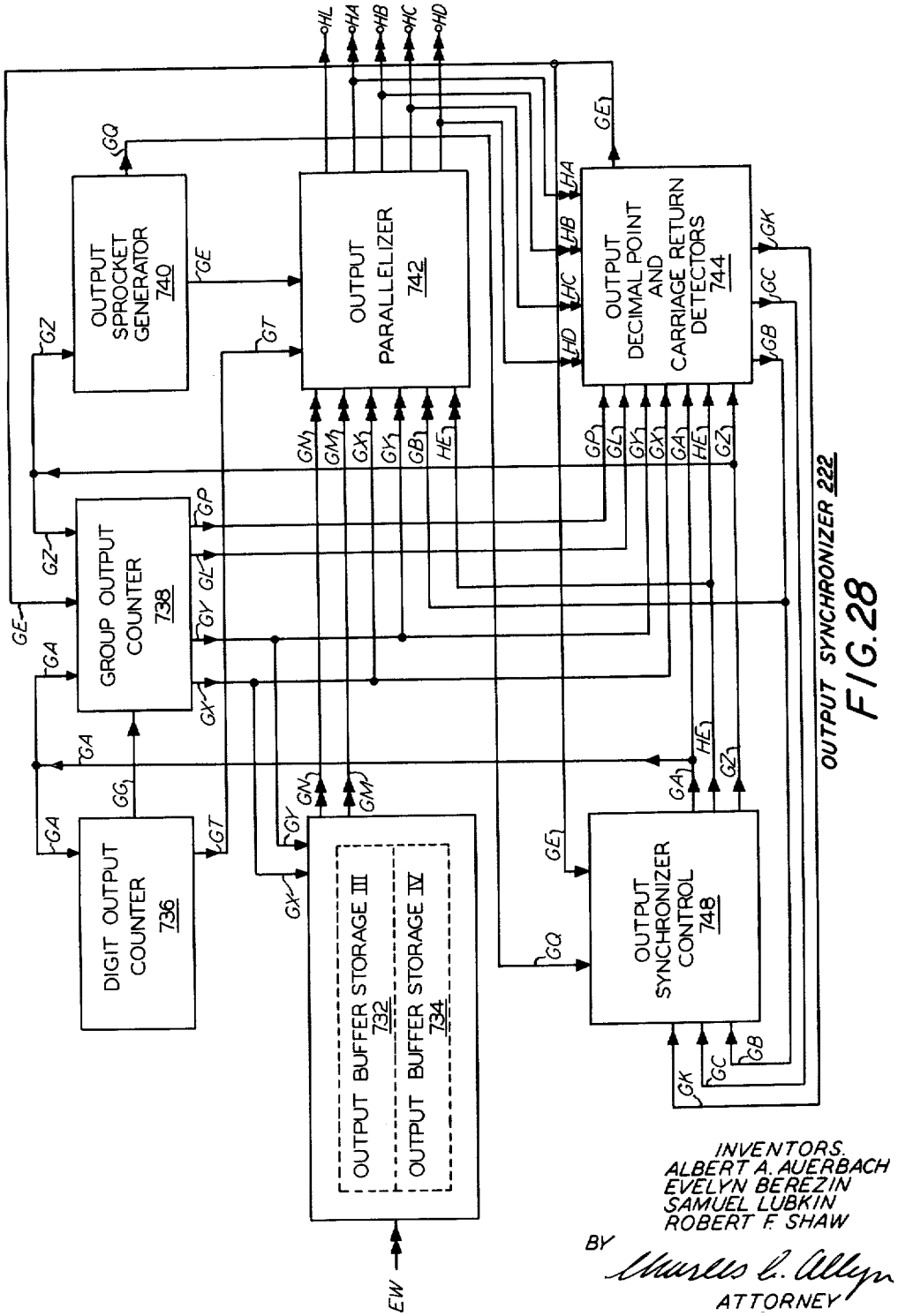
FIGURE 28 is a block diagram and signal flow showing of the Output Synchronizer.

34. *The output synchronizer (FIG. 28)*

The prime function of the output synchronizer 222 is to serve as a buffer storage between the memory and the tape units. When it is necessary to record the contents of a memory channel on a magnetic tape, the output synchronizer 222 assumes the role of the transfer medium. A subsidiary function is to serve as a buffer storage between the memory and the input-output unit.

To perform this role the output synchronizer 222 contains the output buffer storage III 732, the output buffer storage IV 734, the digit output counter 736, the group output counter 738, the output sprocket generator 740, the output parallelizer 742 and the output synchronizer control 748.

Upon receipt of a signal calling for an output cycle, a cycle during which a block of information is extracted from a memory channel for recording, the output synchronizer generates a delay interval signal which primes the apparatus but prevents any information transfer until the magnetic tape is up to a speed suitable for recording. During the delay interval the first group of digits is located and inserted into the buffer storage III 732 and the second group is inserted into the buffer storage IV 734.

When the delay interval is complete, a series of synchronizing sprockets are generated by the output sprocket generator 740. As each sprocket is generated, a digit is transferred from a buffer storage to the output parallelizer 742 and is recorded on the magnetic tape. As each digit is recorded, the digit output counter 736 records the count and precesses to permit a new digit to be fed to the output parallelizer 742. For sequence operations, where the recording is from least significant digit to most significant digit the precession is earlier in time, while for nonsequence operations, where the recording is from most significant digit to least significant digit, the precession is later in time.

When all the digits of one buffer storage (each having a capacity of six digits) are recorded, as indicated by the digit output counter 736, the other buffer storage is then unloaded while the first is refilled. During the filling of each buffer storage the group output counter 738 precesses to permit the extracting of a new group from the memory channel into the selected buffer storage. The directions of precession follow the same rules as with digit output counter 736.

The decimal point and carriage return detectors 744 are used to determine the beginning and end of the block of information that is being recorded to provide synchronization and termination signals. When the entire block has been recorded the output synchronizer 222 feeds a signal back to the file processor which permits the start of a new operation.

35. *The output buffer storages (FIG. 29)*

There are two output buffer storages in the output synchronizer 222. Each buffer storage has a capacity of six digits. The buffer storages are alternately filled, six digits at a time, from a selected memory channel. When one buffer storage is filled, the input switches to the other which is then filled.

Each buffer storage when filled is emptied a digit at a tiem and recorded on an output magnetic tape. When one buffer storage is emptied the other buffer storage is connected to the output circuitry and is in turn emptied.

Figure 29:
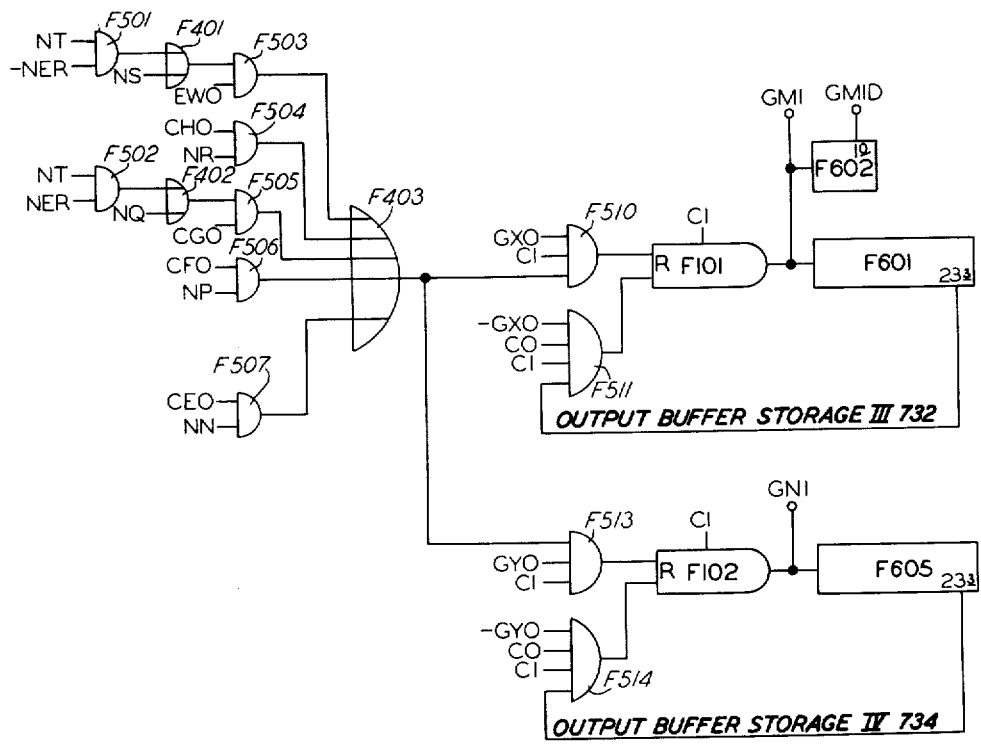
FIGURE 29 is a diagrammatic showing of the Output Buffer Storages.

The output buffer storage III 732 is shown in FIG. 29 as comprising the serially connected reshaper F101, the twenty-three and three-quarter pulse time delay line F601 and the recirculation gate F511 which feeds an intput terminal of the reshaper F101. The second input terminal of the reshaper F101 is the input gate F510. The positive output terminal of the reshaper F101 (the GM1 signal line) in addition to driving the twenty-three and three-quarter pulse time delay line F601 also feeds the one pulse time delay line F602 whose output is the GM1D signal line. The GM1 signal line is considered to be the output terminal of the output buffer storage III 732.

The output buffer storage IV 734 is shown as the serially connected reshaper F102 having the GN1 signal output terminal, the twenty-three and three-quarter pulse time delay line F605 and the recirculation gate F514 connected to an input terminal of the reshaper F102. The second input terminal of the reshaper F102 is connected to the input gate F513. The output terminal of the reshaper F102 (the GN1 signal line) is considered to be the output terminal of the output buffer storage IV 734.

Included with the output buffer storages is the common buffer F403 which feeds both the input gate F510 of the output buffer storage III 732 and the input gate F513 of the output buffer storage IV 734. The common buffer F403 has five input terminals coupled respectively to the gates F503 to F507.

The gate F503 is coupled to the memory channel E210 via EW0 signal line and passes information from this channel during test operations when this channel is forced to read out as characterized by the NS signal operating through the buffer F401. It also operates at all other times when test operations are not in progress (the NT signal will be present at gate F501) except during electromechanical typewriter read-out (the —NER signal characteristic of the read-out will then be present).

The gate F504 feeding the second input terminal of the common buffer F403 receives information from the memory channel D (the CH0 signal) during test operations as characterized by the NR signal.

The gate F505 feeds information from the memory channel C (the CG0 signal) during test operations (the NQ signal feeding the buffer F402) or during read-out operations involving the electromechanical typewriter (the NER and NT signals feeding gate F502).

The gate F506 gates information from the memory channel B (the CF0 signal) during test operations when a forced output of this channel is called for as characterized by the NP signal.

The gate F507 gates information from the memory channel A (the CE0 signal) during test operations when a forced output of the channel (the NN signal) is called for.

The GX and GY signals determine which of the output buffer storages is to receive the information. Only one of the two signals is normally present at one time.

As long as the GX signals are present the output buffer storage III 732 receives information. The GX0 signal fed to the entry gate F510 permits passage of new information from the common buffer F403 while the —GX0 signal fed to the recirculation gate F511 clears out the old information.

Similarly when the GY signals are present the output buffer storage IV 734 is loaded. The GY0 signal feeding entry gate F513 permits the insertion of new information from the common buffer F403 while the —GY0 blocks the recirculation gate F514 to effectively clear out unwanted information. In this manner it is possible to continuously feed digits into the output buffer storage but when the GX or GY signals disappear, only the six last digits transmitted remain trapped in the buffer storage.

36. *The digit output counter (FIG. 30)*

Figure 30:
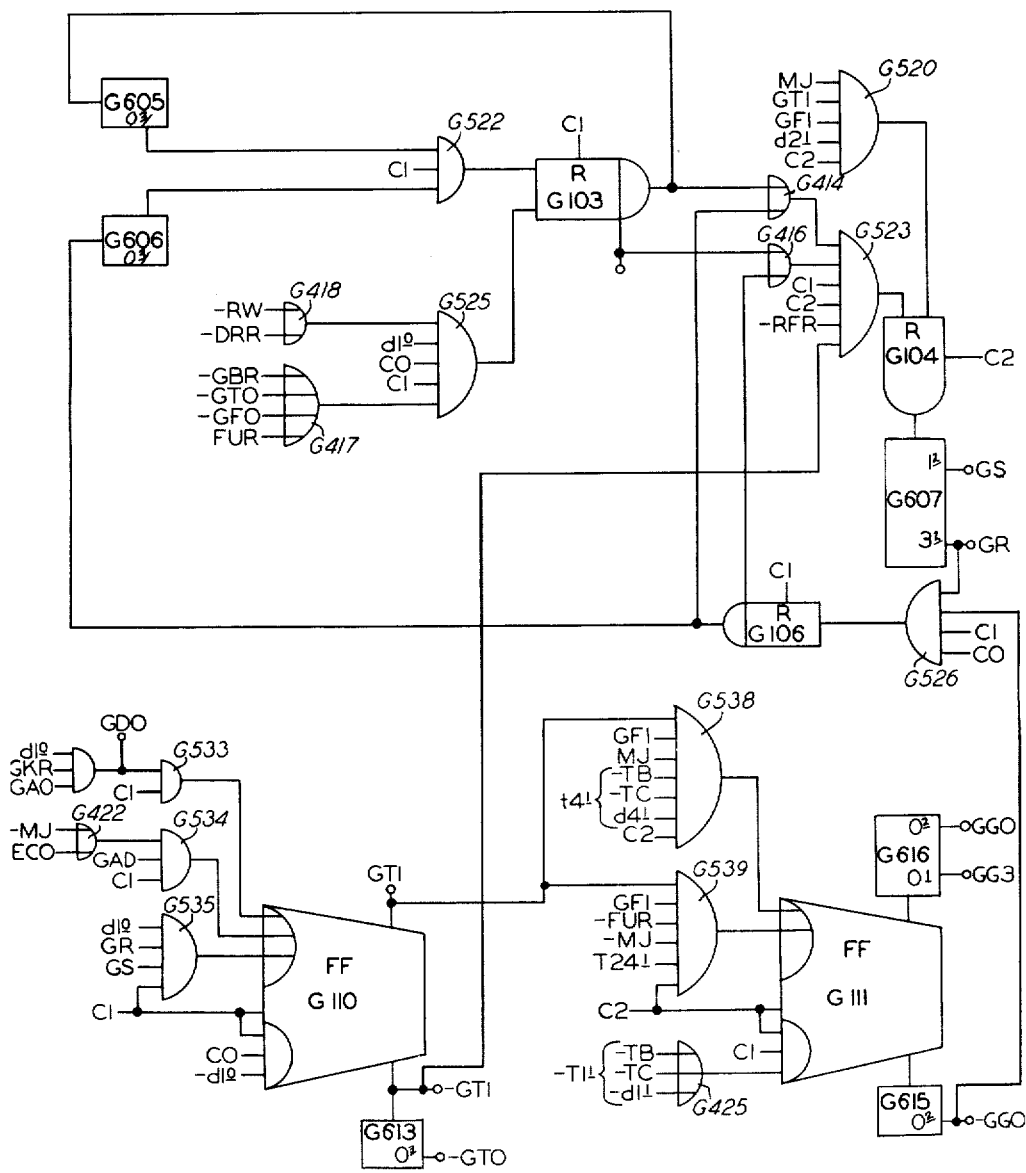
FIGURE 30 is a schematic representation of the Digit Output Counter.

The digit output counter 736 as shown in FIG. 30 is very similar to the digit input counter 720 of the input synchronizer 220 in both construction and function. It is used to extract each digit from an output buffer storage. The extraction must be bidirectional since during sequence operations information is recorded on the magnetic tapes least significant digit first while for all other operations, information is recorded most significant digit first.

For sequence operations, the counter generates a four pulse time gating signal every minor cycle which permits the gating out of the least significant digit in a register whenever a sprocket signal is generated. After each digit is gated out, the gating signal is precessed to occur four pulse times earlier to gat out the digit next higher in significance, etc.

During nonsequence operations, the counter is set up to generate a four pulse time gating signal which first locates the most significant digit in an output buffer storage. When this digit is extracted, the gating signal is precessed four pulse times later and is used to locate the digit next lower in significance.

In either case it is required to know when a buffer storage is completely empty so that the other buffer storage may be emptied while the first is being filled again.

The digit output counter 736 performs the function of synchronously extracting the digits one at a time for a buffer storage. This is accomplished by generating a four pulse time gating pulse nearly every minor cycle. This four pulse time gating is used to gate the first information digit from an input buffer storage. After the first digit is extracted the gating digit is precessed to occur twenty-eight pulse times later for nonsequence operations and twenty pulse times later if a sequence operation is in progress. After the first out of step cycle, the counter again returns to its minor cycle repetition rate. Thus the next lower significant digit is extracted for nonsequence operations while the next higher significant digit is extracted for sequence operations. As each digit is extracted the precession of the four pulse times signal occurs and each succeeding digit is removed from a buffer storage. When the first buffer storage is emptied a switching system is activated which permits the serial removal of the six digits stored in the other buffer storage.

The digit output counter 736, a counter which includes a conventional unit adder and a storage register, counts $d1$ pulses (pulses occurring every four pulse times). When the sixth such pulse is being counted a four pulse time gating signal (GT) is generated which recycles the counter.

Whenever a GT signal occurs along with an output sprocket signal GF (FIG. 32), a digit is gated through and parallelized by the output parallelizer 742. At the same time, the GF sprocket signal prevents one of the unit additions during nonsequence operations or effectively causes an extra unit addition during sequence operations. When a unit addition is prevented, the next GT occurs four pulse times after its normal occurence and when an extra unit addition occurs the next GT is four pulse times earlier than its usual transmission time.

The digit output counter 736 which counts in straight binary notation comprises: a storage register ideally composed of the serially connected reshaper G104 having one input terminal connected to an add two gate G520, the three and one half pulse times delay line G607 with a GR signal terminal at the output of the line, and the recirculation gate G526; and the binary unit adder composed of the sum gate G523 feeding another input terminal of the reshaper G104, the cross connected buffers G414 and G416, the three-quarter pulse time carry delay lines G605 and G606, the augend reshaper G106 being fed by the recirculation gate G526, the add one reshaper G103 being fed by a carry gate G522 and an add one gate G525 which has input terminals connected to the output terminals of the buffers G417 and G418.

The flip flops G110 and G111 are included in the digit output counter 736. The flip flop G110 (the GT signal generator) which is used to detect the sixth addition of a $d1$ pulse signal has the first set gate G523 having one input terminal fed by the gate G532, the second set gate G534 being fed by the buffer G422 and the third set gate G535. The flip flop G111 (the GG signal generator), which detects the extraction of the last or sixth digit from a buffer storage has the first set gate G538, the second set gate G539 and the reset buffer G425.

The apparatus operates as follows: When the file processor is turned on, $d1$ pulses pass through the add one gate G525, and a count of these pulses is accumulated. After the count reaches five, the GR and GS signals fed to the third set gate G535 of the flip flop G110 go positive as the count is to become six by virtue of another $d1$ pulse addition. The GR and GS signals permit the $d1$ signal, also present as an input to gate G535, to pass through the gate G535 and set the flip flop G110 which is reset by a $-d1$ signal four pulse times later. The —GT1 signals at the sum gate G523 causes the clearing of the counter to binary zero. A new count now begins. This counting and clear process continues until an output cycle is called for.

At this time it is necessary to synchronize the output digit counter 736 to the information circulating in the memory channels. During nonsequence operations, the set gate G534 is alerted for a set pulse to set the flip flop G110 and perform the synchronization. The GA0 signal which at this time is a pulse signal occurring before the most significant digit is available from a memory channel, permits the passage of a C1 pulse through the set gate G534 and the GT signals are generated synchronizing the digit output counter 736 so that the most significant digit in a group is read out first.

During sequence operations, when information is read out least significant digit first, the set gate G533 is used to get a synchronization with the occurrence of the least significant digits in a memory channel. The GD0 signal passing through this gate sets the flip flop. The GD0 signal is generated by the gate G532. The gate G532 is alerted by the GA0 signal and when the combination of decimal points and carriage returns at the end of a block is detected the GKR signal occurs permitting the passage of a $d1$ signal which becomes the GD0 signal.

Thus in one case synchronization is locked in on the most significant digit when the output is most significant digit first and in the other case synchronization is locked in on the least significant digit when the output is least significant digit first. In either case, after six digits are extracted from an output buffer storage it is necessary to switch output buffer storages. The detection of the sixth extraction is accomplished by the flip flop G111.

During nonsequence operations, the set gate G539 is operative and the set gate G538 is blocked. During nonsequence operations the sixth extraction occurs with the GT signal encompassing a T24¼ timing signal as a result of the less significant precessions. During sequence operations the sixth extraction occurs with the GT signal encompassing the $t4¼$ timing signal as a result of the more significant precessions. In either case, the GG signals are generated by the setting of the flip flop G111 to indicate six extractions and to initiate means for shifting information flow to and from the output buffer storages.

37. *The group output counter (FIG. 31)*

Figure 31:
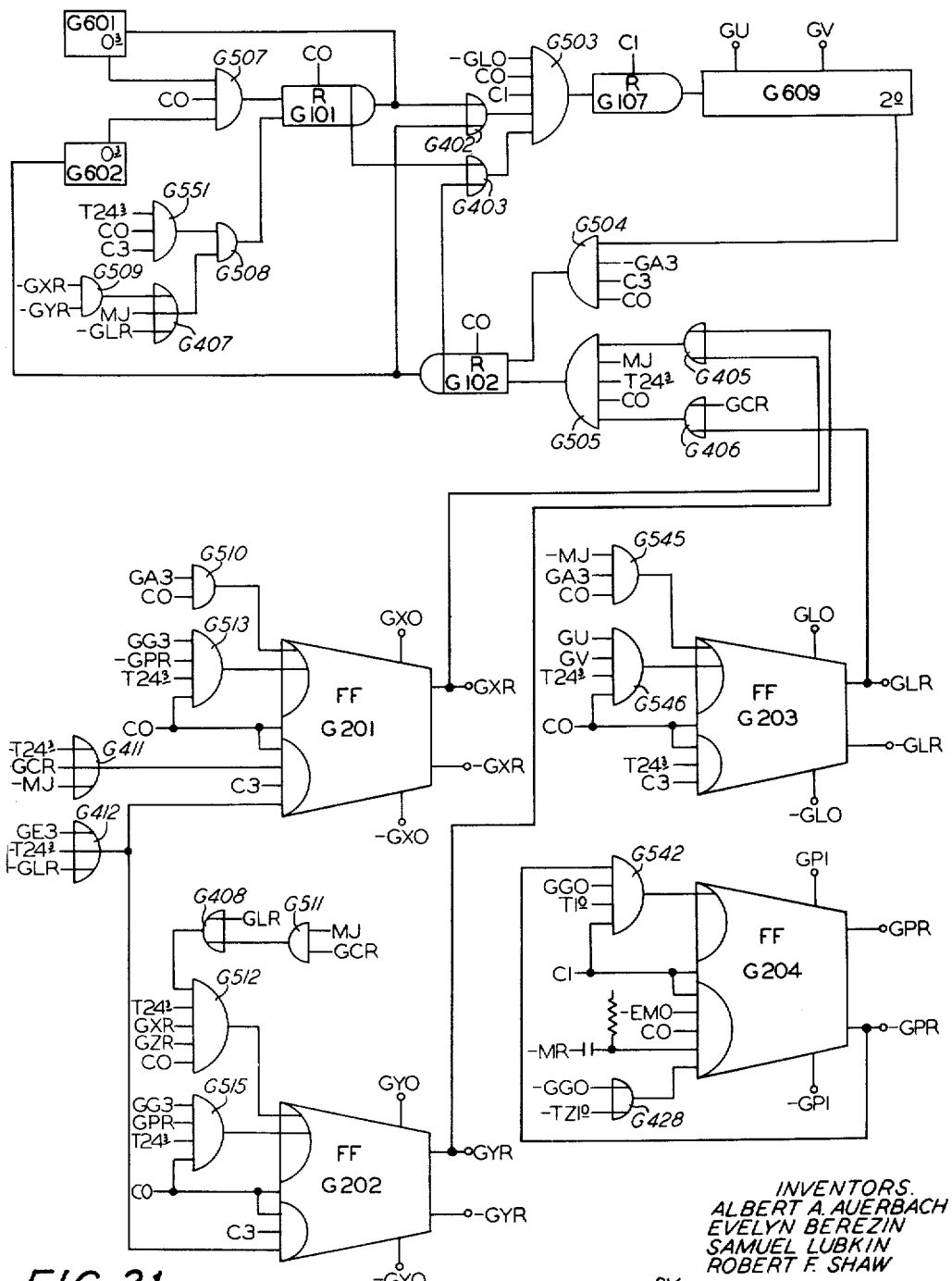
FIGURE 31 is a schematic representation of the Group Output Counter.

The group output counter 738 shown in FIG. 31 functions primarily by counting minor cycles to synchronize the extraction of each group of six digits from a memory channel for placement in the output buffer storages. During nonsequence operations, the synchronization is such that the first group extracted is the six most significant digits stored in a memory channel. The second group is the next six most significant digits, etc. During sequence operations, the first group extracted includes the six least significant digits, the second group the next six least significant digits, etc. Since in one case the extraction occurs from most significant to least significant and in another case from least significant to most significant, two types of synchronization are called for just as with the digit output counter 736.

Once the primary synchronization has been accomplished it is only necessary to count minor cycles and as the count changes from thirty-six to thirty-seven, indicating the completion of a major cycle, the counter is cleared and a new count begun. If initially the group output counter 738 is synchronized for nonsequence operations, the clearing of the counter occurs just prior to the start of a new major cycle. If a group transfer occurs at that time the group extracted will comprise the most significant group position (six most significant digits) of the output memory channel. If also when this transfer occurs the count of one minor cycle is suppressed, then the next thirty-seven count occurs one minor cycle later. The next time a group transfer from the memory channel to an output buffer storage occurs the group transferred will be from the next most significant group position of the memory channel. The suppression of a minor cycle count during a transfer permits the precession of a gating signal to one group time lower in significance.

If, however, initially the group output counter 738 is synchronized for sequence operations, the clearing operation occurs just as the least significant digits are available for output in the memory channel. This is accomplished by detecting the end of block characters (the decimal points and carriage returns). Then when the first group transfer occurs, this group will be extracted from the memory channel and transferred to one of the output buffer storages. If also when this transfer occurs, one is effectively added to the minor cycle count then the next thirty-seven count occurs one minor cycle earlier. The next time a group extraction occurs, the group extracted will be from the next least significant group position in the memory channel because the effective addition of one in the minor cycle count during a transfer permits the precession of the gating signal to one group higher in significance.

Since there are two output buffer storages associated with the output synchronizer and these storages are alternately transferred to and emptied it is necessary to provide switching apparatus which alternately fills the output buffer storages and alternately empties them after filling. Apparatus is provided which permits the memory channel to be switched between the two output buffer storages. Apparatus is also provided which permits the output buffer storages to be alternately coupled to the general output circuits of the output synchronizer.

The group output counter 738 has a unit adder and a storage register similar to the digit output counter 736. The group output counter 738 counts minor cycles as represented by the T24¾ pulses and when the count in the group output counter results in a count of thirty-seven, the counter is cleared to zero and the count starts over.

The group output counter 738 comprises a recirculation register composed of the serially connected reshaper G107, the 5½ pulse time delay line G609 having a GU tap ²⁄₄ of a pulse time down the line and a GV tap 3½ pulse times down the line and the recirculation gate G504; and a unit adder composed of the sum gate G503, the ¾ pulse time carry delay lines G601 and G602, the cross connected buffers G402 and G403, the augend reshaper G102 having one input terminal connected to the recirculation gate G504 and a second input terminal connected to the add one gate G505 which is fed by the buffers G405 and G406, the addend reshaper G101 having one input terminal connected to the add one gate G507 and a second input terminal connected to the add one gate G508 which receives signals from the gate G551 and the buffer G407 which is connected to the gate G509.

Included in the group output counter 738 is the flip flop G203 having a first set gate G545 and a second set gate G546. The flip flop G203 generates the GL signals which indicate that a count of thirty-seven has been reached. Also included is the flip flop G204 having a set gate G542 and a reset buffer G428. This flip flop generates the GP signals that control which one of the two output buffer storages is to be unloaded. The flip flop G201 having the set gates G510 and G513 and the reset buffers G411 and G412 is also part of the group output counter 738. The flip flop G201 generates the GX signals which when present insure that the information being transferred from a memory channel enters the output buffer storage III 732, similarly the flip flop G202 having a first set gate G512 which is connected to the buffer G408 which in turn is connected to the gate G511; said flip flop also has a second set gate G515 and generates the GY signals which when present insure that the information being transferred from a memory channel enters the output buffer storage IV 734.

The group output counter operates on nonsequence operations as follows: In synchronism with the appearance of the most significant digit at the output of a memory channel, the GA3 signal as a single pulse signal occurring just before the start of the first minor cycle of a major cycle operates through the set gate G545 to set the flip flop G203 which generates the GL signals for one minor cycle. The —GL0 signal fed to the gate G503 clears the storage register. At the same time, the GA3 signal fed to the set gate G510 sets the flip flop G201 generating the GX signals and the six most significant digits enter the output buffer storage III 732. At the end of this first major cycle, a GLR signal acting through buffer G408 and a T24¾ signal at set gate G512 set the flip flop G202 causing the generation of the GY signals opening an entry path from a memory channel to the output buffer storage IV 734. This is followed by a —GLR and a —T24¾ resetting flip flop G201 via buffer G412, thus trapping the six most significant digits in the output buffer storage III 732. At the same time the —GXR acting through the gate G509 cooperates with the —GLR (the MJ is absent and negative) via the buffer G407 to prevent a minor cycle unit addition of a T24¾ from gate G551 at the add one gate G508. It now takes thirty-eight minor cycles to reach a thirty-seven count and a less significant precession occurs.

As the thirty-seven count is reached, the GU and GV signals (taps on the delay line G609) pass a T24¾ pulse through the set gate G546 yielding a second GL signal. The —GLR acting through the buffer G412, resets the flip flop G202 with a —T24¾ pulse signal. The disappearance of the GY signals at this time traps the second most significant group in the output buffer storage IV 734. Both the output buffer storages are now loaded and must be emptied. The digit output counter 736 heretofore described, controls the digit by digit unloading. The selection of the buffer being emptied is determined by the GP signals generated by the flip flop G204 acting as a binary counter.

The —EM0 signal fed to a reset terminal of the flip flop G204 initially resets the flip flop. The absences of the GP signals cause the output buffer storage III 732 to empty first. As the sixth digit is removed, the GG signal from flip flop G111, characteristic of the removal of this digit, is generated in the digit output counter 736. The GG0 signal cooperating with the absence of the —GPR signal, sets the flip flop G204 via the set gate G542 causing the generation of the GP signals which permit the digit by digit unloading of the output buffer storage IV 734.

At the same time the GG3 signal cooperates with the absence of the —GPR signal at the set gate G513 again setting the flip flop G201. The GX signals so generated permit the information from a memory channel to enter the buffer storage III 732.

Whenever the next thirty-seven count occurs, a —GLR is generated which causes the usual precession and resets, via the buffer G412, the flip flop G201 trapping the third most significant group in the output buffer storage III 732. After the output buffer storage IV 734 is emptied, another GG signal is generated and the GG3 signal cooperates with the GPR signal at the set gate G515 to set the flip flop G202 causing the generation of the GY signals which permit memory channel information to enter the output buffer storage IV 734. At the same time, the —GG0 signal acting through the reset buffer G428 resets the flip flop G204 terminating the GP signals since the —GPR signal then present at gate G542 prevents the GG0 signal from holding flip flop G204 set and the buffer storage III 732 is readied for emptying. In this manner, the flip flop G204 counts GG signals to alternately connect the output buffer storages to the output circuitry.

The GL signals initiating of the reset of the flip flops G201 and G204 along with the GG and GP signals initiating the setting of these flip flops, determine the alternate generation of the GX and GY signals which control the loading of the output buffer storages.

It should be noted that the —GXR and —GYR signals fed to the gate G509 are used with the —GLR signal at the buffer G407 to suppress a unit addition whenever a group transfer from a memory channel occurs to cause a less significant direction precession during nonsequence operations (MJ signal is negative at this time). In this manner a channel is emptied. The alternations of the GX and GY signals occur until a GE signal, indicating the block has been completely read out, is generated in the hereinafter described output decimal point and carriage return detector 744 to lock both the flip flops G201 and G202 in a set condition by overriding the negative signals —GLR and —T24¾ at buffer G412.

For sequence operation, the apparatus works in approximately the same manner except that since the information is read out least significant digit first it is necessary to start with the least significant digit group and precess upward.

The operation starts with the occurrence of the GA3 signal which is present until the least significant digits are located in a memory channel. The GA3 signal acting through set gate G510 sets the flip flop G201 causing the generation of the GX signals which permit information to enter the buffer III 732. The —GA3 fed to the gate G504 maintains the counter cleared to zero.

When the decimal points and carriage returns associated with the end of a block are detected, the —GA signal disappears and the GC signals are generated. The disappearance of the —GA3 at the recirculation gate G504 at this time synchronizes the thirty-seven counter. The —GCR signal permits the passage of a —T24¾ pulse through the reset buffer G411 (the —MJ is present and negative during sequence operations) causing the resetting of the flip flop G201. The termination of the GX signal traps the least significant group in the buffer storage III 732. This group may not contain six digits but it will at least contain the least significant digit in a block (the second check digit).

At the same time, the GCR signal in the presence of the MJ signal at gate G511, acts through buffer G408 to cooperate with a GXR signal at set gate 512 to pass a T24¾ pulse which sets the flip flop G202 causing the generation of the GY signal. The GY signal permits information to enter the buffer storage IV 734. In addition, the GCR signal passes through buffer G406 and cooperating with a GXR signal from buffer G405 forces a count of one into the unit adder (the count instead of being cleared to zero is cleared to binary one). It is now only necessary to count thirty-six minor cycles to generate the GL signal. Thus a more significant precession is obtained. The GL signals function in the same manner as described above. From this point on the operation is similar to nonsequence operations except the more significant group precessions occur for each group transfer. The MJ signal fed to buffer G407 prevents the add one suppression while the MJ at gate G505 causes the unit adder to be cleared to binary one instead of binary zero whenever a group transfer occurs.

Figure 33:
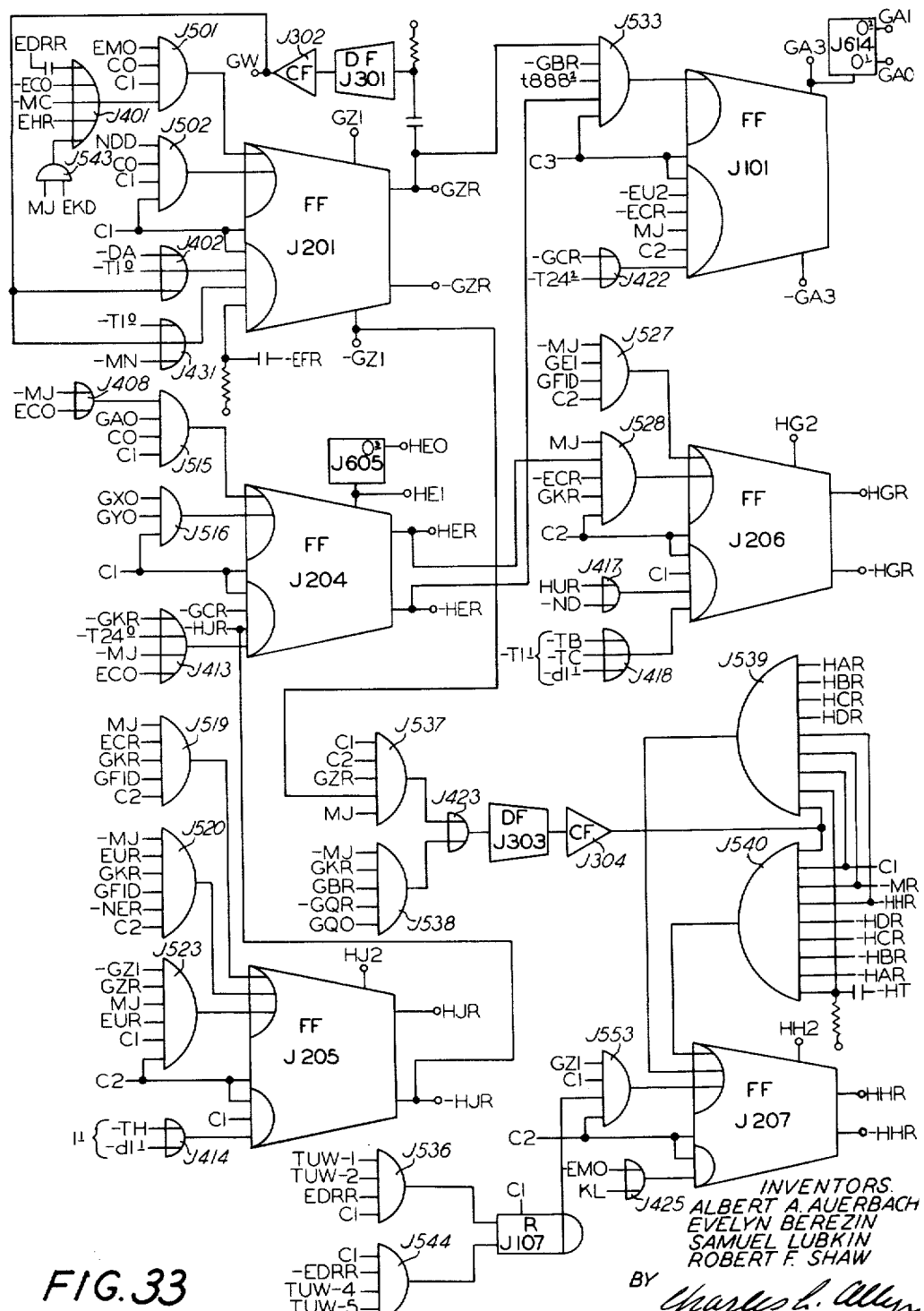
FIGURE 33 is a schematic showing of the circuits in the Output Synchronizer Control.

38. *The output synchronizer control* (*FIG. 33*)

The output synchronizer control 748 as shown in FIG. 33 is a group of circuits whose chief functions are: to provide a suitable time delay at the start of an output operation primarily for the output tapes to come up to a suitable writing speed; to provide a signal upon the location of the first digit in a memory channel that is to be recorded; to provide a signal which causes the automatic writing of decimal points (two at the start of a block of information and three at the end of a whole tape of information); to provide a signal which indicates to the remainder of the file processor that a block of information has been recorded; and to provide an error signal whenever any digit except a check digit is written which contains all zeros (0000) or all ones (1111), and whenever the write relay in the circuit between the input of the tape unit and recording head is open.

The up to speed time delay circuits include: the flip flop J201 having the set gate J501 being fed by the buffer J401 which in turn receives signals from the gate J543; the set gate J502 and the reset buffers J402 and J431; the delay flip flop J301 which generates a delay interval greater than five milliseconds; and the cathode follower J302.

When a signal is passed by either of the set gates J501 or J502 the flip flop J201 is set and generates the GZ signals which indicate the magnetic tapes are starting up. The positive GZR signal is differentiated and fed to the delay flop J301 which is triggered to an on state for a time interval of at least five milliseconds. The output of the delay flop J301 is coupled to the cathode follower J302 which provides a low impedance output for the delay flop signal GW. The GW signal generated by the cathode follower J302 is fed to an input terminal of both reset buffers J402 and J431. When the delay flop J301 returns to its reset state after about five milliseconds the GW signal goes negative and the next —T1 signal synchronously resets the flip flop J201 terminating the GZ signals.

When the output cycle is a normal automatic output cycle, the set gate J501 is used (the EM0 signal is characteristic of this type of operation). When the output cycle will be manually called for, particularly during test operations, the set gate J502 is used (the NDD signal characteristic of manual read out operations controls this gate).

The flip flop J101 is used to synchronize the output synchronizer with the location of the first bit of information to be drawn from a memory channel. During nonsequence operations where the output is to be most significant first, the first bit of information is the most significant bit of information stored in a memory channel. Timewise, this bit immediately follows a t888¾ pulse signal. Therefore, as the tapes are coming up to speed (the presence of a GZR signal) and before the forced writing of the decimal points occur (the absence of the —HER signal) and before any information is actually transferred (the absence of the —GBR signal), a pulse ($t888\frac{2}{4}$) passes through the set gate J533 to give a GA signal. Since, a nonsequence operation is in progress, the MJ signal which is equivalent to the MA signal during non readout operation is absent at a reset terminal of the flip flop J101 and therefore the flip flop is effectively reset after transmitting the single pulse. This single GA pulse signal is fed to units of the output synchronizers, for example, the counters, to synchronize them with the memory channel storing the information to be recorded.

During sequence operations where the output operation is least significant digit first, the first bit of information recorded is the least significant bit of the second check digit following the end of block markers. The flip flop J101 is set via the set gate J533, but since the MJ signal is now present at a reset terminal a whole train of GA pulses is generated. Finally, when the second end of block marker is detected by the output decimal point and carriage return detectors 744, see FIG. 35, a —GCR signal is generated and fed to the reset buffer J422 where, cooperating with a —T24$\frac{2}{4}$ pulse signal, it synchronously resets the flip flop J101 terminating the GA signals. The termination of GA signals in this case is used to synchronize the output counters with the memory channel.

The forced writing of the two decimal points at the start of a block of information and the forced writing of three decimal points at the start of a pass of magnetic tape, is controlled by the flip flop J204 which generates the HE signals. The set gate J515 is used to set the flip flop J204 for the writing of the three decimal points at the start of a pass (characterized by the ECO signal acting through the buffer J408). The set gate J515 is also used to set the flip flop J204 for the writing of the two decimal points at the start of a block of information (note the absence of the —MJ signal at the buffer J408 and the GA0 signal feeding an input terminal of the set gate J515). During sequence operations, the set gate J516 is employed. After all the information has been recorded on magnetic tapes both the GX0 and GY0 signals are generated by the group output counter 738, FIG. 31. The simultaneous occurrence of these signals indicates that the most significant digit of the block of information has been recorded and it is now necessary to record the prefixing decimal points.

The resetting of the flip flop J204 is determined by the type of decimal point writing that occurred. During nonsequence operations, the recording of the second decimal point associated with a block of information is noted by the occurrence of a —GCR signal at a reset terminal of the flip flop J204. During sequence operations, the reset buffer J413 is operative. The recording of the second decimal point is noted by the occurrence of the —GKR cooperating with a —T24 signal and a —MJ signal (present during sequence operations).

For the three decimal point writing, associated with the start of a pass, the EC0 signal controls and essentially negates the effect of the —GKR signal at the reset buffer J413. Instead as the third decimal point is recorded a —HJR signal (to be discussed immediately below) is generated and its occurrence at a reset terminal, resets the flip flop J204 terminating the generation of the HE signals.

The flip flop J205 which generates the HJ signals is intimately associated with the flip flop J204 during the writing of the three decimal points indicating the end of a reading pass. It should be noted that during nonsequence operations, a tape is read after it has been rewound therefore if the three decimal points are written at the end of a pass they will be read (after a rewind) at the end of a pass. Whereas during sequence operations where no rewind occurs between writing and reading, the three decimals are recorded at the start of a writing pass so that they will be read at the end of a reading pass.

During nonsequence operations, the set gate J520 is operative. The EUR signal, a signal indicating the end of a pass, alerts the gate so that as the third decimal point is being set up by the synchronizing sprocket (GF1D), (the GKR signal indicates the second demical point has been written), the flip flop J205 is set generating the HJ signals which reset the flip flop J204 terminating the decimal point force.

During sequence operations, the set gate J519 is activated by the start of pass signal ECR and as the third decimal point is being set up (note the GKR and GF1D signals) the flip flop J205 is set generating the HJ signals which terminate the decimal point force. In either case, the reset buffer J414 under the control of timing signals resets the flip flop J205 during the first pulse time of the next major cycle.

The set gate J523 is used to set flip flop J205 during a spacing operation at the end of a sequence pass. Both output magnetic tapes are started up and then let coast to a stop to permit a suitable acceleration distance for the next reading pass. Although no decimal points are written at this time the HJ signals are required to terminate the pass and initiate the reverse pass.

The flip flop J206 is used during the end of the recording of each output block, to terminate an output cycle. During nonsequence operations, the set gate J527 is operative and starts the generation of the HG signal just as the second check digit is recorded (the GE1 and GF1D signals). During sequence operations, the set gate J528 is operative and initiates the generation of the HG signals just as the second decimal point is recorded (the GKR and HER signals). Note the —ECR signal distinguishes this case from the writing of the second decimal point in the three decimal point force at the start of a pass during sequence operations. In either case, the timing signals feeding the reset buffer J418 provide a synchronizing reset. The reset buffer J417 is used during the read out operation associated with machine testing and is not relevant at this time.

The error circuitry of the output synchronizer comprises the flip flop J207 having the set gates J539, J540 and J553 and the reset buffer J425. The set gates J539 and J540 are both coupled to the output of the cathode follower J304 being fed by the three hundred microsecond delay flop J303 which is triggered by the buffer J423 connected to the gates J537 and J538. The set gate J553 is coupled to the negative output of the reshaper J107 which receives signals from the gates J536 and J544.

The error circuitry checks for two types of errors: the recording of a forbidden combination of bits, or the malfunctioning of a relay which connects the recording amplifiers to the recording heads.

There are two forbidden combinations of four bits, namely, binary fifteen (1111) or the writing of all ones and binary zero (0000) or the writing of all zeros. No character in a block whether alphabetic, numeric or formal contains these two combinations except the check digits which are pure binary numbers. The error check circuitry is active during the entire recording operation but is disabled during the recording of the check digits.

The set gates J539 and J540 perform the forbidden combination checks. The set gate J539 tests for the simultaneous presence of the HAR, HBR, HCR and HDR signals which indicate the combination (1111). The set gate J540 tests for the simultaneous absence of the —HAR, —HBR, —HCR and —HDR signals which indicate the combination (0000). The test is accomplished by the —HT signal feeding both gates. This signal is terminated while the flip flops of the output parallelizer 742 are set up. The termination of the —HT signal feeds a positive transient pulse to both the set gates.

One input of each of the set gates J539 and J540 is coupled to the output of the cathode follower J304 which acts as an impedance transformer for the delay flop J303. Whenever the delay flop J303 is triggered a three hundred microsecond negative pulse effectively blocks the two set gates. This inhibiting signal is caused to occur just prior to the recording of the first check digit and will be present until after the recording of the second check digit. During sequence operations the gate J537 is used to trigger the delay flop J303. It should be noted that the check digits are the first digits recorded during a sequence operation and that the recording operation starts when the magnetic tapes are up to speed as characterized by the disappearance of the GZ signals. Hence as the GZ signals disappear, the GZR and the —GZ1 cooperate to pass a positive transient through the gate J537.

During nonsequence operations, the gate J538 serves as a trigger source to pulse the delay flop J303 after the second end of block character is recorded as characterized by the GKR and GBR signals.

The third set gate J553 of the flip flop J207 operates while the magnetic tapes to be recorded on are coming up to speed (note the GZ1 signal) to test whether the read-write relay in the selected tape unit for recording is in the write position.

When the selected tape units are the tape units I and II the gate J536 is operative, if the associated relays are in the write positions, positive potentials will be present on the lines TUW–1 and TUW–2 and a series of pulses are fed to the reshaper J107 which then inhibits the set gate J553. If however, either of the relays is not in the write position a negative voltage is present on either or both of the lines and the reshaper J107 is not pulsed and therefore the set gate J553 is not blocked. When the selected tape units are the tape units IV and V the gate J544 operates in a similar manner. The EDRR and —EDRR signals feeding gates J536 and J544 determine the selection of the tape units.

39. Output sprocket generator 740 (FIG. 32)

Figure 32:
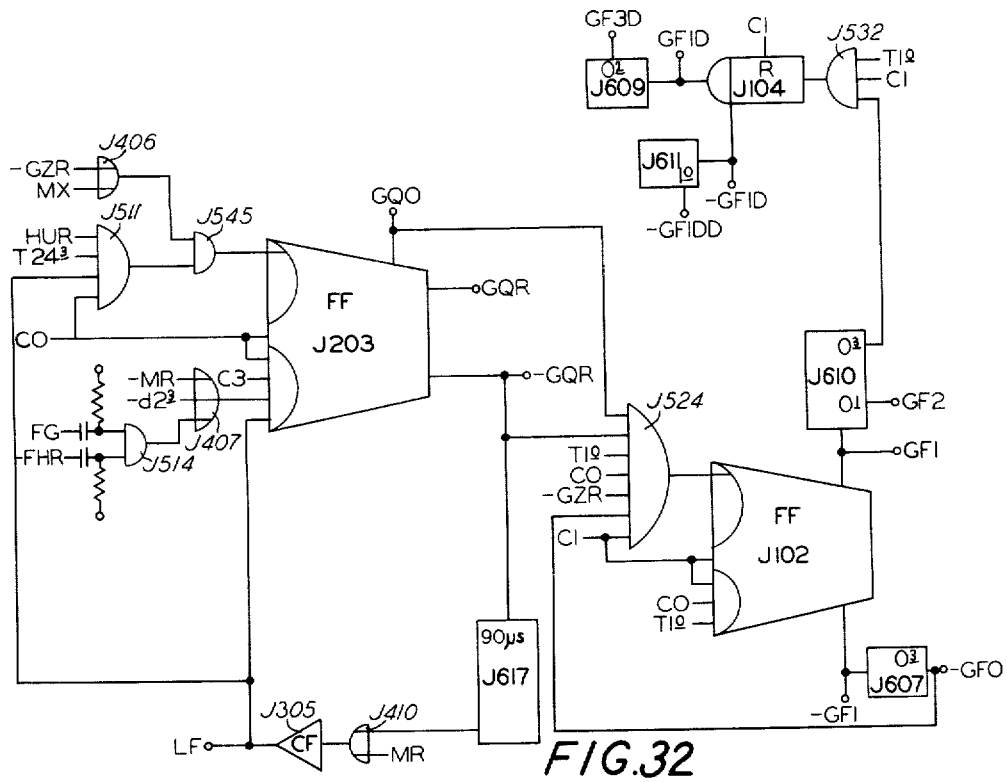
FIGURE 32 is a diagrammatic showing of the circuits in the Output Sprocket Generator.

The output sprocket generator 740 as shown in FIG. 32 which controls the rhythm for recording digits is actually a highly sophisticated bistable square-wave generator. It is a free running device having a period of approximately one hundred six microseconds. When turned on it will generate square waves in synchronism with a multiple of minor cycles and continues to generate the waves until reset. The apparatus comprises: the flip flop J203 having the set gate J511, and the reset buffer J407 which is fed by the gate J514; the eighty microsecond delay line J617; the buffer J410; the cathode follower J305; the flip flop J102 having the set gate J524; the three quarter pulse time delay J607; the three quarter pulse delay line J610; the reshaper J104; the two quarter pulse time delay line J609; and the one quarter pulse time delay line J611.

At the start of an output operation the HUR signal from the control unit 216 alerts the set gate J511 so that when the tapes are up to speed as indicated by the disappearance of the —GZR signal at the buffer J406 a T24³4 signal sets the flip flop J203 causing the generation of the GQ signals.

A —GQR signal is fed into the delay line J617. Ninety microseconds later the leading edge passes through the buffer J410 to the cathode follower J305 which starts generating a negative signal that blocks the set gate J511 and also resets the flip flop J203 via one of its reset terminals.

Thus a ninety microsecond GQ signal has been generated. For the next ninety microseconds the output of the cathode follower J305 is at a negative potential. At the end of ninety microseconds the output of the cathode follower J305 goes positive and the set gate J511 is alerted. The next T24³4 that occurs sets the flip flop J203 and the cycle is repeated. This cycle of setting and resetting continues until the end of the output operation at which time the HUR signal feeding the set gate J511 disappears and the set gate is blocked until another output operation is initiated.

When keyboard output by the electromechanical typewriter is called for, the MR signal at buffer J410 and the —MR signal at the reset buffer J407 take over to cause the generation of a square wave compatible with the electromechanical typewriter printing cycle.

Each time the GQ signals are generated, the GQ0 and —GQR signals are fed to the set gate J524 where they continue to generate a positive going transient which permits a T1 pulse to set the flip flop J102 causing the generation of the GF signal. The next —T1 that occurs resets the flip flop J102. Thus every one hundred eighty microseconds, a one minor cycle (GF) is generated which is used in the output synchronizer as the synchronizing sprocket. A whole family of GF signals are generated having different phases and delays to satisfy circuit and timing considerations throughout the output synchronizer, but they are all basically similar to the signals generated by the flip flop J102.

Figure 34:
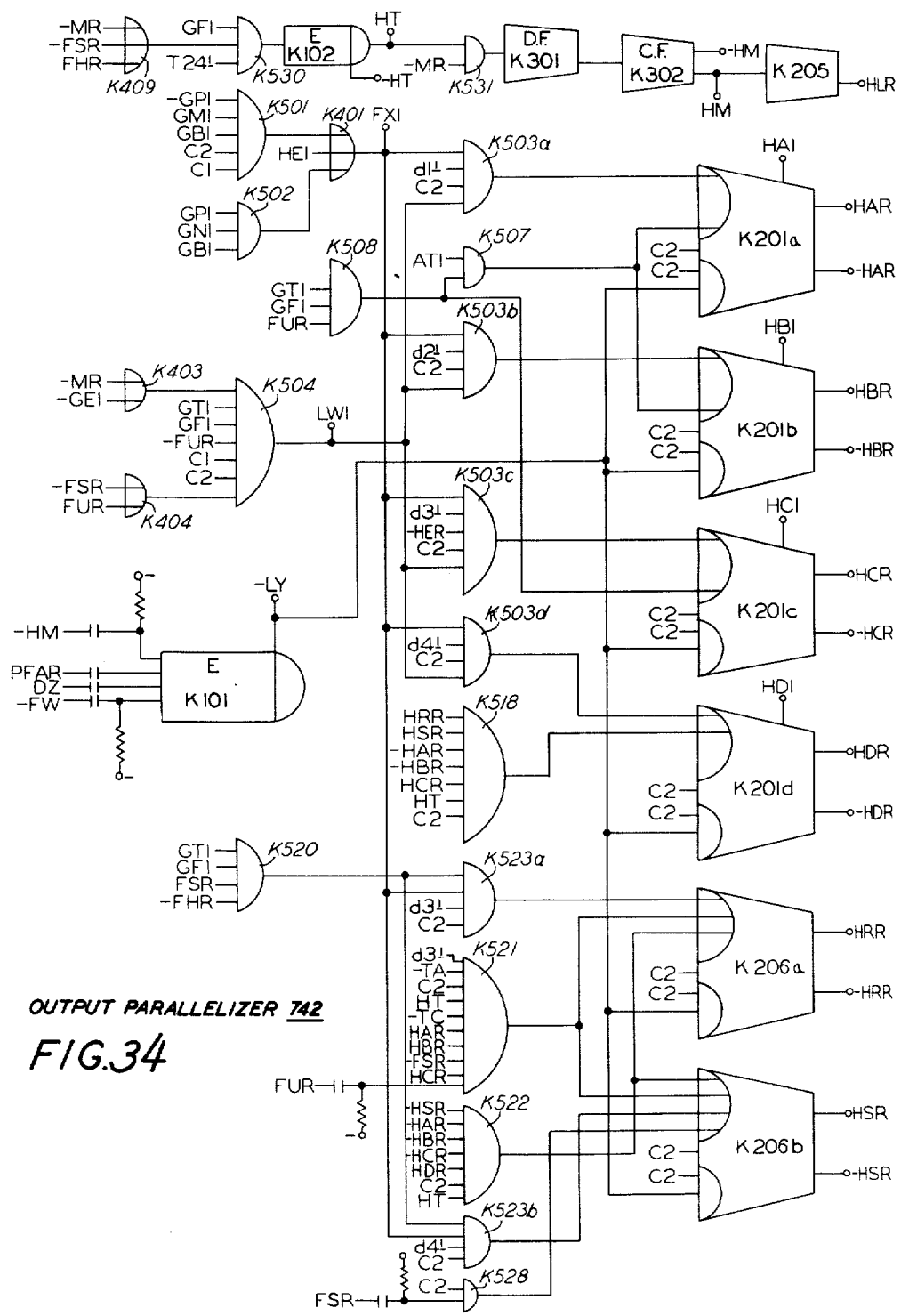
FIGURE 34 is a schematic showing of the Output Parallelizer.

40. Output parallelizer 742 (FIG. 34)

The output parallelizer 742 receives serial information from the output buffer storages and converts this information into parallel form for recording on the magnetic tapes or for external output to an electromechanical typewriter.

During magnetic tape recording, four bits for each digit enter the output parallelizer 742 and set appropriate numeric flip flops. At the same time a recording sprocket pulse is generated by a recording sprocket pulse generator. The outputs of the four numeric flip flops and the recording sprocket pulse generator are fed to a preselected magnetic tape and the signals from the above sources are recorded on parallel channels of the magnetic tape. The termination of the recording sprocket pulse is used to reset the numeric flip flops which are then ready to accept the next four bits.

Since each block of information must be preceded by two decimal points and these decimal points at the start of a block are not stored in the memory channels, special circuitry is included to force the writing of decimal points (1101).

When the output parallelizer 742 is used to activate the external output units as characterized by the presence of the MR signals the structure of the characters may be of two kinds. A pair of four bit digit units constitutes alpha-numeric characters and a single unit of four bits constitutes purely numeric characters. The setting up of numeric characters is handled in essentially the same manner as the recording of a four bit digit on magnetic tape.

The alpha-numeric characters are treated slightly differently. When alpha-numeric words are handled, the most significant digit position (the sign position) contains a comma indicating that the ten following units of four bits are to be handled in pairs. The first unit of the pair is used to activate the zone flip flops and after they are set up the second unit of the pair then activates the appropriate numeric flip flops. After both the zone and the numeric flip flops are set up and a sprocket pulse initiated, the alpha-numeric character is gated into the appropriate external output unit. The termination of a sprocket signal from the output unit is used to reset the zone and numeric flip flops.

On electromechanical typewriter output operations, which are primarily unedited output operations, it is necessary to change some characters which control the format of the printed information into recognizable printed characters. This is accomplished by decoding the outputs of the flip flops for particular combinations and as a result of the decoding, other flip flops are set to print special characters.

The special characters so handled are the actual tabulating operation, which is converted to a "TA" symbol, the actual carriage return operation which is converted to a "CR" symbol and the actual blank operation (non-print) which is converted to a "BL" symbol.

The output parallelizer 742, see FIG. 34, comprises: the four numeric flip flops K201a to K201d having the respective set gates K503a to K503d; the common buffer K401 feeding these set gates, the entry gate K501 from the output buffer storage III and the entry gate K502 from the output buffer storage IV, both feeding the common buffer K401; the numeric control gate K504 also feeding the set gates K503a to K503d and being fed by the buffers K403 and K404; the space between word control gate K507 coupled to input terminals of the flip flops K201a and K201b; the "TA" gate K518; the zone flip flops K206a and K206b having the set gates K523a and K523b; the reset pulse extender K101 feeding the reset terminals of the numeric flip flops K201 and the zone flip flops K206; the zone control gate K520 feeding input terminals of the set gates K523a and K523b; the "CR" gate K521 feeding set terminals of the flip flops K206a and K206b; the "FL" gate K522 feeding other set terminals of the zone flip flops K206a and K206b, the "comma" gate K528 feeding a third set terminal of the flip flop K206b; and the output sprocket generator composed of the serially connected buffer K409, the gate K530, the pulse extender K102, the gate K531, the seventy-five microsecond delay flop K301, the two phase cathode follower K302, and the D.C. amplifier K205.

During magnetic tape operations, four bits of information are read into the numeric flip flops K201a to K201d via either the entry gate K501 or the entry gate K502 depending upon the presence or absence of the GP signal as described in the section on the group output counter 738. When the GP signals are absent the —GP1 signal at the entry gate K501 is positive and the information as the GM1 signal is fed from the output buffer storage III 732, whereas when the GP signal is present, the GP1 signal at the gate K502 is positive and information signals are fed as the GN1 signals from the output buffer storage IV 734 through the entry gate K502. The GB1 signal feeding both of these gates is present only during the actual information transfer.

The numeric control gate K504 feeding all the set gates K503 is used to select the specific digit from the entire group of six digits circulating in the output buffer storages. This is accomplished by the coincidence of the GF1 and the GT1 signals feeding this gate. GT1 signal is a four pulse time gating signal which precesses from digit to digit (see the section on the digit output counter 736). The buffer K404 which feeds the numeric control gate K504 is used to select the numeric portion of an alpha-numeric character. The —FSR signal feeding this buffer is present for all alpha-numeric characters and the FHR signal feeding this buffer overrides the —FSR signal during the second or numeric portion of an alpha-numeric character. During magnetic tape recording on pure numeric output the —FSR signal is absent.

In any case, the four bits of a digit are fed to all of the set gates K503a to K503d. It is then necessary to pick out the bit appropriate to each numeric flip flop K503. This is accomplished by the d signals feeding the set gates K503a to K503d. In particular the d1¼ signal fed to the set gate K503a will set the numeric flip flop K201a generating the HAR signal whenever a pulse is present in the most significant bit position of a digit. The d2¼ signal feeding the set gate K503b will set the numeric flip flop K201b generating the HBR signal whenever a pulse is present in the second most significant bit position of the digit being read out. The d3¼ signal feeding the set gate K503c will set the numeric flip flop K201c generating the HCR signal whenever a pulse is present in the third most significant bit position of a digit. And the d4¼ signal feeding the set gate K503d will set the numeric flip flop K201d generating the HDR signal whenever a pulse is present in the least significant bit position of the digit read out.

It should be noted that the common buffer K401 also feeds the zone flip flops K206a to K206d. Although the zone digit is stored in the memory channels as four bits only two of the four bits are required to set up the zone characters in the electromechanical typewriter. Therefore, only the two least significant bits of a digit require decoding. The zone control gate K520 governs the setting of the zone flip flops K206. During alpha-numeric operations the FSR signal is always present alerting the zone control gate K520. The —FHR signal feeding this gate is absent during the setting up of the zone portion of an alpha-numeric character. After the zone portion is set up, the —FHR signal is present and the gate is blocked. The numeric digit portion of the alpha-numeric character is then set up in the numeric flip flops K201 (see the FHR signal on buffer K404) feeding the numeric control gate K504.

When a pulse is present in the third most significant digit position of the zone portion of an alpha-numeric character the d3¼ signal feeding the set gate K532a, sets the zone flip flop K206a causing the generation of the HRR signals. Likewise, when a pulse is present in the least significant bit position of the zone portion of an alpha-numeric character, the d4¼ signal sets the zone flip flop K206b causing the generation of the HSR signals.

While these signals (the HAR, HBR, HCR, HDR, HRR, HSR signals) are being set up, a recording sprocket is generated. During magnetic tape output operations, the —MR signal is not present at the buffer K409, therefore the gate K530 is alerted to permit the passage of a T24¼ pulse signal (whenever an internal synchronizing sprocket, characterized by the GF1 signal, is present) to generate the HT signals by the pulse extender K102. The HT signal passes through the gate K531 to set the seventy-five microsecond delay flop K301 causing the generation of a seventy-five microsecond pulse which is amplified by the cathode follower K302 becoming the HM signal which drives the D.C. amplifier K205 yielding an HLR signal. The HLR signal is recorded as a seventy-five microsecond pulse on the sprocket channel of a magnetic tape. At the end of the seventy-five microseconds, the —HM signal goes positive passing a positive transient into the pulse extender K101 generating a negative pulse LY that is fed to the reset terminals of all the numeric and zone flip flops which resets any of these flip flops that have been set. It should be noted that the DZ signal which occurs at the start of any output operation is fed to the extender K101 to provide an initial clear of the flip flops.

During electromechanical typewriter output operations, the —MR signal is present at the buffer K409 and the buffer becomes dependent upon the state of the —FSR and the FHR signals which also feed this buffer. When the external output operation is purely numeric, the —FSR signal is absent and the gate K530 is alerted to cause the generation of an HT pulse in the same manner as during a magnetic tape operation. The HT signal is fed to the external output circuitry causing the generation of a sprocket pulse for the writing of a character by the external output circuitry. This sprocket pulse is characterized by the FW signal from the typewriter control circuits, FIG. 37. With the disappearance of the FW signal, the —FW goes positive causing a positive transient to be fed to the extender K101 which in turn resets the numeric and zone flip flops.

During alpha-numeric typewriter operations the —FSR signal is present and the buffer K409 becomes dependent on the FHR signal feeding the third input terminal of this buffer. The FHR signal is present during the setting up of the numeric portion of an alpha-numeric character. Thus when the second digit of the alpha-numeric character is set up the GF1 signal associated with this portion permits the passage of a T24¼ pulse through the gate K530 causing the generation of an HT signal which functions in a previously described manner.

The situations for handling special characters will now be described. During alpha-numeric operations whenever a character characteristic of a tabulating operation is encountered, it is necessary to change this to the printing of a "TA" character by operation of a special "TA" printing key. This is accomplished by forcing the setting of the flip flop K201d whenever the remaining numeric and zone flip flops are set such that the "TA" gate K518 decodes the combination (XX11 001X). The forcing of this flip flop changes the combination to (XX11 0011) which will control operation of the "TA" printing key. To prevent the performance of an actual carriage return it is necessary to amend the code. This is accomplished by the "CR" gate K521 which, when it decodes the combination (1110) during the numeric portion of an alpha-numeric word, forces the setting of the zone flip flops K206a and K206b yielding the combination (XX11 1110) causing the printing of a "CR" symbol by a special key. Likewise the "BL" gate K522 amends a zone portion to change the blank or nonprint operation to the operation of a "BL" symbol printing key. Similarly the "comma" gate K528 operates to change the alpha-numeric indicator into the printing of a comma. The use of the symbol X in the above brackets implies that the decoding is independent of these bit positions.

During unedited output a space is interposed between words (every five alpha-numeric characters). This is under the control of the FU signals. In particular, the gates K508 and K507 perform this function. After every fifth character an AT1 signal is present which passes through the gate K507 under the control of the gate K508 to set the flip flops appropriate for generating a space operation.

41. *Output decimal point and carriage return detectors (FIG. 35)*

Figure 35:
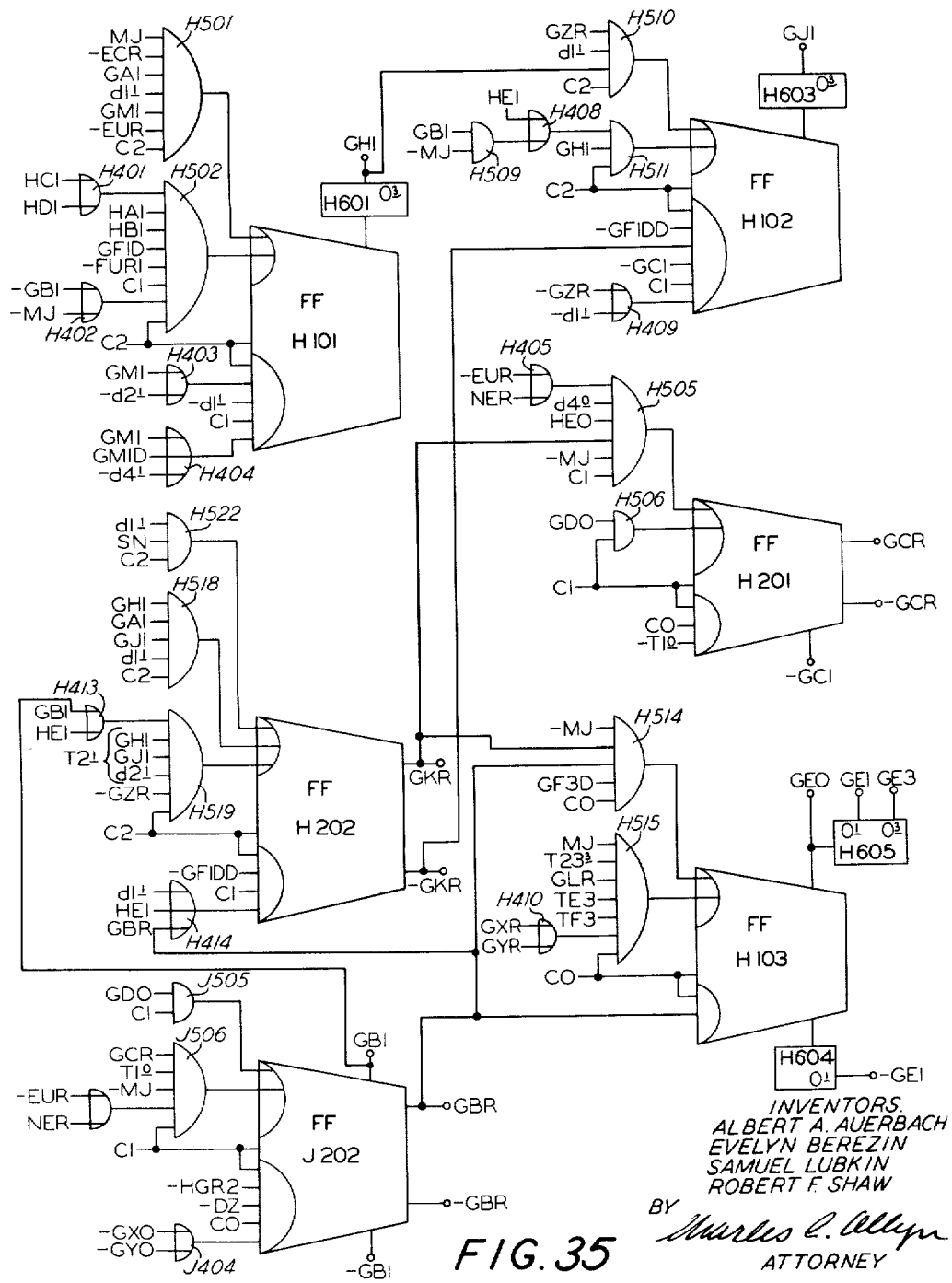
FIGURE 35 is a schematic showing of the Output Decimal Point and Carriage Return Detectors.

The output decimal point and carriage return detectors 744 as shown in FIG. 35 are used to detect the start and end of block characters during output operations. It will be recalled that the start of block characters are two serially recorded decimal points and that the end of block characters are any combination of decimal point and carriage return characters whether they be decimal points, carriage returns or one of each. There are primarily four occasions when these combinations are detected.

During sequence operations, it is necessary to first locate the end of block characters so that the information may then be recorded least significant digit first. Following the recording of the most significant digit in the block, two decimal points are then recorded to indicate the start of the block of information. As the two decimal points are set up for recording, they are sensed so that after the second decimal point is actually recorded on the magnetic tape, the output operation may be terminated.

During nonsequence operations where information is recorded most significant digit first, it is necessary to first record two decimal points at the start of the output operation and after they are recorded and detected, to then record all the information associated with the block stored in a memory channel. After the least significant digit of information is recorded, the next two digits in the memory channel are the end of block characters. As these two digits are recorded, they are detected and activate a termination mechanism which permits the recording of the two check digits that follow the end of block characters.

The output decimal point and carriage return detectors 744 comprise: the flip flop H101 having the set gate H501, and the set gate H502 which is fed by the buffers H401 and H402, and the reset buffers H403 and H404; the flip flop H102 having the set gate H510, and the set gate H511 which is fed by the buffer H408 which in turn receives signals from the gate H509, and the reset buffer H409; the flip flop H202 having the set gate H522, the set gate H518, the set gate H519 being fed by the buffer H413, and the reset buffer H414. The flip flop H201 having the set gate H506, and the set gate H505 being fed by the buffer H405; the flip flop H103 which drives the one quarter pulse time delay lines H604 and H605 having the set gate H514, and the set gate H515 being fed by a buffer H410; and the flip flop J202 having the set gate J505, the set gate J506, and the reset buffer J404.

The flip flop H101 which generates the GH signals, is set whenever a carriage return or decimal point is detected and will reset before the detection of the next digit. This flip flop may be considered to be the actual decimal point and carriage return detector.

The flip flop H102 will be set whenever the flip flop H101 is set and will remain set until after the sampling of the next digit. The flip flop H102 is considered to be a decimal point and carriage return detection memory. The flip flop H102 stays set and generates the GJ signals until after detection of the next digit by the flip flop H101.

The flip flop H202 generating the GK signals will be set when both the flip flop H101 and H102 are set to indicate that two decimal points or carriage returns or a combination of one of each have been detected. The flip flop H202 will be reset after the sampling of the third digit in the series.

The flip flop H201 which generates the GC signals is a synchronizing flip flop which is set as the second decimal point or carriage return is detected, as indicated by the generation of the GK signals. The flop flop H201 is used primarily to synchronize the output counters to the memory channel information. The flip flop J202 generating the GB signals is characteristic of the interval during which digits from the memory channel will pass through the output synchronizer and be recorded.

The flip flop H103 which generates the GE signals is set by the end of block characters to terminate the output operation. The operation of these six flip flops will now be discussed for both the beginning and the end of a block in sequence operations and for the beginning and the end of a block in nonsequence operations. During nonsequence operations, the MJ signal is absent and, therefore, the set gate H501 is blocked while the set gate H502 is alerted by means of the absence of the —MJ signal being fed to the buffer H402. As the selected output tape comes up to speed, circuitry is activated in the output synchronizer control 748, generating the HE signals which force the automatic writing of decimal points by the output parallelizer 742. As the first decimal point is written the HA1, the HB1 and the HD1 signals feeding the set gate H502 will be positive. When the synchronizing sprocket from the output synchronizer control 748, as characterized by a GF1D signal, is present the flip flop H101 is set and generates the GH signals. The GH1 signal passes through the set gate H511 to set the flip flop H102. A —d1¼ signal then resets the flip flop H101 and terminates the GH signals. As the next decimal point is set up in the output parallelizer 742 the flip flop H101 is again set and starts generating another GH signal. The GH signal, in cooperation with the GJ signal at the set gate H519, sets the flip flop H202 causing the generation of the GK signals indicating that two decimal points have been written. An HE0 cooperating with GKR at the set gate H505 then sets the flip flop H201 causing the generation of the GC signals.

The GC signal during the nonsequence operations, remains set for approximately one minor cycle and its primary function is to set the flip flop J202 through gate J506 and also to terminate the generation of HE signals from flip flop J204, FIG. 33.

The GCR signal at the set gate J506 permits a T1 pulse to set the flip flop J202 causing the generation of the GB signals which will remain present until all the information in a memory channel is recorded. The GB signal is characteristic of the transfer of information from a memory channel to the magnetic tapes. It should be noted that —GF1DD signal (a synchronizing sprocket signal) fed to reset terminals of the flip flops H102 and H202 reset both of these flip flops as the first digit of information from a memory channel is set up in the output parallelizer 742. The output synchronizer, now under the control of the GB signal, proceeds to empty the memory channel and record the digits on the magnetic tapes.

Somewhere in this process, the end of block markers are read out of the memory channel. As the first end of block marker is read out, whether it be a decimal point or a carriage return, the flip flop H101 is set in the same manner as during the previously described detection of the forced decimal point at the start of the non-sequence operation. The reading in of the second end of block character causes the activation of the GJ and GK signals in the same manner. The generation of the GK signal resulting with the detection of the second end of block character does not set the flip flop H201 (the HE0 signal at the set gate H505 is not present at this time). Instead, the GKR signal in cooperation with the GBR signal passes a GF3D signal through the set gate H514 to set the flip flop H103 causing the generation of the GE signals which terminates the output operation after the recording of the two check digits which follow the end of block characters.

The operation of the output decimal point and carriage return detectors 744 will now be described for sequence operations. Since during sequence operations the information is written least significant digit first it is necessary to first locate the end of block markers in the memory channel and start the recording on the magnetic tapes with the two check digits that trail in significance these end of block characters. The end of block characters are a combination of decimal points and carriage returns. As the first end of block character is located in the output buffer storage III 732, the most significant bit of this character will be in synchronism with a $d1¼$ pulse present at the set gate H501 to set the flip flop H101 for at least one pulse time. If the characters being detected are either a decimal point or a carriage return the GM1 and the GM2 signals at the reset buffers H403 and H404 override the resetting effects of the $-d2¼$ and the $-d4¼$ pulses and the flip flop remains set until just before the next digit is to be sampled. The GH1 signal so generated cooperates with the GZR signal (an indication that the magnetic tape is coming up to speed) at gate H510 to cause a $d1¼$ signal to set the flip flop H102 causing the generation of the GJ signals. As the second end of block character is detected in the same manner, the GH signal is again generated and the GH1 signal cooperating with the GJ1 signal and the GA1 signal pass a $d1¼$ pulse through the set gate H518 causing the setting of the GK flip flop H202 indicating that two end of block characters have been detected. The GK signal fed to the digit output counter 736, FIG. 30, causes the generation of the GD0 signal which is used to synchronize the digit output counter 736. The GK signal is also fed to the group output counter 738, FIG. 31, which synchronizes this counter such that the group trapped in the output buffer storage III 732 contains the last check digit at the end of a block of information. The GD0 signal in addition to its synchronization of the digit output counter 738, is fed through the set gate H506 to set the flip flop H201 causing the generation of the GC signals. The GC signal is used to permit the entry of the next group of information into the output buffer storage IV 734.

At the same time, the GD0 signal is fed to the set gate J505 causing the setting of the flip flop J202 which generates the GB signals. The GB signals have the same significance as during the above described non-sequence operation, that is, it indicates that groups are being transferred from a memory channel for recording. The groups are transferred in increasing order of significance. Since the most significant group is always present in the most significant position in the memory channel, we depend on this time relationship to terminate the operation. The set gate H515 of the flip flop H103, tests for the occurrence of the GLR signal from the group output counter 738 during the last minor cycle of a major cycle as defined by the T23¾, TE3 signal and the TF signal feeding this gate. When a GLR signal occurs during this minor cycle we know that the most significant group is being written out. At this time, a set pulse passes though the set gate H515 setting the flip flop H103 causing the generation of the GE signals. The GE signal is fed to the group output counter 738, FIG' 31, to cause both the GX and the GY signals to be simultaneously generated. The simultaneous generation of these signals causes a reset pulse to pass through the reset buffer J404 resetting the flip flop J202 and terminating the GB signals. At the same time the GX and GY signals are fed to the output synchronizing control 748, FIG. 33, where they cause the generation of the HE signals, which then force the writing of the two decimal points at the beginning of a block.

42. The input output unit (FIGS. 36 and 37)

The input-output unit 224 is the primary means of external communication. The unit contains an electromechanical typewriter which includes facilities for reading and punching six hole paper tape. Since this device is commercially available equipment additional apparatus is provided to intimately tie this unit to the remainder of the file processor. This additional apparatus primarily includes translating devices which convert the six place code used in this unit to the four place (or pairs of four place) code used in the file processor.

The file processor uses a code system in which pure numeric information is handled as a four bit combination while alphanumeric information is handled as pairs of four bit combinations. Therefore, the six place code of the typewriter must be translated to the four bit code of the file processor during input operations, and the four bit code of the file processor must be translated to the six bit code of the typewriter during output operations.

This is accomplished by dividing the information being handled into words of ten four bit combinations prefixed by a signal position. When the coded representation of a comma (0011) is in the sign position, the four bit combinations are handled in pairs to indicate they are alphanumeric characters.

The electromechanical typewriter is used for both input and output operations and may handle either pure numeric or alphanumeric information. During input operations, it is conventional to type in two decimal points followed by a physical carriage return action. The physical carriage return is purely a control action whose representation is not inserted. Instead, it activates sign position sensing circuitry which tests to see whether the next digit inserted is a comma (alphanumeric indicator) or not. If the next digit is not a comma then ten pure numeric digits may be typed in. As each digit is entered, its four hole representation is sampled by a sprocket signal derived from the setting up of the signal representation of the digit. The results of the sampling cause signals to be fed to the input synchronizer 220 which handles the signals as if they were entered from the magnetic tapes. After the tenth digit is inserted a physical carriage return is performed and the sign position sensing circuitry is reactivated.

If the next digit is a comma, then the word to be inserted is alphanumeric . Now, as each character enters, a sprocket is generated which samples the zone digit of the character. After the zone digit is entered, a second sprocket is automatically generated which samples the numeric digit. After five alphanumeric characters are inserted, a carriage return action is performed which prepares the apparatus for the insertion of the next word. The operation is terminated by the typing of two decimal points which are entered and which set up the terminating apparatus of the input synchronizer 220.

During typing out operations, control signals are set up which prime the output synchronizer 222 to transfer data to the electromechanical typewriter. The output synchronizer 222 operates during this typing out operation in a manner essentially similar to magnetic tape output operations except that the signals from the output parallelizer 742 are fed to the electromechanical typewriter.

The two decimal points at the start of a block are first printed and activate counting apparatus in the input synchronizer 220. The group input counter 722 is now used to count typing sprockets which are generated as each digit is set up for typing and the digit input counter 720 is used to count words typed out. After the two decimal points are typed, circuitry is set up to test the next character for a comma. If no comma is detected, the word is pure numeric and ten numeric digits are typed out. Eleven typing sprockets are therefore counted (one for the sign position and ten for the numeric digits). The comma detection circuitry is again set up and if a comma is detected, an alphanumeric type occurs. First the zone digit of a word is set up, then a second sprocket is automatically generated which sets up the numeric digit and the combination forms the six places needed to print an alphanumeric character. Note that two sprockets are generated for each character. After eleven sprockets are counted the comma detection circuitry is again activated. After each word is typed out, an automatic spacing signal is generated which causes the electromechanical typewriter to space. After the count of each five words, the electromechanical typewriter is forced to perform a carriage return.

When the end of block characters are detected, the usual terminating mechanism of the output synchronizer 222 takes over and the operation is ended.

The input-output unit 224 comprises the electromechanical typewriter 750 and the electromechanical typewriter controls 751.

43. *The electromechanical typewriter (FIGURE 36)*

The electromechanical typewriter 750 is a commercially available piece of equipment which includes low speed paper tape reading and punching facilities. The following modifications are performed on the commercial device:

(1) Leads given designations TC5 and TC6 permit connections between the positive and negative terminals of a D.C. voltage source in the electromechanical typewriter with the file processor. TC6 carries a −90 volt potential to the file processor and TC5 is a common ground, (2) Leads designated as SC1 to SC6, FIG. 36, connect the selector code contacts which decode the character determined by key depression to the file processor, (3) Leads designated JR1 to JR7 interconnect both units so that the translator code magnets of the electromechanical typewriter 750 may receive signals from the file processor, (4) The lead LPC connects one terminal of a punch clutch magnet of the typewriter to the file processor, (5) The lead JP8 connects an energization terminal for the punch clutch magnet of the typewriter to the file processor control box 226, (6) The lead TA20 connects a carriage return interlock to the file processor, (7) The lead TA 29 connects the reader clutch magnet to the file processor, to start the paper tape reader of the typewriter.

External to the electromechanical typewriter 750 are a plurality of relays, see FIG. 36, whose prime function is to change the signal levels of the signals between this unit and the file processor. These include the input relays X801a–X801f which are double pole single throw relays. Each relay has one terminal of its coil coupled to the NL signal line which during an input operation is coupled via TC5 to the typewriter ground. The other coil terminals are respectively coupled via the SC1 to SC6 leads to the typewriter unit so that whenever a signal is present on any one of these lines during a typewriter insert, the associated relay is activated.

Each of the first fixed contacts X803 of the relays X801 is returned to a positive five volt potential while its associated moving terminal X804 is respectively coupled to one of the FA to FF signal lines. Likewise, the other fixed contact X805 is returned to a negative ten volt potential while its associated moving contact X806 is coupled to a respective one of the −FA to −FF signal lines so that when a particular code position in the typewriter is detected, the associated relay is energized and the FA to FF signals generated. These signals are transferred to the input synchronizer 220 for entry into the file processor.

During typing out operations the relays X807a–f are used. One end of each of their coils is returned via the NU signal line to a negative potential. The other ends X808a–f of the coils of the relays X807a–f are connected via the HAR, HBR, HCR, HDR, HRR and HSR signal lines to the output synchronizer to receive signals representing the character being typed out. The other end X808g of the coil of relay X807g is returned via the FW signal line to the electromechanical typewriter control 751, FIG. 37, to receive a writing sprocket pulse. The fixed contacts X809 of the relays X807a–g are all returned to the negative D.C. voltage, generated by the typewriter unit, while the moving contacts X810a–f are connected via the JR1–6 signal lines to the translator code magnets of the typewriter. The moving contact X810g is connected via the JR7 signal line to the translator clutch magnet of the electromechanical typewriter.

During the printing of a digit, some combination of the "H" signals are set up by the output parallelizer 742 and the associated relays X807a–f are activated causing the generation of particular JR signals which energize their associated translator code magnets. As the writing sprocket signal is generated the FW signal energizes the relay X807g causing the generation of the JR7 signal which engages the translator clutch causing the printing of a character.

Included in the electromechanical typewriter 750 is a start-read control comprising the relay X814 and the gate X501. During the simultaneous occurrence of the NM and DPR signal indicating the start of a typewriter input operation, the relay X814 is energized causing a −VDC voltage to be fed via the lead TA29 of the typewriter proper. At the same time, the voltage is fed back and, after a delay caused by the RC network X910, blocks the gate X501 starting the deenergization of the relay X814 and effectively creating a transient which performs the same action as the manual depression of the start-read switch of the typewriter.

Also included is the relay X815 which acts as a stall during carriage return and tabulation movements. When such a movement is performed by the typewriter, the NK signal which is effectively from the lead TA20 of the typewriter (a carriage return interlock) is at ground potential. When carriage travel is completed the relay X815 is energized and a negative transient is fed via the −FX signal line to the electromechanical typewriter control 751, FIG. 37, to deactivate a stall device and permit the typing to proceed.

44. *The electromechanical typewriter controls (FIG. 37)*

The electromechanical typewriter control 751 as shown in FIG. 37 comprises: the electromechanical typewriter sprocket generator which includes in a relatively serial arrangement the gate V501, the forty millisecond delay flop V302, the cathode follower V307, the fifty-five millisecond delay flop V301, the cathode follower V308, the gate V510, the buffer V406; the buffer V405, the relay V801, the seventy-five millisecond delay flop V306, the fifteen millisecond delay flop V303 and the cathode followers V304 and V305; the pulse amplifier V102 which has an input terminal connected to the gate V519 receiving signals from the buffers V412 and V413; the flip flop V101 for alerting sign position sensing having the set gates V502 and V503 and the reset buffer V401; the flip flop V201 for alphanumeric memory having the set gates V511 and V512 and the reset buffer V408; the flip flop V205 having the set gate V523 being fed by the buffer V414 and the reset buffers V415 and V416 used to distinguish the zone and numeric positions of an alphanumeric character; the flip flop V202 for automatic spacing between typed words having the set gates V506 and V507 and the reset buffer V403; the d.c. amplifier V203 being fed by the buffer V410 which receives signals from the gates V516, V517 and V518; and the sprocketed information generator having the numeric gates V527-V530 each having a terminal fed by the pulse amplifier V103 which is serially fed by the buffer V419 and the gate V526, and the zone gates V531 and V532, each having one input, respectively, coupled to the pulse amplifier V104 which receives signals from the gate V533.

During typing in operations, as a key is struck a certain combination of the "F" signals is generated in the electromechanical typewriter 750. These "F" signals generate a sprocket signal which is used in the input synchronizer 220 in a manner similar to the sprocket signal from a magnetic tape during magnetic tape input operation. The sprocket signal is also used to sample a plurality of gates which also receive the "F" signals so that a timed sampling of the bits associated with the entering digit is performed. These time sampled bits are fed to the input synchronizer 220 and are handled in a manner very similar to the bits received from the channels of a magnetic tape.

The format of the inserted information follows the general rule that two decimal points are initially inserted followed by a physical carriage return. Then each entered word consists of either a sign and ten numeric digits or a sign and five alphanumeric characters each word followed by another carriage return. Since the words inserted may be either pure numeric or alphanumeric, it is necessary to sample the sign position of each inserted word. Therefore, as a carriage return is struck, no information is inserted into the input synchronizer 220 but instead the carriage return activates a sign sensing flip flop. Since the carriage return is struck just before the insertion of a word the next key operation will be the depression of the sign digit position. If the sign digit position is anything but a comma (alphanumeric indicator), the insertion is straight-forward and as each numeric key is depressed the previously described sprocket is generated. The coded combination of "F" signals is sampled and a digit inserted into the input synchronizer 220. At the end of ten digits the carriage return is again struck. No information related to this key depression is entered and the sign sensing apparatus is again alerted. If an alphanumeric character is now detected, a flip flop is set which indicates that the word to be inserted is alphanumeric. Therefore, as the first alphanumeric character is detected a binary counter is turned to its set condition, the zone portion of the "F" signals is sampled and entered into the input synchronizer 220. As this zone portion is inserted the input synchronizer 220 feeds back a signal to the binary counter which returns the counter to its reset condition and causes the sampling and transfer of the numeric portion of the character to the input synchronizer 220. After the five alphanumeric characters are typed in, another carriage return is performed.

After all the information has been inserted, two decimal points are typed in which, when sensed by the input synchronizer 220, terminate the operation in a manner similar to the manner used when the input synchronizer 220 detects the end of block characters from a magnetic tape input.

To accomplish the above series of steps the apparatus of the electromechanical typewriter control 751 operates as follows:

Whenever a key is depressed a combination of "F" signals is generated and fed to the buffer V405 and to one or more of the buffers V420 to V425 (it will be assumed that a numeric character is being inserted and in particular the second decimal point (1101) of the two decimal points that precede the insertion of words). It should be noted that any digit of any numeric word is handled in the same manner. The combination of "F" signals, in this case an FA, an FB and an FD signal, pass through the buffer V405 to activate the relay V801 which causes a positive transient from a condenesr V900 to trigger the seventy-five millisecond delay flop V306. The leading edge of the seventy-five millisecond pulse passes through the buffer V406 to trigger the fifteen millisecond delay flop V303 which after fifteen milliseconds passes a positive transient to the cathode follower V305 which transmits a —FG signal to the gate V519 to cause the generation of an FY signal by the amplifier V102. The reason for the relay V801 and condenser V900 is to prevent a possible double triggering of the delay flop V306 and also to prevent a possible double triggering of the delay flop V303. The delay flop V303 is used to cause the generation of a delayed sprocket sampling pulse so that the relays which generate the "F" signals have stopped bouncing before their outputs are sampled. The FY signal from extender V102 is fed to the gate V526 to cause the generation of a sampling pulse by the pulse amplifier V103, the sampling pulse then probes the numeric gates V527 to V530 and passes pulses from these gates depending upon which of the "F" signals (FC, FD, FE and FF) are present. The outputs of these gates, respectively, as the FJ, FK, FL and FM signals (in the case of a decimal point FJ, FK and FM) are fed to the input parallelizer 716 of the input synchronizer 220 where they are handled as if they represented a digit being read from the magnetic tapes.

At the same time, the FY signal is fed to the input synchronizer 220 where it acts in a manner identical to the sprocket signals from a magnetic tape. Since this was the second decimal point typed in, the next character typed in is a carriage return. The "F" signals associated with the carriage return are fed to the buffer V405 and result in the generation of the —FG signal but in this case the reverse of the coded combination of the physical carriage return is also present at the buffer V413 and causes the generation of an inhibiting signal which prevents the passage of the —FG signal through the gate V519 to prevent the generation of the FY signal so that no information is sampled and no sprocket isgnal is fed back to the input synchronizer 220. Instead, the coded combination of the "F" signals representing the physical carriage return is fed to the gate V502 and is sampled by the FG signal to set the flip flop V101 causing the generation of the FR signals.

The next character is then typed in. This character is the sign position of a word. In this case it will be assumed that a comma, the alphanumeric indicator, is entered. The coded combination for the comma is the FE and FF signals. The presence of these signals along with the FR1 signal and the AZ signal (the synchronizing sprocket signal from the sprocket synchronizer 714 of the input synchronizer 220) causes the setting of the flip-flop V201 via the set gate V511 to generate the FS signals. (In particular a positive FSR signal alerts the gate V533 and a —FSR blocks gate V526. Therefore the next digit to be typed in will be an alphanumeric character.

As this character is typed in the "F" signals pass through the buffer V405 to generate a —FG signal as described. The FG signal in turn generates the FY signal at extender V102. The FY signal so generated does not pass through the gate V526 but instead passes through the gate V533 to cause the generation of an FN pulse which samples the zone gates V531 and V532. The signals generated by the zone gates constitute the zone digit of an alphanumeric character and are transferred to the input synchronizer 220. The FY signal is also fed to the input synchronizer to set up the synchronizing sprockets which result in the generation of the AZ signals. The AZ signal is fed through the buffer V414 to set the flip flop V205 to cause the generation of the FH signals.

In particular, the FH signal is differentiated and fed through the buffer V419 to cause the generation of the LZ signals causing the sampling of the numeric digit of the alphanumeric character which is then fed back to the input synchronizer 220. At the same time, the FH signal is also fed back to the input synchronizer 220 to cause the generation of a synchronizing sprocket in the input synchronizer resulting in another AZ signal. The —AZ signal associated with this sprocket from the input synchronizer 220, acts through the buffer V415 to return the flip flop V205 to its reset condition. Four more alphanumeric characters are typed in a similar manner. It should be noted that whenever an alphanumeric word is being entered, that the first sprocket signal fed to the input synchronizer 220 is the FY signal which was originally generated by the depressing of the key and that a second sprocket signal is caused to be generated by the setting of the flip flop V205.

The type out operation will now be discussed. During type out, information pulses, along with a sprocket pulse, are received from the output synchronizer 222. The information is represented by a series of "H" signals from the output parallelizer 742. The output synchronizer 222 in this case operates in a manner very similar to magnetic tape output operations except that the information is fed to the electromechanical typewriter 750 and the electromechanical typewriter control 751 instead of to the magnetic tapes. As each digit is fed from the output synchronizer 222, a sprocket signal is generated which activates the electromechanical typewriter 750 and also is counted in the group input counter of the input synchronizer 220. After all sprockets are counted (to account for ten digit positions and a sign position of a word) a forced spacing operation is performed by the electromechanical typewriter 750 and a new word is then entered. After each fifth word a forced carriage return operation is performed.

At the start of the operation, after the two decimal points are written, a GCR signal is generated in the output synchronizer 222 and cooperates with an MR signal (characteristic of type out operations) to set the flip flop V202 via the set gate V506. The FU signal so generated, is fed to the output parallelizer 742 and causes an automatic carriage return to be set up. As the carriage return is performed, a —AW3 signal from the input synchronizer 220 acting through the buffer V403 resets the flip flop V202 causing the termination of the FU signals and, in particular, the disappearance of a —FUR signal at the gate V516 sets the D.C. amplifier V203, causing the generation of the FVR signals. At the same time, the disappearance of the —FUR signal at the set gate V503 causes the setting of the flip flop V101 causing the generation of the FR signals. The generation of the FUR signals creates a temporary stall to the output operation and the carriage stops moving as indicated by the occurrence of a —FX signal fed to the gate V518 terminating the FVR signals. The termination of the —FVR signal causes a positive transient to be fed through the buffer V406 which is fed to the cathode follower V304 causing the generation of an FG signal which is fed back to the output synchronizer 222 to cause the setting up of the next digit for type out. As the next digit is set up (note that the digit represents the sign position of a word) it will be assumed that this digit is not an alphanumeric indicator and the typing out of the word will be in a straightforward manner. At the same time, the output synchronizer feeds an HT signal to the gate V501 to cause the setting of the forty millisecond delay flop V302 which generates the FW signals from the cathode follower V307 to activate the translator clutch of the electromechanical typewriter 750. At the termination of the forty millisecond delay, a positive transient is fed to the fifty-five millisecond delay flop V301 to cause the generation of an LV signal which is fed through the gate V510 to set a fifteen millisecond delay flop V303 which in turn generates an FG signal to set up the next digit for type out by the output synchronizer 222.

If, however, an alphanumeric indicator had been detected the HC1 and the HD1 signals, characteristic of the code combination for the alphanumeric indicator, would set the flip flop V201 via the set gate V512. The FS signals so generated would be fed back to the output synchronizer 222 to cause the generation of another sprocket pulse so that as each character is then typed out two digits are sequentially sampled before an actual typing of a character occurs.

After eleven sprockets have been counted, the AW3, the AM3 and the AN3 from the group input counter 722 are all present at the set gate V507 and the flip flop V202 is set to cause the automatic forcing of a space. Before the next digit is prepared for typing out, a —AW3 signal fed through the buffer V403 resets the flip flop V202 which causes a new setting of the flip flop V101 as has been previously described.

45. *The control box (FIGS. 38 and 38a)*

The control box 226 as shown in FIGS. 38 and 38a is primarily a plurality of manual switches and relays whose chief function is to permit an operator to set up the file processor for specific operations. Included in the control box 226 is circuitry which permits maintenance testing of the machine. This maintenance circuitry includes means for forcing particular operations as well as means which immobilizes error detection circuitry.

During normal operation the usual procedure is to initially clear the file processor; select the desired operation (sequence, separate, collate, etc.); and then strike a proceed key to start the file processor on the performance of the operation.

The control box 226 includes a clear switch Z705. The switch is of the triple pole triple throw variety. When the switch is moved from its center or neutral position to the up position, an initial clear signal is forced into the file processor. When the switch is moved from its center position or neutral position to the down position, a clearing of the input-output apparatus is performed. The first pole Z705a of the clear switch Z705 is returned via a condenser Z904 to a negative ten volt potential. The neutral contact Z705b and the down contact Z705c associated with the pole Z705a are both returned via a resistor Z902 to a positive sixty-five volt potential. The upper contact Z705d is coupled to the DT signal line. During an initial clear operation when the switch is moved to the up position, a positive transient is fed via the DT signal line to the remainder of the file processor to primarily activate circuitry to clear registers and flip flops.

The second pole Z705e is returned to a positive five volt potential. The neutral contact Z705f associated with this pole and the down contact Z705g are both coupled to the —DZ signal line and through a resistor Z901 to a —10 volt potential. The upper contact Z705h is coupled to the plus DZ signal line and through a resistor Z902 to a —10 volt potential. In the neutral position the —DZ signal line is at a positive five volt potential and the +DZ line is at a negative potential. During an initial clear operaton, when the switch is in the up position the DZ signal line is at a positive potential and the —DZ signal line is at a negative potential.

The third pole Z705j is returned to the plus five volt potential. The neutral contact Z705k and up contact Z705n associated with this pole are coupled to a —SN signal line while the down contact Z705m is coupled to the SN signal line. The —SN and the SN signal lines are each coupled through a register Z905 or Z906 to the —10 volt potential. During an input-output clear operation the switch Z705 is moved to the down position. A positive voltage is present in the SN signal line and the negative voltage at the —SN signal line. At this time these signals are used to prepare the file processor for an input-output operation.

The operation switch Z701 is used to select the desired operation. An idealized configuration for the switch is shown but it should be realized that anyone skilled in the art can wire a switch to perform the same desired results. The following table summarizes the function of the switches:

| Switch position | Type of operation | Signals generated |
|---|---|---|
| 1 | Sequence two keys | MA and —MA. |
| 2 | Sequence one key | MA and —MA. MH and —MH. |
| 3 | Separate | MB and —MB. |
| 4 | Select | ME and —ME. MC and —MC. |
| 5 | Collate | ME and —ME. MD and —MD. |
| 6 | Select and collate | ME and —ME. |
| 7 | Upper bound entry | NR and —NR. MM and —MM. NX and —NX. |
| 8 | Lower bound entry | NN and —NN. MM and —MM. NY and —NY. |
| 9 | Key entry | MM and —MM. NR and —NR. |
| 10 | Manual | MF and —MF. |
| 11 | Read out | MRX and —MRX. |

Whenever the switch is in a given position the positive signals associated with this position are a positive potential and the negative signals at a negative potential but the positive signals associated with the remaining switch positons are at a negative potential and the negative signals are at a positive potential.

If any of the entry operations are via the keyboard of the electromechanical typewriter 750, then the relay Z802 is energized by the MM signal from either switch Z701 or switch Z702. The relay Z802 is a four pole double throw relay which is used in a switch gating manner to change the inner connections between the file processor and the electromechanical typewriter.

The input-output selector comprises the switches Z702 and Z703 which are shown in an idealized configuration. The switch 702 has four positions which select the type of input to be performed when a manual operation is called for by the operation switch Z701. The following table summarizes the function of the switch Z702:

| Position | Type of input | Signals generated |
|---|---|---|
| 1 | Off position | ML and —ML. |
| 2 | Paper tape input from typewriter | MM and —MM. NM and —NM. |
| 3 | Keyboard input | MM and —MM. |
| 4 | Magnetic tape input | MP and —MP. |

The switch Z703 determines the type of output. The operation of the switch Z703 is summarized in the following table:

| Position | Type of output | Signals generated |
|---|---|---|
| 1 | Off position | MQ and —MQ. |
| 2 | Keyboard output | MR and —MR. —NU. |
| 3 | Magnetic tape output | MS and —MS. |

After the previously described switches have been set into their desired positions, the proceed switch Z704 is momentarily depressed. The proceed switch Z704 is a double pole double throw switch. When the switch is thrown a positive transient is fed from a condenser Z910 via the NC signal line to the remainder of the file processor and also a negative potential is fed via the —PX signal line to reset any error circuits which have been set.

If during file processor operation an error occurs, a DQ signal energizes the relay Z801 causing the generation of a visible or an audible alarm. However, sometimes during maintenance operations it is desirable to delete the error control circuitry. This is accomplished by the switches Z707 and Z708. The switch Z707 when in the up position transmits a positive voltage via the KL signal line and prevents any output error from halting the file processor. Similarly, the switch Z708 when in the up position transmits a positive potential via the KM signal line and prevents any input error from stalling the file processor.

During maintenance operations, it is often desirable to cause the file processor to go through an operation one block at a time or one pass at a time. This is accomplished by the double pole triple throw switch Z706. When this switch is in the up position, a positive potential is fed via the MK signal line so that when one block of information is processed the file processor stops and waits until the proceed switch is again operated before proceeding to the next block.

During sequencing which is a multipass operation, it is sometimes desirable during the course of maintenance to perform the passes in a stepwise manner. In this case, the switch Z706 is moved to the down position and the MA signal is effectively disconnected from the MAP signal line and the file processor will halt after each pass.

Sometimes during maintenance operations, it is desirable to record the presence of an input error but to proceed with the operation. This is accomplished by the switch Z750. As an input error occurs, the circuitry associated with the input error detector is activated but by moving the switch Z750 to the down position a negative potential is fed via the PY signal line through the proceed switch Z704 and the —PX signal line to the circuitry and the circuitry is immediately reset permitting the operation to continue.

During maintenance operations the switch Y701 permits the forced insertion of information into or out of particular memory channels. The following table summarizes the function of the switch:

| Switch position | Memory channel | Signals generated |
|---|---|---|
| 1 | A | NN and —NN. |
| 2 | B | NP and —NP. |
| 3 | C | NQ and —NQ. |
| 4 | D | NR and —NR. |
| 5 | E | NS and —NS. |

There is a sixth position which is considered the off position or neutral position for the switch and causes the generation of a NT and a —NT signal.

The switches Y708, Y709 and Y710 are used to force the activation of particular tape units. Their function is readily understood by referring to the FIGURE 38.

Finally a plurality of neon indicators are included to give a visible indication of the state of the file processor. Each one of these indicators is driven by a voltage amplifier. The following table summarizes the neon indicator array:

| Input Signal | Voltage Amplifier | Indication |
| --- | --- | --- |
| ERR | Y305 | Input error. |
| EZR | Y306 | End of an operation. |
| HHR | Y301 | Output error. |
| DPR | Y302 | Input. |
| EYR | Y303 | Selection error. |
| TUER | Y304 | End of a magnetic tape. |
| EAR | Y307 | Channel B receiving information. |
| −EDRR | Y308 | Odd pass. |
| EDRR | Y309 | Even pass. |
| HUR | Y310 | Output. |

46. Signals from timer 228 (FIG. 39)

The timer 228 generates several series of repetitive waveforms which are used throughout the file processor for the synchronization and timing of information and control signals. FIG. 39 shows the waveforms generated by the timer 228. These series of waveforms are conveniently divided into several groups.

The first group of waveforms are the clock pulse signals which may be generated by a conventional one megacycle crystal controlled oscillator. The clock pulses are generated in four series, each series being out of phase with the preceding series by one-quarter of a pulse time. The basic clock pulses generated by the one megacycle oscillator are known as the C0 signals and are a series of rectangular pulses. The second series of clock pulses known as the C1 signals are identical to the C0 signals except for a one-quarter pulse delay or ninety degree phase displacement. The third series of clock pulses known as the C2 signals are delayed a one-quarter pulse with respect to the C1 clock pulses and therefore are 180° out of phase with the C0 signals. The fourth series of clock pulse signals known as the C3 signals are delayed a one-quarter of a pulse time with respect to the C2 signals and therefore 180° out of phase with the C1 signals. Since the apparatus for the generating and phasing of clock pulse signals is well known in the art, any suitable clock pulse generator capable of producing the above described signals may be used in the apparatus.

The second group of timing signals are known as the $d$ signals. Each one of these $d$ signals is in phase with one of the clock pulse signals and occurs every fourth clock pulse signal. For example, the $d1\frac{1}{4}$ signal is in phase with the C1 signal and occurs every fourth C1 clock pulse. Each one of the $d$ signals is considered to represent one of the four bits in a binary coded digit. For example, the $d1\frac{1}{4}$ signal may represent the least significant bit of a binary coded digit in phase with the C1 clock pulse, while at the same time the $d4\frac{1}{4}$ pulse signal represents the most significant bit of a binary coded decimal digit. The $d$ signals occur as both positive and negative pulses although only the positive waveforms are shown. These waveforms are readily generated by frequency dividing techniques that are well known in the art. Therefore any suitable frequency divider may be employed to generate these waveforms provided they conform to the shown timing references.

The next major group of signals includes the TA, TB and TC, and the TAD, TBD and TCD signals. These signals along with their negative counterparts may be conveniently generated by coupling three conventional binary counters with appropriate feedback paths so that the binary counters form a ring counter whose maximum count is six.

As has been stated above, the basic minor cycle of the file processor is the time required to transfer six digits, each represented by four bits. Thus the minor cycle occupies twenty-four (six times four) pulse positions. These pulse positions are conveniently labeled $t1$ to $t24$. Some of the pulse positions are frequently sampled and it is therefore convenient to generate specific timing pulses in various phases to aid in selecting or probing these pulse positions.

Therefore a series of T signals; namely, $T23\frac{3}{4}$, $T24\frac{1}{4}$, $T24\frac{2}{4}$, $T24\frac{3}{4}$ and T1 are also generated. These signals are easily generated by gating together combinations of the $d$ signals with the TA, TB and TC signals.

Since there are 888 pulses in a major cycle, 37 minor cycles are included in a major cycle. To generate a major cycle signal, it is only necessary to count 37 minor cycle signals. This is readily accomplished by a unit adder substantially similar to that in the group input counter 722 which counts $T24\frac{1}{4}$ signals and which is herein referred to as a minor cycle counter. The TE, TF and TJ signals are pulse representations of the count in the minor cycle counter. These signals are fed throughout the apparatus for synchronizing purposes. When the count in the minor cycle counter reaches thirty-seven, indicating that a complete major cycle has occurred, a TH signal and three phases of a signal known as $t888$ are generated. These signals are used through the file processor to indicate the end of a major cycle and the start of a new major cycle.

Finally, the $t888\frac{3}{4}$ signal causes the generation of a TG2 signal (a series of twenty-four C2 signals) which is primarily used to clear a register or to transfer the contents of a register in the file processor.

47. Tape unit I 232 (FIG. 40)

There are five tape units associated with the file processor. Since these tape units are nearly identical, only one will be more fully described. Any exceptions to the described tape unit will hereinafter be noted.

The tape unit I 232 is shown in FIG. 40 in diagrammatic form, with the actual transport mechanism not included. Such transport means are commercially available. Each of the tape units effectively handles the six channel magnetic tape. One channel is reserved for the reading and recording of sprocket signals. Four channels are reserved for parallel reading and recording of the bit positions in a digit. A sixth channel is reserved for the reading of a good tape signal which, when present, indicates that a sufficient length of good (nondefective) tape is available to complete the recording of an entire block.

Each of the five information and sprocket channel circuits Q700 comprises a dual purpose recording and reproducing head Q702 having one end connected to a moving contact Q704 of a relay Q701. The other end of the magnetic head Q702 is connected to a second moving contact Q708 of the relay Q701. The relay Q701 has a first normally closed contact Q706 and a second normally closed contact Q712 coupled to the input terminals of a conventional magnetic tape reading amplifier Q718. The output terminal of the amplifier Q718 is coupled to an input terminal of the gate Q720 whose output terminal is coupled to the input terminal of a conventional cathode follower Q722 whose output terminal is the JV–I signal line. Therefore when the tape unit I 232 is reading information from a magnetic tape, sprocket signals are fed from the head through the normally closed contacts Q704 and Q706, Q708 and Q712 of the relay to the reading amplifier Q718. If a reading of information from the tape unit I is called for, a TUR1 signal, fed from the tape control 242, is present at a second input terminal of the gate Q720 and sprocket pulses are fed to the remainder of the file processor via the cathode follower Q722 and the JV–I signal line.

If sprocket signals are to be recorded on the magnetic tape, the relay Q701 will be energized and a TUW1 signal from the tape control 242 cooperates with an HL signal from the output synchronizer 222 to feed recording current through the normally open contact Q714, the moving contact Q708, the magnetic head Q702, the moving contact Q704, and the normally open contact Q710 to the voltage source.

In a similar manner, information is handled in parallel by the information channel circuit Q700$b$ in which case, when a reading of information is in progress, JW–1 signals representative of the least significant bit of a digit are transferred to the input synchronizer 220. Whereas, during an output cycle, HA signals from the output synchronizer 222 representing the least significant bit for recording are fed to the magnetic head Q702b. The remaining information channels Q700c, Q700e, and Q700f function similarly.

The relay Q701, a record-reproduce relay, has a coil Q724 which receives energization signals from the cathode follower Q726. The input of the cathode follower Q726 is the EDRR signal used for controlling both the tape unit I and the tape unit II. Similar cathode followers receive the —EDRR signals in the tape units IV and V. (The tape unit III is locked in the reading position for all operations.) Thus when the EDRR and —EDRR signals are present, information may be read from the tape units IV and V for their associated relays are in a deenergized state and information may be recorded on the tape units I and II whose relays Q701 are energized. The sixth channel of the tape unit I reads only good tape signals while information is being recorded upon the remaining channels. Therefore, the magnetic head Q728 of this channel is permanently connected to a reading amplifier Q730 whose output is coupled to an input terminal of the gate Q732 and good tape signals are fed to the cathode follower Q734 during the writing of information on the tape unit I as characterized by the TUW1 signal feeding a second input terminal of the gate Q732. The good tape signal (a constant frequency sine wave) is transferred via the JU–I signal line to sprocket synchronizer 714 of the file processor to permit the recording of information.

The combination of the gates Q740 and Q742 and the buffer Q744 are used to pass a pulse to energize a thyratron tube in the transport mechanism which thyratron starts the transport mechanism driving in a forward direction.

The combination of the gates Q750, Q752 and the buffer Q754 are used to pass a pulse which fires another thyratron tube to start the transport mechanism moving in a reverse direction. The combination of the gates Q760 and Q762 and the buffer Q764 are used to pass a pulse which stops the motion of the transport mechanism.

48. The tape controls 242 (FIGS. 41, 42, 43)

The tape controls 242 are a plurality of circuits whose prime function is to select and activate the tape units I–V depending on the operation being performed and upon the particular times of the cycles within the operation.

The tape controls 242 include the tape error and proceed circuitry 756 which controls the motions of the tape units when errors have been detected, for example, during a reproducing cycle if an error is detected, it will activate an automatic reversal and reread. Also included is a time delay network which stalls access to the tape units when there is a switch from reproducing to recording or vice versa.

The second major component of the tape controls 242 is the tape selection motion control 758 which functions to determine which of the tape units is to be selected and also to start and stop the selected tape units.

The tape selector 760, the third component of the tape control 242, receives signals from the tape selection and motion controls 758 and generates control signals which actually are used to activate the tape units for reproducing or recording.

49. Tape selector (FIG. 41)

The tape selector 760 as shown in FIG. 41 comprises a plurality of flip flops whose primary function is to select specific tape units for reading or recording information. The tape selector 760 comprises: the flip flop T201, having a set gate T501; the flip flop T202 having the first set gate T505 and the second set gate T504; the flip flop T203 having the set gate T508; the flip flop T204 having the set gate T511 and also using the previously cited set gate T504; the flip flop T205 having the set gates T515, T516, T517 and T532; the flip flop T206 having the set gate T520, the flip flop T207 having the set gate T523; the flip flop T208 having the set gate T526; and the flip flop T209 having the set gate T529.

The above group of flip flops is used to set up specific tape drives during certain operations such as sequencing, selection, etc. It will be noted that a very particular set of signals in various combinations is fed into the set gates of all of these flip flops and certain other signals are fed to the reset terminals of these flip flops. These signals are herein listed along with a summary of their prime function:

| Signal | Comment |
| --- | --- |
| DF and —DF | When present record on tape units II or V, when absent record on tape units I or IV. |
| CZ and —CZ | When present reproduce from tape units I or IV, when absent reproduce from tape units II or V. |
| EDRR and —EDRR | When present reproduce from tape units IV or V, record on tape units I or II; when absent reproduce from tape units I or II, record on tape units IV or V. |
| EMO | Indicates start of an output or recording cycle. |
| ELO | Indicates start of a read or reproduction cycle. |
| —DZ | An initial clear signal which resets all the flip flops before the start of any operation. |
| JRD | A stop signal which is used to stop any tape units that are reproducing information. The JRD signal is a differentiated signal which upon its termination transmits a negative-going transient. |
| JSD | A stop signal which is used to stop any tape units that are recording information. The JSD signal is a differentiated signal which upon its termination transmits a negative-going transient. |
| —SA | An inhibitory signal which prevents the possible setting of these flip flops when an input-output operation associated with the input-output unit 224 is in progress. |

There are some specialized signals that will be discussed below.

The flip flop T201 when set generates the TUW–1 to permit recording on the tape of the tape unit I 232.

The flip flop T202 when set, generates the TUR–1 signal which permits the reproducing of information from the tape of tape unit I 232. The setting of the flip flop T202 via the set gate T504 occurs only during the first pass of sequencing at which time the tape is only moved and no reproducing occurs. This is essentially a paying out operation to assure adequate tape for recording at later passes. The —ETR signal fed to a reset terminal of the flip flop is used to reset the flip flop T202 at the end of the first pass of sequence.

The flip flop T203 when set causes the generation of the TUW–2 signals permitting recording of information on the tape of tape unit II 234.

The flip flop T204 when set causes the generation of the TUR–2 signals permitting reproduction of information from the tape of tape unit II 234. This flip flop is also set on the first pass of sequence via the set gate T504 for the same reasons as given for the flip flop T202. The flip flop T206 when set causes the generation of the TUW–4 signal permitting recording of information on the tape unit IV 238. The flip flop T207 when set, causes the generation of the TUR–4 signals permitting reproduction of information from the tape unit IV 238. The flip flop T208 when set, causes the generation of the TUW–5 signals permitting recording on the tape unit V 240. The flip flop T209 when set, generates the TUR–5 signals permitting reproduction of information from the tape unit V 240.

The flip flop T205 when set causes the generation of the TUR–3 signals permitting reading of information from the tape unit III 236. The flip flop T205 will be set under four possible conditions as determined by the set gates T515, T516, T517 and T532. The set gate T532 activates the flip flop during a select operation. The set gate T517 reactivates the flip flop during a select operation when the select items contain trailer blocks when although not used in the selection must be passed over. The set gate T516 activates the flip flop during the first pass of sequence during which time, the file to be sequenced is read from the magnetic tape of tape unit III. The set gate T515 is used to activate the flip flop during select when the designator block of the selector item is less than the designator block of the main file item and a new selector item is to be entered.

50. *Tape error and proceed circuitry (FIG. 42)*

The tape error and proceed circuitry 756 as shown in FIG. 42 is used primarily to control the movement of the magnetic tapes if an error has been detected. One of its more important functions is to detect a so-called input error, that is, an error occurring when information is read in from a magnetic tape. As has been stated in a previous section, each block of information that is read in to the file processor from a magnetic tape is appended with two check digits which are a representation of the count of the number of bits recorded in the block. During the reading in operation, the bits are counted and a comparison is performed between a representation of this second count and representation of two recorded check digits. If there is a nonagreement, the input tape is stopped and rewound to the start of the block and a second reading is performed. Since most errors are of a transient nature, the second reading is usually correct. If, however, an error still exists, circuitry is activated to halt the file processor and give an indication of the error.

Another type of error which may occur is during multi-reel operations where it is possible to put an out of order reel into a tape unit. For example, assume that a file is composed of three reels each of which contains items in order. Normally, the magnitude of the last item on reel one would be less than the magnitude of the first item on reel two, and the magnitude of the last item on reel two would be less than the magnitude of the first item of reel three. If somehow the operator inadvertently after processing reel one, installs reel three for processing and after processing reel three, installs reel two, the reels have been processed out of order for the first item of reel two is less than the last item of reel three and the information has been inserted out of reel order.

When this case arises, error circuitry is activated which stops the machine to notify the operator that he has installed the reels in improper sequence.

Also included in the tape error and proceed circuits 756 is circuitry which is used primarily for test operations. These are included for the sake of completeness but it should be understood that they are not necessary for normal file processor operation and are primarily used for maintenance and test procedures.

The tape error and proceed circuits 756 comprise: the flip flop M202 having the set gate M536; the flip flop S202 having the set gates S511, S503, S504 and S505; the flip flop S205 having the set gate S506 being fed by the buffers S402 and S422; the flip flop S206 having the set gates S509 and S510; the flip flop S203 having the set gate S517 being fed by the gate S516 and the buffer S415 which in turn receives signals from the gate S514; the D.C. amplifier S201 being fed by the gate S501 which in turn receives signals from the buffer S401; the cathode follower S302 being driven by the buffer S406, the reshaper S207 receiving signals from the gate S531 which in turn is coupled to the output terminals of the buffers S417 and S418 which receives signals from the gate S530; and a delay circuit which includes the flip flop S204 having the set gates S522 and S524, the set gate S524 receiving signals from the pulse extender S101 which receives signals from the gates S521 and S520 which has an input terminal connected to the buffer S409, and a delayed feedback path from the positive output terminal of the flip flop S204 which path includes the delay flop S301, the cathode follower S303, and the buffer S416 feeding back to a reset terminal of the flip flop S204.

The flip flop M202 when set generates the EP signals to indicate that an input error has occurred. This flip flop is used primarily as a memory to indicate the occurrence of an error and to start a reread cycle. Its memory function is discussed below in relation to the flip flop S202. If there is no error resulting from the reread the flip flop is reset by a −BM3 signal before it can cause the setting of the flip flop S202.

The flip flop S202 when set generates the ER signals which indicate an input error has occurred. Under normal operating conditions, this flip flop is set via the set gate S505 by the combination of an EP, BZ and DV. These signals only occur in coincidence whenever an error has occurred twice and at the end of a rewind preparatory to a third reread of a block of information.

The set gate S503, the set gate S504 and the gate S502 are used during test operations to detect an input error, but during such operations, the input error is only indicated and the machine does not halt since the KM signal from the input error selector Z708, FIG. 38, maintains the output of buffer U413 positive and the −ERR signal does not block gate U527 to stop the EL signals and input tape driving. The set gate S511 is used to indicate an error during the block by block stepping of a one block test operation.

The flip flop S205 when set, generates the EY signals to indicate that an out of order reel has been inserted into a tape unit during a multiple reel selection operation. It should be noted that both the flip flops S202 and S205 are reset by either a −DZ or a −PX signal. The −DZ signal results from activating an initial clear switch which is usually done at the start of an operation, and the −PX signal is generated by depressing a proceed switch or an input error reset switch at any time during the operation after a halt has occurred. More particularly, the flip flop S205 generating the EY signals is the out of sequence error check. The flip flop is fed by the set gate S506 which in turn receives signals from the buffer S402. During all operations which assume that the file to be processed is in sequence in ascending order (i.e., select, collate, select and collate), an ME signal from the control box 226 continuously feeds one input of the set gate S506 through buffer S422. Whenever an input cycle occurs for an item being entered from any tape unit except the tape unit III 236, the BM2 signal is present and the −DGR0 signal is absent so that the set gate S506 is dependent upon the signals from the buffer S402. The CQ2 signal feeding the buffer S402 is from the comparison circuits 218 and when present indicates that the contents of the memory channel C206 are greater than the contents of the memory channel A202. Similarly, the CR2 signal from the comparison circuits when present indicates that the contents of the memory channel C206 are greater than the contents of the memory channel B204. Since the contents of the memory channel C206 are always the previously entered item, and the memory channels A202 or B204 receive the newly entered item, the only time the contents of the memory channel C206 are greater than the contents of either of the two other memory channels is when items are entered not in a sequential ascending order. In such a case, the flip flop S205 is set and the EY signals generated. The EY' signal is fed through buffer S406 and cathode follower S302 as the DQ signal to the control box 226 where it activates an alarm indicator Z801 to give a visual or audible indication of the occurrence of an error.

The flip flop S203 when set generates the PS signals which are characteristic of signal block operation. This is primarily a maintenance or test procedure and is not necessarily concerned with normal operation of the file processor, but is included for the sake of completeness.

The flip flop S206, when set, generates the EZ signals which indicate the end of an operation whether it be sequence, select, collate, separate, etc. When the operation is a sequence operation, the set gate S510 is used (note the presence of the MA signal as an input to this gate). During all other operations the set gate S509 passes the setting pulse (note the presence of the —MA signal as an input to this gate).

During any operations involving magnetic tape it is possible to reach the end of the tape stored on a reel. For this reason each of the magnetic tapes used in the file processor contains a leader mark which is sensed by conventional apparatus to indicate the end of the tape on the reel. When this leader mark is detected, a signal is generated which is fed via the appropriate tape unit to an input of the buffer S401. The signal from the tape unit I is the TUER1 signal, from the tape unit II is the TUER2, etc. The presence of any one of these signals permits the passage of clock pulses through the gate S501 to activate the D.C. amplifier S201 and cause the generation of the TUER signals which indicate that one of the tape units has reached the end of a reel.

Whenever any one of the above described errors occurs or whenever the end of a reel is detected, the file processor, under normal operating conditions, is halted and an alarm is activated. The activation of the alarm is accomplished by the feeding of an error signal through the buffer S406 to the cathode follower S302 which generates a DQ signal that is fed to the relay Z801 of the control box 226, FIG. 38, to activate the alarm.

The signals feeding the buffer S406 indicate specific conditions which are summarized in the succeeding table:

| Signal | Condition |
| --- | --- |
| HHR | Output error, the recording of a bit containing all zeros or all ones. |
| ERR | Input error, the representation of the count of the bits that are read in does not agree with the representation of the count of the check digits and a reread has not remedied the condition. |
| EYR | The reading of an out of order reel during a selection operation. |
| EZR | The end of an operation. |
| TUER | The end of a tape reel. |

The reshaper S207 and its associated circuitry generates the DK signals. The DK signals basically control the direction of magnetic tape movement. When the DK signals are present the magnetic tapes are driven by the tape units in a forward direction. When the DK signals are absent, the magnetic tapes will move in a reverse direction. In all operations but sequencing, the magnetic tapes move only in a forward direction. During sequencing operations, the magnetic tapes, depending upon the pass being performed, move either in a forward or reverse direction. The only other time that a direction reversal will occur is during a reread as a result of an input error. For this reason, the BW signals associated with the error are fed to the gate S530 and the buffer S417 to reverse the conditions set up by the ED signals which normally determine the state of the reshaper S207.

Whenever a magnetic tape unit is switched from a reading to a writing operation, it is necessary to introduce a time delay so that a switching relay Q701 within a tape unit may switch the transducing head from recording circuits to the reproducing circuits or vice versa. This operation normally occurs at the beginning and end of a pass during the sequence operations. At this time, a pulse (the 888¾) passes through the gate S520 to the extender S101. A pulse from the extender S101 passes through the set gate S524 to set the flip flop S204. As the flip flop S204 is set, a positive transient is fed through an RC differentiating network to trigger the delay flop S301 which starts generating a positive signal that is fed through the cathode follower S303 and the buffer S416 to a reset terminal of the flip flop S204. Approximately one hundred milliseconds later (a sufficient time for a read-write relay to change position) the positive output of the delay flop S101 returns to a negative potential. This negative potential permits a negative pulse (—t20, comprised of a —TA, a —TC, and a d4° pulses) to synchronously reset the flip flop S204. As the flip flop S204 resets a positive transient formed by the RC network is transmitted via the EE signal line to indicate that the magnetic tapes are again available for use.

51. *Tape selection and motion control (FIG. 43)*

The tape selection and motion control 758 as shown in FIG. 43 functions primarily to control the flip flops of tape selector 760 which select the specific tape units for reproducing or recording and to start and stop the tape units in the handling of blocks of information. The tape selection and motion control 758 comprises: the flip flop U201 having the set gates U501, U502 and U503 and the reset buffer U402; the flip flop U101 having the set gates U509 and U510 being fed by the gate U512; the set gate U506 receiving signals from the buffer U403; the set gate U507 and the reset buffer U405; a modified flip flop composed of D.C. amplifiers U203, U204 and U205, the set gates U513 and U515, the reset gate U516 and the reset buffer U409; the reshaper U109 having the input gates U525, U526 which is fed by the buffer U411, the input gate U542 which is fed by the buffer U412 and the gates U543 and U527; the pulse extender U110 whose input terminal receives signals from the gates U536 and U538; the pulse extender U111 whose input terminal receives signals from the gates U537, U539, U540 and U541; the reshaper U105 having input gates U528, U524, U529 and U530 which receives signals from the buffer U419; the pulse extender U106 being fed by the gate U532 which receives signals from reshaper U105; the pulse extender U107 fed by the gate U533; the pulse extender U108 being fed by the gate U534 which in turn receives signals from the buffer U421; the pulse extender U104 having an input terminal which receives signals from the buffer U424 having one input terminal connected to the output terminal of the gate U522, a second input terminal connected to the output terminal of the cathode follower U305, and a third input terminal connected to the gate U521; the one millisecond delay flop U303 which feeds the cathode followers U304 and U305 and which receives signals from the extender U103 via the gate U520; and the cathode follower amplifier U302 being fed by the delay flop U301 which receives signals from the gate U519.

The flip flop U201, which when set generates the CZ signals, is primarily a binary counter to determine which of the tape units will feed the next block of information into the input synchronizer 220. The binary counter operation is dependent upon the CY3 signal fed to the set gate U501 and the —CY3 signal fed to the reset buffer U402. The CY3 signals are received from the comparison circuits 218 and whenever such a signal a generated, the state of the flip flop U201 is changed. When the flip flop U201 is in a set condition, information will be read from either the tape drive of the tape unit I or the tape unit IV depending on whether the tapes are being read in a forward or reverse direction. When the flip flop is in a reset condition, a block will be read from either the tape unit II or the tape unit V depending on whether the tape is being moved in a forward or reverse direction. The set gate U502 is used at the start of a pass to insure that the first block of information read in is from either the tape unit I or tape unit IV. The set gate U503 is used during certain test operations. It should be noted that the —EAR signal feeding the set gate U501 and the EAR signal feeding the reset buffer U402 essentially negate the effect of the CY3 signals during any operation which involves only one input tape unit. Basically the binary counter is frozen into one of its states and remains there until the operation is completed.

The flip flop U101, when set, generates the DF signals. The flip flop U101 acts as a binary counter to select which of the tape units is to receive information from the output synchronizer 222 for recording. When the flip flop is in a set condition, information will be recorded either by the tape units II or V depending on the direction of magnetic tape movement and when the flip flop is in a reset condition, information will be recorded either on the tape units I or IV depending upon the direction of magnetic tape motion. During normal operation, the EJ3 signal fed to the set gate U506 and the —EJ3 signal feeding a reset terminal control the state of the flip flop. The EJ3 signals are generated by the comparison circuits 218 and their occurrence is dependent upon the results of the comparison. The remaining set gates are primarily used during test and maintenance operations.

The modified flip flop comprising the D.C. amplifiers U203, U204 and U205 generates a family of DG signals. When the flip flop is set, the tape unit III is activated to transmit a block of information to the input synchronizer 220 during select operations. The normal set gate for the flip flop is the set gate U515. The set gate U513 is used primarily in test and maintenance operations.

The reshaper U109, when pulsed, generates the EL signals. The prime function of the EL signals is to start the operation of the input synchronizer 220 in its reception of a block of information. The input gate U526 is the most common pulse source feeding the reshaper U109. After a comparison and a transfer of a block of information has occurred, a CX3D signal is generated and initiates the next input cycle by pulsing the reshaper U109. The input gate U525 is used during manual test operation as is the input gate U527. The input gate U523 is the pulse source during the first pass of sequence when information is read in from tape unit III but it is still necessary to both activate the input synchronizer and cause movement of the tape units I and II even though no information is read from them. This is to insure that an adequate amount of tape is reeled out so that when the input tapes I and II are used in the reverse passes of sequence for recording information there is no chance of reaching the end of a reel before all the information is recorded.

The circuitry comprising the pulse extender U110 and the gate U536 causes the generation of the ELB signal. This is a pulse which starts an input tape unit moving in the reverse direction. Thus, whenever an EL0 signal is generated to start the input synchronizer 220, the EL0 signal cooperating with a DKR signal characteristic of reverse tape movement at gate U536, causes a pulse to be fed to the extender U110 to generate an ELB signal. Similarly the extender U111 and the gate U537 are used to generate an ELF signal which will start the selected input tape units in a forward direction. Thus, whenever an EL0 signal is generated, it starts the input synchronizer 220 and if the —DKR signal is absent a pulse passes through the gate U537 to cause the generation of an ELF signal. The gates U539, U540 and U541 are primarily concerned with test and error procedures.

The reshaper U105, when pulsed, causes the generation of the EM signals which trigger the output synchronizer 222 to transfer a block of information to a selected tape unit for recording. The input gate U529 is the normal pulse source for the reshaper U105. The CX3D signal occurring at the end of a comparison and transfer cycle associated with the previous block triggers the reshaper U105 to cause the generation of the EM signals. The input gates U524, U528, U529 and U530 are used primarily during test or error procedures. It should be noted that the input gate U523 is not only a pulse source for the reshaper U109 during the first pass of a sequence operation, but is also a pulse source for the reshaper U105 and performs a similar function for the reshaper U105 as it did for the reshaper U109.

The pulse extender U106 and the gate U532 are used to generate an EMB signal whenever an EM0 signal is generated to start the output synchronizer 222. If a DKR signal is present indicating reverse tape movement, an EM0 pulse passes through the gate U532 to give an EMB signal which will start the selected output tapes in a reverse direction. Similarly the extender U107 and the gate U533 cause the generation of an EMF signal which will start the selected output tape in a forward direction whenever an EM0 signal is generated during the absence of a —DKR signal.

The pulse extender U108, the gate U534 and the buffer U421 are serially connected and cause the generation of the JS signals whenever the selected output tape is to be stopped after recording a block of information at the end of an entire pass. Similarly the extender U104, the buffer U424 and the gate U522 are used to generate the JR signal after a block of information has been read from an input magnetic tape.

The serial combination of the gate U520, the pulse extender U103, the delay flop U303, and the cathode follower U305 feeding a second input of the buffer U424 for the extender U104, permits a delayed stopping of the reading tapes whenever an error has occurred. In this case, the tapes are stopped one millisecond later than the normal stopping time to permit adequate acceleration and deceleration time before a reread is performed.

The serial combination of the gate U519, the three second delay flop U301 and the cathode follower U302 which generates the EB signal that feeds a third input terminal of the buffer U424, permits a delay termination of reading tape movement at the end of a first pass of sequencing to provide an adequate safety margin so that there is enough tape to accept all the information that may be recorded on a reading tape during succeeding passes when the reading tape becomes a writing tape.

52. Conclusion

Thus, by the present invention, the sequencing of a file of randomly arranged items can be greatly speeded up by the means permitting the sequencing to be performed during both the forward and reverse passes of the magnetic tapes. In the specific embodiment shown, ascending sequences are formed when the magnetic tapes are moving in a forward direction and descending sequences are formed when the tapes are moving in a reverse direction. In this manner, the usual idle rewind or backward pass procedure is eliminated, not only causing a saving in operating time but also minimizing magnetic tape wear due to head abrasion. Although only the embodiment for processing items recorded on magnetic tape is disclosed, it should be apparent that bidirectional sequencing can also be performed on items stored on other media such as conventional punched cards or punched paper tape. Therefore, unless expressly stated, the invention should not be considered to be wholly limited in scope to the shown embodiment, but should be interpreted in the broader sense of encompassing the mechanisms for alternate sequencing in two directions.

With a goal to minimizing operating time, two very important file processing operations have been integrally combined so that a combined select and collate operation is performed in a single pass through a file of items. This combined operation has been shown for the file processor as disclosed. In the instant file processor, the operating period of a routine which includes extracting items from two files while they are being merged, has been greatly reduced, permitting the handling of large quantities of data in a reasonable period of time.

It should be apparent to those skilled in the art that the invention, although shown for the specific select and collate operation is equally applicable to similar operations during which two input files of items are merged to form one main file while simultaneously extracting predetermined items from the combined main file.

In addition, apparatus has been shown which permits multiple criteria separation. With such apparatus, it is possible on one pass of a file of items to separate out all those items which satisfy at least one of a plurality of conditions. Such an operation permits the most efficient use of data processing equipment by obviating the necessity of several passes of a file during which each of the criteria is independently used to separate out items. When the master file contains thousands of items, each pass consumes an appreciable period of time and therefore it is highly desirable to hold the number of passes of the main file to a minimum. For this reason and also to minimize magnetic tape abrasion, the novel apparatus which permits multiple separating during one pass is a valuable feature of the present embodiment of the invention. It has also been shown that apparatus is provided for economizing a selection operation. By using the actual characters in a selector item to activate the comparison units which compare a selector item and a main file item, it is not necessary to perform the usual function of preinserting or programming information to indicate the fields of a main file item which are critical in the comparisons. Therefore both operating time and apparatus are minimized.

Apparatus has also been shown which permits the handling of variable length items in a highly efficient manner. The apparatus permits the more flexible handling of information by a very slight increase in the apparatus of a total system. It permits the handling of very large items in storage registers having a capacity that is a fraction of the item lengths by separating the item into blocks and treating the blocks serially. Each block of an item is considered to be linked together by means of the control indicia appended to the end of the block.

It should be apparent to those skilled in the data processing art, that many of the above noted aspects of the invention are not restricted to record media of the magnetic type or class, but are beneficial to other data processors which handle record media such as punched cards or paper tapes, or records having information in the form of coded arrangements of conductive or photoelectrically readable spots or areas.

Provision has been made in the file processor to detect the human error of intermixing reels of magnetic tape when a multitape file is processed. The apparatus which performs the checking is basically a comparator that compares the last item of one reel with the first item of the next reel. Although the specific embodiment is for separate reels, it should be apparent to those skilled in the art that it is equally possible to perform such a test with succeeding items recorded on the same magnetic tape whenever all items of the file are assumed to be prearranged in a given order of significance relative to each other. Thus missorting of information may be readily detected. Likewise, similar apparatus can perform the same type of test with bins of punched cards or the other record media mentioned.

Sequential memory location apparatus has also been shown which permits the rapid location of addresses in a recirculating type memory. The apparatus as shown eliminates the need for much of the equipment associated with conventional address generators and locators. Although in the present embodiment, recirculating acoustic delay lines are employed as a memory, other recirculating memories such as magnetic drums can be used. Therefore this aspect of the invention should be interpreted in the broad sense of encompassing all recirculating type memories.

Magnetic tape apparatus has also been included which permits the reliable recording of a block of information. The apparatus insures that whenever the recording of a block is initiated, the entire block may be recorded before the end of a reel of tape is reached. In this way, the possibility of partial block recording is prevented. It should be noted that by using a minimum of extra apparatus, primarily an extra tape channel and a transducing head, a desirable error preventing means is provided.

There now will be obvious to those skilled in the art many modifications and variations utilizing the principles and apparatus set forth and realizing many or all of the objects and advantages of the circuits described, but which do not depart essentially from the spirit of the invention.

What is claimed is:

1. Apparatus for processing a file of items, each item being represented by a plurality of signals in a descending order of significance, said apparatus comprising a first magnetic tape having recorded thereon the signals representing items of the file, means for reproducing the signals from said magnetic tape, a second magnetic tape, converting means for recording on said second magnetic tape in an ascending order of significance the signals reproduced from said first magnetic tape, and a reversing means to change the direction of motion of both said first and second magnetic tapes and to interchange their recording and reproducing functions whereby the signals representing items may be read from said second tape in a descending order of significance.

2. Apparatus for processing a file of items, each item being composed of a plurality of digits represented by signals, said apparatus comprising a first magnetic tape containing the signals representing items of the file, means for reproducing each of the items on said first magnetic tape most significant digit first in time, a second magneitc tape, means for recording the signals representing the items reproduced from said first magnetic tape on said second magnetic tape least significant digit first in time while said first and said second magnetic tapes are moving in a first direction, reversing means to reverse the direction of said first and said second magnetic tapes and to interchange their recording and reproducing functions, means for reproducing each of the items on said second magnetic tape most significant digit first in time, and means for recording the signals representing the items reproduced from said second magnetic tape on said first magnetic tape least significant digit first in time when said reversing means has caused said tapes to move in a direction opposite to said first direction.

3. A file processor apparatus for sequencing a file of items, each item being composed of a plurality of digits represented by signals, said apparatus comprising a first magnetic tape containing the signals representing items of the file, means for reproducing each of the items on said first magnetic tape most significant digit first in time, a second magnetic tape, means for recording the signals representing the items reproduced from said first magnetic tape on said second magnetic tape least significant digit first in time while said first and said second magnetic tapes are moving in a first direction, reversing means to reverse the direction of said first and said second magnetic tapes and to interchange their recording and reproducing functions, means for reproducing each of the items on said second magnetic tape most significant digit first in time, means for recording the signals representing the items reproduced from said second magnetic tape on said first magnetic tape least significant digit first in time when said reversing means is operative whereby all items are entered from either said first or second magnetic tape in the same order of significance, a plurality of means, each to retain an item in said apparatus, and means responsive to said item representing signals to alter the sequence of recording said items on said tapes.

4. Apparatus for sequencing a plurality of items, each item being composed of digits represented by signals, said apparatus comprising a first pair of magnetic tape transport means, each having an associated magnetic tape, means for reproducing the signals representing digits of items recorded on said first pair of magnetic tapes, means for assembling said items such that the digits occur in a first denominational order of significance, means for comparing said items, a second pair of magnetic tape transport means, each having an associated magnetic tape means controlled by said comparing means for transferring items to the tapes of said second pair of magnetic tape transport means so that ascending subsequences are formed, means for recording said compared items on said second pair of magnetic tapes in an opposite order of significance, and tape transport reversing means for reversing the direction of operation of all said tape transport means so that items are reproduced from said second pair of magnetic tapes in said first order of significance, said comparing means, during operation of said reversing means, controlling transfer of said items to said first pair of magnetic tapes so that descending subsequences are formed and recorded on said first pair of magnetic tapes in said opposite order of significance.

5. Apparatus for sequencing a plurality of items, each item being composed of digits represented by signals, said apparatus comprising a first pair of magnetic tape transport means, each having an associated magnetic tape, means for reproducing the signals representing digits of items recorded on said first pair of magnetic tapes, means for assembling said items such that the digits occur most significant digit first in time, a plurality of item storage devices to receive items from said magnetic tapes, means for comparing items in said storage devices, a second pair of magnetic tape transport means each having an associated magnetic tape, means controlled by said comparing means for transferring items from said storage devices to the tapes of said second pair of magnetic tape transport means so that ascending subsequences are formed, means for recording said compared items on said second pair of magnetic tapes least significant digit first in time, and tape transport reversing means for reversing the direction of operation of all said tape transport means so that items are reproduced from said second pair of magnetic tapes most significant digit first, said comparing means during operation of said reversing means controlling transfer of said items to said first pair of magnetic tapes so that descending subsequences are formed and recorded on said first pair of magnetic tapes least significant digit first in time.

6. Apparatus for sequencing a plurality of different magnitude items stored on a magnetic tape, each item being composed of digits represented by signals, said apparatus comprising a first and second pair of magnetic tap units each having a reversible tape transport means for moving a magnetic tape in a forward or a reverse direction and a magnetic transducing head for reproducing or recording signals, an input synchronizing means for receiving items from either of the tape transport means of said first pair of magnetic tape units most significant digit first in time, an output synchronizing means for transferring items to said second pair of magnetic tape units least significant digit first, a storage means for storing items received from said input synchronizing means, a comparing means for comparing the magnitudes of stored items, a transfer means responsive to said comparing means to transfer stored items to either of the tape units of said second pair so as to form subsequences in ascending order on said second pair of magnetic tapes, and reversing means for reversing the direction of movement of all of said tape transport means and for switching said input synchronizing means to respond to said second pair of magnetic tape units and said output synchronizing means to enable recording on said first pair of magnetic tape units, said reversing means also altering said comparing means so that subsequences are formed in decending order on said first pair of magnetic tape units.

7. In a processor for processing a file of items, apparatus for separating in a single and unidirectional pass from the file of items, all items which satisfy one of several alternate or conditions and all of several interdependent "and" conditions comprising a magnetic tape unit for storing the items of the file, a first storage register to serially receive as signals each of the items from said magnetic tape unit, a second storage register for storing groups of comparison indicia signals representing said conditions, groups of non-comparison indicia signals separating comparison indicia signal groups, and end of comparison indicia signals included in the non-comparison indicia signal groups separating "or" condition comparison indicia signal groups and omitted from the non-comparison indicia signal groups separating "and" condition indicia signal groups, said indicia signals being in a representation compatible with the signals from said first storage register, a comparing means responsive to the signals of said first storage register and said second storage register, said comparing means testing the item representing signals in said first storage register with the signals in said second storage register if a non-comparison indicia is not present, control means responsive to said comparing means, said control means having a first or a second state of activation, said control means being in the first state of activation and switching to the second state of activation when said comparing means indicates the equality of signals from said first storage register and the corresponding comparison indicia signals preceding a given end of comparison signal in said second storage register and such given end of comparison signal is received from said second storage register whereby said second state of activation is attained if any one of the several alternate "or" conditions is satisfied or all of several interdependent "and" conditions are satisfied, and second and third magnetic tape units responsive to said control means for receiving the items after the comparisons so that the separated items are transferred to said second magnetic tape unit and the unseparated items are transferred to said third magnetic tape unit.

8. In an information processor which processes items composed of a variable number of characters, means for dividing the items into blocks, each block containing no more than a predetermined maximum number of characters and having appended thereto either one of two types of end of block characters, a plurality of block tranfer paths, a control means for selecting one of said transfer paths, and an end of block character detector activated by only one type of end of block character, said control means being controlled by said end of block character detector to enable said control means to select a transfer path only upon detection by said end of block character detector of said one type of end of block character whereby a block selected transfer path is retained for transfer of following blocks of an item through the same transfer path and until another of said one type of end of block characters is detected.

9. In an information processor which processes items having a variable number of characters, means for dividing the items into blocks, each block having no more than a predetermined maximum number of characters and having appended thereto either one of two types of end of block characters, a device responsive to information in each block, a plurality of block transfer paths, a control means activated by said responsive device for selecting one of said transfer paths, and an end of block character detector for detecting only one said type of end of block character, said control means being controlled by said end of block character detector when said one type of character is detected to enable said control means to select a block transfer path so that a selected transfer path remains set for transfer of following blocks of an item through the same transfer path and until another first type of end of block character is detected.

10. Information processing apparatus for processing items of information, said apparatus comprising a plurality of storage registers, said items having more units of data than the capacity of one of said storage registers and being arranged into a group of blocks, each block having suffixed thereto an end of block marker and being within the capacity of a storage register, said end of block markers being of two types with a first type of marker suffixed to the first of the associated blocks of an item and a second type of marker suffixed to each of the remaining blocks of the item, a first and a second block transfer path in said apparatus, means for detecting the data in one of said blocks and selecting a transfer path in accordance with such data, control apparatus responsive to said detecting means to activate a selected transfer path, an end of block marker detector to sense said end of block markers, and means energized by said end of block marker detector upon detection of a marker of said second type to lock said control apparatus on a selected block transfer path whereby all associated blocks of an item will be transmitted over the same transfer path.

11. File processing apparatus for processing files of variable length items apt to be single and multi-block items, a block adapted to accommodate a fixed, maximum number of characters, said apparatus comprising means providing character signals on which the next processing operation is to be based; at least one input magnetic tape unit having recorded thereon variable length items, the initial block of each item defined as the designator block, including information character signals to be compared with the aforesaid character signals and further including character signals identifying the block as a designator block, and each of any blocks of a given item subsequent to the designator block, defined as trailer blocks, including character signals identifying such block as a trailer block rather than designator block; an input memory channel for each input magnetic tape unit for storing initially the designator block of a given item transferred from the respective input tape unit; an output magnetic tape unit for recording thereon processed items; an output memory channel for storing the designator block of the item last previously recorded on said output magnetic tape unit; comparison means for comparing the first-mentioned character signals and the information character signals of the designator blocks stored in a given input memory channel and in said output memory channel to decide whether the item whose designator block is presently stored in said given input memory channel shall be immediately transferred to said output magnetic tape unit or shall await a subsequent similar comparison; means responsive to said comparison means deciding upon immediate transfer for transferring the designator block stored in said given input memory channel to said output memory channel for storage therein to replace the designator block previously stored therein, and also to said output magnetic tape unit, and for transferring into said given input memory channel for storage the next following block from its respective tape; and testing means responsive to the block identifying signals in the block just transferred to said given input memory channel, if designator block identifying signals, to halt further tape and memory inter-transfers pending another decision of said comparison means, and if trailer block identifying signals, to transfer from said given input memory channel the trailer block presently stored therein to said output magnetic tape and to transfer into said given input memory channel from its respective input tape the next following block for another testing operation.

12. File processing apparatus for bidirectionally processing files of variable length items, apt to be single and multi-block items, in forward and backward passes, a block adapted to accommodate a fixed maximum number of characters, said apparatus comprising at least two magnetic tape units to serve on forward passes as read-from and write-on units respectively and on reverse passes as write-on and read-from units respectively, a forward pass read-from tape unit, when serving as such having recorded thereon variable length items in one character-by-character order of significance, and a reverse pass read-from tape unit, when serving as such, having recorded thereon variable length items in opposite character-by-character order of significance, each "trailer" block intermediate of the initial "front designator" block and the final "back designator" block of a multi-block item of both types of read-from tape units including trailer block identification character signals and information character signals, the former being interpretable as such in forward and reverse order of reading from a read-from unit, the front designator blocks of both types of read-from tape units including block identification character signals and information character signals, the former being interpretable as front designator block identification signals in said forward order and as trailer block identification signals in said reverse order, and the latter including "key" character signals for item-from-item differentiation, the back designator blocks of both types of read-from tape units including the same information character signals as the respective front designator blocks and further including block identification signals interpretable as trailer block identification signals in said forward order and as front designator blocks in said reverse order and the single block items of both types of read-from tape units including front designator block identification character signals and information character signals, the former being interpretable as such in both said forward and reverse orders and the latter including key character signals; an input and an output memory channel for initially storing, on both forward and reverse passes, the initial blocks of items last read from a given read-from and last written on a write-on tape unit respectively, each channel providing the key character signals of the stored block in said one order of character-by-character significance even on reverse passes; means providing a set of comparison basis character signals in said one order of significance on both forward and reverse passes; comparison means for comparing the key signals stored in said channels and said comparison basis signals and for deciding on the basis of the comparison whether the designator block stored in said input channel shall be immediately transferred to a write-on tape unit or shall remain stored for a subsequent comparison; transfer means responsive to said comparison means deciding on immediate transfer for transferring the block stored in said input channel to a write-out tape unit in said forward order and also to said output channel and for transferring the next following block of said given read-from unit to said input channel; and testing means responsive to the block identifying signals in the block just transferred to said input channel, if interpretable as front designator block identifying signals, to halt further tape and memory inter-transfers pending another decision of said comparison means, and if interpretable as trailer block identifying signals, to cause said transfer means to transfer the block stored in said input memory channel to the last-mentioned write-on tape unit in said forward order and the next following block of said given read-from unit to said input channel for another testing operation.

13. Apparatus in a file processor for performing a combined collating and selecting operation on a plurality of items in a single and unidirectional pass, said apparatus comprising a first, a second, and a third magnetic tape unit upon which are recorded as signals respectively a first, a second and a third sequenced file of items, said first and second file items being items to be collated and selected from, and said third file items being selector file items forming the basis of selection; a first, a second, and a third storage means for receiving the logically lowest sequenced item respectively from said first, second and third magnetic tape units; a first comparison circuit responsive to said first and to said second storage means for comparing the items stored therein; a first control circuit responsive to said comparison circuit to enable the transmission of the item in said first storage means and to cause the transfer of the next following item from said first magnetic tape unit to said first storage means when a predetermined relationship exists between the just compared items, and to enable the transmission of the item in said second storage means and cause the transfer of the next following item from said second magnetic tape unit to said second storage means when the predetermined relationship does not exist, thereby to prepare for a new comparison in either case; a second comparison circuit responsive to the transmitted item and the selector item stored in said third storage means for comparing them; a fourth and a fifth magnetic tape unit; and a second control circuit responsive to said second comparison circuit to cause the transfer of the next following selector item from said third magnetic tape unit to said third storage means when said transmitted item is logically greater than the stored selection item just compared therewith to prepare for a new transmitted and selector item comparison, and to channel said transmitted item to said fourth magnetic tape unit when said transmitted item is logically less than said stored selector item and to said fifth magnetic tape unit when said transmitted item is logically equal to said stored selector item.

14. Apparatus in a file processor for performing a combined collating and selecting operation on a plurality of items in a single and unidirectional pass, said apparatus comprising a first, a second, and a third magnetic tape unit upon which are recorded as signals respectively a first, a second and a third sequenced file of items, said first and second file items being items to be collated and selected from, and said third file items being selector file items forming the basis of selection; a first, a second, and a third storage means for receiving the logically lowest sequenced item respectively from said first, second and third magnetic tape unit; a first comparison circuit responsive to said first and to said second storage means for comparing the items stored therein; a first control circuit responsive to said comparison circuit to enable the transmission of the item in said first storage means and to cause the transfer of the next following item from said first magnetic tape unit to said first storage means when a predetermined relationship exists between the just compared items, and to enable the transmission of the item in said second storage means and cause the transfer of the next following item from said second magnetic tape unit to said second storage means when the predetermined relationship does not exist, thereby to prepare for a new comparison in either case; a second comparison circuit responsive to the transmitted item and the selector item stored in said third storage means for comparing them; a fourth and a fifth magnetic tape unit; and a second control circuit responsive to said second comparison circuit to cause the transfer of the next following selector item from said third magnetic tape unit to said third storage means when said transmitted item is logically greater than the stored selection item just compared therewith to prepare for a new transmitted and selector item comparison, and to channel said transmitted item selectively to said fourth and fifth magnetic tape units when said transmitted item is logically equal to or less than said stored selector item.

15. Apparatus for separating in a single and unidirectional pass from a file of items those items which satisfy one of a plurality of alternate "or" conditions and all of a plurality of interdependent "and" conditions, said apparatus comprising input file storage means for storing the file of items, each file item including a key block of character signals representing the item in turn including at respective predetermined locations within the block key character information signal groups separated by non-key character information signal groups, each key character signal group of a given item apt to satisfy a respective one of said individual conditions, a key block storage device for transient storage of the key block of an item from said file storage means with the relative positions of the key character signal groups and non-key character signal groups in correspondence with their relative positions on said file storage means, criteria storage means for storing the condition criteria as key character test signal groups separated by non-key character non-test signal groups corresponding in number and relative position to the key and non-key character signal groups in said key block storage device, each separating non-key character non-test signal group including a first or a second character that signifies that the immediately preceding and succeeding key character signal groups are to be treated on an "and" basis and on an "or" basis respectively, testing means for testing seriatim corresponding ones of said key character signal groups in said key block storage device and said criteria storage means, said testing means responding to said first and second characters and being in one state when in a given test series none of the "or" condition criteria are satisfied and in each set of interdependent "and" conditions one criterion is not satisfied and otherwise to assume an alternate state, and transfer means responsive to said testing means assuming its said alternate state for transferring the item whose key block is stored in said key block storage device to said output file storage means and further responsive to said testing means in either state at the end of a test series for transferring the key block of the next item in said input file storage means to said key block storage device to replace for another testing operation the just tested key block.

References Cited in the file of this patent

UNITED STATES PATENTS

| | | |
|---|---|---|
| 2,587,532 | Schmidt | Feb. 26, 1952 |
| 2,624,786 | Potter | Jan. 6, 1953 |
| 2,679,638 | Bensky | May 25, 1954 |
| 2,688,050 | Harris | Aug. 31, 1954 |
| 2,688,656 | Wright et al. | Sept. 7, 1954 |
| 2,705,262 | Post et al. | Mar. 29, 1955 |
| 2,721,990 | McNaney | Oct. 25, 1955 |
| 2,779,826 | Scott | Jan. 29, 1957 |
| 2,782,398 | West | Feb. 19, 1957 |
| 2,785,390 | Rajchman | Mar. 12, 1957 |
| 2,799,845 | Dietrich | July 16, 1957 |
| 2,818,322 | Blakely | Dec. 31, 1957 |
| 2,847,657 | Hartley | Apr. 12, 1958 |
| 2,911,624 | Booth et al. | Nov. 3, 1959 |
| 2,913,171 | Phelps et al. | Nov. 17, 1959 |
| 2,961,643 | Ayres et al. | Nov. 22, 1960 |

OTHER REFERENCES

Vol. III of Theory and Techniques for Design of Electronic Computers, Moore School of E. E., U. of Penn., June 30, 1948 (lecture 22).